United States Patent
Kastelein et al.

(10) Patent No.: US 12,448,457 B2
(45) Date of Patent: *Oct. 21, 2025

(54) GP130 BINDING MOLECULES AND METHODS OF USE

(71) Applicant: Synthekine, Inc., Menlo Park, CA (US)

(72) Inventors: Robert Kastelein, Menlo Park, CA (US); Deepti Rokkam, Menlo Park, CA (US); Patrick J. Lupardus, Menlo Park, CA (US); Sandro Vivona, Menlo Park, CA (US)

(73) Assignee: Synthekine, Inc., Menlo Park, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 18/006,189

(22) PCT Filed: Aug. 4, 2021

(86) PCT No.: PCT/US2021/044575
§ 371 (c)(1),
(2) Date: Jan. 20, 2023

(87) PCT Pub. No.: WO2022/031869
PCT Pub. Date: Feb. 10, 2022

(65) Prior Publication Data
US 2024/0199737 A1    Jun. 20, 2024

Related U.S. Application Data

(60) Provisional application No. 63/135,884, filed on Jan. 11, 2021, provisional application No. 63/078,745, filed on Sep. 15, 2020, provisional application No. 63/061,562, filed on Aug. 5, 2020.

(51) Int. Cl.
| | |
|---|---|
| *C07K 16/28* | (2006.01) |
| *A61P 37/02* | (2006.01) |
| *C07K 14/715* | (2006.01) |
| *C07K 16/46* | (2006.01) |
| *C07K 19/00* | (2006.01) |
| *C12N 15/63* | (2006.01) |
| *C12N 15/86* | (2006.01) |
| *A61K 39/00* | (2006.01) |

(52) U.S. Cl.
CPC .......... *C07K 16/2866* (2013.01); *A61P 37/02* (2018.01); *C07K 14/7155* (2013.01); *C07K 16/2803* (2013.01); *C07K 16/46* (2013.01); *C07K 16/468* (2013.01); *C07K 19/00* (2013.01); *C12N 15/63* (2013.01); *C12N 15/86* (2013.01); *A61K 2039/505* (2013.01); *C07K 2317/22* (2013.01); *C07K 2317/24* (2013.01); *C07K 2317/31* (2013.01); *C07K 2317/33* (2013.01); *C07K 2317/522* (2013.01); *C07K 2317/524* (2013.01); *C07K 2317/526* (2013.01); *C07K 2317/53* (2013.01); *C07K 2317/565* (2013.01); *C07K 2317/567* (2013.01); *C07K 2317/569* (2013.01); *C07K 2319/40* (2013.01)

(58) Field of Classification Search
None
See application file for complete search history.

(56) References Cited

U.S. PATENT DOCUMENTS

| | | |
|---|---|---|
| 8,258,268 B2 | 9/2012 | Wu et al. |
| 8,921,528 B2 | 12/2014 | Holt et al. |
| 8,975,382 B2 | 3/2015 | Revets et al. |
| 9,334,331 B2 | 5/2016 | Igawa et al. |
| 10,421,807 B2 | 9/2019 | Gonzales et al. |
| 10,450,381 B2 | 10/2019 | Igawa et al. |
| 10,927,186 B2 | 2/2021 | Roobrouck et al. |
| 11,873,349 B1 | 1/2024 | Kastelein et al. |
| 12,157,773 B2 | 12/2024 | Kastelein et al. |
| 2006/0024295 A1 | 2/2006 | Brunetta |
| 2010/0297127 A1 | 11/2010 | Ghilardi et al. |
| 2011/0028695 A1 | 2/2011 | Revets et al. |
| 2011/0053865 A1 | 3/2011 | Saunders et al. |
| 2011/0142831 A1 | 6/2011 | Cua et al. |
| 2011/0311550 A1* | 12/2011 | Law .............. C07K 16/109 435/339 |
| 2012/0201746 A1 | 8/2012 | Liu et al. |
| 2012/0316324 A1 | 12/2012 | Adams et al. |
| 2013/0189262 A1 | 7/2013 | Wong et al. |
| 2014/0065142 A1 | 3/2014 | Roschke et al. |
| 2015/0079088 A1 | 3/2015 | Lowman et al. |

(Continued)

FOREIGN PATENT DOCUMENTS

| | | |
|---|---|---|
| CN | 111018985 A | 6/2019 |
| WO | 2008/011081 A2 | 1/2008 |

(Continued)

OTHER PUBLICATIONS

MacCallum et al., Antibody-antigen interactions: contact analysis and binding site topography; 1996, J. Mol. Biol., 262: 732-745. (Year: 1996).*

(Continued)

*Primary Examiner* — Daniel E Kolker
*Assistant Examiner* — James Ryland Melchior
(74) *Attorney, Agent, or Firm* — Kilpatrick Townsend & Stockton LLP

(57) ABSTRACT

The present disclosure relates to biologically active molecules comprising a single domain antibody (sdAb) that specifically binds to the extracellular domain of human gp130, compositions comprising such antibodies, and methods of use thereof.

20 Claims, No Drawings
Specification includes a Sequence Listing.

(56) References Cited

U.S. PATENT DOCUMENTS

| | | |
|---|---|---|
| 2016/0046730 A1 | 2/2016 | Ghayur et al. |
| 2016/0251440 A1 | 9/2016 | Roobrouck et al. |
| 2017/0106051 A1 | 4/2017 | Oh et al. |
| 2017/0298149 A1 | 10/2017 | Baeuerle et al. |
| 2018/0362655 A1 | 12/2018 | Wang et al. |
| 2019/0185562 A1 | 6/2019 | Gromada et al. |
| 2019/0330366 A1 | 10/2019 | Eckelman et al. |
| 2019/0352404 A1 | 11/2019 | Xu et al. |
| 2019/0382500 A1 | 12/2019 | Abujoub et al. |
| 2020/0016202 A1 | 1/2020 | Kuchroo et al. |
| 2020/0055946 A1 | 2/2020 | Timmer et al. |
| 2020/0157237 A1 | 5/2020 | Regev et al. |
| 2024/0026014 A1 | 1/2024 | Kastelein et al. |
| 2024/0209101 A1 | 6/2024 | Kastelein et al. |

FOREIGN PATENT DOCUMENTS

| | | |
|---|---|---|
| WO | 2009/068631 A1 | 6/2009 |
| WO | 2009068627 A2 | 6/2009 |
| WO | 2013/006544 A1 | 1/2013 |
| WO | 2013/059299 A1 | 4/2013 |
| WO | 2015/142675 A2 | 9/2015 |
| WO | 2016/097313 A1 | 6/2016 |
| WO | 2017/198212 A1 | 11/2017 |
| WO | 2019/129221 A1 | 7/2019 |
| WO | 2019/242632 A1 | 12/2019 |
| WO | 2020/144164 A1 | 7/2020 |
| WO | 2020/187711 A1 | 9/2020 |
| WO | 2022031871 A1 | 2/2022 |
| WO | 2022055641 A2 | 3/2022 |

OTHER PUBLICATIONS

Dondelinger et al., Understanding the significance and implications of antibody numbering and antigen-binding surface/residue definition, 2018, Frontiers in Immunology, 9(2278): 1-15. (Year: 2018).*

Sheriff et al., Redefining the minimal antigen-binding fragment; 1996, Nature Structural Biology, 3(9): 733-736. (Year: 1996).*

Xu et al., gp130: a promising drug target for cancer therapy; 2013, Expert Opinion on Therapeutic Targets, 17(11): 1303-1328. (Year: 2013).*

Schwerd et al., A biallelic mutation in IL6ST encoding the GP130 co-receptor causes immunodeficiency and craniosynostosis; 2017, Journal of Experimental Medicine, 214(9): 2547-2562. (Year: 2017).*

How is Alzheimer's Disease Treated?, Sep. 12, 2023, NIH-National Institute on Aging, https://www.nia.nih.gov/health/alzheimers-treatment/how-alzheimers-disease-treated. (Year: 2023) (Year: 2023).*

HIV Overview, HIV Treatment: The Basics, Sep. 4, 2024, NIH, https://hivinfo.nih.gov/understanding-hiv/fact-sheets/hiv-and-aids-basics. (Year: 2024) (Year: 2024).*

U.S. Appl. No. 18/006,370 , Advisory Action, Mailed on Jun. 4, 2024, 3 pages.

U.S. Appl. No. 18/006,370 , Notice of Allowance, Mailed on Jul. 26, 2024, 9 pages.

U.S. Appl. No. 18/464,998 , Advisory Action, Mailed on Aug. 26, 2024, 4 pages.

U.S. Appl. No. 18/464,998 , Final Office Action, Mailed on Jul. 10, 2024, 6 pages.

U.S. Appl. No. 18/464,998 , Non-Final Office Action, Mailed on Apr. 12, 2024, 8 pages.

International Search Report in PCT/US2021/044575, mailed Feb. 2, 2022.

Shahangain et al., VVH Against VEGF-RBD, Genbank entry (online) National Center for Biotechnology Information, May 12, 215, retrieved from the internet www.ncbi.nlm.nih.gov/protein/BAR73350. 1, 2 pages.

Cairo, et al. "Control of multivalent interactions by binding epitope density." Journal of the American Chemical Society 124, No. 8 (2002): 1615-1619.

Fan, et al. "Bispecific antibodies and their applications." Journal of hematology & oncology 8 (2015): 1-14.

Heldin, Carl-Henrik. "Dimerization of cell surface receptors in signal transduction." Cell 80, No. 2 (1995): 213-223.

Holliger, et al. ""Diabodies": small bivalent and bispecific antibody fragments." Proceedings of the National Academy of Sciences 90, No. 14 (1993): 6444-6448.

Kontermann, "Dual Targeting Strategies with Bispecific Antibodies," mAbs, 4:2 Mar. 1, 2012, 182-197.

Nie, et al. "Biology drives the discovery of bispecific antibodies as innovative therapeutics." Antibody therapeutics 3, No. 1 (2020): 18-62.

Pingwara et al. IFN-λ Modulates the Migratory Capacity of Canine Mammary Tumor Cells via Regulation of the Expression of Matrix Metalloproteinases and Their Inhibitors. Cells. Apr. 23, 2021;10(5):999.

Saerens, et al. "Single-domain antibodies as building blocks for novel therapeutics." Current opinion in pharmacology 8, No. 5 (2008): 600-608.

Weidle et al., "The Intriguing Options of Multispecific Antibody Formats for treatment of Cancer," Cancer Genomics & Proteomics 10:1-18 (2013).

U.S. Appl. No. 18/464,998, filed Sep. 11, 2023, Robert Kastelein.

U.S. Appl. No. 18/006,370 , Final Office Action, Mailed on Mar. 15, 2024, 12 pages.

U.S. Appl. No. 18/006,370 , Non-Final Office Action, Mailed on Dec. 4, 2023, 36 pages.

U.S. Appl. No. 18/164,386 , Non-Final Office Action, Mailed on Jul. 25, 2023, 25 pages.

U.S. Appl. No. 18/164,386 , Notice of Allowance, Mailed on Aug. 25, 2023, 10 pages.

Akbar et al., "A Compact Vocabulary of Paratope-Epitope Interactions Enables Predictability of Antibodyantigen Binding", Cell Reports, vol. 34, 108856, Mar. 16, 2021, 21 pages.

Bhattacharya et al., "Impact of Genetic Variation on Three Dimensional Structure and Function of Proteins", PLoS One, vol. 12, No. 3, e0171355, Mar. 15, 2017, pp. 1-22.

Bork et al., "Go Hunting in Sequence Databases but Watch Out for the Traps", Trends in Genetics, vol. 12, No. 10, Oct. 1996, pp. 425-427.

Bork , "Powers and Pitfalls in Sequence Analysis: The 70% Hurdle", Genome Research, vol. 10, No. 4, Apr. 2000, pp. 398-400.

Brenner , "Errors in Genome Annotation", Trends in Genetics, vol. 15, No. 4, Apr. 1999, pp. 132-133.

Brorson et al., "Mutational Analysis of Avidity and Fine Specificity of Anti-Levan Antibodies", The Journal of Immunology, vol. 163, No. 12, Dec. 15, 1999, pp. 6694-6701.

Brummell et al., "Probing the Combining Site of an Anti-Carbohydrate Antibody by Saturation-Mutagenesis: Role of the Heavy-Chain CDR3 Residues", Biochemistry, vol. 32, No. 4, Feb. 1993, pp. 1180-1187.

Burks et al., "In Vitro Scanning Saturation Mutagenesis of an Antibody Binding Pocket", Proceedings of the National Academy of Sciences, vol. 94, No. 2, Jan. 21, 1997, pp. 412-417.

Cairo et al., "Control of Multivalent Interactions by Binding Epitope Density", Journal of the American Chemical Society, vol. 124, No. 8, Feb. 2, 2002, pp. 1615-1619.

Colman , "Effects of Amino Acid Sequence Changes on Antibody-Antigen Interactions", Research in Immunology, vol. 145, No. 1, Jan. 1994, pp. 33-36.

De Weerd et al., "The Interferons and Their Receptors—Distribution and Regulation", Immunology & Cell Biology, vol. 90, No. 5, May 2012, pp. 483-491.

Doerks et al., "Protein Annotation: Detective Work for Function Prediction", Trends in Genetics, vol. 14, No. 6, Jun. 1998, pp. 248-250.

Edwards et al., "The Remarkable Flexibility of the Human Antibody Repertoire; Isolation of Over One Thousand Different Antibodies to a Single Protein, BLyS", Journal of Molecular Biology, vol. 334, No. 1, Nov. 14, 2003, pp. 103-118.

Fan et al., "Bispecific Antibodies and their Applications", Journal of Hematology & Oncology, vol. 8, No. 130, Dec. 21, 2015, pp. 1-14.

(56) References Cited

OTHER PUBLICATIONS

Fenton et al., "Rheostat Positions: A New Classification of Protein Positions Relevant to Pharmacogenomics", Medicinal Chemistry Research, vol. 29, Jun. 7, 2020, pp. 1133-1146.
Fu et al., "Comparison of Camelus Bactrianus VHH Sequences from Conventional and Heavy Chain Antibodies", National Center for Biotechnology Information, Available Online at: https://www.ncbi.nlm.nih.gov/nucleotide/KF179376.1, GenBank: KF179376.1, Sep. 21, 2013, 1 page.
Goel et al., "Plasticity Within the Antigen-Combining Site May Manifest as Molecular Mimicry in the Humoral Immune Response", The Journal of Immunology, vol. 173, No. 12, Dec. 2004, pp. 7358-7367.
Guo et al., "Protein Tolerance to Random Amino Acid Change", Proceedings of the National Academy of Sciences, vol. 101, No. 25, Jun. 14, 2004, pp. 9205-9210.
Heldin, "Dimerization of Cell Surface Receptors in Signal Transduction", Cell, vol. 80, No. 2, Jan. 27, 1995, pp. 213-223.
Holliger et al., ""Diabodies": Small Bivalent and Bispecific Antibody Fragments", Proceedings of the National Academy of Sciences, vol. 90, No. 14, Jul. 15, 1993, pp. 6444-6448.
Ikeuchi et al., "Delicate Balance Among Thermal Stability, Binding Affinity, and Conformational Space Explored by Single-domain VHH Antibodies", Scientific Reports, vol. 11, No. 1, Oct. 18, 2021, 9 pages.
Jang et al., "The Structural Basis for DNA Binding by an Anti-DNA Autoantibody", Molecular Immunology, vol. 35, No. 18, Dec. 15, 1998, pp. 1207-1217.
Jiang et al., "Regulation of Interleukin-10 Receptor Ubiquitination and Stability by Beta-TrCP-Containing Ubiquitin E3 Ligase", PLoS ONE, vol. 6, No. 11, Nov. 8, 2011, pp. 1-14.
Khan et al., "Adjustable Locks and Flexible Keys: Plasticity of Epitope-Paratope Interactions in Germline Antibodies", The Journal of Immunology, vol. 192, No. 11, Jun. 1, 2014, pp. 5398-5405.
Kobayashi et al., "Tryptophan H33 Plays an Important Role in Pyrimidine (6-4) Pyrimidone Photoproduct Binding by a High-Affinity Antibody", Protein Engineering, vol. 12, No. 10, Oct. 1, 1999, pp. 879-884.
Kontermann, "Dual Targeting Strategies with Bispecific Antibodies", mABs, vol. 4, No. 2, Mar.-Apr. 2012, pp. 182-197.
Lloyd et al., "Modelling the Human Immune Response: Performance of a 1011 Human Antibody Repertoire Against a Broad Panel of Therapeutically Relevant Antigens", Protein Engineering, Design and Selection, vol. 22, No. 3, Mar. 2009, pp. 159-168.
Lo et al., "Conformational Epitope Matching and Prediction Based on Protein Surface Spiral Features", BMC Genomics, vol. 22, May 31, 2021, pp. 1-16.
Marks et al., "How Repertoire Data are Changing Antibody Science", Journal of Biological Chemistry, vol. 295, No. 29, Jul. 17, 2020, pp. 9823-9837.
Nie et al., "Biology Drives the Discovery of Bispecific Antibodies as Innovative Therapeutics", Antibody Therapeutics, vol. 3, No. 1, Feb. 17, 2020, pp. 18-62.
Application No. PCT/US2021/044576, International Preliminary Report on Patentability, Mailed on Feb. 16, 2023, 8 pages.
Application No. PCT/US2021/044576, International Search Report and Written Opinion, Mailed on Jan. 12, 2022, 12 pages.
PCT/US2021/044576, "Invitation to Pay Additional Fees and, Where Applicable, Protest Fee", Nov. 12, 2021, 2 pages.
Application No. PCT/US2021/044577, International Preliminary Report on Patentability, Mailed on Feb. 16, 2023, 7 pages.
Application No. PCT/US2021/044577, International Search Report and Written Opinion, Mailed on Dec. 9, 2021, 10 pages.
Pingwara et al., "IFN-λ Modulates the Migratory Capacity of Canine Mammary Tumor Cells via Regulation of the Expression of Matrix Metalloproteinases and Their Inhibitors", Cells, vol. 10, No. 5, Apr. 23, 2021, pp. 1-15.
Poosarla et al., "Computational de novo Design of Antibodies binding to a Peptide with High Affinity", Biotechnology and Bioengineering, vol. 114, No. 6, Jan. 6, 2017, pp. 1331-1342.
Rudikoff et al., "Single Amino Acid Substitution Altering Antigen-Binding Specificity", Proceedings of the National Academy of Sciences, vol. 79, No. 6, Mar. 1, 1982, pp. 1979-1983.
Saerens et al., "Single-Domain Antibodies as Building Blocks for Novel Therapeutics", Current Opinion in Pharmacology, vol. 8, No. 5, Oct. 2008, pp. 600-608.
Shouval et al., "Interleukin 10 Receptor Signaling: Master Regulator of Intestinal Mucosal Homeostasis in Mice and Humans", Advances in Immunology, vol. 122, 2014, pp. 1-29.
Skolnick et al., "From Genes to Protein Structure and Function: Novel Applications of Computational Approaches in the Genomic Era", Trends in Biotechnology, vol. 18, No. 1, Jan. 1, 2000, pp. 34-39.
Smith et al., "The Challenges of Genome Sequence Annotation or "The Devil is in the Details"", Nature Biotechnology, vol. 15, No. 12, Nov. 1997, pp. 1222-1223.
Tokuriki et al., "Stability Effects of Mutations and Protein Evolvability", Current Opinion in Structural Biology, vol. 19, No. 5, Oct. 2009, pp. 596-604.
Vajda et al., "Progress Toward Improved Understanding of Antibody Maturation", Current Opinion in Structural Biology, vol. 67, Apr. 2021, pp. 226-231.
Vasudevan et al., "A Single Amino Acid Change in the Binding Pocket Alters Specificity of an Anti-Integrin Antibody AP7.4 as Revealed by Its Crystal Structure", Blood Cells, Molecules, and Diseases, vol. 32, No. 1, Jan.-Feb. 2004, pp. 176-181.
Zhang et al., "Comprehensive Optimization of a Single-Chain Variable Domain Antibody Fragment as a Targeting Ligand for a Cytotoxic Nanoparticle", mAbs, vol. 7, No. 1, Jan. 2015, pp. 42-52.
Anonymous, "Human gp130 Antibody," Datasheet, Monoclonal Mouse IgG1 Clone # 28126, XP093090952, Feb. 7, 2018, pp. 1-2.
Baran et al., "The Balance of Interleukin (IL)-6, IL-6.Soluble IL-6 Receptor (sIL-6R), and IL-6.sIL-6R.sgp130 Complexes Allows Simultaneous Classic and Trans-Signaling," Journal of Biological Chemistry, vol. 293, No. 18, May 4, 2018, pp. 6762-6775.
Chow et al., "A structural template for gp130-cytokine signaling assemblies," Biochimica et Biophysica Acta, 1592, 2002, pp. 225-235.
EP Application No. 2185240.3, Partial Search Report, dated Sep. 18, 2024, 17 pages.
Hunter et al., "Interleukin-27: Balancing Protective and Pathological Immunity," Immunity 37, Dec. 14, 2012, pp. 960-969.
Jones et al., "Therapeutic strategies for the clinical blockade of IL-6/gp130 signaling," The Journal of Clinical Investigation, 121(9), Sep. 2011, pp. 3375-3383.
Schwerd et al., "A biallelic mutation in IL6ST encoding the GP130 coreceptor causes immunodeficiency and craniosynostosis," J Exp Med. 214(9), 2017, pp. 2547-2562.

* cited by examiner

SEQUENCE LISTING

<160> NUMBER OF SEQ ID NOS: 288

<210> SEQ ID NO 1
<211> LENGTH: 918
<212> TYPE: PRT
<213> ORGANISM: Homo sapiens

<400> SEQUENCE: 1

```
Met Leu Thr Leu Gln Thr Trp Leu Val Gln Ala Leu Phe Ile Phe Leu
1               5                   10                  15

Thr Thr Glu Ser Thr Gly Glu Leu Leu Asp Pro Cys Gly Tyr Ile Ser
            20                  25                  30

Pro Glu Ser Pro Val Val Gln Leu His Ser Asn Phe Thr Ala Val Cys
        35                  40                  45

Val Leu Lys Glu Lys Cys Met Asp Tyr Phe His Val Asn Ala Asn Tyr
    50                  55                  60

Ile Val Trp Lys Thr Asn His Phe Thr Ile Pro Lys Glu Gln Tyr Thr
65                  70                  75                  80

Ile Ile Asn Arg Thr Ala Ser Ser Val Thr Phe Thr Asp Ile Ala Ser
                85                  90                  95

Leu Asn Ile Gln Leu Thr Cys Asn Ile Leu Thr Phe Gly Gln Leu Glu
            100                 105                 110

Gln Asn Val Tyr Gly Ile Thr Ile Ile Ser Gly Leu Pro Pro Glu Lys
        115                 120                 125

Pro Lys Asn Leu Ser Cys Ile Val Asn Glu Gly Lys Lys Met Arg Cys
    130                 135                 140

Glu Trp Asp Gly Gly Arg Glu Thr His Leu Glu Thr Asn Phe Thr Leu
145                 150                 155                 160

Lys Ser Glu Trp Ala Thr His Lys Phe Ala Asp Cys Lys Ala Lys Arg
                165                 170                 175

Asp Thr Pro Thr Ser Cys Thr Val Asp Tyr Ser Thr Val Tyr Phe Val
            180                 185                 190

Asn Ile Glu Val Trp Val Glu Ala Glu Asn Ala Leu Gly Lys Val Thr
        195                 200                 205

Ser Asp His Ile Asn Phe Asp Pro Val Tyr Lys Val Lys Pro Asn Pro
    210                 215                 220

Pro His Asn Leu Ser Val Ile Asn Ser Glu Glu Leu Ser Ser Ile Leu
225                 230                 235                 240
```

-continued

```
Lys Leu Thr Trp Thr Asn Pro Ser Ile Lys Ser Val Ile Ile Leu Lys
                    245                 250                 255

Tyr Asn Ile Gln Tyr Arg Thr Lys Asp Ala Ser Thr Trp Ser Gln Ile
            260                 265                 270

Pro Pro Glu Asp Thr Ala Ser Thr Arg Ser Ser Phe Thr Val Gln Asp
        275                 280                 285

Leu Lys Pro Phe Thr Glu Tyr Val Phe Arg Ile Arg Cys Met Lys Glu
    290                 295                 300

Asp Gly Lys Gly Tyr Trp Ser Asp Trp Ser Glu Ala Ser Gly Ile
305                 310                 315                 320

Thr Tyr Glu Asp Arg Pro Ser Lys Ala Pro Ser Phe Trp Tyr Lys Ile
                325                 330                 335

Asp Pro Ser His Thr Gln Gly Tyr Arg Thr Val Gln Leu Val Trp Lys
            340                 345                 350

Thr Leu Pro Pro Phe Glu Ala Asn Gly Lys Ile Leu Asp Tyr Glu Val
        355                 360                 365

Thr Leu Thr Arg Trp Lys Ser His Leu Gln Asn Tyr Thr Val Asn Ala
    370                 375                 380

Thr Lys Leu Thr Val Asn Leu Thr Asn Asp Arg Tyr Leu Ala Thr Leu
385                 390                 395                 400

Thr Val Arg Asn Leu Val Gly Lys Ser Asp Ala Ala Val Leu Thr Ile
                405                 410                 415

Pro Ala Cys Asp Phe Gln Ala Thr His Pro Val Met Asp Leu Lys Ala
            420                 425                 430

Phe Pro Lys Asp Asn Met Leu Trp Val Glu Trp Thr Thr Pro Arg Glu
        435                 440                 445

Ser Val Lys Lys Tyr Ile Leu Glu Trp Cys Val Leu Ser Asp Lys Ala
    450                 455                 460

Pro Cys Ile Thr Asp Trp Gln Gln Glu Asp Gly Thr Val His Arg Thr
465                 470                 475                 480

Tyr Leu Arg Gly Asn Leu Ala Glu Ser Lys Cys Tyr Leu Ile Thr Val
                485                 490                 495

Thr Pro Val Tyr Ala Asp Gly Pro Gly Ser Pro Glu Ser Ile Lys Ala
            500                 505                 510

Tyr Leu Lys Gln Ala Pro Pro Ser Lys Gly Pro Thr Val Arg Thr Lys
        515                 520                 525

Lys Val Gly Lys Asn Glu Ala Val Leu Glu Trp Asp Gln Leu Pro Val
    530                 535                 540

Asp Val Gln Asn Gly Phe Ile Arg Asn Tyr Thr Ile Phe Tyr Arg Thr
545                 550                 555                 560

Ile Ile Gly Asn Glu Thr Ala Val Asn Val Asp Ser Ser His Thr Glu
                565                 570                 575

Tyr Thr Leu Ser Ser Leu Thr Ser Asp Thr Leu Tyr Met Val Arg Met
            580                 585                 590

Ala Ala Tyr Thr Asp Glu Gly Gly Lys Asp Gly Pro Glu Phe Thr Phe
        595                 600                 605

Thr Thr Pro Lys Phe Ala Gln Gly Glu Ile Glu Ala Ile Val Val Pro
    610                 615                 620

Val Cys Leu Ala Phe Leu Leu Thr Leu Leu Gly Val Leu Phe Cys
625                 630                 635                 640

Phe Asn Lys Arg Asp Leu Ile Lys Lys His Ile Trp Pro Asn Val Pro
                645                 650                 655

Asp Pro Ser Lys Ser His Ile Ala Gln Trp Ser Pro His Thr Pro Pro
```

```
                    660             665             670
Arg His Asn Phe Asn Ser Lys Asp Gln Met Tyr Ser Asp Gly Asn Phe
            675             680             685

Thr Asp Val Ser Val Val Glu Ile Glu Ala Asn Asp Lys Lys Pro Phe
        690             695             700

Pro Glu Asp Leu Lys Ser Leu Asp Leu Phe Lys Glu Lys Ile Asn
705             710             715             720

Thr Glu Gly His Ser Ser Gly Ile Gly Gly Ser Ser Cys Met Ser Ser
                725             730             735

Ser Arg Pro Ser Ile Ser Ser Ser Asp Glu Asn Glu Ser Ser Gln Asn
            740             745             750

Thr Ser Ser Thr Val Gln Tyr Ser Thr Val Val His Ser Gly Tyr Arg
        755             760             765

His Gln Val Pro Ser Val Gln Val Phe Ser Arg Ser Glu Ser Thr Gln
    770             775             780

Pro Leu Leu Asp Ser Glu Glu Arg Pro Glu Asp Leu Gln Leu Val Asp
785             790             795             800

His Val Asp Gly Gly Asp Gly Ile Leu Pro Arg Gln Gln Tyr Phe Lys
                805             810             815

Gln Asn Cys Ser Gln His Glu Ser Ser Pro Asp Ile Ser His Phe Glu
            820             825             830

Arg Ser Lys Gln Val Ser Ser Val Asn Glu Glu Asp Phe Val Arg Leu
        835             840             845

Lys Gln Gln Ile Ser Asp His Ile Ser Gln Ser Cys Gly Ser Gly Gln
    850             855             860

Met Lys Met Phe Gln Glu Val Ser Ala Ala Asp Ala Phe Gly Pro Gly
865             870             875             880

Thr Glu Gly Gln Val Glu Arg Phe Glu Thr Val Gly Met Glu Ala Ala
                885             890             895

Thr Asp Glu Gly Met Pro Lys Ser Tyr Leu Pro Gln Thr Val Arg Gln
            900             905             910

Gly Gly Tyr Met Pro Gln
        915

<210> SEQ ID NO 2
<211> LENGTH: 129
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 2

Gln Val Gln Leu Gln Glu Ser Gly Gly Gly Ser Val Gln Ala Gly Gly
1               5                   10                  15

Ser Leu Arg Leu Ser Cys Thr Ala Ser Gly Ala Ile Ala Ser Gly Tyr
            20                  25                  30

Ile Asp Ser Arg Trp Cys Met Ala Trp Phe Arg Gln Ala Pro Gly Lys
        35                  40                  45

Glu Arg Glu Gly Val Ala Ala Ile Trp Pro Gly Gly Gly Leu Thr Val
    50                  55                  60

Tyr Ala Asp Ser Val Lys Gly Arg Phe Thr Ile Ser Arg Asp His Ala
65                  70                  75                  80

Lys Asn Thr Leu Tyr Leu Gln Met Asn Asn Leu Lys Pro Glu Asp Thr
                85                  90                  95
```

```
Ala Met Tyr Tyr Cys Ala Ala Gly Ser Pro Arg Met Cys Pro Ser Leu
            100                 105                 110

Glu Phe Gly Phe Asp Tyr Trp Gly Gln Gly Thr Gln Val Thr Val Ser
        115                 120                 125

Ser

<210> SEQ ID NO 3
<211> LENGTH: 123
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 3

Gln Val Gln Leu Gln Glu Ser Gly Gly Gly Ser Val Gln Ala Gly Gly
1               5                   10                  15

Ser Leu Arg Leu Ser Cys Thr Ala Pro Gly Phe Thr Ser Asn Ser Cys
            20                  25                  30

Gly Met Asp Trp Tyr Arg Gln Ala Pro Gly Lys Glu Arg Glu Phe Val
        35                  40                  45

Ser Ser Ile Ser Thr Asp Gly Thr Thr Gly Tyr Ala Asp Ser Val Lys
    50                  55                  60

Gly Arg Phe Thr Ile Ser Lys Asp Lys Ala Lys Asp Thr Val Tyr Leu
65                  70                  75                  80

Gln Met Asn Ser Leu Lys Pro Glu Asp Thr Gly Met Tyr Ser Cys Lys
                85                  90                  95

Thr Lys Asp Gly Thr Ile Ala Thr Met Glu Leu Cys Asp Phe Gly Tyr
            100                 105                 110

Trp Gly Gln Gly Thr Gln Val Thr Val Ser Ser
        115                 120

<210> SEQ ID NO 4
<211> LENGTH: 128
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 4

Gln Val Gln Leu Gln Glu Ser Gly Gly Gly Ser Val Gln Ala Gly Gly
1               5                   10                  15

Ser Leu Arg Leu Ser Cys Ala Ala Ser Gly Tyr Pro Tyr Ser Asn Gly
            20                  25                  30

Tyr Met Gly Trp Phe Arg Gln Ala Pro Gly Lys Glu Arg Glu Gly Val
        35                  40                  45

Ala Thr Ile Tyr Thr Gly Asp Gly Arg Thr Tyr Tyr Ala Asp Ser Val
    50                  55                  60

Lys Gly Arg Phe Thr Ile Ser Arg Asp Asn Ala Lys Asn Thr Val Asp
65                  70                  75                  80

Leu Gln Met Ser Ser Leu Lys Pro Glu Asp Thr Ala Met Tyr Tyr Cys
                85                  90                  95

Ala Ala Arg Ala Ala Pro Leu Tyr Ser Ser Gly Ser Pro Leu Thr Arg
            100                 105                 110

Ala Arg Tyr Asn Val Trp Gly Gln Gly Thr Gln Val Thr Val Ser Ser
        115                 120                 125
```

```
<210> SEQ ID NO 5
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 5

Gln Val Gln Leu Gln Glu Ser Gly Gly Gly Ser Val Gln Ala Gly Gly
1               5                   10                  15

Ser Leu Arg Leu Ser Cys Val Ala Ser Ala Ser Thr Tyr Cys Thr Tyr
            20                  25                  30

Asp Met His Trp Tyr Arg Gln Ala Pro Gly Lys Gly Arg Glu Phe Val
        35                  40                  45

Ser Ala Ile Asp Ser Asp Gly Thr Thr Arg Tyr Ala Asp Ser Val Lys
    50                  55                  60

Gly Arg Phe Thr Ile Ser Gln Gly Thr Ala Lys Asn Thr Val Tyr Leu
65                  70                  75                  80

Gln Met Asn Ser Leu Gln Pro Glu Asp Thr Ala Met Tyr Tyr Cys Lys
                85                  90                  95

Thr Val Cys Val Val Gly Ser Arg Trp Ser Asp Tyr Trp Gly Gln Gly
            100                 105                 110

Thr Gln Val Thr Val Ser Ser
        115

<210> SEQ ID NO 6
<211> LENGTH: 117
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 6

Gln Val Gln Leu Gln Glu Ser Gly Gly Gly Ser Val Gln Ala Gly Gly
1               5                   10                  15

Ser Leu Thr Leu Ser Cys Ala Ala Ser Glu Tyr Ala Tyr Ser Thr Cys
            20                  25                  30

Asn Met Gly Trp Tyr Arg Gln Ala Pro Gly Lys Glu Arg Glu Leu Val
        35                  40                  45

Ser Ala Phe Ile Ser Asp Gly Ser Thr Tyr Tyr Ala Asp Ser Val Lys
    50                  55                  60

Gly Arg Phe Thr Ile Thr Arg Asp Asn Ala Lys Asn Thr Val Tyr Leu
65                  70                  75                  80

Gln Met Asn Ser Leu Lys Pro Glu Asp Thr Ala Ile Tyr Tyr Cys Ser
                85                  90                  95

Ala Asn Cys Tyr Arg Arg Leu Arg Asn Tyr Trp Gly Gln Gly Thr Gln
            100                 105                 110

Val Thr Val Ser Ser
        115

<210> SEQ ID NO 7
<211> LENGTH: 124
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 7
```

```
Gln Val Gln Leu Gln Glu Ser Gly Gly Gly Leu Val Gln Pro Gly Gly
1               5                   10                  15

Ser Leu Arg Leu Ser Cys Thr Ala Ser Gly Leu Thr Phe Asp Asp Ser
            20                  25                  30

Val Met Gly Trp Phe Arg Gln Ala Pro Gly Lys Gly Arg Glu Ala Val
        35                  40                  45

Ser Cys Ile Ser Ser Ser Gly Ala Asn Ala Phe Tyr Ala Asp Ser Val
    50                  55                  60

Lys Gly Arg Phe Thr Ile Ser Arg Asp Asn Ala Lys Asn Thr Leu Tyr
65                  70                  75                  80

Leu Gln Met Asn Ser Leu Lys Pro Glu Asp Thr Ala Thr Tyr Tyr Cys
                85                  90                  95

Lys Arg Gly His Ala Cys Ala Gly Tyr Tyr Pro Ile Pro Tyr Asp Asp
            100                 105                 110

Tyr Trp Gly Gln Gly Thr Gln Val Thr Val Ser Ser
        115                 120
```

<210> SEQ ID NO 8
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

```
Ala Ile Ala Ser Gly Tyr Ile Asp Ser Arg Trp Cys Met Ala
1               5                   10
```

<210> SEQ ID NO 9
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 9

```
Ala Ile Trp Pro Gly Gly Gly Leu Thr Val Tyr Ala Asp Ser Val Lys
1               5                   10                  15

Gly
```

<210> SEQ ID NO 10
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10

```
Gly Ser Pro Arg Met Cys Pro Ser Leu Glu Phe Gly Phe Asp Tyr
1               5                   10                  15
```

<210> SEQ ID NO 11
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 11

```
Phe Thr Ser Asn Ser Cys Gly Met Asp
1               5
```

<210> SEQ ID NO 12
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 12

```
Ser Ile Ser Thr Asp Gly Thr Thr Gly Tyr Ala Asp Ser Val Lys Gly
1               5                   10                  15
```

<210> SEQ ID NO 13
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13

```
Lys Asp Gly Thr Ile Ala Thr Met Glu Leu Cys Asp Phe Gly Tyr
1               5                   10                  15
```

<210> SEQ ID NO 14
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 14

```
Tyr Pro Tyr Ser Asn Gly Tyr Met Gly
1               5
```

<210> SEQ ID NO 15
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 15

```
Thr Ile Tyr Thr Gly Asp Gly Arg Thr Tyr Tyr Ala Asp Ser Val Lys
1               5                   10                  15

Gly
```

<210> SEQ ID NO 16
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 16

```
Arg Ala Ala Pro Leu Tyr Ser Ser Gly Ser Pro Leu Thr Arg Ala Arg
1               5                   10                  15

Tyr Asn Val
```

```
<210> SEQ ID NO 17
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 17

Ser Thr Tyr Cys Thr Tyr Asp Met His
1               5

<210> SEQ ID NO 18
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 18

Ala Ile Asp Ser Asp Gly Thr Thr Arg Tyr Ala Asp Ser Val Lys Gly
1               5                   10                  15

<210> SEQ ID NO 19
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Val Cys Val Val Gly Ser Arg Trp Ser Asp Tyr
1               5                   10

<210> SEQ ID NO 20
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 20

Tyr Ala Tyr Ser Thr Cys Asn Met Gly
1               5

<210> SEQ ID NO 21
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 21

Ala Phe Ile Ser Asp Gly Ser Thr Tyr Tyr Ala Asp Ser Val Lys Gly
1               5                   10                  15

<210> SEQ ID NO 22
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 22
```

```
Asn Cys Tyr Arg Arg Leu Arg Asn Tyr
1               5
```

<210> SEQ ID NO 23
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 23

```
Leu Thr Phe Asp Asp Ser Val Met Gly
1               5
```

<210> SEQ ID NO 24
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 24

```
Cys Ile Ser Ser Ser Gly Ala Asn Ala Phe Tyr Ala Asp Ser Val Lys
1               5                   10                  15
Gly
```

<210> SEQ ID NO 25
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 25

```
Gly His Ala Cys Ala Gly Tyr Tyr Pro Ile Pro Tyr Asp Asp Tyr
1               5                   10                  15
```

<210> SEQ ID NO 26
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 26

```
Gln Val Gln Leu Gln Glu Ser Gly Gly Gly Ser Val Gln Ala Gly Gly
1               5                   10                  15

Ser Leu Arg Leu Ser Cys Val Ile Ser Gly Phe Thr Tyr Arg Gln Thr
            20                  25                  30

Phe Met Gly Trp Phe Arg Gln Val Leu Gly Lys Glu Arg Glu Gly Val
        35                  40                  45

Ala Ala Ile Ser Thr Gly Gly Ser Thr Val Tyr Ala Asp Ser Val
    50                  55                  60

Lys Gly Arg Phe Thr Ile Ser Gln Asp Ser Ser Lys Asn Thr Val Tyr
65                  70                  75                  80

Leu Glu Met Asn Gly Leu Lys Leu Glu Asp Thr Gly Met Tyr Tyr Cys
                85                  90                  95

Ala Ala Ser Thr Val Ile Thr Ser Val Ser Ile Asn Arg Gly Leu Tyr
                100                 105                 110
```

Gln Tyr Trp Gly Gln Gly Thr Gln Val Thr Val Ser Ser
            115                 120                 125

<210> SEQ ID NO 27
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 27

Gln Val Gln Leu Gln Glu Ser Gly Gly Gly Ser Val Gln Ala Gly Gly
1               5                   10                  15

Ser Leu Arg Leu Ser Cys Ala Ile Ser Gly Phe Thr Tyr Arg Gln Thr
            20                  25                  30

Phe Met Gly Trp Phe Arg Gln Val Gly Lys Glu Arg Glu Gly Val
        35                  40                  45

Ala Ala Ile Ser Thr Gly Gly Ser Thr Val Tyr Ala Asp Ser Val
    50                  55                  60

Lys Gly Arg Phe Thr Ile Ser Gln Asp Ser Ser Lys Asp Thr Val Tyr
65                  70                  75                  80

Leu Glu Met Asn Gly Leu Lys Leu Glu Asp Thr Gly Met Tyr Tyr Cys
                85                  90                  95

Ala Ala Ser Thr Val Ile Thr Ser Glu Ser Ile Asn Arg Asn Leu Tyr
            100                 105                 110

Gln Tyr Trp Gly Gln Gly Thr Gln Val Thr Val Ser Ser
            115                 120                 125

<210> SEQ ID NO 28
<211> LENGTH: 124
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 28

Gln Val Gln Leu Gln Glu Ser Gly Gly Gly Leu Val Gln Pro Gly Gly
1               5                   10                  15

Ser Leu Arg Leu Ser Cys Ala Ala Ser Gly Phe Thr Leu Ser Thr Tyr
            20                  25                  30

Trp Ile Tyr Trp Val Arg Gln Ala Pro Gly Lys Gly Pro Glu Trp Val
        35                  40                  45

Ser Thr Val Ser Arg Ser Gly Gly Thr Thr Tyr Tyr Ala Asp Ser Val
    50                  55                  60

Asn Gly Arg Phe Thr Ile Ser Arg Asp Asn Ala Lys Asn Thr Val Tyr
65                  70                  75                  80

Leu Gln Met Asn Asn Leu Lys Pro Glu Asp Ala Ala Val Tyr Tyr Cys
                85                  90                  95

Leu Ala Ser Val Ser Asn Leu Gly Trp Pro Pro Val Arg Ala Pro Ser
            100                 105                 110

Pro Thr Gly Gln Gly Thr Gln Val Thr Val Ser Ser
            115                 120

<210> SEQ ID NO 29
<211> LENGTH: 125
<212> TYPE: PRT
<213> ORGANISM: Artificial Sequence

```
<220> FEATURE:
<223> OTHER INFORMATION: Description of Artificial Sequence: Synthetic
      polypeptide

<400> SEQUENCE: 29

Gln Val Gln Leu Gln Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Asn Ser Gly Gly Ala Gly Thr Tyr Tyr Thr Asp Ser Val
    50                  55                  60

Lys Gly Arg Phe Thr Ile Ser Arg Asp Asn Ala Lys Asn Thr Leu Tyr
65                  70                  75                  80

Leu Gln Leu Asn Ser Leu Lys Thr Glu Asp Thr Ala Met Tyr Tyr Cys
                85                  90                  95

Ala Lys His Val Thr Gly Asp Tyr Asp Pro Ser Leu Arg His Gly Tyr
            100                 105                 110

Asn Val Trp Ser Gln Gly Thr Gln Val Thr Val Ser Ser
        115                 120                 125

<210> SEQ ID NO 30
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 30

Gln Val Gln Leu Gln Glu Ser Gly Gly Gly Ser Val Gln Ala Gly Gly
1               5                   10                  15

Ser Leu Arg Leu Ser Cys Val Ile Ser Gly Phe Thr Tyr Arg Gln Thr
            20                  25                  30

Phe Met Gly Trp Phe Arg Gln Val Val Gly Lys Glu Arg Glu Gly Val
        35                  40                  45

Ala Ala Ile Ser Thr Gly Gly Gly Ser Thr Ile Tyr Ala Asp Ser Val
    50                  55                  60

Lys Gly Arg Phe Thr Ile Ser Gln Asp Ser Ser Lys Asp Thr Val Tyr
65                  70                  75                  80

Leu Glu Met Asn Gly Leu Lys Leu Glu Asp Thr Gly Met Tyr Tyr Cys
                85                  90                  95

Ala Ala Ser Thr Val Ile Thr Ser Glu Ser Ile Asn Arg Asn Leu Tyr
            100                 105                 110

Gln Tyr Trp Gly Gln Gly Thr Gln Val Thr Val Ser Ser
        115                 120                 125

<210> SEQ ID NO 31
<211> LENGTH: 124
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 31

Gln Val Gln Leu Gln Glu Ser Gly Gly Gly Leu Val Gln Pro Gly Gly
1               5                   10                  15
```

```
Ser Leu Arg Leu Ser Cys Ala Ala Ser Gly Phe Thr Leu Ser Thr Tyr
            20                  25                  30

Trp Met Tyr Trp Val Arg Gln Ala Pro Gly Lys Gly Pro Glu Trp Val
        35                  40                  45

Ser Ala Val Ser Arg Gly Gly Phe Asn Thr Tyr Tyr Ala Asp Ser Val
    50                  55                  60

Lys Gly Arg Phe Thr Ile Ser Arg Asp Asn Ala Lys Asn Thr Val Tyr
65                  70                  75                  80

Leu Gln Met Asn Ser Leu Lys Pro Glu Asp Thr Ala Val Tyr Tyr Cys
                85                  90                  95

Met Ser Ser Val Ser Phe Tyr Gly Trp Pro Pro Asp Arg Val Pro Ser
            100                 105                 110

Pro Thr Gly Gln Gly Thr Gln Val Thr Val Ser Ser
        115                 120

<210> SEQ ID NO 32
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 32

Gln Val Gln Leu Gln Glu Ser Gly Gly Gly Leu Val Gln Pro Gly Glu
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Asn Ser Gly Gly Ala Gly Thr Tyr Tyr Thr Asp Ser Val
    50                  55                  60

Lys Gly Arg Phe Thr Ile Ser Arg Asp Asn Ala Lys Asn Thr Leu Tyr
65                  70                  75                  80

Leu Gln Leu Asn Ser Leu Lys Thr Glu Asp Thr Ala Met Tyr Tyr Cys
                85                  90                  95

Ala Lys His Val Thr Gly Asp Tyr Asp Pro Ser Leu Arg Tyr Gly Tyr
            100                 105                 110

Asn Val Trp Ser Gln Gly Thr Gln Val Thr Val Ser Ser
        115                 120                 125

<210> SEQ ID NO 33
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 33

Gln Val Gln Leu Gln Glu Ser Gly Gly Gly Ser Val Gln Ala Gly Gly
1               5                   10                  15

Ser Leu Arg Leu Ser Cys Val Ile Ser Gly Phe Thr Tyr Arg Pro Thr
            20                  25                  30

Phe Met Gly Trp Phe Arg Gln Val Leu Gly Lys Glu Arg Glu Gly Val
        35                  40                  45

Ala Ala Ile Thr Thr Gly Gly Gly Ser Thr Val Tyr Ala Asp Ser Val
    50                  55                  60
```

```
Lys Gly Arg Phe Thr Ile Ser Gln Asp Ser Ser Lys Asn Thr Val Tyr
 65                  70                  75                  80

Leu Glu Met Asn Gly Leu Lys Leu Glu Asp Thr Gly Met Tyr Tyr Cys
                 85                  90                  95

Ala Ala Thr Thr Val Ile Thr Ser Val Ser Ile Asn Arg Asn Leu Tyr
            100                 105                 110

Gln Tyr Trp Gly Gln Gly Thr Gln Val Thr Val Ser Ser
        115                 120                 125
```

<210> SEQ ID NO 34
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 34

```
Gln Val Gln Leu Gln Glu Ser Gly Gly Gly Ser Val Gln Ala Gly Gly
 1               5                  10                  15

Ser Leu Arg Leu Ser Cys Gly Ile Ser Gly Phe Thr Tyr Arg Pro Thr
             20                  25                  30

Phe Met Gly Trp Phe Arg Gln Val Leu Gly Lys Glu Arg Glu Gly Val
         35                  40                  45

Ala Ala Ile Ser Thr Gly Gly Ser Ser Val Tyr Ala Asp Ser Val
 50                  55                  60

Lys Gly Arg Phe Thr Val Ser Gln Asp Ser Ser Lys Asn Thr Val Tyr
 65                  70                  75                  80

Leu Glu Met Asn Gly Leu Lys Leu Glu Asp Thr Gly Met Tyr Tyr Cys
                 85                  90                  95

Ala Ala Ser Thr Val Ile Thr Ser Val Ser Ile Asn Arg Gly Leu Tyr
            100                 105                 110

Gln Tyr Trp Gly Gln Gly Thr Gln Val Thr Val Ser Ser
        115                 120                 125
```

<210> SEQ ID NO 35
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 35

```
Gln Val Gln Leu Gln Glu Ser Gly Gly Gly Leu Val Gln Pro Gly Gly
 1               5                  10                  15

Ser Leu Arg Leu Ser Cys Thr Ala Ser Gly Phe Thr Phe Arg Asn Tyr
             20                  25                  30

Ala Met Ser Trp Val Arg Gln Ala Pro Gly Lys Gly Leu Glu Trp Val
         35                  40                  45

Ser Ala Ile Asn Ser Gly Gly Ser Thr Tyr Tyr Ala Asp Ser Val
 50                  55                  60

Lys Gly Arg Phe Thr Ile Ser Arg Asp Asn Ala Lys Asn Thr Leu Tyr
 65                  70                  75                  80

Leu Arg Leu His Ser Leu Lys Thr Glu Asp Thr Ala Met Tyr Tyr Cys
                 85                  90                  95

Ala Lys His Val Thr Gly Asp Tyr Asp Pro Ser Leu Arg Tyr Glu Tyr
            100                 105                 110
```

```
Asn Tyr Trp Ser Gln Gly Thr Gln Val Thr Val Ser Ser
            115                 120                 125

<210> SEQ ID NO 36
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 36

Gln Val Gln Leu Gln Glu Ser Gly Gly Gly Leu Val Gln Pro Gly Gly
1               5                   10                  15

Ser Leu Arg Leu Ser Cys Ala Ala Ser Gly Phe Thr Phe Arg Asn Tyr
            20                  25                  30

Ala Met Ser Trp Val Arg Gln Ala Pro Gly Lys Gly Leu Glu Trp Val
        35                  40                  45

Ser Ala Ile Asn Ser Gly Gly Gly Ser Thr Tyr Tyr Ala Asp Ser Val
    50                  55                  60

Lys Gly Arg Phe Thr Ile Ser Arg Asp Asn Ala Lys Asn Thr Leu Tyr
65                  70                  75                  80

Leu Gln Leu Asn Ser Leu Lys Thr Glu Asp Thr Ala Met Tyr Tyr Cys
                85                  90                  95

Thr Lys His Val Thr Gly Asp Tyr Asp Pro Ser Leu Arg Tyr Glu Tyr
            100                 105                 110

Asn Tyr Trp Ser Gln Gly Thr Gln Val Thr Val Ser Ser
            115                 120                 125

<210> SEQ ID NO 37
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 37

Gln Val Gln Leu Gln Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Asn Ser Gly Gly Gly Ser Thr Tyr Tyr Ala Asp Ser Val
    50                  55                  60

Lys Gly Arg Phe Thr Ile Ser Arg Asp Asn Ala Lys Asn Thr Leu Tyr
65                  70                  75                  80

Leu Gln Leu Asn Ser Leu Lys Thr Glu Asp Thr Ala Met Tyr Cys Cys
                85                  90                  95

Ala Lys His Val Thr Gly Asp Tyr Asp Pro Ser Leu Arg Tyr Gly Tyr
            100                 105                 110

Asn Cys Trp Gly Pro Gly Thr Gln Val Thr Val Ser Ser
            115                 120                 125

<210> SEQ ID NO 38
<211> LENGTH: 124
<212> TYPE: PRT
<213> ORGANISM: Artificial Sequence
<220> FEATURE:
```

<223> OTHER INFORMATION: Description of Artificial Sequence: Synthetic
      polypeptide

<400> SEQUENCE: 38

Gln Val Gln Leu Gln Glu Ser Gly Gly Gly Ser Val Gln Pro Gly Gly
1               5                   10                  15

Ser Leu Arg Leu Ser Cys Ala Ala Ser Gly Phe Thr Phe Ser Thr Tyr
            20                  25                  30

Asp Met Ser Trp Val Arg Gln Ala Pro Gly Lys Gly Leu Glu Trp Val
        35                  40                  45

Ser Thr Ile Asn Tyr Ser Gly Ser Thr Tyr Tyr Val Asp Ser Val
    50                  55                  60

Leu Gly Arg Phe Thr Ile Ala Arg Asp Asn Ala Lys Asn Thr Leu Tyr
65                  70                  75                  80

Leu Gln Met Asn Asn Leu Gln Thr Glu Asp Thr Ala Val Tyr Tyr Cys
                85                  90                  95

Ala Ser Val Lys Glu Arg Arg Ser Asn Gly His Pro Ile Val Phe Gly
            100                 105                 110

Asp Arg Gly Gln Gly Thr Gln Val Thr Val Ser Ser
        115                 120

<210> SEQ ID NO 39
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 39

Gln Val Gln Leu Gln Glu Ser Gly Gly Gly Ser Val Gln Ala Gly Gly
1               5                   10                  15

Ser Leu Arg Leu Ser Cys Val Ile Ser Gly Phe Thr Tyr Lys Gln Thr
            20                  25                  30

Phe Met Gly Trp Phe Arg Gln Val Pro Gly Lys Glu Arg Glu Gly Val
        35                  40                  45

Ala Ala Ile Ser Thr Gly Gly Ser Thr Val Tyr Ala Asp Ser Val
    50                  55                  60

Lys Gly Arg Phe Thr Ile Ser Gln Asp Ser Ser Lys Asn Thr Val Tyr
65                  70                  75                  80

Leu Glu Met Asn Gly Leu Lys Leu Glu Asp Thr Gly Met Tyr Tyr Cys
                85                  90                  95

Ala Ala Ser Thr Val Ile Thr Ser Val Ser Ile Asn Arg Gly Leu Tyr
            100                 105                 110

Gln Tyr Trp Gly Gln Gly Thr Gln Val Thr Val Ser Ser
        115                 120                 125

<210> SEQ ID NO 40
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 40

Gln Val Gln Leu Gln Glu Ser Gly Gly Gly Ser Val Gln Ala Gly Gly
1               5                   10                  15

Ser Leu Arg Leu Ser Cys Val Ile Ser Gly Phe Thr Tyr Arg Gln Thr

```
                    20                  25                  30
Phe Met Gly Trp Phe Arg Gln Val Gly Lys Glu Arg Glu Gly Val
            35                  40                  45
Ala Ala Ile Ser Thr Gly Gly Ser Thr Val Tyr Ala Asp Ser Val
        50                  55                  60
Lys Gly Arg Phe Thr Ile Ser Gln Asp Ser Lys Asp Thr Val Tyr
65                  70                  75                  80
Leu Glu Met Asn Gly Leu Lys Leu Glu Asp Thr Gly Met Tyr Tyr Cys
                85                  90                  95
Ala Ala Ser Thr Val Ile Thr Ser Glu Ser Ile Tyr Arg Asn Leu Tyr
            100                 105                 110
Gln Tyr Trp Gly Gln Gly Thr Gln Val Thr Val Ser Ser
        115                 120                 125

<210> SEQ ID NO 41
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 41

Gln Val Gln Leu Gln Glu Ser Gly Gly Gly Leu Val Gln Pro Gly Gly
1               5                   10                  15
Ser Leu Arg Leu Ser Cys Ala Ala Ser Gly Phe Thr Phe Arg Asn Tyr
            20                  25                  30
Ala Met Ser Trp Val Arg Gln Ala Pro Gly Lys Gly Leu Glu Trp Val
        35                  40                  45
Ser Ala Ile Asn Ser Gly Gly Gly Ser Thr Tyr Tyr Ala Asp Ser Val
    50                  55                  60
Lys Gly Arg Phe Thr Ile Ser Arg Asp Asn Ala Lys Asn Thr Leu Tyr
65                  70                  75                  80
Leu Gln Met Asn Ser Leu Lys Pro Glu Asp Thr Ala Met Tyr Tyr Cys
                85                  90                  95
Ala Lys His Val Thr Gly Asp Tyr Asp Pro Ser Leu Arg Tyr Glu Tyr
            100                 105                 110
Asn Tyr Trp Ser Gln Gly Thr Gln Val Thr Val Ser Ser
        115                 120                 125

<210> SEQ ID NO 42
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 42

Gln Val Gln Leu Gln Glu Ser Gly Gly Gly Leu Val Gln Pro Gly Gly
1               5                   10                  15
Ser Leu Arg Leu Ser Cys Ala Ala Ser Gly Phe Thr Phe Arg Asn Tyr
            20                  25                  30
Ala Met Ser Trp Val Arg Gln Ala Pro Gly Lys Gly Leu Glu Trp Val
        35                  40                  45
Ser Ala Ile Asn Ser Gly Gly Gly Ser Thr Tyr Tyr Ala Asp Ser Val
    50                  55                  60
Lys Gly Arg Phe Thr Ile Ser Arg Asp Asn Ala Lys Asn Thr Leu Tyr
```

```
                65                  70                  75                  80
Leu Gln Leu Asn Ser Leu Lys Thr Glu Asp Thr Ala Met Tyr Tyr Cys
                    85                  90                  95

Ala Lys His Val Thr Gly Asp Tyr Asp Pro Ser Leu Arg Tyr Glu Tyr
                100                 105                 110

Ala Tyr Trp Ser Gln Gly Thr Gln Val Thr Val Ser Ser
            115                 120                 125

<210> SEQ ID NO 43
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 43

Gln Val Gln Leu Gln Glu Ser Gly Gly Gly Ser Val Gln Ala Gly Gly
1               5                   10                  15

Ser Leu Arg Leu Ser Cys Ala Ala Ser Gly Phe Thr Phe Ser Ser Tyr
                20                  25                  30

Ala Met Ser Trp Val Arg Gln Ala Pro Gly Lys Gly Leu Glu Trp Val
            35                  40                  45

Ser Ala Ile Asn Ser Gly Gly Gly Ser Thr Tyr Tyr Ala Asp Ser Val
        50                  55                  60

Lys Ala Arg Phe Thr Ile Ser Arg Asp Asn Ala Lys Asn Thr Leu Tyr
65                  70                  75                  80

Leu Gln Leu Asn Ser Leu Lys Thr Glu Asp Thr Ala Met Tyr Tyr Cys
                85                  90                  95

Ala Lys His Val Thr Gly Asp Tyr Asp Pro Ser Leu Arg Tyr Asp Tyr
                100                 105                 110

Asn Tyr Trp Gly Gln Gly Thr Gln Val Thr Val Ser Ser
            115                 120                 125

<210> SEQ ID NO 44
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 44

Gln Val Gln Leu Gln Glu Ser Gly Gly Gly Ser Val Gln Ala Gly Gly
1               5                   10                  15

Ser Leu Arg Leu Ser Cys Gly Ile Ser Gly Phe Thr Tyr Arg Pro Thr
                20                  25                  30

Phe Met Gly Trp Phe Arg Gln Val Leu Gly Lys Glu Arg Glu Gly Val
            35                  40                  45

Ala Ala Ile Ser Thr Gly Gly Gly Ser Ser Val Tyr Ala Asp Ser Val
        50                  55                  60

Lys Gly Arg Phe Thr Val Ser Gln Asp Ser Ser Lys Asn Thr Val Tyr
65                  70                  75                  80

Leu Glu Met Asn Gly Leu Lys Leu Glu Asp Thr Gly Met Tyr Tyr Cys
                85                  90                  95

Ala Ala Ser Thr Val Ile Thr Ser Val Ser Ile Asn Arg Ala Leu Tyr
                100                 105                 110

Gln Tyr Trp Gly Gln Gly Thr Gln Val Thr Val Ser Ser
```

<210> SEQ ID NO 45
<211> LENGTH: 125
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 45

Gln Val Gln Leu Gln Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Val Ser Trp Val Arg Gln Ala Pro Gly Lys Gly Leu Glu Trp Val
        35                  40                  45

Ser Thr Ile Asn Ser Gly Gly Gly Ser Thr Tyr Tyr Ala Asp Ser Val
    50                  55                  60

Lys Gly Arg Phe Thr Ile Ser Arg Asp Asn Ala Lys Asn Thr Leu Tyr
65                  70                  75                  80

Leu Gln Leu Asn Ser Leu Lys Thr Glu Asp Thr Ala Met Tyr Tyr Cys
                85                  90                  95

Thr Lys His Val Thr Gly Asp Tyr Asp Pro Ser Leu Arg Tyr Glu Tyr
            100                 105                 110

Asn Val Trp Ser Gln Gly Thr Gln Val Thr Val Ser Ser
        115                 120                 125

<210> SEQ ID NO 46
<211> LENGTH: 125
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 46

Gln Val Gln Leu Gln Glu Ser Gly Gly Gly Ser Val Gln Ala Gly Gly
1               5                   10                  15

Ser Leu Arg Val Ser Cys Gln Ile Ser Gly Phe Thr Tyr Arg Gln Thr
            20                  25                  30

Phe Met Gly Trp Phe Arg Gln Val Pro Gly Lys Glu Arg Glu Gly Val
        35                  40                  45

Ala Ala Ile Ser Thr Gly Gly Gly Ser Thr Val Tyr Ala Asp Ser Val
    50                  55                  60

Lys Gly Arg Phe Thr Ile Ser Gln Asp Ser Ser Lys Asn Thr Val Tyr
65                  70                  75                  80

Leu Glu Met Asn Gly Leu Lys Leu Glu Asp Thr Gly Met Tyr Tyr Cys
                85                  90                  95

Ala Ala Ser Thr Val Ile Thr Ser Pro Ser Ile Asn Arg Asn Leu Tyr
            100                 105                 110

Gln Tyr Trp Gly Gln Gly Thr Gln Val Thr Val Ser Ser
        115                 120                 125

<210> SEQ ID NO 47
<211> LENGTH: 114
<212> TYPE: PRT
<213> ORGANISM: Artificial Sequence
<220> FEATURE:
<223> OTHER INFORMATION: Description of Artificial Sequence: Synthetic -continued polypeptide

<400> SEQUENCE: 47

Gln Val Gln Leu Gln Glu Ser Gly Gly Gly Leu Val Gln Pro Gly Gly
1               5                   10                  15

Ser Leu Arg Leu Ser Cys Ala Val Ser Gly Phe Thr Phe Ser Asn Tyr
            20                  25                  30

Ala Met Lys Trp Val Arg Gln Ala Pro Gly Lys Gly Leu Glu Trp Val
        35                  40                  45

Ser Ser Ile Ser Gly Gly Gly Ala Thr Tyr Tyr Ala Asp Ser Val
    50                  55                  60

Lys Gly Arg Phe Thr Ile Ser Arg Asp Asn Thr Lys Asn Thr Leu Tyr
65                  70                  75                  80

Leu Gln Met Asn Ser Leu Lys Thr Glu Asp Thr Ala Val Tyr Tyr Cys
                85                  90                  95

Ala Ala Gln Asn Leu Asp Tyr Arg Gly Gln Gly Thr Gln Val Thr Val
            100                 105                 110

Ser Ser

<210> SEQ ID NO 48
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 48

Gln Val Gln Leu Gln Glu Ser Gly Gly Gly Leu Val Gln Pro Gly Gly
1               5                   10                  15

Ser Leu Arg Leu Ser Cys Thr Ala Ser Gly Phe Thr Phe Asn Ser Ala
            20                  25                  30

His Met Lys Trp Glu Arg Gln Pro Pro Gly Lys Gly Leu Glu Trp Val
        35                  40                  45

Ser Phe Ile Thr Pro Gly Gly Ala Ser Thr Gly Tyr Ala Asp Ser Val
    50                  55                  60

Lys Gly Arg Phe Thr Ile Ser Arg Asp Asn Ala Lys Asn Thr Leu Tyr
65                  70                  75                  80

Leu Gln Met Asn Asn Leu Lys Thr Glu Asp Thr Ala Val Tyr Tyr Cys
                85                  90                  95

Ala Thr Gly Gly Leu Arg Gly Gln Gly Thr Gln Val Thr Val Ser Ser
            100                 105                 110

<210> SEQ ID NO 49
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 49

Gln Val Gln Leu Gln Glu Ser Gly Gly Gly Ser Val Gln Ala Gly Gly
1               5                   10                  15

Ser Leu Arg Leu Ser Cys Val Ile Ser Gly Phe Thr Tyr Arg Pro Thr
            20                  25                  30

Phe Met Gly Trp Phe Arg Gln Val Leu Gly Lys Glu Arg Glu Gly Val
        35                  40                  45

Ala Ala Ile Thr Thr Gly Gly Gly Ser Thr Leu Tyr Ala Asp Ser Val
            50                  55                  60

Lys Gly Arg Phe Thr Ile Ser Gln Asp Ser Ser Lys Asn Thr Val Tyr
65                  70                  75                  80

Leu Glu Met Asn Gly Leu Lys Leu Glu Asp Thr Gly Met Tyr Tyr Cys
                85                  90                  95

Ala Ala Thr Thr Val Ile Thr Ser Val Ser Ile Asn Arg Asn Leu Tyr
            100                 105                 110

Gln Tyr Trp Gly Gln Gly Thr Gln Val Thr Val Ser Ser
            115                 120                 125

<210> SEQ ID NO 50
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 50

Gln Val Gln Leu Gln Glu Ser Gly Gly Gly Ser Val Gln Ala Gly Gly
1               5                   10                  15

Ser Leu Arg Leu Ser Cys Val Ile Ser Gly Phe Thr Tyr Lys Gln Thr
            20                  25                  30

Phe Met Gly Trp Phe Arg Gln Val Pro Gly Lys Glu Arg Glu Gly Val
            35                  40                  45

Ala Ala Ile Ser Thr Gly Gly Gly Ser Thr Val Tyr Ala Asp Ser Val
            50                  55                  60

Lys Gly Arg Phe Thr Ile Ser Gln Asp Ser Ser Lys Asn Thr Val Tyr
65                  70                  75                  80

Leu Glu Met Asn Gly Leu Lys Leu Glu Asp Thr Gly Met Tyr Tyr Cys
                85                  90                  95

Ala Ala Ser Thr Val Ile Thr Ser Val Thr Ile Asn Arg Gly Leu Tyr
            100                 105                 110

Gln Tyr Trp Gly Gln Gly Thr Gln Val Thr Val Ser Ser
            115                 120                 125

<210> SEQ ID NO 51
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 51

Gln Val Gln Leu Gln Glu Ser Gly Gly Gly Ser Val Gln Ala Gly Gly
1               5                   10                  15

Ser Leu Arg Leu Ser Cys Val Ile Ser Gly Phe Val Tyr Lys Gln Thr
            20                  25                  30

Phe Met Gly Trp Phe Arg Gln Val Pro Gly Lys Glu Arg Glu Gly Val
            35                  40                  45

Ala Ala Ile Ser Thr Gly Gly Gly Ser Thr Val Tyr Ala Asp Ser Val
            50                  55                  60

Lys Gly Arg Phe Thr Ile Ser Gln Asp Ser Ser Lys Asn Thr Val Tyr
65                  70                  75                  80

Leu Glu Met Asn Gly Leu Lys Leu Glu Asp Thr Gly Met Tyr Tyr Cys
                85                  90                  95

```
Ala Ala Ser Thr Val Ile Thr Ser Val Ser Ile Asn Arg Gly Leu Tyr
            100                 105                 110

Gln Tyr Trp Gly Gln Gly Thr Gln Val Thr Val Ser Ser
        115                 120                 125

<210> SEQ ID NO 52
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 52

Gln Val Gln Leu Gln Glu Ser Gly Gly Gly Ser Val Gln Ala Gly Gly
1               5                   10                  15

Ser Leu Arg Val Ser Cys Val Ile Ser Gly Phe Thr Tyr Arg Gln Thr
            20                  25                  30

Phe Met Gly Trp Phe Arg Gln Val Pro Gly Lys Glu Arg Glu Gly Val
        35                  40                  45

Ala Ala Ile Ser Thr Gly Gly Ser Thr Val Tyr Ala Asp Ser Val
    50                  55                  60

Lys Gly Arg Phe Thr Ile Ser Gln Asp Ser Ser Lys Asn Thr Val Tyr
65                  70                  75                  80

Leu Glu Met Asn Gly Leu Lys Leu Glu Asp Thr Gly Met Tyr Tyr Cys
                85                  90                  95

Ala Ala Ser Thr Val Ile Thr Ser Val Ser Ile Asn Arg Gly Leu Tyr
            100                 105                 110

Gln Tyr Trp Gly Gln Gly Thr Gln Val Thr Val Ser Ser
        115                 120                 125

<210> SEQ ID NO 53
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 53

Gln Val Gln Leu Gln Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Asn Ser Gly Gly Gly Ser Thr Tyr Tyr Ala Asp Ser Val
    50                  55                  60

Lys Gly Arg Phe Thr Ile Ser Arg Asp Asn Ala Lys Ser Thr Leu Tyr
65                  70                  75                  80

Leu Gln Leu Asn Ser Leu Lys Thr Glu Asp Thr Ala Met Tyr Tyr Cys
                85                  90                  95

Thr Lys His Val Thr Gly Asp Tyr Asp Pro Ser Leu Arg Tyr Glu Tyr
            100                 105                 110

Asn Tyr Trp Ser Gln Gly Thr Gln Val Thr Val Ser Ser
        115                 120                 125

<210> SEQ ID NO 54
<211> LENGTH: 125
```

```
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 54

Gln Val Gln Leu Gln Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Asn Ser Gly Gly Ala Ser Thr Tyr Tyr Ala Asp Ser Val
    50                  55                  60

Lys Gly Arg Phe Thr Ile Ser Arg Asp Asn Ala Lys Asn Thr Leu Tyr
65                  70                  75                  80

Leu Gln Leu Asn Ser Leu Lys Thr Glu Asp Thr Ala Met Tyr Cys Cys
                85                  90                  95

Ala Lys His Val Thr Gly Asp Tyr Asp Pro Ser Leu Arg Tyr Glu Tyr
            100                 105                 110

Asn Cys Trp Gly Pro Gly Thr Gln Val Thr Val Ser Ser
        115                 120                 125

<210> SEQ ID NO 55
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 55

Gln Val Gln Leu Gln Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Asn Ser Gly Gly Gly Ser Thr Tyr Tyr Ala Asp Ser Val
    50                  55                  60

Lys Gly Arg Phe Thr Ile Ser Arg Asp Asn Ala Lys Asn Thr Leu Tyr
65                  70                  75                  80

Leu Gln Leu Asn Ser Leu Lys Thr Glu Asp Thr Ala Met Tyr Tyr Cys
                85                  90                  95

Ala Lys His Val Thr Gly Asp Tyr Asp Pro Ser Leu Arg Tyr Glu Tyr
            100                 105                 110

Asn Tyr Trp Ser Gln Gly Thr Gln Val Thr Val Ser Ser
        115                 120                 125

<210> SEQ ID NO 56
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 56

Gln Val Gln Leu Gln Glu Ser Gly Gly Gly Ser Val Gln Ala Gly Gly
```

```
                1               5                  10                 15
Ser Leu Arg Leu Ser Cys Val Ile Ser Gly Phe Thr Tyr Arg Gln Thr
            20                  25                 30

Phe Met Gly Trp Phe Arg Gln Val Val Gly Lys Glu Arg Glu Gly Val
            35                  40                 45

Ala Ala Ile Ser Thr Gly Gly Ser Thr Val Tyr Ala Asp Ser Val
            50                  55                 60

Lys Gly Arg Phe Thr Ile Ser Gln Asp Ser Ser Lys Asp Thr Val Tyr
 65                 70                  75                 80

Leu Glu Met Asn Gly Leu Lys Leu Glu Asp Thr Gly Met Tyr Tyr Cys
                85                  90                 95

Ala Ala Ser Thr Val Ile Thr Ser Glu Ser Ile Asn Arg Asn Leu Tyr
                100                 105                110

Gln Tyr Trp Gly Gln Gly Thr Gln Val Thr Val Ser Ser
            115                 120                125
```

<210> SEQ ID NO 57
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 57

```
Gln Val Gln Leu Gln Glu Ser Gly Gly Gly Ser Val Gln Ala Gly Gly
1               5                   10                 15

Ser Leu Arg Val Ser Cys Val Val Ser Gly Phe Thr Tyr Arg Gln Thr
            20                  25                 30

Phe Met Gly Trp Phe Arg Gln Val Pro Gly Lys Glu Arg Glu Gly Val
            35                  40                 45

Ala Ala Ile Ser Thr Gly Gly Ser Thr Val Tyr Ala Asp Ser Val
            50                  55                 60

Lys Gly Arg Phe Thr Ile Ser Gln Asp Ser Ser Lys Asn Thr Val Tyr
 65                 70                  75                 80

Leu Glu Met Asn Gly Leu Lys Leu Glu Asp Thr Gly Met Tyr Tyr Cys
                85                  90                 95

Ala Ala Ser Thr Val Ile Thr Ser Val Ser Ile Asn Arg Asn Leu Tyr
                100                 105                110

Gln Tyr Trp Gly Gln Gly Thr Gln Val Thr Val Ser Ser
            115                 120                125
```

<210> SEQ ID NO 58
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 58

```
Gln Val Gln Leu Gln Glu Ser Gly Gly Gly Leu Val Gln Pro Gly Gly
1               5                   10                 15

Ser Leu Arg Leu Ser Cys Ala Ala Ser Gly Phe Thr Phe Ser Ser Tyr
            20                  25                 30

Ala Met Ser Trp Val Arg Gln Ala Pro Gly Lys Gly Leu Glu Trp Val
            35                  40                 45

Ser Ala Ile Asn Ser Gly Gly Gly Ser Thr Tyr Tyr Ala Asp Ser Val
```

```
                50                  55                  60
Lys Gly Arg Phe Thr Ile Ser Arg Asp Asn Ala Lys Asn Thr Met Tyr
 65                  70                  75                  80

Leu Gln Leu Asn Ser Leu Lys Thr Glu Asp Thr Ala Met Tyr Tyr Cys
                 85                  90                  95

Ala Lys His Val Ala Gly Asp Tyr Asp Pro Ser Leu Arg Tyr Glu Trp
                100                 105                 110

His Val Trp Gly Gln Gly Thr Gln Val Thr Val Ser Ser
            115                 120                 125

<210> SEQ ID NO 59
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 59

Gln Val Gln Leu Gln Glu Ser Gly Gly Gly Leu Val Gln Pro Gly Gly
  1               5                  10                  15

Ser Leu Arg Leu Ser Cys Ala Ala Ser Gly Phe Thr Phe Arg Ser Tyr
                 20                  25                  30

Ala Met Ser Trp Val Arg Gln Ala Pro Gly Lys Gly Leu Glu Trp Val
             35                  40                  45

Ser Ala Ile Asn Ser Gly Gly Gly Ser Thr Tyr Tyr Ala Asp Ser Val
 50                  55                  60

Lys Ala Arg Phe Thr Ile Ser Arg Asp Asn Ala Lys Asn Thr Leu Tyr
 65                  70                  75                  80

Leu Gln Leu Asn Ser Leu Lys Thr Glu Asp Thr Ala Met Tyr Tyr Cys
                 85                  90                  95

Ala Lys His Val Thr Gly Asp Tyr Asp Pro Ser Leu Arg Tyr Glu Tyr
                100                 105                 110

Asn Tyr Trp Gly Gln Gly Thr Gln Val Thr Val Ser Ser
            115                 120                 125

<210> SEQ ID NO 60
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 60

Gln Val Gln Leu Gln Glu Ser Gly Gly Gly Leu Val Gln Pro Gly Gly
  1               5                  10                  15

Ser Leu Arg Leu Ser Cys Ala Ala Ser Gly Phe Thr Phe Ser Ser Tyr
                 20                  25                  30

Ala Met Ser Trp Val Arg Gln Ala Pro Gly Lys Gly Leu Glu Trp Val
             35                  40                  45

Ser Ala Ile Asn Ser Gly Gly Gly Ser Thr Tyr Tyr Ala Asp Ser Val
 50                  55                  60

Lys Gly Arg Phe Thr Ile Ser Arg Asp Asn Ala Lys Asn Thr Leu Tyr
 65                  70                  75                  80

Leu Gln Leu Asn Ser Leu Lys Thr Glu Asp Thr Ala Met Tyr Tyr Cys
                 85                  90                  95

Ala Lys His Ile Thr Gly Asp Tyr Asp Pro Ser Leu Arg Tyr Glu Tyr
```

```
                    100                 105                 110
Asn Tyr Trp Gly Gln Gly Thr Gln Val Thr Val Ser Ser
            115                 120                 125

<210> SEQ ID NO 61
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 61

Gln Val Gln Leu Gln Glu Ser Gly Gly Gly Ser Val Gln Ala Gly Gly
1               5                   10                  15

Ser Leu Arg Leu Ser Cys Val Ile Ser Gly Phe Thr Tyr Arg Gln Thr
            20                  25                  30

Phe Met Gly Trp Phe Arg Gln Val Gly Lys Glu Arg Glu Gly Val
        35                  40                  45

Ala Ala Ile Ser Thr Gly Gly Gly Ser Met Val Tyr Ala Asp Ser Val
    50                  55                  60

Lys Gly Arg Phe Thr Ile Ser Gln Asp Ser Ser Lys Asp Thr Val Tyr
65                  70                  75                  80

Leu Glu Met Asn Gly Leu Lys Leu Glu Asp Thr Gly Met Tyr Tyr Cys
                85                  90                  95

Ala Ala Ser Thr Val Ile Thr Ser Glu Ser Ile Asn Arg Asn Leu Tyr
            100                 105                 110

Gln Tyr Trp Gly Gln Gly Thr Gln Val Thr Val Ser Ser
            115                 120                 125

<210> SEQ ID NO 62
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 62

Gln Val Gln Leu Gln Glu Ser Gly Gly Gly Pro Val Gln Ala Gly Gly
1               5                   10                  15

Ser Leu Arg Leu Ser Cys Val Ile Ser Gly Phe Thr Tyr Arg Gln Thr
            20                  25                  30

Phe Met Gly Trp Phe Arg Gln Val Pro Gly Lys Glu Arg Glu Gly Val
        35                  40                  45

Ala Ala Ile Ser Thr Gly Gly Gly Ser Thr Val Tyr Ala Asp Ser Val
    50                  55                  60

Lys Gly Arg Phe Thr Ile Ser Gln Asp Ser Ser Lys Asn Thr Val Tyr
65                  70                  75                  80

Leu Glu Met Asn Gly Leu Lys Leu Glu Asp Thr Gly Met Tyr Tyr Cys
                85                  90                  95

Ala Ala Ser Thr Val Ile Thr Ser Glu Ser Ile Asn Arg Gly Leu Tyr
            100                 105                 110

Gln Tyr Trp Gly Gln Gly Thr Gln Val Thr Val Ser Ser
            115                 120                 125

<210> SEQ ID NO 63
<211> LENGTH: 122
<212> TYPE: PRT
```

<213> ORGANISM: Artificial Sequence
<220> FEATURE:
<223> OTHER INFORMATION: Description of Artificial Sequence: Synthetic
      polypeptide

<400> SEQUENCE: 63

Gln Val Gln Leu Gln Glu Ser Gly Gly Gly Ser Val Gln Ala Gly Gly
1               5                   10                  15

Phe Leu Arg Leu Ser Cys Ala Phe Ser Gly Tyr Thr Gly Cys Met Gly
            20                  25                  30

Trp Phe Arg Gln Gly Pro Gly Gln Glu Arg Glu Gly Val Ala Ser Ile
        35                  40                  45

Asn Asp Gly Gly Ser Leu Thr Tyr Ala Asp Ser Val Lys Gly Arg Phe
    50                  55                  60

Thr Ile Ser Lys Asp Asn Ala Lys Lys Thr Leu Asp Leu Gln Met Asn
65                  70                  75                  80

Thr Leu Lys Pro Glu Asp Thr Ala Met Tyr Tyr Cys Ala Ala Ser Leu
                85                  90                  95

Ser Tyr Cys Leu Asn Pro Thr Leu Arg Val Asp Gly Tyr Asn Tyr Trp
            100                 105                 110

Gly Gln Gly Thr Gln Val Thr Val Ser Ser
        115                 120

<210> SEQ ID NO 64
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 64

Gln Val Gln Leu Gln Glu Ser Gly Gly Gly Ser Val Gln Ala Gly Gly
1               5                   10                  15

Ser Leu Arg Leu Ser Cys Val Ile Ser Gly Leu Thr Tyr Lys Gln Thr
            20                  25                  30

Phe Met Gly Trp Phe Arg Gln Val Pro Gly Lys Glu Arg Glu Gly Val
        35                  40                  45

Ala Ala Ile Ser Thr Gly Gly Ser Thr Val Tyr Ala Asp Ser Val
    50                  55                  60

Lys Gly Arg Phe Thr Ile Ser Gln Asp Asn Ser Lys Asn Thr Val Tyr
65                  70                  75                  80

Leu Glu Met Asn Gly Leu Lys Leu Glu Asp Thr Gly Met Tyr Tyr Cys
                85                  90                  95

Ala Ala Ser Thr Val Ile Thr Ser Val Ser Ile Asn Arg Tyr Leu Tyr
            100                 105                 110

Gln Trp Trp Gly Gln Gly Thr Gln Val Thr Val Ser Ser
        115                 120                 125

<210> SEQ ID NO 65
<211> LENGTH: 124
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 65

Gln Val Gln Leu Gln Glu Ser Gly Gly Gly Leu Val Gln Pro Gly Gly
1               5                   10                  15

-continued

```
Ser Leu Arg Leu Ser Cys Ala Ala Ser Gly Phe Thr Phe Ser Asn Tyr
            20                  25                  30

Ala Met Ser Trp Val Arg Gln Ala Pro Gly Lys Gly Val Glu Trp Val
        35                  40                  45

Ser Ala Ile Asn Ser Gly Gly Ser Val Phe Tyr Ala Asp Ser Val Lys
    50                  55                  60

Gly Arg Phe Thr Ile Ser Arg Asp Asn Ala Lys Asn Thr Leu Tyr Leu
65                  70                  75                  80

Gln Leu Ser Ser Leu Lys Thr Glu Asp Thr Ala Met Tyr Tyr Cys Ala
                85                  90                  95

Lys His Val Thr Gly Asp Tyr Asp Pro Ser Leu Arg Tyr Gly Tyr Asn
            100                 105                 110

Val Trp Ser Gln Gly Thr Gln Val Thr Val Ser Ser
        115                 120
```

<210> SEQ ID NO 66
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 66

```
Gln Val Gln Leu Gln Glu Ser Gly Gly Gly Ser Val Gln Ala Gly Gly
1               5                   10                  15

Ser Leu Arg Leu Ser Cys Gly Ile Ser Gly Phe Thr Tyr Arg Pro Thr
            20                  25                  30

Phe Met Gly Trp Phe Arg Gln Val Leu Gly Lys Glu Arg Glu Gly Val
        35                  40                  45

Ala Ala Ile Ser Thr Gly Gly Ser Thr Val Tyr Ala Asp Ser Val
    50                  55                  60

Lys Gly Arg Phe Thr Ile Ser Gln Asp Ser Ser Lys Asp Thr Val Tyr
65                  70                  75                  80

Leu Glu Met Asn Gly Leu Lys Leu Glu Asp Thr Gly Met Tyr Tyr Cys
                85                  90                  95

Ala Ala Ser Thr Val Ile Thr Ser Glu Ser Ile Asn Arg Asn Leu Tyr
            100                 105                 110

Gln Tyr Trp Gly Gln Gly Thr Gln Val Thr Val Ser Ser
        115                 120                 125
```

<210> SEQ ID NO 67
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 67

```
Gln Val Gln Leu Gln Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Asn Ser Gly Gly Gly Ser Thr Tyr Tyr Ala Asp Ser Val
    50                  55                  60
```

```
Lys Gly Arg Phe Thr Ile Ser Arg Asp Asn Ala Lys Asn Thr Leu Tyr
 65                  70                  75                  80

Leu Gln Leu Asn Ser Leu Lys Thr Glu Asp Thr Ala Met Tyr Tyr Cys
                 85                  90                  95

Ala Lys His Val Thr Gly Asp Tyr Asp Pro Ser Leu Arg Tyr Gly Tyr
            100                 105                 110

Asn Val Trp Ser Gln Gly Thr Gln Val Thr Val Ser Ser
        115                 120                 125

<210> SEQ ID NO 68
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 68

Gln Val Gln Leu Gln Glu Ser Gly Gly Gly Leu Val Gln Pro Gly Gly
 1               5                  10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
         35                  40                  45

Ser Ala Ile Asn Leu Gly Gly Asp Thr Thr Tyr Tyr Thr Asp Ser Val
     50                  55                  60

Lys Gly Arg Phe Thr Ile Ser Arg Asp Asn Ala Lys Asn Thr Leu Tyr
 65                  70                  75                  80

Leu Gln Leu Asn Ser Leu Lys Thr Glu Asp Thr Ala Met Tyr Tyr Cys
                 85                  90                  95

Ala Lys His Val Thr Gly Asp Tyr Asp Pro Ser Leu Arg Tyr Glu Tyr
            100                 105                 110

Gly Tyr Trp Ser Gln Gly Thr Gln Val Thr Val Ser Ser
        115                 120                 125

<210> SEQ ID NO 69
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 69

Gln Val Gln Leu Gln Glu Ser Gly Gly Gly Leu Val Gln Pro Gly Gly
 1               5                  10                  15

Ser Leu Arg Leu Ser Cys Thr Ala Ser Gly Phe Thr Phe Asn Ser Ala
            20                  25                  30

His Leu Lys Trp Glu Arg Gln Pro Pro Gly Lys Gly Leu Glu Trp Val
         35                  40                  45

Ser Phe Ile Thr Asn Gly Gly Ala Ser Thr Gly Tyr Ala Asp Ser Val
     50                  55                  60

Lys Gly Arg Phe Thr Ile Ser Arg Asp Asp Ala Lys Asn Thr Leu Tyr
 65                  70                  75                  80

Leu Gln Met Asn Asn Leu Lys Thr Glu Asp Thr Ala Val Tyr Tyr Cys
                 85                  90                  95

Ala Thr Gly Gly Leu Arg Gly Gln Gly Thr Gln Val Thr Val Ser Ser
            100                 105                 110
```

<210> SEQ ID NO 70
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 70

Gln Val Gln Leu Gln Glu Ser Gly Gly Gly Ser Val Gln Ala Gly Gly
1               5                   10                  15

Ser Leu Arg Val Ser Cys Val Ile Ser Gly Phe Thr Tyr Arg Gln Thr
            20                  25                  30

Phe Met Gly Trp Phe Arg Gln Val Pro Gly Lys Glu Arg Glu Gly Val
        35                  40                  45

Ala Ala Ile Ser Thr Gly Gly Ser Thr Ile Tyr Ala Asn Ser Val
    50                  55                  60

Lys Gly Arg Phe Thr Ile Ser Gln Asp Ser Ser Lys Asn Thr Val Tyr
65                  70                  75                  80

Leu Glu Met Asn Gly Leu Lys Leu Glu Asp Thr Gly Met Tyr Tyr Cys
                85                  90                  95

Ala Ala Ser Thr Val Ile Thr Ser Val Ser Ile Asn Arg Gly Leu Tyr
            100                 105                 110

Gln Tyr Trp Gly Gln Gly Thr Gln Val Thr Val Ser Ser
        115                 120                 125

<210> SEQ ID NO 71
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 71

Gln Val Gln Leu Gln Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Asn Ser Gly Gly Gly Ser Thr Tyr Tyr Ala Asp Ser Val
    50                  55                  60

Lys Gly Arg Phe Thr Ile Ser Arg Asp Asn Ala Lys Asn Thr Leu Tyr
65                  70                  75                  80

Leu Gln Leu Asn Ser Leu Lys Thr Glu Asp Thr Ala Met Tyr Cys Cys
                85                  90                  95

Ala Lys His Ile Thr Gly Asp Tyr Asp Pro Ser Leu Arg Tyr Glu Tyr
            100                 105                 110

Asn Cys Trp Gly Gln Gly Thr Gln Val Thr Val Ser Ser
        115                 120                 125

<210> SEQ ID NO 72
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 72

Gln Val Gln Leu Gln Glu Ser Gly Gly Ser Val Gln Ala Gly Gly
1               5                   10                  15

Ser Leu Arg Leu Ser Cys Val Ile Ser Gly Phe Thr Tyr Lys Gln Thr
            20                  25                  30

Phe Met Gly Trp Phe Arg Gln Val Pro Gly Lys Glu Arg Glu Gly Val
        35                  40                  45

Ala Ala Ile Ser Thr Gly Gly Asn Thr Val Tyr Ala Asp Ser Val
    50                  55                  60

Lys Gly Arg Phe Thr Ile Ser Gln Asp Ser Ser Lys Asn Thr Val Tyr
65                  70                  75                  80

Leu Glu Met Asn Gly Leu Lys Leu Glu Asp Thr Gly Met Tyr Tyr Cys
                85                  90                  95

Ala Ala Ser Thr Val Ile Thr Ser Val Thr Val Asn Arg Gly Leu Tyr
            100                 105                 110

Gln Tyr Trp Gly Gln Gly Thr Gln Val Thr Val Ser Ser
        115                 120                 125

<210> SEQ ID NO 73
<211> LENGTH: 114
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 73

Gln Val Gln Leu Gln Glu Ser Gly Gly Ala Leu Val Gln Pro Gly Gly
1               5                   10                  15

Ser Leu Arg Leu Ser Cys Ala Ala Ser Gly Phe Thr Phe Ser Tyr Tyr
            20                  25                  30

Ala Met Lys Trp Val Arg Gln Ala Pro Gly Lys Gly Leu Glu Trp Val
        35                  40                  45

Ser Ser Ile Ser Gly Gly Gly Ala Thr Tyr Tyr Ala Asp Ser Val
    50                  55                  60

Lys Gly Arg Phe Thr Ile Ser Arg Asp Asn Thr Asn Asp Thr Leu Tyr
65                  70                  75                  80

Leu Gln Met Asn Ser Leu Lys Thr Glu Asp Thr Ala Val Tyr Tyr Cys
                85                  90                  95

Ala Ala Gln Asn Leu Asp Tyr Arg Gly Gln Gly Thr Gln Val Thr Val
            100                 105                 110

Ser Ser

<210> SEQ ID NO 74
<211> LENGTH: 125
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 74

Gln Val Gln Leu Gln Glu Ser Gly Gly Ser Val Gln Ala Gly Gly
1               5                   10                  15

Ser Leu Arg Leu Ser Cys Val Ile Ser Gly Phe Thr Tyr Lys Gln Thr
            20                  25                  30

Phe Met Gly Trp Phe Arg Gln Val Pro Gly Lys Glu Arg Glu Gly Val

```
                35                  40                  45
Ala Ala Ile Ser Thr Gly Gly Ser Thr Val Tyr Ala Asp Ser Val
         50                  55                  60

Lys Gly Arg Phe Thr Ile Ser Gln Glu Ser Ser Lys Asn Thr Val Tyr
 65                  70                  75                  80

Leu Glu Met Asn Gly Leu Lys Leu Glu Asp Thr Gly Met Tyr Tyr Cys
                 85                  90                  95

Ala Ala Ser Thr Val Ile Thr Ser Val Thr Ile Asn Arg Gly Leu Tyr
             100                 105                 110

Gln Tyr Trp Gly Gln Gly Thr Gln Val Thr Val Ser Ser
        115                 120                 125

<210> SEQ ID NO 75
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 75

Phe Thr Tyr Arg Gln Thr Phe Met Gly
1               5

<210> SEQ ID NO 76
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 76

Ala Ile Ser Thr Gly Gly Gly Ser Thr Val Tyr Ala Asp Ser Val Lys
1               5                  10                  15
Gly

<210> SEQ ID NO 77
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 77

Ser Thr Val Ile Thr Ser Val Ser Ile Asn Arg Gly Leu Tyr Gln Tyr
1               5                  10                  15

<210> SEQ ID NO 78
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 78

Phe Thr Tyr Arg Gln Thr Phe Met Gly
1               5

<210> SEQ ID NO 79
<211> LENGTH: 17
<212> TYPE: PRT
```

<213> ORGANISM: Artificial Sequence
<220> FEATURE:
<223> OTHER INFORMATION: Description of Artificial Sequence: Synthetic
      peptide

<400> SEQUENCE: 79

Ala Ile Ser Thr Gly Gly Gly Ser Thr Val Tyr Ala Asp Ser Val Lys
1               5                   10                  15

Gly

<210> SEQ ID NO 80
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 80

Ser Thr Val Ile Thr Ser Glu Ser Ile Asn Arg Asn Leu Tyr Gln Tyr
1               5                   10                  15

<210> SEQ ID NO 81
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 81

Phe Thr Leu Ser Thr Tyr Trp Ile Tyr
1               5

<210> SEQ ID NO 82
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 82

Thr Val Ser Arg Ser Gly Gly Thr Thr Tyr Tyr Ala Asp Ser Val Asn
1               5                   10                  15

Gly

<210> SEQ ID NO 83
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 83

Ser Val Ser Asn Leu Gly Trp Pro Pro Val Arg Ala Pro Ser Pro
1               5                   10                  15

<210> SEQ ID NO 84
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

```
<400> SEQUENCE: 84

Phe Thr Phe Ser Ser Tyr Ala Met Ser
1               5

<210> SEQ ID NO 85
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 85

Ala Ile Asn Ser Gly Gly Ala Gly Thr Tyr Tyr Thr Asp Ser Val Lys
1               5                   10                  15

Gly

<210> SEQ ID NO 86
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 86

His Val Thr Gly Asp Tyr Asp Pro Ser Leu Arg His Gly Tyr Asn Val
1               5                   10                  15

<210> SEQ ID NO 87
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 87

Phe Thr Tyr Arg Gln Thr Phe Met Gly
1               5

<210> SEQ ID NO 88
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 88

Ala Ile Ser Thr Gly Gly Gly Ser Thr Ile Tyr Ala Asp Ser Val Lys
1               5                   10                  15

Gly

<210> SEQ ID NO 89
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 89

Ser Thr Val Ile Thr Ser Glu Ser Ile Asn Arg Asn Leu Tyr Gln Tyr
1               5                   10                  15
```

```
<210> SEQ ID NO 90
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 90

Phe Thr Leu Ser Thr Tyr Trp Met Tyr
1               5

<210> SEQ ID NO 91
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 91

Ala Val Ser Arg Gly Gly Phe Asn Thr Tyr Tyr Ala Asp Ser Val Lys
1               5                   10                  15
Gly

<210> SEQ ID NO 92
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 92

Ser Val Ser Phe Tyr Gly Trp Pro Pro Asp Arg Val Pro Ser Pro
1               5                   10                  15

<210> SEQ ID NO 93
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 93

Phe Thr Phe Ser Ser Tyr Ala Met Ser
1               5

<210> SEQ ID NO 94
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 94

Ala Ile Asn Ser Gly Gly Ala Gly Thr Tyr Tyr Thr Asp Ser Val Lys
1               5                   10                  15
Gly

<210> SEQ ID NO 95
<211> LENGTH: 16
<212> TYPE: PRT
<213> ORGANISM: Artificial Sequence
```

<220> FEATURE:
<223> OTHER INFORMATION: Description of Artificial Sequence: Synthetic
      peptide

<400> SEQUENCE: 95

His Val Thr Gly Asp Tyr Asp Pro Ser Leu Arg Tyr Gly Tyr Asn Val
1               5                   10                  15

<210> SEQ ID NO 96
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 96

Phe Thr Tyr Arg Pro Thr Phe Met Gly
1               5

<210> SEQ ID NO 97
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 97

Ala Ile Thr Thr Gly Gly Gly Ser Thr Val Tyr Ala Asp Ser Val Lys
1               5                   10                  15

Gly

<210> SEQ ID NO 98
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 98

Thr Thr Val Ile Thr Ser Val Ser Ile Asn Arg Asn Leu Tyr Gln Tyr
1               5                   10                  15

<210> SEQ ID NO 99
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 99

Phe Thr Tyr Arg Pro Thr Phe Met Gly
1               5

<210> SEQ ID NO 100
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 100

Ala Ile Ser Thr Gly Gly Gly Ser Ser Val Tyr Ala Asp Ser Val Lys

<210> SEQ ID NO 101
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 101

Ser Thr Val Ile Thr Ser Val Ser Ile Asn Arg Gly Leu Tyr Gln Tyr
1               5                   10                  15

<210> SEQ ID NO 102
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 102

Phe Thr Phe Arg Asn Tyr Ala Met Ser
1               5

<210> SEQ ID NO 103
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 103

Ala Ile Asn Ser Gly Gly Gly Ser Thr Tyr Tyr Ala Asp Ser Val Lys
1               5                   10                  15
Gly

<210> SEQ ID NO 104
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 104

His Val Thr Gly Asp Tyr Asp Pro Ser Leu Arg Tyr Glu Tyr Asn Tyr
1               5                   10                  15

<210> SEQ ID NO 105
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 105

Phe Thr Phe Arg Asn Tyr Ala Met Ser
1               5

<210> SEQ ID NO 106
<211> LENGTH: 17

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 106

Ala Ile Asn Ser Gly Gly Gly Ser Thr Tyr Tyr Ala Asp Ser Val Lys
1               5                   10                  15

Gly

<210> SEQ ID NO 107
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 107

His Val Thr Gly Asp Tyr Asp Pro Ser Leu Arg Tyr Glu Tyr Asn Tyr
1               5                   10                  15

<210> SEQ ID NO 108
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 108

Phe Thr Phe Ser Ser Tyr Ala Met Ser
1               5

<210> SEQ ID NO 109
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 109

Ala Ile Asn Ser Gly Gly Gly Ser Thr Tyr Tyr Ala Asp Ser Val Lys
1               5                   10                  15

Gly

<210> SEQ ID NO 110
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 110

His Val Thr Gly Asp Tyr Asp Pro Ser Leu Arg Tyr Gly Tyr Asn Cys
1               5                   10                  15

<210> SEQ ID NO 111
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide
```

```
<400> SEQUENCE: 111

Phe Thr Phe Ser Thr Tyr Asp Met Ser
1               5

<210> SEQ ID NO 112
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 112

Thr Ile Asn Tyr Ser Gly Ser Ser Thr Tyr Tyr Val Asp Ser Val Leu
1               5                   10                  15

Gly

<210> SEQ ID NO 113
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 113

Val Lys Glu Arg Arg Ser Asn Gly His Pro Ile Val Phe Gly Asp
1               5                   10                  15

<210> SEQ ID NO 114
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 114

Phe Thr Tyr Lys Gln Thr Phe Met Gly
1               5

<210> SEQ ID NO 115
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 115

Ala Ile Ser Thr Gly Gly Gly Ser Thr Val Tyr Ala Asp Ser Val Lys
1               5                   10                  15

Gly

<210> SEQ ID NO 116
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 116

Ser Thr Val Ile Thr Ser Val Ser Ile Asn Arg Gly Leu Tyr Gln
1               5                   10                  15
```

<210> SEQ ID NO 117
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 117

Phe Thr Tyr Arg Gln Thr Phe Met Gly
1               5

<210> SEQ ID NO 118
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 118

Ala Ile Ser Thr Gly Gly Gly Ser Thr Val Tyr Ala Asp Ser Val Lys
1               5                   10                  15

Gly

<210> SEQ ID NO 119
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 119

Ser Thr Val Ile Thr Ser Glu Ser Ile Tyr Arg Asn Leu Tyr Gln Tyr
1               5                   10                  15

<210> SEQ ID NO 120
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 120

Phe Thr Phe Arg Asn Tyr Ala Met Ser
1               5

<210> SEQ ID NO 121
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 121

Ala Ile Asn Ser Gly Gly Gly Ser Thr Tyr Tyr Ala Asp Ser Val Lys
1               5                   10                  15

Gly

<210> SEQ ID NO 122
<211> LENGTH: 16
<212> TYPE: PRT

```
<213> ORGANISM: Artificial Sequence
<220> FEATURE:
<223> OTHER INFORMATION: Description of Artificial Sequence: Synthetic
      peptide

<400> SEQUENCE: 122

His Val Thr Gly Asp Tyr Asp Pro Ser Leu Arg Tyr Glu Tyr Asn Tyr
1               5                   10                  15

<210> SEQ ID NO 123
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 123

Phe Thr Phe Arg Asn Tyr Ala Met Ser
1               5

<210> SEQ ID NO 124
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 124

Ala Ile Asn Ser Gly Gly Gly Ser Thr Tyr Tyr Ala Asp Ser Val Lys
1               5                   10                  15

Gly

<210> SEQ ID NO 125
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 125

His Val Thr Gly Asp Tyr Asp Pro Ser Leu Arg Tyr Glu Tyr Ala Tyr
1               5                   10                  15

<210> SEQ ID NO 126
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 126

Phe Thr Phe Ser Ser Tyr Ala Met Ser
1               5

<210> SEQ ID NO 127
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 127
```

```
Ala Ile Asn Ser Gly Gly Gly Ser Thr Tyr Tyr Ala Asp Ser Val Lys
1               5                   10                  15

Ala
```

<210> SEQ ID NO 128
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 128

```
His Val Thr Gly Asp Tyr Asp Pro Ser Leu Arg Tyr Asp Tyr Asn Tyr
1               5                   10                  15
```

<210> SEQ ID NO 129
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 129

```
Phe Thr Tyr Arg Pro Thr Phe Met Gly
1               5
```

<210> SEQ ID NO 130
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 130

```
Ala Ile Ser Thr Gly Gly Gly Ser Ser Val Tyr Ala Asp Ser Val Lys
1               5                   10                  15

Gly
```

<210> SEQ ID NO 131
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 131

```
Ser Thr Val Ile Thr Ser Val Ser Ile Asn Arg Ala Leu Tyr Gln Tyr
1               5                   10                  15
```

<210> SEQ ID NO 132
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 132

```
Phe Thr Phe Ser Ser Tyr Ala Val Ser
1               5
```

<210> SEQ ID NO 133

<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 133

Thr Ile Asn Ser Gly Gly Gly Ser Thr Tyr Tyr Ala Asp Ser Val Lys
1               5                   10                  15
Gly

<210> SEQ ID NO 134
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 134

His Val Thr Gly Asp Tyr Asp Pro Ser Leu Arg Tyr Glu Tyr Asn Val
1               5                   10                  15

<210> SEQ ID NO 135
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 135

Phe Thr Tyr Arg Gln Thr Phe Met Gly
1               5

<210> SEQ ID NO 136
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 136

Ala Ile Ser Thr Gly Gly Gly Ser Thr Val Tyr Ala Asp Ser Val Lys
1               5                   10                  15
Gly

<210> SEQ ID NO 137
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 137

Ser Thr Val Ile Thr Ser Pro Ser Ile Asn Arg Asn Leu Tyr Gln Tyr
1               5                   10                  15

<210> SEQ ID NO 138
<211> LENGTH: 9
<212> TYPE: PRT
<213> ORGANISM: Artificial Sequence
<220> FEATURE:
<223> OTHER INFORMATION: Description of Artificial Sequence: Synthetic peptide

<400> SEQUENCE: 138

Phe Thr Phe Ser Asn Tyr Ala Met Lys
1               5

<210> SEQ ID NO 139
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 139

Ser Ile Ser Gly Gly Gly Gly Ala Thr Tyr Tyr Ala Asp Ser Val Lys
1               5                   10                  15
Gly

<210> SEQ ID NO 140
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 140

Gln Asn Leu Asp Tyr
1               5

<210> SEQ ID NO 141
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 141

Phe Thr Phe Asn Ser Ala His Met Lys
1               5

<210> SEQ ID NO 142
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 142

Phe Ile Thr Pro Gly Gly Ala Ser Thr Gly Tyr Ala Asp Ser Val Lys
1               5                   10                  15
Gly

<210> SEQ ID NO 143
<211> LENGTH: 3
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 143

Gly Gly Leu

```
<210> SEQ ID NO 144
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 144

Phe Thr Tyr Arg Pro Thr Phe Met Gly
1               5

<210> SEQ ID NO 145
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 145

Ala Ile Thr Thr Gly Gly Gly Ser Thr Leu Tyr Ala Asp Ser Val Lys
1               5                   10                  15

Gly

<210> SEQ ID NO 146
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 146

Thr Thr Val Ile Thr Ser Val Ser Ile Asn Arg Asn Leu Tyr Gln Tyr
1               5                   10                  15

<210> SEQ ID NO 147
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 147

Phe Thr Tyr Lys Gln Thr Phe Met Gly
1               5

<210> SEQ ID NO 148
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 148

Ala Ile Ser Thr Gly Gly Gly Ser Thr Val Tyr Ala Asp Ser Val Lys
1               5                   10                  15

Gly

<210> SEQ ID NO 149
<211> LENGTH: 16
```

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 149

Ser Thr Val Ile Thr Ser Val Thr Ile Asn Arg Gly Leu Tyr Gln Tyr
1               5                   10                  15

<210> SEQ ID NO 150
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 150

Phe Val Tyr Lys Gln Thr Phe Met Gly
1               5

<210> SEQ ID NO 151
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 151

Ala Ile Ser Thr Gly Gly Gly Ser Thr Val Tyr Ala Asp Ser Val Lys
1               5                   10                  15

Gly

<210> SEQ ID NO 152
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 152

Ser Thr Val Ile Thr Ser Val Ser Ile Asn Arg Gly Leu Tyr Gln Tyr
1               5                   10                  15

<210> SEQ ID NO 153
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 153

Phe Thr Tyr Arg Gln Thr Phe Met Gly
1               5

<210> SEQ ID NO 154
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 154
```

```
Ala Ile Ser Thr Gly Gly Ser Thr Val Tyr Ala Asp Ser Val Lys
1               5                   10                  15

Gly

<210> SEQ ID NO 155
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 155

Ser Thr Val Ile Thr Ser Val Ser Ile Asn Arg Gly Leu Tyr Gln Tyr
1               5                   10                  15

<210> SEQ ID NO 156
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 156

Phe Thr Phe Ser Ser Tyr Ala Met Ser
1               5

<210> SEQ ID NO 157
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 157

Ala Ile Asn Ser Gly Gly Gly Ser Thr Tyr Tyr Ala Asp Ser Val Lys
1               5                   10                  15

Gly

<210> SEQ ID NO 158
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 158

His Val Thr Gly Asp Tyr Asp Pro Ser Leu Arg Tyr Glu Tyr Asn Tyr
1               5                   10                  15

<210> SEQ ID NO 159
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 159

Phe Thr Phe Ser Ser Tyr Ala Met Ser
1               5
```

```
<210> SEQ ID NO 160
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 160

Ala Ile Asn Ser Gly Gly Ala Ser Thr Tyr Tyr Ala Asp Ser Val Lys
1               5                   10                  15

Gly

<210> SEQ ID NO 161
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 161

His Val Thr Gly Asp Tyr Asp Pro Ser Leu Arg Tyr Glu Tyr Asn Cys
1               5                   10                  15

<210> SEQ ID NO 162
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 162

Phe Thr Phe Ser Ser Tyr Ala Met Ser
1               5

<210> SEQ ID NO 163
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 163

Ala Ile Asn Ser Gly Gly Gly Ser Thr Tyr Tyr Ala Asp Ser Val Lys
1               5                   10                  15

Gly

<210> SEQ ID NO 164
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 164

His Val Thr Gly Asp Tyr Asp Pro Ser Leu Arg Tyr Glu Tyr Asn Tyr
1               5                   10                  15

<210> SEQ ID NO 165
<211> LENGTH: 9
<212> TYPE: PRT
<213> ORGANISM: Artificial Sequence
<220> FEATURE:
```

<223> OTHER INFORMATION: Description of Artificial Sequence: Synthetic
      peptide

<400> SEQUENCE: 165

Phe Thr Tyr Arg Gln Thr Phe Met Gly
1               5

<210> SEQ ID NO 166
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 166

Ala Ile Ser Thr Gly Gly Gly Ser Thr Val Tyr Ala Asp Ser Val Lys
1               5                   10                  15

Gly

<210> SEQ ID NO 167
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 167

Ser Thr Val Ile Thr Ser Glu Ser Ile Asn Arg Asn Leu Tyr Gln Tyr
1               5                   10                  15

<210> SEQ ID NO 168
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 168

Phe Thr Tyr Arg Gln Thr Phe Met Gly
1               5

<210> SEQ ID NO 169
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 169

Ala Ile Ser Thr Gly Gly Gly Ser Thr Val Tyr Ala Asp Ser Val Lys
1               5                   10                  15

Gly

<210> SEQ ID NO 170
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 170

Ser Thr Val Ile Thr Ser Val Ser Ile Asn Arg Asn Leu Tyr Gln Tyr
1               5                   10                  15

<210> SEQ ID NO 171
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 171

Phe Thr Phe Ser Ser Tyr Ala Met Ser
1               5

<210> SEQ ID NO 172
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 172

Ala Ile Asn Ser Gly Gly Gly Ser Thr Tyr Tyr Ala Asp Ser Val Lys
1               5                   10                  15
Gly

<210> SEQ ID NO 173
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 173

His Val Ala Gly Asp Tyr Asp Pro Ser Leu Arg Tyr Glu Trp His Val
1               5                   10                  15

<210> SEQ ID NO 174
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 174

Phe Thr Phe Arg Ser Tyr Ala Met Ser
1               5

<210> SEQ ID NO 175
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 175

Ala Ile Asn Ser Gly Gly Gly Ser Thr Tyr Tyr Ala Asp Ser Val Lys
1               5                   10                  15
Ala

<210> SEQ ID NO 176

```
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 176

His Val Thr Gly Asp Tyr Asp Pro Ser Leu Arg Tyr Glu Tyr Asn Tyr
1               5                   10                  15

<210> SEQ ID NO 177
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 177

Phe Thr Phe Ser Ser Tyr Ala Met Ser
1               5

<210> SEQ ID NO 178
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 178

Ala Ile Asn Ser Gly Gly Gly Ser Thr Tyr Tyr Ala Asp Ser Val Lys
1               5                   10                  15

Gly

<210> SEQ ID NO 179
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 179

His Ile Thr Gly Asp Tyr Asp Pro Ser Leu Arg Tyr Glu Tyr Asn Tyr
1               5                   10                  15

<210> SEQ ID NO 180
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 180

Phe Thr Tyr Arg Gln Thr Phe Met Gly
1               5

<210> SEQ ID NO 181
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide
```

```
<400> SEQUENCE: 181

Ala Ile Ser Thr Gly Gly Gly Ser Met Val Tyr Ala Asp Ser Val Lys
1               5                   10                  15

Gly

<210> SEQ ID NO 182
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 182

Ser Thr Val Ile Thr Ser Glu Ser Ile Asn Arg Asn Leu Tyr Gln Tyr
1               5                   10                  15

<210> SEQ ID NO 183
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 183

Phe Thr Tyr Arg Gln Thr Phe Met Gly
1               5

<210> SEQ ID NO 184
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 184

Ala Ile Ser Thr Gly Gly Gly Ser Thr Val Tyr Ala Asp Ser Val Lys
1               5                   10                  15

Gly

<210> SEQ ID NO 185
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 185

Ser Thr Val Ile Thr Ser Glu Ser Ile Asn Arg Gly Leu Tyr Gln Tyr
1               5                   10                  15

<210> SEQ ID NO 186
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 186

Tyr Thr Gly Cys Met Gly
1               5
```

```
<210> SEQ ID NO 187
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 187

Ser Ile Asn Asp Gly Gly Ser Leu Thr Tyr Ala Asp Ser Val Lys Gly
1               5                   10                  15

<210> SEQ ID NO 188
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 188

Ser Leu Ser Tyr Cys Leu Asn Pro Thr Leu Arg Val Asp Gly Tyr Asn
1               5                   10                  15

Tyr

<210> SEQ ID NO 189
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 189

Leu Thr Tyr Lys Gln Thr Phe Met Gly
1               5

<210> SEQ ID NO 190
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 190

Ala Ile Ser Thr Gly Gly Gly Ser Thr Val Tyr Ala Asp Ser Val Lys
1               5                   10                  15

Gly

<210> SEQ ID NO 191
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 191

Ser Thr Val Ile Thr Ser Val Ser Ile Asn Arg Tyr Leu Tyr Gln Trp
1               5                   10                  15

<210> SEQ ID NO 192
<211> LENGTH: 9
<212> TYPE: PRT
<213> ORGANISM: Artificial Sequence
```

```
<220> FEATURE:
<223> OTHER INFORMATION: Description of Artificial Sequence: Synthetic
      peptide

<400> SEQUENCE: 192

Phe Thr Phe Ser Asn Tyr Ala Met Ser
1               5

<210> SEQ ID NO 193
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 193

Ala Ile Asn Ser Gly Gly Ser Val Phe Tyr Ala Asp Ser Val Lys Gly
1               5                   10                  15

<210> SEQ ID NO 194
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 194

His Val Thr Gly Asp Tyr Asp Pro Ser Leu Arg Tyr Gly Tyr Asn Val
1               5                   10                  15

<210> SEQ ID NO 195
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 195

Phe Thr Tyr Arg Pro Thr Phe Met Gly
1               5

<210> SEQ ID NO 196
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 196

Ala Ile Ser Thr Gly Gly Gly Ser Thr Val Tyr Ala Asp Ser Val Lys
1               5                   10                  15

Gly

<210> SEQ ID NO 197
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 197

Ser Thr Val Ile Thr Ser Glu Ser Ile Asn Arg Asn Leu Tyr Gln Tyr
```

```
<210> SEQ ID NO 198
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 198

Phe Thr Phe Ser Ser Tyr Ala Met Ser
1               5

<210> SEQ ID NO 199
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 199

Ala Ile Asn Ser Gly Gly Gly Ser Thr Tyr Tyr Ala Asp Ser Val Lys
1               5                   10                  15
Gly

<210> SEQ ID NO 200
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 200

His Val Thr Gly Asp Tyr Asp Pro Ser Leu Arg Tyr Gly Tyr Asn Val
1               5                   10                  15

<210> SEQ ID NO 201
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 201

Phe Thr Phe Ser Ser Tyr Ala Met Ser
1               5

<210> SEQ ID NO 202
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 202

Ala Ile Asn Leu Gly Gly Asp Thr Thr Tyr Tyr Thr Asp Ser Val Lys
1               5                   10                  15
Gly

<210> SEQ ID NO 203
<211> LENGTH: 16
```

```
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 203

His Val Thr Gly Asp Tyr Asp Pro Ser Leu Arg Tyr Glu Tyr Gly Tyr
1               5                   10                  15

<210> SEQ ID NO 204
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 204

Phe Thr Phe Asn Ser Ala His Leu Lys
1               5

<210> SEQ ID NO 205
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 205

Phe Ile Thr Asn Gly Gly Ala Ser Thr Gly Tyr Ala Asp Ser Val Lys
1               5                   10                  15

Gly

<210> SEQ ID NO 206
<211> LENGTH: 3
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 206

Gly Gly Leu
1

<210> SEQ ID NO 207
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 207

Phe Thr Tyr Arg Gln Thr Phe Met Gly
1               5

<210> SEQ ID NO 208
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 208
```

```
Ala Ile Ser Thr Gly Gly Ser Thr Ile Tyr Ala Asn Ser Val Lys
1               5                   10                  15

Gly

<210> SEQ ID NO 209
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 209

Ser Thr Val Ile Thr Ser Val Ser Ile Asn Arg Gly Leu Tyr Gln Tyr
1               5                   10                  15

<210> SEQ ID NO 210
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 210

Phe Thr Phe Ser Ser Tyr Ala Met Ser
1               5

<210> SEQ ID NO 211
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 211

Ala Ile Asn Ser Gly Gly Gly Ser Thr Tyr Tyr Ala Asp Ser Val Lys
1               5                   10                  15

Gly

<210> SEQ ID NO 212
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 212

His Ile Thr Gly Asp Tyr Asp Pro Ser Leu Arg Tyr Glu Tyr Asn Cys
1               5                   10                  15

<210> SEQ ID NO 213
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 213

Phe Thr Tyr Lys Gln Thr Phe Met Gly
1               5
```

```
<210> SEQ ID NO 214
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 214

Ala Ile Ser Thr Gly Gly Gly Asn Thr Val Tyr Ala Asp Ser Val Lys
1               5                   10                  15

Gly

<210> SEQ ID NO 215
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 215

Ser Thr Val Ile Thr Ser Val Thr Val Asn Arg Gly Leu Tyr Gln Tyr
1               5                   10                  15

<210> SEQ ID NO 216
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 216

Phe Thr Phe Ser Tyr Tyr Ala Met Lys
1               5

<210> SEQ ID NO 217
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 217

Ser Ile Ser Gly Gly Gly Gly Ala Thr Tyr Tyr Ala Asp Ser Val Lys
1               5                   10                  15

Gly

<210> SEQ ID NO 218
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 218

Gln Asn Leu Asp Tyr
1               5

<210> SEQ ID NO 219
<211> LENGTH: 9
<212> TYPE: PRT
<213> ORGANISM: Artificial Sequence
<220> FEATURE:
```

<223> OTHER INFORMATION: Description of Artificial Sequence: Synthetic
      peptide

<400> SEQUENCE: 219

Phe Thr Tyr Lys Gln Thr Phe Met Gly
1               5

<210> SEQ ID NO 220
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 220

Ala Ile Ser Thr Gly Gly Gly Ser Thr Val Tyr Ala Asp Ser Val Lys
1               5                   10                  15
Gly

<210> SEQ ID NO 221
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 221

Ser Thr Val Ile Thr Ser Val Thr Ile Asn Arg Gly Leu Tyr Gln Tyr
1               5                   10                  15

<210> SEQ ID NO 222
<211> LENGTH: 387
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 222
caggtgcaac ttcaggagtc cggcggtggc agtgtgcagg ccggaggctc tctccgcctc    60
tcttgcacag cctccggtgc catcgcctcc ggctacattg actctaggtg gtgtatggcc   120
tggttccgcc aggcccccgg aaaggagaga gagggcgtcg cggcaatttg gccgggtggg   180
ggcctgacag tgtacgccga ttctgtcaag gtcgctttta ccatcagccg cgaccatgcg   240
aaaaacaccc tgtaccttca gatgaacaat ctcaagccag aggataccgc tatgtattac   300
tgcgcagcgg gcagccctcg catgtgtcct tccctggagt ttggcttcga ttactgggga   360
cagggtactc aggtgaccgt cagctct                                       387

<210> SEQ ID NO 223
<211> LENGTH: 369
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 223
caagtgcagt tgcaggagag cggtgggggt agcgtccagg ccggggggctc tcttcggctg    60 tcctgtactg caccgggatt caccagtaac tcatgcggca tggactggta tcggcaggca   120
ccgggcaagg aacgcgagtt cgtgtccagt atctctacag atggcaccac tggttacgct   180

```
gactccgtga aaggccggtt caccatctca aaagataagg caaaggatac tgtgtacctc    240
caaatgaaca gcctgaagcc ggaggacaca ggaatgtata gctgtaagac caaggatggc    300
acgattgcca caatggagct ttgcgatttc ggatactggg ggcaaggcac ccaggtgacc    360
gtgtcttcc                                                             369

<210> SEQ ID NO 224
<211> LENGTH: 384
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 224
caggtgcaac tccaagagag cggaggtggc agtgttcagg ccggggcag cctgcgcctc      60 agctgtgcag cttccgggta tccctactcc aatggctaca tgggctggtt ccgccaagcg    120
cccggcaagg agagagaggg tgtcgcaacc atttataccg cgacggaag gacttattac     180 gcggattccg tcaagggccg ctttactatc tctcgcgata cgctaagaa taccgtggat     240 ctccagatgt cctctctcaa gcccgaggac accgctatgt attactgcgc cgctagggct    300 gcacccctt atagctctgg atcaccgctg acacgcgcaa ggtacaatgt gtggggacag     360
ggaacgcaag tgacggtgtc ctcc                                            384

<210> SEQ ID NO 225
<211> LENGTH: 357
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 225
caggtacagc ttcaggagtc cggggggaggc agcgtgcagg caggtggctc cctgcgcctg     60
tcttgcgtcg ctagtgccag cacctactgc acctacgaca tgcactggta tcgtcaagcg    120
cccggaaagg gccgtgagtt cgtctctgcc atcgacagcg acggcaccac acggtacgct    180
gactccgtca aggcaggtt cactatttct cagggcaccg ccaagaacac tgtgtacctc     240
cagatgaaca gtctccagcc tgaggacacc gcaatgtatt actgtaagac tgtgtgcgtc    300
gtgggctctc ggtggtcaga ttactgggga cagggtactc aggtaactgt tagctcc        357

<210> SEQ ID NO 226
<211> LENGTH: 351
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 226
caggtgcaac tccaggagag cggaggcggt tccgtgcagg ctggggtag cctcactctc       60 tcctgtgcag cttccgaata tgcgtatagc acttgcaata tggggtggta tcgccaggcc    120
cccggtaaag agcgtgagct ggtgtccgct ttcatttctg acggatcaac ttattacgca    180
gatagcgtaa agggacgctt cacaattaca cgggataatg ccaagaatac agtgtacttg    240
cagatgaaca gtctgaagcc tgaggacact gccatctact attgcagtgc gaactgctac    300
cgtaggctga ggaattactg gggtcaaggt acacaggtaa ctgtctcctc t              351
```

<210> SEQ ID NO 227
<211> LENGTH: 372
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 227

```
caggtgcagt tgcaggagtc cggcggtgga ctggttcagc caggtgggtc tctgcgcctc      60
tcctgtaccg ctagtggact gacctttgat gacagcgtca tgggatggtt ccgtcaggcc     120
cctgggaagg gtcgcgaggc cgtttcctgt atctcctcta gcggagccaa tgccttctac     180
gcggactctg tgaaaggccg ctttactatc agtcgcgata acgctaagaa taccctgtac     240
cttcagatga acagcctcaa gcccgaggat acagcaactt actattgtaa gcgcggacat     300
gcctgcgcag gctattaccc tatccctat gacgattact ggggtcaagg cacccaggtc     360
acggtgagca gc                                                         372
```

<210> SEQ ID NO 228
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 228

```
caggtgcagc tgcaggagag cggcggcggc agcgtgcagg ccggcggcag cctgaggctg      60
agctgcgtga tcagcggctt cacctacagg cagaccttca tgggctggtt caggcaggtg     120
ctgggcaagg agagggaggg cgtggccgcc atcagcaccg gcggcggcag caccgtgtac     180
gccgacagcg tgaagggcag gttcaccatc agccaggaca gcagcaagaa caccgtgtac     240
ctggagatga cggcctgaa gctggaggac accggcatgt actactgcgc cgccagcacc     300
gtgatcacca gcgtgagcat caacaggggc ctgtaccagt actggggcca gggcacccag     360
gtgaccgtga gcagc                                                      375
```

<210> SEQ ID NO 229
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 229

```
caggtgcagc tgcaggagag cggcggcggc agcgtgcagg ccggcggcag cctgaggctg      60
agctgcgcca tcagcggctt cacctacagg cagaccttca tgggctggtt caggcaggtg     120
gtgggcaagg agagggaggg cgtggccgcc atcagcaccg gcggcggcag caccgtgtac     180
gccgacagcg tgaagggcag gttcaccatc agccaggaca gcagcaagga caccgtgtac     240
ctggagatga cggcctgaa gctggaggac accggcatgt actactgcgc cgccagcacc     300
gtgatcacca gcgagagcat caacaggaac ctgtaccagt actggggcca gggcacccag     360
gtgaccgtga gcagc                                                      375
```

<210> SEQ ID NO 230
<211> LENGTH: 372

```
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 230
caggtgcagc tgcaggagag cggcggcggc ctggtgcagc ccggcggcag cctgaggctg     60
agctgcgccg ccagcggctt caccctgagc acctactgga tctactgggt gaggcaggcc   120
cccggcaagg gccccgagtg ggtgagcacc gtgagcagga gcggcggcac cacctactac   180
gccgacagcg tgaacggcag gttcaccatc agcagggaca cgccaagaa caccgtgtac   240 ctgcagatga acaacctgaa gcccgaggac gccgccgtgt actactgcct ggccagcgtg   300
agcaacctgg gctggccccc cgtgagggcc cccagcccca ccggccaggg cacccaggtg   360
accgtgagca gc                                                        372

<210> SEQ ID NO 231
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 231
caggtgcagc tgcaggagag cggcggcggc ctggtgcagc ccggcggcag cctgaggctg     60
agctgcgccg ccagcggctt caccttcagc agctacgcca tgagctgggt gaggcaggcc   120
cccggcaagg gcctggagtg ggtgagcgcc atcaacagcg gcggcgccgg cacctactac   180
accgacagcg tgaagggcag gttcaccatc agcagggaca cgccaagaa caccctgtac   240 ctgcagctga acagcctgaa gaccgaggac accgccatgt actactgcgc caagcacgtg   300
accggcgact acgaccccag cctgaggcac ggctacaacg tgtggagcca gggcacccag   360
gtgaccgtga gcagc                                                     375

<210> SEQ ID NO 232
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 232
caggtgcagc tgcaggagag cggcggcggc agcgtgcagg ccggcggcag cctgaggctg     60
agctgcgtga tcagcggctt cacctacagg cagaccttca tgggctggtt caggcaggtg   120
gtgggcaagg agagggaggg cgtggccgcc atcagcaccg gcggcggcag caccatctac   180
gccgacagcg tgaagggcag gttcaccatc agccaggaca gcagcaagga caccgtgtac   240
ctggagatga cggcctgaa gctggaggac accggcatgt actactgcgc cgccagcacc   300
gtgatcacca gcgagagcat caacaggaac ctgtaccagt actggggcca gggcacccag   360
gtgaccgtga gcagc                                                     375

<210> SEQ ID NO 233
<211> LENGTH: 372
<212> TYPE: DNA
<213> ORGANISM: Artificial Sequence
<220> FEATURE:
<223> OTHER INFORMATION: Description of Artificial Sequence: Synthetic
```

-continued polynucleotide

<400> SEQUENCE: 233
caggtgcagc tgcaggagag cggcggcggc ctggtgcagc ccggcggcag cctgaggctg    60
agctgcgccg ccagcggctt caccctgagc acctactgga tgtactgggt gaggcaggcc   120
cccggcaagg gccccgagtg ggtgagcgcc gtgagcaggg gcggcttcaa cacctactac   180
gccgacagcg tgaagggcag gttcaccatc agcagggaca cgccaagaa caccgtgtac    240 ctgcagatga acagcctgaa gcccgaggac accgccgtgt actactgcat gagcagcgtg   300
agcttctacg gctggccccc cgacagggtg cccagcccca ccggccaggg cacccaggtg   360
accgtgagca gc                                                       372

<210> SEQ ID NO 234
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 234
caggtgcagc tgcaggagag cggcggcggc ctggtgcagc ccggcgagag cctgaggctg    60
agctgcgccg ccagcggctt caccttcagc agctacgcca tgagctgggt gaggcaggcc   120
cccggcaagg gcctggagtg ggtgagcgcc atcaacagcg gcggcgccgg cacctactac   180
accgacagcg tgaagggcag gttcaccatc agcagggaca cgccaagaa caccctgtac    240 ctgcagctga acagcctgaa gaccgaggac accgccatgt actactgcgc caagcacgtg   300
accggcgact acgaccccag cctgaggtac ggctacaacg tgtggagcca gggcacccag   360
gtgaccgtga gcagc                                                    375

<210> SEQ ID NO 235
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 235
caggtgcagc tgcaggagag cggcggcggc agcgtgcagg ccggcggcag cctgaggctg    60
agctgcgtga tcagcggctt cacctacagg cccaccttca tgggctggtt caggcaggtg   120
ctgggcaagg agagggaggg cgtggccgcc atcaccaccg gcggcggcag caccgtgtac   180
gccgacagcg tgaagggcag gttcaccatc agccaggaca gcagcaagaa caccgtgtac   240
ctggagatga acggcctgaa gctggaggac accggcatgt actactgcgc cgccaccacc   300
gtgatcacca gcgtgagcat caacaggaac ctgtaccagt actggggcca gggcacccag   360
gtgaccgtga gcagc                                                    375

<210> SEQ ID NO 236
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 236

```
caggtgcagc tgcaggagag cggcggcggc agcgtgcagg ccggcggcag cctgaggctg    60
agctgcggca tcagcggctt cacctacagg cccaccttca tgggctggtt caggcaggtg   120
ctgggcaagg agagggaggg cgtggccgcc atcagcaccg gcggcggcag cagcgtgtac   180
gccgacagcg tgaagggcag gttcaccgtg agccaggaca gcagcaagaa caccgtgtac   240
ctggagatga acggcctgaa gctggaggac accggcatgt actactgcgc cgccagcacc   300
gtgatcacca gcgtgagcat caacaggggc ctgtaccagt actggggcca gggcacccag   360
gtgaccgtga gcagc                                                    375
```

`<210>` SEQ ID NO 237

`<400>` SEQUENCE: 237

000

`<210>` SEQ ID NO 238
`<211>` LENGTH: 375
`<212>` TYPE: DNA
`<213>` ORGANISM: Artificial Sequence
`<220>` FEATURE:
`<223>` OTHER INFORMATION: Description of Artificial Sequence: Synthetic polynucleotide

`<400>` SEQUENCE: 238

```
caggtgcagc tgcaggagag cggcggcggc ctggtgcagc ccggcggcag cctgaggctg    60
agctgcaccg ccagcggctt caccttcagg aactacgcca tgagctgggt gaggcaggcc   120
cccggcaagg gcctggagtg ggtgagcgcc atcaacagcg gcggcggcag cacctactac   180
gccgacagcg tgaagggcag gttcaccatc agcagggaca cgccaagaa cacctgtac   240 ctgaggctgc acagcctgaa gaccgaggac accgccatgt actactgcgc caagcacgtg   300
accggcgact acgaccccag cctgaggtac gagtacaact actggagcca gggcacccag   360
gtgaccgtga gcagc                                                    375
```

`<210>` SEQ ID NO 239
`<211>` LENGTH: 375
`<212>` TYPE: DNA
`<213>` ORGANISM: Artificial Sequence
`<220>` FEATURE:
`<223>` OTHER INFORMATION: Description of Artificial Sequence: Synthetic polynucleotide

`<400>` SEQUENCE: 239

```
caggtgcagc tgcaggagag cggcggcggc ctggtgcagc ccggcggcag cctgaggctg    60
agctgcgccg ccagcggctt caccttcagg aactacgcca tgagctgggt gaggcaggcc   120
cccggcaagg gcctggagtg ggtgagcgcc atcaacagcg gcggcggcag cacctactac   180
gccgacagcg tgaagggcag gttcaccatc agcagggaca cgccaagaa cccctgtac   240 ctgcagctga acagcctgaa gaccgaggac accgccatgt actactgcac caagcacgtg   300
accggcgact acgaccccag cctgaggtac gagtacaact actggagcca gggcacccag   360
gtgaccgtga gcagc                                                    375
```

`<210>` SEQ ID NO 240
`<211>` LENGTH: 375
`<212>` TYPE: DNA
`<213>` ORGANISM: Artificial Sequence
`<220>` FEATURE:
`<223>` OTHER INFORMATION: Description of Artificial Sequence: Synthetic polynucleotide

<400> SEQUENCE: 240

```
caggtgcagc tgcaggagag cggcggcggc ctggtgcagc ccggcggcag cctgaggctg      60
agctgcgccg ccagcggctt caccttcagc agctacgcca tgagctgggt gaggcaggcc     120
cccggcaagg gcctggagtg ggtgagcgcc atcaacagcg gcggcggcag cacctactac     180
gccgacagcg tgaagggcag gttcaccatc agcagggaca cgccaagaa caccctgtac      240 ctgcagctga acagcctgaa gaccgaggac accgccatgt actgctgcgc caagcacgtg     300
accggcgact acgaccccag cctgaggtac ggctacaact gctggggccc cggcacccag     360
gtgaccgtga gcagc                                                      375
```

<210> SEQ ID NO 241
<211> LENGTH: 372
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 241

```
caggtgcagc tgcaggagag cggcggcggc agcgtgcagc ccggcggcag cctgaggctg      60
agctgcgccg ccagcggctt caccttcagc acctacgaca tgagctgggt gaggcaggcc     120
cccggcaagg gcctggagtg ggtgagcacc atcaactaca gcggcagcag cacctactac     180
gtggacagcg tgctgggcag gttcaccatc gccagggaca cgccaagaa caccctgtac      240 ctgcagatga acaacctgca gaccgaggac accgccgtgt actactgcgc cagcgtgaag     300
gagaggagga gcaacggcca ccccatcgtg ttcggcgaca ggggccaggg cacccaggtg     360
accgtgagca gc                                                         372
```

<210> SEQ ID NO 242
<211> LENGTH: 375
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 242

```
caggtgcagc tgcaggagag cggcggcggc agcgtgcagg ccggcggcag cctgaggctg      60
agctgcgtga tcagcggctt caccttacaag cagaccttca tgggctggtt caggcaggtg     120
cccggcaagg agagggaggg cgtggccgcc atcagcaccg gcggcggcag caccgtgtac     180
gccgacagcg tgaagggcag gttcaccatc agccaggaca gcagcaagaa caccgtgtac     240
ctggagatga acgccctgaa gctggaggac accggcatgt actactgcgc cgccagcacc     300
gtgatcacca gcgtgagcat caacaggggc ctgtaccagt actggggcca gggcacccag     360
gtgaccgtga gcagc                                                      375
```

<210> SEQ ID NO 243
<211> LENGTH: 375
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 243

```
caggtgcagc tgcaggagag cggcggcggc agcgtgcagg ccggcggcag cctgaggctg      60
```

```
agctgcgtga tcagcggctt cacctacagg cagaccttca tgggctggtt caggcaggtg      120
gtgggcaagg agagggaggg cgtggccgcc atcagcaccg gcggcggcag caccgtgtac      180
gccgacagcg tgaagggcag gttcaccatc agccaggaca gcagcaagga caccgtgtac      240
ctggagatga acggcctgaa gctggaggac accggcatgt actactgcgc cgccagcacc      300
gtgatcacca gcgagagcat ctacaggaac ctgtaccagt actggggcca gggcacccag      360
gtgaccgtga gcagc                                                       375

<210> SEQ ID NO 244
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 244
caggtgcagc tgcaggagag cggcggcggc ctggtgcagc ccggcggcag cctgaggctg      60
agctgcgccg ccagcggctt caccttcagg aactacgcca tgagctgggt gaggcaggcc      120
cccggcaagg gcctggagtg ggtgagcgcc atcaacagcg gcggcggcag cacctactac      180
gccgacagcg tgaagggcag gttcaccatc agcagggaca acgccaagaa caccctgtac      240
ctgcagatga acgcctgaa gcccgaggac accgccatgt actactgcgc caagcacgtg      300
accggcgact acgaccccag cctgaggtac gagtacaact actggagcca gggcacccag      360
gtgaccgtga gcagc                                                       375

<210> SEQ ID NO 245
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 245
caggtgcagc tgcaggagag cggcggcggc ctggtgcagc ccggcggcag cctgaggctg      60
agctgcgccg ccagcggctt caccttcagg aactacgcca tgagctgggt gaggcaggcc      120
cccggcaagg gcctggagtg ggtgagcgcc atcaacagcg gcggcggcag cacctactac      180
gccgacagcg tgaagggcag gttcaccatc agcagggaca acgccaagaa caccctgtac      240
ctgcagctga acagcctgaa gaccgaggac accgccatgt actactgcgc caagcacgtg      300
accggcgact acgaccccag cctgaggtac gagtacgcct actggagcca gggcacccag      360
gtgaccgtga gcagc                                                       375

<210> SEQ ID NO 246
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 246
caggtgcagc tgcaggagag cggcggcggc agcgtgcagg ccggcggcag cctgaggctg      60
agctgcgccg ccagcggctt caccttcagc agctacgcca tgagctgggt gaggcaggcc      120
cccggcaagg gcctggagtg ggtgagcgcc atcaacagcg gcggcggcag cacctactac      180
```

```
gccgacagcg tgaaggccag gttcaccatc agcagggaca acgccaagaa cacccctgtac    240 ctgcagctga acagcctgaa gaccgaggac accgccatgt actactgcgc caagcacgtg    300
accggcgact acgacccag cctgaggtac gactacaact actggggcca gggcacccag     360
gtgaccgtga gcagc                                                      375

<210> SEQ ID NO 247
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 247
caggtgcagc tgcaggagag cggcggcggc agcgtgcagg ccggcggcag cctgaggctg    60
agctgcggca tcagcggctt cacctacagg cccaccttca tgggctggtt caggcaggtg    120
ctgggcaagg agagggaggg cgtggccgcc atcagcaccg gcggcggcag cagcgtgtac    180
gccgacagcg tgaagggcag gttcaccgtg agccaggaca gcagcaagaa caccgtgtac    240
ctggagatga acgccctgaa gctggaggac accgccatgt actactgcgc cgccagcacc    300
gtgatcacca gcgtgagcat caacagggcc ctgtaccagt actggggcca gggcacccag    360
gtgaccgtga gcagc                                                      375

<210> SEQ ID NO 248
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 248
caggtgcagc tgcaggagag cggcggcggc ctggtgcagc ccggcggcag cctgaggctg    60
agctgcgccg ccagcggctt caccttcagc agctacgccg tgagctgggt gaggcaggcc    120
cccggcaagg gcctggagtg ggtgagcacc atcaacagcg gcggcggcag cacctactac    180
gccgacagcg tgaagggcag gttcaccatc agcagggaca acgccaagaa cacccctgtac   240 ctgcagctga acagcctgaa gaccgaggac accgccatgt actactgcac caagcacgtg    300
accggcgact acgacccag cctgaggtac gagtacaacg tgtggagcca gggcacccag     360
gtgaccgtga gcagc                                                      375

<210> SEQ ID NO 249
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 249
caggtgcagc tgcaggagag cggcggcggc agcgtgcagg ccggcggcag cctgagggtg    60
agctgccaga tcagcggctt cacctacagg cagaccttca tgggctggtt caggcaggtg    120
cccggcaagg agagggaggg cgtggccgcc atcagcaccg gcggcggcag caccgtgtac    180
gccgacagcg tgaagggcag gttcaccatc agcaggaca gcagcaagaa caccgtgtac     240
ctggagatga acgccctgaa gctggaggac accgccatgt actactgcgc cgccagcacc    300
```

```
gtgatcacca gccccagcat caacaggaac ctgtaccagt actggggcca gggcacccag    360
gtgaccgtga gcagc                                                     375
```

<210> SEQ ID NO 250
<211> LENGTH: 342
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 250

```
caggtgcagc tgcaggagag cggcggcggc ctggtgcagc ccggcggcag cctgaggctg     60
agctgcgccg tgagcggctt caccttcagc aactacgcca tgaagtgggt gaggcaggcc    120
cccggcaagg gcctggagtg ggtgagcagc atcagcggcg gcggcggcgc cacctactac    180
gccgacagcg tgaagggcag gttcaccatc agcagggaca caccaagaa ccccctgtac     240 ctgcagatga acagcctgaa gaccgaggac accgccgtgt actactgcgc cgcccagaac    300
ctggactaca ggggccaggg cacccaggtg accgtgagca gc                      342
```

<210> SEQ ID NO 251
<211> LENGTH: 336
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 251

```
caggtgcagc tgcaggagag cggcggcggc ctggtgcagc ccggcggcag cctgaggctg     60
agctgcaccg ccagcggctt caccttcaac agcgcccaca tgaagtggga gaggcagccc    120
cccggcaagg gcctggagtg ggtgagcttc atcacccccg gcggcgccag caccggctac    180
gccgacagcg tgaagggcag gttcaccatc agcagggaca cgccaagaa cccctgtac      240 ctgcagatga acaacctgaa gaccgaggac accgccgtgt actactgcgc caccggcggc    300
ctgaggggcc agggcaccca ggtgaccgtg agcagc                              336
```

<210> SEQ ID NO 252
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 252

```
caggtgcagc tgcaggagag cggcggcggc agcgtgcagg ccggcggcag cctgaggctg     60
agctgcgtga tcagcggctt cacctacagg cccaccttca tgggctggtt caggcaggtg    120
ctgggcaagg agagggaggg cgtggccgcc atcaccaccg gcggcggcag cacccctgtac    180 gccgacagcg tgaagggcag gttcaccatc agccaggaca gcagcaagaa caccgtgtac    240
ctggagatga acgcctgaa gctggaggac accggcatgt actactgcgc cgccaccacc    300
gtgatcacca gcgtgagcat caacaggaac ctgtaccagt actggggcca gggcacccag    360
gtgaccgtga gcagc                                                     375
```

<210> SEQ ID NO 253
<211> LENGTH: 375

<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 253
caggtgcagc tgcaggagag cggcggcggc agcgtgcagg ccggcggcag cctgaggctg      60
agctgcgtga tcagcggctt cacctacaag cagaccttca tgggctggtt caggcaggtg     120
cccggcaagg agagggaggg cgtggccgcc atcagcaccg gcggcggcag caccgtgtac     180
gccgacagcg tgaagggcag gttcaccatc agccaggaca gcagcaagaa caccgtgtac     240
ctggagatga cggcctgaa gctggaggac accggcatgt actactgcgc cgccagcacc      300
gtgatcacca gcgtgaccat caacaggggc ctgtaccagt actggggcca gggcacccag     360
gtgaccgtga gcagc                                                      375

<210> SEQ ID NO 254
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 254
caggtgcagc tgcaggagag cggcggcggc agcgtgcagg ccggcggcag cctgaggctg      60
agctgcgtga tcagcggctt cgtgtacaag cagaccttca tgggctggtt caggcaggtg     120
cccggcaagg agagggaggg cgtggccgcc atcagcaccg gcggcggcag caccgtgtac     180
gccgacagcg tgaagggcag gttcaccatc agccaggaca gcagcaagaa caccgtgtac     240
ctggagatga cggcctgaa gctggaggac accggcatgt actactgcgc cgccagcacc      300
gtgatcacca gcgtgagcat caacaggggc ctgtaccagt actggggcca gggcacccag     360
gtgaccgtga gcagc                                                      375

<210> SEQ ID NO 255
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 255
caggtgcagc tgcaggagag cggcggcggc agcgtgcagg ccggcggcag cctgagggtg      60
agctgcgtga tcagcggctt cacctacagg cagaccttca tgggctggtt caggcaggtg     120
cccggcaagg agagggaggg cgtggccgcc atcagcaccg gcggcggcag caccgtgtac     180
gccgacagcg tgaagggcag gttcaccatc agccaggaca gcagcaagaa caccgtgtac     240
ctggagatga cggcctgaa gctggaggac accggcatgt actactgcgc cgccagcacc      300
gtgatcacca gcgtgagcat caacaggggc ctgtaccagt actggggcca gggcacccag     360
gtgaccgtga gcagc                                                      375

<210> SEQ ID NO 256
<211> LENGTH: 375
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 256

```
caggtgcagc tgcaggagag cggcggcggc ctggtgcagc ccggcggcag cctgaggctg      60
agctgcgccg ccagcggctt caccttcagc agctacgcca tgagctgggt gaggcaggcc     120
cccggcaagg gcctggagtg ggtgagcgcc atcaacagcg gcggcggcag cacctactac     180
gccgacagcg tgaagggcag gttcaccatc agcagggaca cgccaagag cacccctgtac    240
ctgcagctga acagcctgaa gaccgaggac accgccatgt actactgcac caagcacgtg     300
accggcgact acgaccccag cctgaggtac gagtacaact actggagcca gggcacccag     360
gtgaccgtga gcagc                                                      375
```

<210> SEQ ID NO 257
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 257

```
caggtgcagc tgcaggagag cggcggcggc ctggtgcagc ccggcggcag cctgaggctg      60
agctgcgccg ccagcggctt caccttcagc agctacgcca tgagctgggt gaggcaggcc     120
cccggcaagg gcctggagtg ggtgagcgcc atcaacagcg gcgcgccag cacctactac     180
gccgacagcg tgaagggcag gttcaccatc agcagggaca cgccaagaa cacccctgtac    240
ctgcagctga acagcctgaa gaccgaggac accgccatgt actgctgcgc caagcacgtg     300
accggcgact acgaccccag cctgaggtac gagtacaact gctggggccc cggcacccag     360
gtgaccgtga gcagc                                                      375
```

<210> SEQ ID NO 258
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 258

```
caggtgcagc tgcaggagag cggcggcggc ctggtgcagc ccggcggcag cctgaggctg      60
agctgcgccg ccagcggctt caccttcagc agctacgcca tgagctgggt gaggcaggcc     120
cccggcaagg gcctggagtg ggtgagcgcc atcaacagcg gcggcggcag cacctactac     180
gccgacagcg tgaagggcag gttcaccatc agcagggaca cgccaagaa cacccctgtac    240
ctgcagctga acagcctgaa gaccgaggac accgccatgt actactgcgc caagcacgtg     300
accggcgact acgaccccag cctgaggtac gagtacaact actggagcca gggcacccag     360
gtgaccgtga gcagc                                                      375
```

<210> SEQ ID NO 259
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 259

```
caggtgcagc tgcaggagag cggcggcggc agcgtgcagg ccggcggcag cctgaggctg    60
agctgcgtga tcagcggctt cacctacagg cagaccttca tgggctggtt caggcaggtg   120
gtgggcaagg agagggaggg cgtggccgcc atcagcaccg gcggcggcag caccgtgtac   180
gccgacagcg tgaagggcag gttcaccatc agcaggaca gcagcaagga caccgtgtac   240
ctggagatga acggcctgaa gctggaggac accggcatgt actactgcgc cgccagcacc   300
gtgatcacca gcgagagcat caacaggaac ctgtaccagt actggggcca gggcacccag   360
gtgaccgtga gcagc                                                    375
```

<210> SEQ ID NO 260
<211> LENGTH: 375
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 260

```
caggtgcagc tgcaggagag cggcggcggc agcgtgcagg ccggcggcag cctgagggtg    60
agctgcgtgg tgagcggctt cacctacagg cagaccttca tgggctggtt caggcaggtg   120
cccggcaagg agagggaggg cgtggccgcc atcagcaccg gcggcggcag caccgtgtac   180
gccgacagcg tgaagggcag gttcaccatc agcaggaca gcagcaagaa caccgtgtac   240
ctggagatga acggcctgaa gctggaggac accggcatgt actactgcgc cgccagcacc   300
gtgatcacca gcgtgagcat caacaggaac ctgtaccagt actggggcca gggcacccag   360
gtgaccgtga gcagc                                                    375
```

<210> SEQ ID NO 261
<211> LENGTH: 375
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 261

```
caggtgcagc tgcaggagag cggcggcggc ctggtgcagc ccggcggcag cctgaggctg    60
agctgcgccg ccagcggctt caccttcagc agctacgcca tgagctgggt gaggcaggcc   120
cccggcaagg gcctggagtg ggtgagcgcc atcaacagcg gcggcggcag cacctactac   180
gccgacagcg tgaagggcag gttcaccatc agcagggaca acgccaagaa ccacatgtac   240
ctgcagctga acagcctgaa gaccgaggac accgccatgt actactgcgc caagcacgtg   300
gccggcgact acgaccccag cctgaggtac gagtggcacg tgtggggcca gggcacccag   360
gtgaccgtga gcagc                                                    375
```

<210> SEQ ID NO 262
<211> LENGTH: 375
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 262

```
caggtgcagc tgcaggagag cggcggcggc ctggtgcagc ccggcggcag cctgaggctg    60
agctgcgccg ccagcggctt caccttcagg agctacgcca tgagctgggt gaggcaggcc   120
```

| | |
|---|---|
| cccggcaagg gcctggagtg ggtgagcgcc atcaacagcg gcggcggcag cacctactac | 180 |
| gccgacagcg tgaaggccag gttcaccatc agcaggaca acgccaagaa cccctgtac | 240 |
| ctgcagctga acagcctgaa gaccgaggac accgccatgt actactgcgc caagcacgtg | 300 |
| accggcgact acgaccccag cctgaggtac gagtacaact actggggcca gggcacccag | 360 |
| gtgaccgtga gcagc | 375 |

<210> SEQ ID NO 263
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 263

| | |
|---|---|
| caggtgcagc tgcaggagag cggcggcggc ctggtgcagc ccggcggcag cctgaggctg | 60 |
| agctgcgccg ccagcggctt caccttcagc agctacgcca tgagctgggt gaggcaggcc | 120 |
| cccggcaagg gcctggagtg ggtgagcgcc atcaacagcg gcggcggcag cacctactac | 180 |
| gccgacagcg tgaagggcag gttcaccatc agcaggaca acgccaagaa cccctgtac | 240 |
| ctgcagctga acagcctgaa gaccgaggac accgccatgt actactgcgc caagcacatc | 300 |
| accggcgact acgaccccag cctgaggtac gagtacaact actggggcca gggcacccag | 360 |
| gtgaccgtga gcagc | 375 |

<210> SEQ ID NO 264
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 264

| | |
|---|---|
| caggtgcagc tgcaggagag cggcggcggc agcgtgcagg ccggcggcag cctgaggctg | 60 |
| agctgcgtga tcagcggctt cacctacagg cagaccttca tgggctggtt caggcaggtg | 120 |
| gtgggcaagg agagggaggg cgtggccgcc atcagcaccg gcggcggcag catggtgtac | 180 |
| gccgacagcg tgaagggcag gttcaccatc agccaggaca gcagcaagga caccgtgtac | 240 |
| ctggagatga acggcctgaa gctggaggac accggcatgt actactgcgc cgccagcacc | 300 |
| gtgatcacca gcgagagcat caacaggaac ctgtaccagt actggggcca gggcacccag | 360 |
| gtgaccgtga gcagc | 375 |

<210> SEQ ID NO 265
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 265

| | |
|---|---|
| caggtgcagc tgcaggagag cggcggcggc cccgtgcagg ccggcggcag cctgaggctg | 60 |
| agctgcgtga tcagcggctt cacctacagg cagaccttca tgggctggtt caggcaggtg | 120 |
| cccggcaagg agagggaggg cgtggccgcc atcagcaccg gcggcggcag caccgtgtac | 180 |
| gccgacagcg tgaagggcag gttcaccatc agccaggaca gcagcaagaa caccgtgtac | 240 |

```
ctggagatga acggcctgaa gctggaggac accggcatgt actactgcgc cgccagcacc    300
gtgatcacca gcgagagcat caacaggggc ctgtaccagt actggggcca gggcacccag    360
gtgaccgtga gcagc                                                     375
```

<210> SEQ ID NO 266
<211> LENGTH: 366
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 266

```
caggtgcagc tgcaggagag cggcggcggc agcgtgcagg ccggcggctt cctgaggctg    60
agctgcgcct tcagcggcta caccggctgc atgggctggt tcaggcaggg ccccggccag   120
gagagggagg gcgtggccag catcaacgac ggcggcagcc tgacctacgc cgacagcgtg   180
aagggcaggt tcaccatcag caaggacaac gccaagaaga ccctggacct gcagatgaac   240 acccctgaagc ccgaggacac cgccatgtac tactgcgccg ccagcctgag ctactgcctg   300
aaccccaccc tgagggtgga cggctacaac tactggggcc agggcaccca ggtgaccgtg   360
agcagc                                                              366
```

<210> SEQ ID NO 267
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 267

```
caggtgcagc tgcaggagag cggcggcggc agcgtgcagg ccggcggcag cctgaggctg    60
agctgcgtga tcagcggcct gacctacaag cagaccttca tgggctggtt caggcaggtg   120
cccggcaagg agagggaggg cgtggccgcc atcagcaccg gcggcggcag caccgtgtac   180
gccgacagcg tgaagggcag gttcaccatc agccaggaca cagcaagaa caccgtgtac   240 ctggagatga acggcctgaa gctggaggac accggcatgt actactgcgc cgccagcacc   300
gtgatcacca gcgtgagcat caacaggtac ctgtaccagt ggtggggcca gggcacccag   360
gtgaccgtga gcagc                                                    375
```

<210> SEQ ID NO 268
<211> LENGTH: 372
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 268

```
caggtgcagc tgcaggagag cggcggcggc ctggtgcagc ccggcggcag cctgaggctg    60
agctgcgccg ccagcggctt caccttcagc aactacgcca tgagctgggt gaggcaggcc   120
cccggcaagg gcgtggagtg ggtgagcgcc atcaacagcg gcggcagcgt gttctacgcc   180
gacagcgtga agggcaggtt caccatcagc agggacaacg ccaagaacac cctgtacctg   240
cagctgagca gcctgaagac cgaggacacc gccatgtact actgcgccaa gcacgtgacc   300
ggcgactacg accccagcct gaggtacggc tacaacgtgt ggagccaggg cacccaggtg   360
```
accgtgagca gc                                                          372

<210> SEQ ID NO 269
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 269
caggtgcagc tgcaggagag cggcggcggc agcgtgcagg ccggcggcag cctgaggctg    60
agctgcggca tcagcggctt cacctacagg cccaccttca tgggctggtt caggcaggtg   120
ctgggcaagg agagggaggg cgtggccgcc atcagcaccg gcggcggcag caccgtgtac   180
gccgacagcg tgaagggcag gttcaccatc agccaggaca gcagcaagga caccgtgtac   240
ctggagatga acggcctgaa gctggaggac accggcatgt actactgcgc cgccagcacc   300
gtgatcacca gcgagagcat caacaggaac ctgtaccagt actggggcca gggcacccag   360
gtgaccgtga gcagc                                                    375

<210> SEQ ID NO 270
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 270
caggtgcagc tgcaggagag cggcggcggc ctggtgcagc ccggcggcag cctgaggctg    60
agctgcgccg ccagcggctt caccttcagc agctacgcca tgagctgggt gaggcaggcc   120
cccggcaagg gcctggagtg ggtgagcgcc atcaacagcg gcggcggcag cacctactac   180
gccgacagcg tgaagggcag gttcaccatc agcagggaca acgccaagaa cacccctgtac  240 ctgcagctga acagcctgaa gaccgaggac accgccatgt actactgcgc caagcacgtg   300
accggcgact acgaccccag cctgaggtac ggctacaacg tgtggagcca gggcacccag   360
gtgaccgtga gcagc                                                    375

<210> SEQ ID NO 271
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 271
caggtgcagc tgcaggagag cggcggcggc ctggtgcagc ccggcggcag cctgaggctg    60
agctgcgccg ccagcggctt caccttcagc agctacgcca tgagctgggt gaggcaggcc   120
cccggcaagg gcctggagtg ggtgagcgcc atcaacctgg gcggcgacac cacctactac   180
accgacagcg tgaagggcag gttcaccatc agcagggaca acgccaagaa cacccctgtac  240 ctgcagctga acagcctgaa gaccgaggac accgccatgt actactgcgc caagcacgtg   300
accggcgact acgaccccag cctgaggtac gagtacggct actggagcca gggcacccag   360
gtgaccgtga gcagc                                                    375

<210> SEQ ID NO 272

```
<211> LENGTH: 336
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 272
caggtgcagc tgcaggagag cggcggcggc ctggtgcagc ccggcggcag cctgaggctg    60
agctgcaccg ccagcggctt caccttcaac agcgcccacc tgaagtggga gaggcagccc   120
cccggcaagg gcctggagtg ggtgagcttc atcaccaacg gcggcgccag caccggctac   180
gccgacagcg tgaagggcag gttcaccatc agcagggacg acgccaagaa caccctgtac   240
ctgcagatga acaacctgaa gaccgaggac accgccgtgt actactgcgc caccggcggc   300
ctgaggggcc agggcacccc agtgaccgtg agcagc                              336

<210> SEQ ID NO 273
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 273
caggtgcagc tgcaggagag cggcggcggc agcgtgcagg ccggcggcag cctgagggtg    60
agctgcgtga tcagcggctt cacctacagg cagaccttca tgggctggtt caggcaggtg   120
cccggcaagg agagggaggg cgtggccgcc atcagcaccg gcggcggcag caccatctac   180
gccaacagcg tgaagggcag gttcaccatc agccaggaca gcagcaagaa caccgtgtac   240
ctggagatga acgccctgaa gctggaggac accggcatgt actactgcgc cgccagcacc   300
gtgatcacca gcgtgagcat caacaggggc ctgtaccagt actggggcca gggcacccag   360
gtgaccgtga gcagc                                                    375

<210> SEQ ID NO 274
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 274
caggtgcagc tgcaggagag cggcggcggc ctggtgcagc ccggcggcag cctgaggctg    60
agctgcgccg ccagcggctt caccttcagc agctacgcca tgagctgggt gaggcaggcc   120
cccggcaagg gcctggagtg ggtgagcgcc atcaacagcg gcggcggcag cacctactac   180
gccgacagcg tgaagggcag gttcaccatc agcagggaca cgccaagaa caccctgtac    240 ctgcagctga acagcctgaa gaccgaggac accgccatgt actgctgcgc caagcacatc   300
accggcgact acgaccccag cctgaggtac gagtacaact gctggggcca gggcacccag   360
gtgaccgtga gcagc                                                    375

<210> SEQ ID NO 275
<211> LENGTH: 375
<212> TYPE: DNA
<213> ORGANISM: Artificial Sequence
<220> FEATURE:
<223> OTHER INFORMATION: Description of Artificial Sequence: Synthetic
      polynucleotide
```

<400> SEQUENCE: 275

```
caggtgcagc tgcaggagag cggcggcggc agcgtgcagg ccggcggcag cctgaggctg      60
agctgcgtga tcagcggctt cacctacaag cagaccttca tgggctggtt caggcaggtg     120
cccggcaagg agagggaggg cgtggccgcc atcagcaccg gcggcggcaa caccgtgtac     180
gccgacagcg tgaagggcag gttcaccatc agccaggaca gcagcaagaa caccgtgtac     240
ctggagatga acggcctgaa gctggaggac accggcatgt actactgcgc cgccagcacc     300
gtgatcacca gcgtgaccgt gaacagggc ctgtaccagt actggggcca gggcacccag      360
gtgaccgtga gcagc                                                      375
```

<210> SEQ ID NO 276
<211> LENGTH: 342
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 276

```
caggtgcagc tgcaggagag cggcggcgcc ctggtgcagc ccggcggcag cctgaggctg      60
agctgcgccg ccagcggctt caccttcagc tactacgcca tgaagtgggt gaggcaggcc     120
cccggcaagg gcctggagtg ggtgagcagc atcagcggcg gcggcggcgc cacctactac     180
gccgacagcg tgaagggcag gttcaccatc agcagggaca caccaacga caccctgtac      240
ctgcagatga acagcctgaa gaccgaggac accgccgtgt actactgcgc cgcccagaac     300
ctggactaca ggggccaggg cacccaggtg accgtgagca gc                        342
```

<210> SEQ ID NO 277
<211> LENGTH: 375
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 277

```
caggtgcagc tgcaggagag cggcggcggc agcgtgcagg ccggcggcag cctgaggctg      60
agctgcgtga tcagcggctt cacctacaag cagaccttca tgggctggtt caggcaggtg     120
cccggcaagg agagggaggg cgtggccgcc atcagcaccg gcggcggcag caccgtgtac     180
gccgacagcg tgaagggcag gttcaccatc agccaggaga gcagcaagaa caccgtgtac     240
ctggagatga acggcctgaa gctggaggac accggcatgt actactgcgc cgccagcacc     300
gtgatcacca gcgtgaccat caacagggc ctgtaccagt actggggcca gggcacccag      360
gtgaccgtga gcagc                                                      375
```

<210> SEQ ID NO 278
<211> LENGTH: 597
<212> TYPE: PRT
<213> ORGANISM: Homo sapiens

<400> SEQUENCE: 278

Glu Leu Leu Asp Pro Cys Gly Tyr Ile Ser Pro Glu Ser Pro Val Val
1               5                   10                  15

Gln Leu His Ser Asn Phe Thr Ala Val Cys Val Leu Lys Glu Lys Cys
            20                  25                  30

-continued

Met Asp Tyr Phe His Val Asn Ala Asn Tyr Ile Val Trp Lys Thr Asn
            35                  40                  45

His Phe Thr Ile Pro Lys Glu Gln Tyr Thr Ile Asn Arg Thr Ala
 50                  55                  60

Ser Val Thr Phe Thr Asp Ile Ala Ser Leu Asn Ile Gln Leu Thr
65              70                  75                  80

Cys Asn Ile Leu Thr Phe Gly Gln Leu Glu Gln Asn Val Tyr Gly Ile
                85                  90                  95

Thr Ile Ile Ser Gly Leu Pro Pro Glu Lys Pro Lys Asn Leu Ser Cys
            100                 105                 110

Ile Val Asn Glu Gly Lys Lys Met Arg Cys Glu Trp Asp Gly Gly Arg
            115                 120                 125

Glu Thr His Leu Glu Thr Asn Phe Thr Leu Lys Ser Glu Trp Ala Thr
    130                 135                 140

His Lys Phe Ala Asp Cys Lys Ala Lys Arg Asp Thr Pro Thr Ser Cys
145                 150                 155                 160

Thr Val Asp Tyr Ser Thr Val Tyr Phe Val Asn Ile Glu Val Trp Val
                165                 170                 175

Glu Ala Glu Asn Ala Leu Gly Lys Val Thr Ser Asp His Ile Asn Phe
            180                 185                 190

Asp Pro Val Tyr Lys Val Lys Pro Asn Pro Pro His Asn Leu Ser Val
        195                 200                 205

Ile Asn Ser Glu Glu Leu Ser Ser Ile Leu Lys Leu Thr Trp Thr Asn
            210                 215                 220

Pro Ser Ile Lys Ser Val Ile Ile Leu Lys Tyr Asn Ile Gln Tyr Arg
225                 230                 235                 240

Thr Lys Asp Ala Ser Thr Trp Ser Gln Ile Pro Pro Glu Asp Thr Ala
                245                 250                 255

Ser Thr Arg Ser Ser Phe Thr Val Gln Asp Leu Lys Pro Phe Thr Glu
            260                 265                 270

Tyr Val Phe Arg Ile Arg Cys Met Lys Glu Asp Gly Lys Gly Tyr Trp
        275                 280                 285

Ser Asp Trp Ser Glu Glu Ala Ser Gly Ile Thr Tyr Glu Asp Arg Pro
290                 295                 300

Ser Lys Ala Pro Ser Phe Trp Tyr Lys Ile Asp Pro Ser His Thr Gln
305                 310                 315                 320

Gly Tyr Arg Thr Val Gln Leu Val Trp Lys Thr Leu Pro Pro Phe Glu
                325                 330                 335

Ala Asn Gly Lys Ile Leu Asp Tyr Glu Val Thr Leu Thr Arg Trp Lys
            340                 345                 350

Ser His Leu Gln Asn Tyr Thr Val Asn Ala Thr Lys Leu Thr Val Asn
    355                 360                 365

Leu Thr Asn Asp Arg Tyr Leu Ala Thr Leu Thr Val Arg Asn Leu Val
    370                 375                 380

Gly Lys Ser Asp Ala Ala Val Leu Thr Ile Pro Ala Cys Asp Phe Gln
385                 390                 395                 400

Ala Thr His Pro Val Met Asp Leu Lys Ala Phe Pro Lys Asp Asn Met
                405                 410                 415

Leu Trp Val Glu Trp Thr Thr Pro Arg Glu Ser Val Lys Lys Tyr Ile
            420                 425                 430

Leu Glu Trp Cys Val Leu Ser Asp Lys Ala Pro Cys Ile Thr Asp Trp
    435                 440                 445

Gln Gln Glu Asp Gly Thr Val His Arg Thr Tyr Leu Arg Gly Asn Leu

```
             450                 455                 460
Ala Glu Ser Lys Cys Tyr Leu Ile Thr Val Thr Pro Val Tyr Ala Asp
465                 470                 475                 480

Gly Pro Gly Ser Pro Glu Ser Ile Lys Ala Tyr Leu Lys Gln Ala Pro
                485                 490                 495

Pro Ser Lys Gly Pro Thr Val Arg Thr Lys Val Gly Lys Asn Glu
                500                 505                 510

Ala Val Leu Glu Trp Asp Gln Leu Pro Val Asp Val Gln Asn Gly Phe
                515                 520                 525

Ile Arg Asn Tyr Thr Ile Phe Tyr Arg Thr Ile Gly Asn Glu Thr
                530                 535                 540

Ala Val Asn Val Asp Ser Ser His Thr Glu Tyr Thr Leu Ser Ser Leu
545                 550                 555                 560

Thr Ser Asp Thr Leu Tyr Met Val Arg Met Ala Ala Tyr Thr Asp Glu
                565                 570                 575

Gly Gly Lys Asp Gly Pro Glu Phe Thr Phe Thr Thr Pro Lys Phe Ala
                580                 585                 590

Gln Gly Glu Ile Glu
                595

<210> SEQ ID NO 279
<211> LENGTH: 917
<212> TYPE: PRT
<213> ORGANISM: Mus musculus

<400> SEQUENCE: 279

Met Ser Ala Pro Arg Ile Trp Leu Ala Gln Ala Leu Leu Phe Phe Leu
1               5                   10                  15

Thr Thr Glu Ser Ile Gly Gln Leu Leu Glu Pro Cys Gly Tyr Ile Tyr
                20                  25                  30

Pro Glu Phe Pro Val Val Gln Arg Gly Ser Asn Phe Thr Ala Ile Cys
            35                  40                  45

Val Leu Lys Glu Ala Cys Leu Gln His Tyr Tyr Val Asn Ala Ser Tyr
        50                  55                  60

Ile Val Trp Lys Thr Asn His Ala Ala Val Pro Arg Glu Gln Val Thr
65                  70                  75                  80

Val Ile Asn Arg Thr Thr Ser Ser Val Thr Phe Thr Asp Val Val Leu
                85                  90                  95

Pro Ser Val Gln Leu Thr Cys Asn Ile Leu Ser Phe Gly Gln Ile Glu
            100                 105                 110

Gln Asn Val Tyr Gly Val Thr Met Leu Ser Gly Phe Pro Pro Asp Lys
        115                 120                 125

Pro Thr Asn Leu Thr Cys Ile Val Asn Glu Gly Lys Asn Met Leu Cys
130                 135                 140

Gln Trp Asp Pro Gly Arg Glu Thr Tyr Leu Glu Thr Asn Tyr Thr Leu
145                 150                 155                 160

Lys Ser Glu Trp Ala Thr Glu Lys Phe Pro Asp Cys Gln Ser Lys His
                165                 170                 175

Gly Thr Ser Cys Met Val Ser Tyr Met Pro Thr Tyr Tyr Val Asn Ile
            180                 185                 190

Glu Val Trp Val Glu Ala Glu Asn Ala Leu Gly Lys Val Ser Ser Glu
        195                 200                 205

Ser Ile Asn Phe Asp Pro Val Asp Lys Val Lys Pro Thr Pro Pro Tyr
    210                 215                 220
```

-continued

```
Asn Leu Ser Val Thr Asn Ser Glu Glu Leu Ser Ser Ile Leu Lys Leu
225                 230                 235                 240

Ser Trp Val Ser Ser Gly Leu Gly Gly Leu Leu Asp Leu Lys Ser Asp
            245                 250                 255

Ile Gln Tyr Arg Thr Lys Asp Ala Ser Thr Trp Ile Gln Val Pro Leu
            260                 265                 270

Glu Asp Thr Met Ser Pro Arg Thr Ser Phe Thr Val Gln Asp Leu Lys
            275                 280                 285

Pro Phe Thr Glu Tyr Val Phe Arg Ile Arg Ser Ile Lys Asp Ser Gly
    290                 295                 300

Lys Gly Tyr Trp Ser Asp Trp Ser Glu Glu Ala Ser Gly Thr Thr Tyr
305                 310                 315                 320

Glu Asp Arg Pro Ser Arg Pro Ser Phe Trp Tyr Lys Thr Asn Pro
            325                 330                 335

Ser His Gly Gln Glu Tyr Arg Ser Val Arg Leu Ile Trp Lys Ala Leu
            340                 345                 350

Pro Leu Ser Glu Ala Asn Gly Lys Ile Leu Asp Tyr Glu Val Ile Leu
    355                 360                 365

Thr Gln Ser Lys Ser Val Ser Gln Thr Tyr Thr Val Thr Gly Thr Glu
    370                 375                 380

Leu Thr Val Asn Leu Thr Asn Asp Arg Tyr Val Ala Ser Leu Ala Ala
385                 390                 395                 400

Arg Asn Lys Val Gly Lys Ser Ala Ala Val Leu Thr Ile Pro Ser
            405                 410                 415

Pro His Val Thr Ala Ala Tyr Ser Val Val Asn Leu Lys Ala Phe Pro
            420                 425                 430

Lys Asp Asn Leu Leu Trp Val Glu Trp Thr Pro Pro Lys Pro Val
            435                 440                 445

Ser Lys Tyr Ile Leu Glu Trp Cys Val Leu Ser Glu Asn Ala Pro Cys
    450                 455                 460

Val Glu Asp Trp Gln Gln Glu Asp Ala Thr Val Asn Arg Thr His Leu
465                 470                 475                 480

Arg Gly Arg Leu Leu Glu Ser Lys Cys Tyr Gln Ile Thr Val Thr Pro
            485                 490                 495

Val Phe Ala Thr Gly Pro Gly Gly Ser Glu Ser Leu Lys Ala Tyr Leu
            500                 505                 510

Lys Gln Ala Ala Pro Ala Arg Gly Pro Thr Val Arg Thr Lys Lys Val
    515                 520                 525

Gly Lys Asn Glu Ala Val Leu Ala Trp Asp Gln Ile Pro Val Asp Asp
530                 535                 540

Gln Asn Gly Phe Ile Arg Asn Tyr Ser Ile Ser Tyr Arg Thr Ser Val
545                 550                 555                 560

Gly Lys Glu Met Val Val His Val Asp Ser Ser His Thr Glu Tyr Thr
            565                 570                 575

Leu Ser Ser Leu Ser Ser Asp Thr Leu Tyr Met Val Arg Met Ala Ala
    580                 585                 590

Tyr Thr Asp Glu Gly Gly Lys Asp Gly Pro Glu Phe Thr Phe Thr Thr
    595                 600                 605

Pro Lys Phe Ala Gln Gly Glu Ile Glu Ala Ile Val Val Pro Val Cys
    610                 615                 620

Leu Ala Phe Leu Leu Thr Thr Leu Leu Gly Val Leu Phe Cys Phe Asn
625                 630                 635                 640

Lys Arg Asp Leu Ile Lys Lys His Ile Trp Pro Asn Val Pro Asp Pro
```

645                 650                 655
Ser Lys Ser His Ile Ala Gln Trp Ser Pro His Thr Pro Arg His
                660                 665                 670

Asn Phe Asn Ser Lys Asp Gln Met Tyr Ser Asp Gly Asn Phe Thr Asp
                675                 680                 685

Val Ser Val Val Glu Ile Glu Ala Asn Asn Lys Lys Pro Cys Pro Asp
                690                 695                 700

Asp Leu Lys Ser Val Asp Leu Phe Lys Glu Lys Val Ser Thr Glu
705                 710                 715                 720

Gly His Ser Ser Gly Ile Gly Gly Ser Cys Met Ser Ser Ser Arg
                725                 730                 735

Pro Ser Ile Ser Ser Asn Glu Glu Asn Glu Ser Ala Gln Ser Thr Ala
                740                 745                 750

Ser Thr Val Gln Tyr Ser Thr Val Val His Ser Gly Tyr Arg His Gln
                755                 760                 765

Val Pro Ser Val Gln Val Phe Ser Arg Ser Glu Ser Thr Gln Pro Leu
                770                 775                 780

Leu Asp Ser Glu Glu Arg Pro Glu Asp Leu Gln Leu Val Asp Ser Val
785                 790                 795                 800

Asp Gly Gly Asp Glu Ile Leu Pro Arg Gln Pro Tyr Phe Lys Gln Asn
                805                 810                 815

Cys Ser Gln Pro Glu Ala Cys Pro Glu Ile Ser His Phe Glu Arg Ser
                820                 825                 830

Asn Gln Val Leu Ser Gly Asn Glu Glu Asp Phe Val Arg Leu Lys Gln
                835                 840                 845

Gln Gln Val Ser Asp His Ile Ser Gln Pro Tyr Gly Ser Glu Gln Arg
                850                 855                 860

Arg Leu Phe Gln Glu Gly Ser Thr Ala Asp Ala Leu Gly Thr Gly Ala
865                 870                 875                 880

Asp Gly Gln Met Glu Arg Phe Glu Ser Val Gly Met Glu Thr Thr Ile
                885                 890                 895

Asp Glu Glu Ile Pro Lys Ser Tyr Leu Pro Gln Thr Val Arg Gln Gly
                900                 905                 910

Gly Tyr Met Pro Gln
                915

<210> SEQ ID NO 280
<211> LENGTH: 595
<212> TYPE: PRT
<213> ORGANISM: Mus musculus

<400> SEQUENCE: 280

Gln Leu Leu Glu Pro Cys Gly Tyr Ile Tyr Pro Glu Phe Pro Val Val
1               5                   10                  15

Gln Arg Gly Ser Asn Phe Thr Ala Ile Cys Val Leu Lys Glu Ala Cys
                20                  25                  30

Leu Gln His Tyr Tyr Val Asn Ala Ser Tyr Ile Val Trp Lys Thr Asn
                35                  40                  45

His Ala Ala Val Pro Arg Glu Gln Val Thr Val Ile Asn Arg Thr Thr
                50                  55                  60

Ser Ser Val Thr Phe Thr Asp Val Val Leu Pro Ser Val Gln Leu Thr
65                  70                  75                  80

Cys Asn Ile Leu Ser Phe Gly Gln Ile Glu Gln Asn Val Tyr Gly Val
                85                  90                  95

-continued

```
Thr Met Leu Ser Gly Phe Pro Pro Asp Lys Pro Thr Asn Leu Thr Cys
            100                 105                 110

Ile Val Asn Glu Gly Lys Asn Met Leu Cys Gln Trp Asp Pro Gly Arg
        115                 120                 125

Glu Thr Tyr Leu Glu Thr Asn Tyr Thr Leu Lys Ser Glu Trp Ala Thr
    130                 135                 140

Glu Lys Phe Pro Asp Cys Gln Ser Lys His Gly Thr Ser Cys Met Val
145                 150                 155                 160

Ser Tyr Met Pro Thr Tyr Tyr Val Asn Ile Glu Val Trp Val Glu Ala
                165                 170                 175

Glu Asn Ala Leu Gly Lys Val Ser Ser Glu Ser Ile Asn Phe Asp Pro
            180                 185                 190

Val Asp Lys Val Lys Pro Thr Pro Pro Tyr Asn Leu Ser Val Thr Asn
        195                 200                 205

Ser Glu Glu Leu Ser Ser Ile Leu Lys Leu Ser Trp Val Ser Ser Gly
    210                 215                 220

Leu Gly Gly Leu Leu Asp Leu Lys Ser Asp Ile Gln Tyr Arg Thr Lys
225                 230                 235                 240

Asp Ala Ser Thr Trp Ile Gln Val Pro Leu Glu Asp Thr Met Ser Pro
                245                 250                 255

Arg Thr Ser Phe Thr Val Gln Asp Leu Lys Pro Phe Thr Glu Tyr Val
            260                 265                 270

Phe Arg Ile Arg Ser Ile Lys Asp Ser Gly Lys Gly Tyr Trp Ser Asp
        275                 280                 285

Trp Ser Glu Glu Ala Ser Gly Thr Thr Tyr Glu Asp Arg Pro Ser Arg
    290                 295                 300

Pro Pro Ser Phe Trp Tyr Lys Thr Asn Pro Ser His Gly Gln Glu Tyr
305                 310                 315                 320

Arg Ser Val Arg Leu Ile Trp Lys Ala Leu Pro Leu Ser Glu Ala Asn
                325                 330                 335

Gly Lys Ile Leu Asp Tyr Glu Val Ile Leu Thr Gln Ser Lys Ser Val
            340                 345                 350

Ser Gln Thr Tyr Thr Val Thr Gly Thr Glu Leu Thr Val Asn Leu Thr
    355                 360                 365

Asn Asp Arg Tyr Val Ala Ser Leu Ala Ala Arg Asn Lys Val Gly Lys
370                 375                 380

Ser Ala Ala Ala Val Leu Thr Ile Pro Ser Pro His Val Thr Ala Ala
385                 390                 395                 400

Tyr Ser Val Val Asn Leu Lys Ala Phe Pro Lys Asp Asn Leu Leu Trp
                405                 410                 415

Val Glu Trp Thr Pro Pro Lys Pro Val Ser Lys Tyr Ile Leu Glu
            420                 425                 430

Trp Cys Val Leu Ser Glu Asn Ala Pro Cys Val Glu Asp Trp Gln Gln
        435                 440                 445

Glu Asp Ala Thr Val Asn Arg Thr His Leu Arg Gly Arg Leu Leu Glu
    450                 455                 460

Ser Lys Cys Tyr Gln Ile Thr Val Thr Pro Val Phe Ala Thr Gly Pro
465                 470                 475                 480

Gly Gly Ser Glu Ser Leu Lys Ala Tyr Leu Lys Gln Ala Pro Ala
                485                 490                 495

Arg Gly Pro Thr Val Arg Thr Lys Lys Val Gly Lys Asn Glu Ala Val
            500                 505                 510

Leu Ala Trp Asp Gln Ile Pro Val Asp Asp Gln Asn Gly Phe Ile Arg
```

```
                515                 520                 525
Asn Tyr Ser Ile Ser Tyr Arg Thr Ser Val Gly Lys Glu Met Val Val
        530                 535                 540

His Val Asp Ser Ser His Thr Glu Tyr Thr Leu Ser Ser Leu Ser Ser
545                 550                 555                 560

Asp Thr Leu Tyr Met Val Arg Met Ala Ala Tyr Thr Asp Glu Gly Gly
                565                 570                 575

Lys Asp Gly Pro Glu Phe Thr Phe Thr Thr Pro Lys Phe Ala Gln Gly
            580                 585                 590

Glu Ile Glu
        595

<210> SEQ ID NO 281
<211> LENGTH: 6
<212> TYPE: PRT
<213> ORGANISM: Artificial Sequence
<220> FEATURE:
<223> OTHER INFORMATION: Description of Artificial Sequence: Synthetic
      6xHis tag

<400> SEQUENCE: 281

His His His His His His
1               5

<210> SEQ ID NO 282
<211> LENGTH: 8
<212> TYPE: PRT
<213> ORGANISM: Artificial Sequence
<220> FEATURE:
<223> OTHER INFORMATION: Description of Artificial Sequence: Synthetic
      8xHis tag

<400> SEQUENCE: 282

His His His His His His His His
1               5

<210> SEQ ID NO 283
<211> LENGTH: 40
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: SITE
<222> LOCATION: (1)..(40)
<223> OTHER INFORMATION: This sequence may encompass 1-10 "Gly Gly Gly
      Ser" repeating units

<400> SEQUENCE: 283

Gly Gly Gly Ser Gly Gly Gly Ser Gly Gly Gly Ser Gly Gly Gly Ser
1               5                   10                  15

Gly Gly Gly Ser Gly Gly Gly Ser Gly Gly Gly Ser Gly Gly Gly Ser
            20                  25                  30

Gly Gly Gly Ser Gly Gly Gly Ser
        35                  40

<210> SEQ ID NO 284
<211> LENGTH: 50
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
```

```
<221> NAME/KEY: SITE
<222> LOCATION: (1)..(50)
<223> OTHER INFORMATION: This sequence may encompass 1-10 "Gly Gly Gly
      Ser Gly" repeating units

<400> SEQUENCE: 284

Gly Gly Gly Ser Gly Gly Gly Gly Ser Gly Gly Gly Gly Ser Gly Gly
1               5                   10                  15

Gly Gly Ser Gly Gly Gly Gly Ser Gly Gly Gly Gly Ser Gly Gly Gly
            20                  25                  30

Gly Ser Gly Gly Gly Gly Ser Gly Gly Gly Gly Ser Gly Gly Gly Gly
        35                  40                  45

Ser Gly
    50

<210> SEQ ID NO 285
<211> LENGTH: 50
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: SITE
<222> LOCATION: (1)..(50)
<223> OTHER INFORMATION: This sequence may encompass 1-10 "Gly Gly Gly
      Gly Ser" repeating units

<400> SEQUENCE: 285

Gly Gly Gly Gly Ser Gly Gly Gly Gly Ser Gly Gly Gly Gly Ser Gly
1               5                   10                  15

Gly Gly Gly Ser Gly Gly Gly Gly Ser Gly Gly Gly Gly Ser Gly Gly
            20                  25                  30

Gly Gly Ser Gly Gly Gly Gly Ser Gly Gly Gly Gly Ser Gly Gly Gly
        35                  40                  45

Gly Ser
    50

<210> SEQ ID NO 286
<211> LENGTH: 31
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: SITE
<222> LOCATION: (1)..(30)
<223> OTHER INFORMATION: This sequence may encompass 1-10 "Gly Gly Ser"
      repeating units

<400> SEQUENCE: 286

Gly Gly Ser Gly Gly Ser Gly Gly Ser Gly Gly Ser Gly Gly Ser Gly
1               5                   10                  15

Gly Ser Gly Gly Ser Gly Gly Ser Gly Gly Ser Gly Gly Ser Gly
            20                  25                  30

<210> SEQ ID NO 287
<211> LENGTH: 40
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: SITE
```

```
<222> LOCATION: (1)..(40)
<223> OTHER INFORMATION: This sequence may encompass 1-10 "Gly Gly Ser
      Gly" repeating units

<400> SEQUENCE: 287

Gly Gly Ser Gly Gly Gly Ser Gly Gly Gly Ser Gly Gly Gly Ser Gly
1               5                   10                  15

Gly Gly Ser Gly Gly Gly Ser Gly Gly Gly Ser Gly Gly Gly Ser Gly
            20                  25                  30

Gly Gly Ser Gly Gly Gly Ser Gly
        35                  40

<210> SEQ ID NO 288
<211> LENGTH: 6
<212> TYPE: PRT
<213> ORGANISM: Artificial Sequence
<220> FEATURE:
<223> OTHER INFORMATION: Description of Artificial Sequence: Synthetic
      His tag
<220> FEATURE:
<221> NAME/KEY: SITE
<222> LOCATION: (1)..(6)
<223> OTHER INFORMATION: This sequence may encompass 3-6 residues

<400> SEQUENCE: 288

His His His His His His
1               5
```

GP130 BINDING MOLECULES AND METHODS OF USE

CROSS-REFERENCES TO RELATED APPLICATIONS

This application is a U.S. national phase of PCT Application No. PCT/US2021/44575, filed Aug. 4, 2021, which claims priority to U.S. Provisional Application No. 63/061,562, filed Aug. 5, 2020, U.S. Provisional Application No. 63/078,745, filed Sep. 15, 2020, and U.S. Provisional Application No. 63/135,884, filed Jan. 11, 2021, the disclosures of which are hereby incorporated by reference in their entirety for all purposes.

SEQUENCE LISTING

The instant application contains a Sequence Listing which has been submitted electronically in ASCII format and is hereby incorporated by reference in its entirety. Said ASCII copy, created on Jan. 19, 2023, is named 106249-1361760-SL.txt and is 179,115 bytes in size.

FIELD OF THE INVENTION

The present disclosure relates to biologically active molecules comprising a single domain antibody that specifically binds to the extracellular domain of the gp130, compositions comprising such single domain antibodies, and methods of use thereof.

BACKGROUND

Glycoprotein 130 (gp130), also known as also known as IL6ST, IL6R-beta and CDw30m, is a highly conserved transmembrane protein which forms a subunit of the type 1 cytokine receptor within the IL6 receptor family. gp130 is ubiquitously expressed in the human body and is a shared subunit of receptor for at least nine cytokines including IL6, IL27, cardiotrophin-1 (CT-1) and neuropoietin (NP), oncostatin M (OSM), leukemia inhibitory factor (LIF), IL11, ciliary neurotropic factor (CNTF) and cardiotrophin-like cytokine (CLC). These various cytokines mediate highly diverse biological processes and as such gp130 has been indicated as playing a role in various types of cancer, cardiovascular disease, autoimmune diseases. By the formation of appropriate receptor complexes, gp130 is able to interact with a variety of cytokines and consequently associated with more than fifty distinct cellular responses.

The extracellular domain of gp130 comprises six contiguous sandwich domains (D1-D6): an N-terminal immunoglobulin-like domain (D1) followed by five fibronectin type-3 domains (D2-D6). The majority of ligands interact with gp130 in the membrane-distal domains D1, D2, and D3. The N-terminal D1 immunoglobulin-like domain is required for cytokine response. In response to ligand binding, the intracellular domain interacts with Janus kinases (JAKs) to provide an intracellular signaling.

In addition to its membrane bound form, gp130 has three soluble isoforms sgp130-RAPS, sgp130-E10 and "full-length" sgp130. The soluble forms of gp130 lack the transmembrane and cytoplasmic domains but retain the extracellular ligand-binding domains. The soluble forms of gp130 interact with soluble forms of the IL6 receptor. Although the physiological role of sgp130 has not been fully determined, it has been postulated that the role of sgp130 is anti-inflammatory by inhibiting gp130 signaling. Sgp130 has a high affinity (1 mM) for IL6:sIL6R, the complex that drives the pro-inflammatory and the pro-atherogenic IL6 trans-signaling pathway. The binding of sgp130 to IL6:sIL6R results in neutralization of the IL6:sIL6R complex reducing its inflammatory activity. In mice, a recombinant form of sgp130 (sgp130Fc) was associated with a protective effect in a mouse experimental model of atherosclerosclerosis. Soluble gp130 has also been reported to inhibit the function of IL-6, OSM, LIF, and CNTF.

Although gp130 is ubiquitously expressed in the human body, its expression varies significantly among various organs and cell types and is more highly expressed in adult organs relative to fetal tissues. Because gp130 is involved in multiple cytokine signaling pathways, it is thought that differences in the expression of other receptor subunits may contribute to the distinct and widely varied functions associated with the ligands for receptors involving gp130. For example, IL-6R is present at relatively high levels in liver, neutrophils, and leukocytes. The LIF receptor is highly expressed in nervous and immune systems. IL-11R is highly expressed in T lymphocytes, heart atrium, and aorta.

Due to its central role in cell signaling in range of tissue and organ types, gp130 has been proposed as a target for intervention in a wide variety of human disease states. For example, anti-gp130 antibodies have been proposed for modulation of the acute phase inflammatory response associated with trauma, infection and injury. Harrison, et al. (1996) British Journal of Haematology 95(3):443-451. Harrison, et al. demonstrated that monoclonal antibodies against the extracellular domain of gp130 was effective in down-modulating the IL6 acute phase reaction in the acute phase response. Okamato, et al. observed that an anti-gp130 monoclonal antibody could inhibit IL-6-induced HIV-1 expression in U1 cells suggesting that blocking the gp130 signal transduction may have therapeutic potential for the treatment of HIV-1 infection. Okamato, et al (1997) Biochemistry and Molecular Biology International 43(4):733-740.

Agents that downregulate or inhibit the activity of gp130 have been demonstrated utility in a variety of cancer types. Xu, et al. reported on an oral small molecule gp130 inhibitor for the treatment of ovarian cancer. Xu, et al (2013)Mol Cancer Ther; 12(6); 937-49. Martin et al, demonstrated that gp130 expression is associated with aggressive forms of bladder cancer and that inhibition of gp130 with siRNA provided a tumor specific response suggesting that blocking gp130 has therapeutic potential in controlling tumor growth Martin, et al (2019) Mol Cancer Ther; 18(2):413-420. Additionally, Burger, et al. demonstrate that an anti-gp130 antibody was more efficacious than anti-IL6 antibodies in the treatment of myeloma and that gp130 antibody treatment resulted in complete prevention of the development plasmacytomas. Burger, et al (2017) Haematologica 102(2): 381-390.

Although monoclonal antibodies are the most widely used reagents for the detection and quantification of proteins, monoclonal antibodies are large molecules of about 150 kDa and it sometimes limits their use in assays with several reagents competing for close epitopes recognition. A unique class of immunoglobulin containing a heavy chain domain and lacking a light chain domain (commonly referred to as heavy chain" antibodies (HCAbs) is present in camelids, including dromedary camels, Bactrian camels, wild Bactrian camels, llamas, alpacas, vicuñas, and guanacos as well as cartilaginous fishes such as sharks. The isolated variable domain region of HCAbs is known as a VHH (an abbreviation for "variable-heavy-heavy" reflecting their architecture) or Nanobody® (Ablynx). Single domain VHH antibodies possesses the advantage of small size (~12-14 kD), approximately one-tenth the molecular weight a conventional mammalian IgG class antibody) which facilitates the binding of these VHH molecules to antigenic determinants of the gp130 which may be inaccessible to a conventional monoclonal IgG format (Ingram et al., 2018). Furthermore, VHH single domain antibodies are frequently characterized by high thermal stability facilitating pharmaceutical distribution to geographic areas where maintenance of the cold chain is difficult or impossible. These properties, particularly in combination with simple phage display discovery methods that do not require heavy/light chain pairing (as is the case with IgG antibodies) and simple manufacture (e.g., in bacterial expression systems) make VHH single domain antibodies useful in a variety of applications including the development of imaging and therapeutic agents.

SUMMARY OF THE INVENTION

The present disclosure provides polypeptides that specifically bind to gp130.

The present disclosure provides polypeptides that specifically bind to the extracellular domain of gp130.

The present disclosure provides a gp130 binding molecule that specifically bind to the extracellular domain of gp130 (e.g., human gp130).

In some embodiments, the gp130 binding molecule comprises a single domain antibody (sdAb) that specifically binds to the extracellular domain of the human gp130.

In some embodiments, the gp130 binding molecule is a sdAb, the sdAb comprising a set of CDRs corresponding to CDR1, CDR2, and CDR3 as shown in a row of Table 1 below.

In some embodiments, the gp130 binding molecule comprises a CDR1, a CDR2, and a CDR3 as described in a row of Table 1 below, in which the CDR1, CDR2, and CDR3 can each, independently, comprise at least 90% (e.g., 91%, 92%, 93%, 94%, 95%, 96%, 97%, 98%, 99%, or 100%) sequence identity, or have 0, 1, 2, or 3 amino acid changes, optionally conservative amino acid changes, relative to the sequence described in a row of Table 1 below.

In some embodiments, the gp130 binding molecule consists of, optionally consists essentially of, or optionally comprises a single domain antibody (sdAb) having at least 80%, alternatively at least 85%, alternatively at least 90%, alternatively at least 95%, alternatively at least 98%, alternatively at least 99% identity (or being identical except for 1, 2, 3, or 4 amino acids that optionally are conserved substitutions) or 100% identity to a polypeptide sequence of any one of SEQ ID NOS: 2-7, as shown in Table 1 below.

TABLE 1

| Name | VHH Sequence (CDRs underlined) | CDR1 | CDR2 | CDR3 |
|---|---|---|---|---|
| DR591 | QVQLQESGGGSVQAGGSLRLSCTAS GAIASGYIDSRWCMAWFRQAPGKE REGVAAIWPGGGLTVYADSVKGRF TISRDHAKNTLYLQMNNLKPEDTA MYYCAAGSPRMCPSLEFGFDYWGQ GTQVTVSS (SEQ ID NO: 2) | AIASGYIDSRW CMA (SEQ ID NO: 8) | AIWPGGG LTVYADS VKG (SEQ ID NO: 9) | GSPRMCPSL EFGFDY (SEQ ID NO: 10) |
| DR592 | QVQLQESGGGSVQAGGSLRLSCTAP GFTSNSCGMDWYRQAPGKEREFVS SISTDGTTGYADSVKGRFTISKDKAK DTVYLQMNSLKPEDTGMYSCKTKD GTIATMELCDFGYWGQGTQVTVSS (SEQ ID NO: 3) | FTSNSCGMD (SEQ ID NO: 11) | SISTDGTT GYADSVK G (SEQ ID NO: 12) | KDGTIATME LCDFGY (SEQ ID NO: 13) |
| DR593 | QVQLQESGGGSVQAGGSLRLSCAAS GYPYSNGYMGWFRQAPGKEREGV ATIYTGDGRTYYADSVKGRFTISRD NAKNTVDLQMSSLKPEDTAMYYCA ARAAPLYSSGSPLTRARYNVWGQG TQVTVSS (SEQ ID NO: 4) | YPYSNGYMG (SEQ ID NO: 14) | TIYTGDGR TYYADSV KG (SEQ ID NO: 15) | RAAPLYSSG SPLTRARYN V (SEQ ID NO: 16) |
| DR594 | QVQLQESGGGSVQAGGSLRLSCVAS ASTYCTYDMHWYRQAPGKGREFVS AIDSDGTTRYADSVKGRFTISQGTA KNTVYLQMNSLQPEDTAMYYCKTV CVVGSRWSDYWGQGTQVTVSS SEQ ID NO: 5) | STYCTYDMH (SEQ ID NO: 17) | AIDSDGTT RYADSVK G (SEQ ID NO: 18) | VCVVGSRW SDY (SEQ ID NO: 19) |
| DR595 | QVQLQESGGGSVQAGGSLTLSCAAS EYAYSTCNMGWYRQAPGKERELVS AFISDGSTYYADSVKGRFTITRDNA KNTVYLQMNSLKPEDTAIYYCSANC YRRLRNYWGQGTQVTVSS SEQ ID NO: 6) | YAYSTCNMG (SEQ ID NO: 20) | AFISDGST YYADSVK G (SEQ ID NO: 21) | NCYRRLRN Y (SEQ ID NO: 22) |
| DR596 | QVQLQESGGGLVQPGGSLRLSCTAS GLTFDDSVMGWFRQAPGKGREAVS CISSSGANAFYADSVKGRFTISRDNA KNTLYLQMNSLKPEDTATYYCKRG HACAGYYPIPYDDYWGQGTQVTVS S (SEQ ID NO: 7) | LTFDDSVMG (SEQ ID NO: 23) | CISSSGAN AFYADSV KG (SEQ ID NO: 24) | GHACAGYY PIPYDDY (SEQ ID NO: 25) |

In some embodiments, the foregoing sets of CDRs are incorporated in a humanized VHH framework to provide "humanized" sdAb gp130 binding molecules.

The disclosure further provides methods of chemical or recombinant processes for the preparation of the gp130 binding molecules of the present disclosure.

The disclosure further provides nucleic acids encoding the gp130 binding molecules. Table 2 below provides examples of DNA sequences encoding gp130 binding molecules as described herein.

binds to the extracellular domain of the mouse or murine gp130 (mgp130) or specifically binds the extracellular domains of both human and mouse gp130.

In some embodiments, a gp130 binding molecule is a sdAb, the sdAb comprising a set of CDRs corresponding to CDR1, CDR2, and CDR3 as shown in a row of Table 3 below.

In some embodiments, the gp130 binding molecule comprises a CDR1, a CDR2, and a CDR3 as described in a row of Table 3 below, in which the CDR1, CDR2, and CDR3 can

TABLE 2

DNA Sequences Encoding VHHs of Table 1.

| Name | Sequence |
|---|---|
| DR591 | CAGGTGCAACTTCAGGAGTCCGGCGGTGGCAGTGTGCAGGCCGGAGGCTC<br>TCTCCGCCTCTCTTGCACAGCCTCCGGTGCCATCGCCTCCGGCTACATTGA<br>CTCTAGGTGGTGTATGGCCTGGTTCCGCCAGGCCCCGGAAAGGAGAGAG<br>AGGGCGTCGCGGCAATTTGGCCGGGTGGGGGCCTGACAGTGTACGCCGAT<br>TCTGTCAAGGGTCGCTTTACCATCAGCCGCGACCATGCGAAAAACACCCT<br>GTACCTTCAGATGAACAATCTCAAGCCAGAGGATACCGCTATGTATTACT<br>GCGCAGCGGGCAGCCCTCGCATGTGTCCTTCCCTGGAGTTTGGCTTCGATT<br>ACTGGGACAGGGTACTCAGGTGACCGTCAGCTCT<br>(SEQ ID NO: 222) |
| DR592 | CAAGTGCAGTTGCAGGAGAGCGGTGGGGGTAGCGTCCAGGCCGGGGGCT<br>CTCTTCGGCTGTCCTGTACTGCACCGGGATTCACCAGTAACTCATGCGGCA<br>TGGACTGGTATCGGCAGGCACCGGGCAAGGAACGCGAGTTCGTGTCCAGT<br>ATCTCTACAGATGGCACCACTGGTTACGCTGACTCCGTGAAAGGCCGGTTC<br>ACCATCTCAAAAGATAAGGCAAAGGATACTGTGTACCTCCAAATGAACAG<br>CCTGAAGCCGGAGGACACAGGAATGTATAGCTGTAAGACCAAGGATGGC<br>ACGATTGCCACAATGGAGCTTTGCGATTTCGGATACTGGGGCAAGGCAC<br>CCAGGTGACCGTGTCTTCC<br>(SEQ ID NO: 223) |
| DR593 | CAGGTGCAACTCCAAGAGAGCGGAGGTGGCAGTGTTCAGGCCGGGGGCA<br>GCCTGCGCCTCAGCTGTGCAGCTTCCGGGTATCCCTACTCCAATGGCTACA<br>TGGGCTGGTTCCGCCAAGCGCCCGGCAAGGAGAGAGAGGGTGTCGCAACC<br>ATTTATACCGGCGACGGAAGGACTTATTACGCGGATTCCGTCAAGGGCCG<br>CTTTACTATCTCTCGCGATAACGCTAAGAATACCGTGGATCTCCAGATGTC<br>CTCTCTCAAGCCCGAGGACACCGCTATGTATTACTGCGCCGCTAGGGCTGC<br>ACCCCTTTATAGCTCTGGATCACCGCTGACACGCGCAAGGTACAATGTGTG<br>GGGACAGGGAACGCAAGTGACGGTGTCCTCC<br>(SEQ ID NO: 224) |
| DR594 | CAGGTACAGCTTCAGGAGTCCGGGGGAGGCAGCGTGCAGGCAGGTGGCTC<br>CCTGCGCCTGTCTTGCGTCGCTAGTGCCAGCACCTACTGCACCTACGACAT<br>GCACTGGTATCGTCAAGCGCCCGGAAAGGGCCGTGAGTTCGTCTCTGCCA<br>TCGACAGCGACGGCACCACACGGTACGCTGACTCCGTCAAGGGCAGGTTC<br>ACTATTTCTCAGGGCACCGCCAAGAACACTGTGTACCTCCAGATGAACAG<br>TCTCCAGCCTGAGGACACCGCAATGTATTACTGTAAGACTGTGTGCGTCGT<br>GGGCTCTCGGTGGTCAGATTACTGGGGACAGGGTACTCAGGTAACTGTTA<br>GCTCC<br>(SEQ ID NO: 225) |
| DR595 | CAGGTGCAACTCCAGGAGAGCGGAGGCGGTTCCGTGCAGGCTGGGGGTA<br>GCCTCACTCTCTCCTGTGCAGCTTCCGAATATGCGTATAGCACTTGCAATA<br>TGGGGTGGTATCGCCAGGCCCCCGGTAAAGAGCGTGAGCTGGTGTCCGCT<br>TTCATTTCTGACGGATCAACTTATTACGCAGATAGCGTAAAGGGACGCTTC<br>ACAATTACACGGGATAATGCCAAGAATACAGTGTACTTGCAGATGAACAG<br>TCTGAAGCCTGAGGACACTGCCATCTACTATTGCAGTGCGAACTGCTACCG<br>TAGGCTGAGGAATTACTGGGGTCAAGGTACACAGGTAACTGTCTCCTCT<br>(SEQ ID NO: 226) |
| DR596 | CAGGTGCAGTTGCAGGAGTCCGGCGGTGGACTGGTTCAGCCAGGTGGGTC<br>TCTGCGCCTCTCCTGTACCGCTAGTGGACTGACCTTTGATGACAGCGTCAT<br>GGGATGGTTCCGTCAGGCCCCTGGGAAGGGTCGCGAGGCCGTTTCCTGTA<br>TCTCCTCTAGCGGAGCCAATGCCTTCTACGCGGACTCTGTGAAAGGCCGCT<br>TTACTATCAGTCGCGATAACGCTAAGAATACCCTGTACCTTCAGATGAACA<br>GCCTCAAGCCCGAGGATACAGCAACTTACTATTGTAAGCGCGGACATGCC<br>TGCGCAGGCTATTACCCTATCCCCTATGACGATTACTGGGGTCAAGGCACC<br>CAGGTCACGGTGAGCAGC<br>(SEQ ID NO: 227) |

In some embodiments, the ILRb is the murine gp130.

In some embodiments, a gp130 binding molecule comprises a single domain antibody (sdAb) that specifically each, independently, comprise at least 90% (e.g., 91%, 92%, 93%, 94%, 95%, 96%, 97%, 98%, 99%, or 100%) sequence identity, or have 0, 1, 2, or 3 amino acid changes, optionally conservative amino acid changes, relative to the sequence described in a row of Table 3 below.

In some embodiments, the gp130 binding molecule consists of, optionally consists essentially of, or optionally comprises a single domain antibody (sdAb) having at least 80%, alternatively at least 85%, alternatively at least 90%, alternatively at least 95%, alternatively at least 98%, alternatively at least 99% identity (or being identical except for 1, 2, 3, or 4 amino acids that optionally are conserved substitutions) or 100% identity to a polypeptide sequence of any one of SEQ ID NOS: 26-74 as shown in Table 3 below.

TABLE 3

| Name | VHH Sequence | CDR1 | CDR2 | CDR3 |
|---|---|---|---|---|
| mgp130_VHH1 | QVQLQESGGGSVQAGG SLRLSCVISGFTYRQTF MGWFRQVLGKEREGV AAISTGGGSTVYADSVK GRFTISQDSSKNTVYLE MNGLKLEDTGMYYCA ASTVITSVSINRGLYQY WGQGTQVTVSS (SEQ ID NO: 26) | FTYRQTFMG (SEQ ID NO: 75) | AISTGGGSTVYA DSVKG (SEQ ID NO: 76) | STVITSVSINR GLYQY (SEQ ID NO: 77) |
| mgp130_VHH2 | QVQLQESGGGSVQAGG SLRLSCAISGFTYRQTF MGWFRQVVGKEREGV AAISTGGGSTVYADSVK GRFTISQDSSKDTVYLE MNGLKLEDTGMYYCA ASTVITSESINRNLYQY WGQGTQVTVSS (SEQ ID NO: 27) | FTYRQTFMG (SEQ ID NO: 78) | AISTGGGSTVYA DSVKG (SEQ ID NO: 79) | STVITSESINR NLYQY (SEQ ID NO: 80) |
| mgp130_VHH3 | QVQLQESGGGLVQPGG SLRLSCAASGFTLSTYW IYWVRQAPGKGPEWVS TVSRSGGTTYYADSVN GRFTISRDNAKNTVYLQ MNNLKPEDAAVYYCLA SVSNLGWPPVRAPSPTG QGTQVTVSS (SEQ ID NO: 28) | FTLSTYWIY (SEQ ID NO: 81) | TVSRSGGTTYYA DSVNG (SEQ ID NO: 82) | SVSNLGWPP VRAPSP (SEQ ID NO: 83) |
| mgp130_VHH4 | QVQLQESGGGLVQPGG SLRLSCAASGFTFSSYA MSWVRQAPGKGLEWV SAINSGGAGTYYTDSVK GRFTISRDNAKNTLYLQ LNSLKTEDTAMYYCAK HVTGDYDPSLRHGYNV WSQGTQVTVSS (SEQ ID NO: 29) | FTFSSYAMS (SEQ ID NO: 84) | AINSGGAGTYYT DSVKG (SEQ ID NO: 85) | HVTGDYDPS LRHGYNV (SEQ ID NO: 86) |
| mgp130_VHH5 | QVQLQESGGGSVQAGG SLRLSCVISGFTYRQTF MGWFRQVVGKEREGV AAISTGGGSTIYADSVK GRFTISQDSSKDTVYLE MNGLKLEDTGMYYCA ASTVITSESINRNLYQY WGQGTQVTVSS (SEQ ID NO: 30) | FTYRQTFMG (SEQ ID NO: 87) | AISTGGGSTIYAD SVKG (SEQ ID NO: 88) | STVITSESINR NLYQY (SEQ ID NO: 89) |
| mgp130_VHH6 | QVQLQESGGGLVQPGG SLRLSCAASGFTLSTYW MYWVRQAPGKGPEWV SAVSRGGFNTYYADSV KGRFTISRDNAKNTVYL QMNSLKPEDTAVYYCM SSVSFYGWPPDRVPSPT GQGTQVTVSS (SEQ ID NO: 31) | FTLSTYWMY (SEQ ID NO: 90) | AVSRGGFNTYYA DSVKG (SEQ ID NO: 91) | SVSFYGWPP DRVPSP (SEQ ID NO: 92) |
| mgp 130_VHH7 | QVQLQESGGGLVQPGE SLRLSCAASGFTFSSYA MSWVRQAPGKGLEWV SAINSGGAGTYYTDSVK GRFTISRDNAKNTLYLQ LNSLKTEDTAMYYCAK HVTGDYDPSLRYGYNV WSQGTQVTVSS (SEQ ID NO: 32) | FTFSSYAMS (SEQ ID NO: 93) | AINSGGAGTYYT DSVKG (SEQ ID NO: 94) | HVTGDYDPS LRYGYNV (SEQ ID NO: 95) |

TABLE 3-continued

| Name | VHH Sequence | CDR1 | CDR2 | CDR3 |
|---|---|---|---|---|
| mgp130_VHH8 | QVQLQESGGGSVQAGG SLRLSCVISGFTYRPTFM GWFRQVLGKEREGVAA ITTGGGSTVYADSVKGR FTISQDSSKNTVYLEMN GLKLEDTGMYYCAATT VITSVSINRNLYQYWGQ GTQVTVSS (SEQ ID NO: 33) | FTYRPTFMG (SEQ ID NO: 96) | AITTGGGSTVYA DSVKG (SEQ ID NO: 97) | TTVITSVSINR NLYQY (SEQ ID NO: 98) |
| mgp130_VHH9 | QVQLQESGGGSVQAGG SLRLSCGISGFTYRPTFM GWFRQVLGKEREGVAA ISTGGGSSVYADSVKGR FTVSQDSSKNTVYLEM NGLKLEDTGMYYCAAS TVITSVSINRGLYQYWG QGTQVTVSS (SEQ ID NO: 34) | FTYRPTFMG (SEQ ID NO: 99) | AISTGGGSSVYA DSVKG (SEQ ID NO: 100) | STVITSVSINR GLYQY (SEQ ID NO: 101) |
| mgp130_VHH10 | QVQLQESGGGLVQPGG SLRLSCTASGFTFRNYA MSWVRQAPGKGLEWV SAINSGGGSTYYADSVK GRFTISRDNAKNTLYLR LHSLKTEDTAMYYCAK HVTGDYDPSLRYEYNY WSQGTQVTVSS (SEQ ID NO: 35) | FTFRNYAMS (SEQ ID NO: 102) | AINSGGGSTYYA DSVKG (SEQ ID NO: 103) | HVTGDYDPS LRYEYNY (SEQ ID NO: 104) |
| mgp130_VHH11 | QVQLQESGGGLVQPGG SLRLSCAASGFTFRNYA MSWVRQAPGKGLEWV SAINSGGGSTYYADSVK GRFTISRDNAKNTLYLQ LNSLKTEDTAMYYCTK HVTGDYDPSLRYEYNY WSQGTQVTVSS (SEQ ID NO: 36) | FTFRNYAMS (SEQ ID NO: 105) | AINSGGGSTYYA DSVKG (SEQ ID NO: 106) | HVTGDYDPS LRYEYNY (SEQ ID NO: 107) |
| mgp130_VHH12 | QVQLQESGGGLVQPGG SLRLSCAASGFTFSSYA MSWVRQAPGKGLEWV SAINSGGGSTYYADSVK GRFTISRDNAKNTLYLQ LNSLKTEDTAMYCCAK HVTGDYDPSLRYGYNC WGPGTQVTVSS (SEQ ID NO: 37) | FTFSSYAMS (SEQ ID NO: 108) | AINSGGGSTYYA DSVKG (SEQ ID NO: 109) | HVTGDYDPS LRYGYNC (SEQ ID NO: 110) |
| mgp130_VHH13 | QVQLQESGGGSVQPGG SLRLSCAASGFTFSTYD MSWVRQAPGKGLEWV STINYSGSSTYYVDSVL GRFTIARDNAKNTLYLQ MNNLQTEDTAVYYCAS VKERRSNGHPIVFGDRG QGTQVTVSS (SEQ ID NO: 38) | FTFSTYDMS (SEQ ID NO: 111) | TINYSGSSTYYVD SVLG (SEQ ID NO: 112) | VKERRSNGH PIVFGD (SEQ ID NO: 113) |
| mgp130_VHH14 | QVQLQESGGGSVQAGG SLRLSCVISGFTYKQTF MGWFRQVPGKEREGVA AISTGGGSTVYADSVKG RFTISQDSSKNTVYLEM NGLKLEDTGMYYCAAS TVITSVSINRGLYQYWG QGTQVTVSS (SEQ ID NO: 39) | FTYKQTFMG (SEQ ID NO: 114) | AISTGGGSTVYA DSVKG (SEQ ID NO: 115) | STVITSVSINR GLYQ (SEQ ID NO: 116) |

TABLE 3-continued

| Name | VHH Sequence | CDR1 | CDR2 | CDR3 |
|---|---|---|---|---|
| mgp130_VHH15 | QVQLQESGGGSVQAGG SLRLSCVISGFTYRQTF MGWFRQVVGKEREGV AAISTGGGSTVYADSVK GRFTISQDSSKDTVYLE MNGLKLEDTGMYYCA ASTVITSESIYRNLYQY WGQGTQVTVSS (SEQ ID NO: 40) | FTYRQTFMG (SEQ ID NO: 117) | AISTGGGSTVYA DSVKG (SEQ ID NO: 118) | STVITSESIYR NLYQY (SEQ ID NO: 119) |
| mgp130_VHH16 | QVQLQESGGGLVQPGG SLRLSCAASGFTFRNYA MSWVRQAPGKGLEWV SAINSGGGSTYYADSVK GRFTISRDNAKNTLYLQ MNSLKPEDTAMYYCAK HVTGDYDPSLRYEYNY WSQGTQVTVSS (SEQ ID NO: 41) | FTFRNYAMS (SEQ ID NO: 120) | AINSGGGSTYYA DSVKG (SEQ ID NO: 121) | HVTGDYDPS LRYEYNY (SEQ ID NO: 122) |
| mgp130_VHH17 | QVQLQESGGGLVQPGG SLRLSCAASGFTFRNYA MSWVRQAPGKGLEWV SAINSGGGSTYYADSVK GRFTISRDNAKNTLYLQ LNSLKTEDTAMYYCAK HVTGDYDPSLRYEYAY WSQGTQVTVSS (SEQ ID NO: 42) | FTFRNYAMS (SEQ ID NO: 123) | AINSGGGSTYYA DSVKG (SEQ ID NO: 124) | HVTGDYDPS LRYEYAY (SEQ ID NO: 125) |
| mgp130_VHH18 | QVQLQESGGGSVQAGG SLRLSCAASGFTFSSYA MSWVRQAPGKGLEWV SAINSGGGSTYYADSVK ARFTISRDNAKNTLYLQ LNSLKTEDTAMYYCAK HVTGDYDPSLRYDYNY WGQGTQVTVSS (SEQ ID NO: 43) | FTFSSYAMS (SEQ ID NO: 126) | AINSGGGSTYYA DSVKA (SEQ ID NO: 127) | HVTGDYDPS LRYDYNY (SEQ ID NO: 128) |
| mgp130_VHH19 | QVQLQESGGGSVQAGG SLRLSCGISGFTYRPTFM GWFRQVLGKEREGVAA ISTGGGSSVYADSVKGR FTVSQDSSKNTVYLEM NGLKLEDTGMYYCAAS TVITSVSINRALYQYWG QGTQVTVSS (SEQ ID NO: 44) | FTYRPTFMG (SEQ ID NO: 129) | AISTGGGSSVYA DSVKG (SEQ ID NO: 130) | STVITSVSINR ALYQY (SEQ ID NO: 131) |
| mgp130_VHH20 | QVQLQESGGGLVQPGG SLRLSCAASGFTFSSYA VSWVRQAPGKGLEWVS TINSGGGSTYYADSVKG RFTISRDNAKNTLYLQL NSLKTEDTAMYYCTKH VTGDYDPSLRYEYNVW SQGTQVTVSS (SEQ ID NO: 45) | FTFSSYAVS (SEQ ID NO: 132) | TINSGGGSTYYA DSVKG (SEQ ID NO: 133) | HVTGDYDPS LRYEYNV (SEQ ID NO: 134) |
| mgp130_VHH21 | QVQLQESGGGSVQAGG SLRVSCQISGFTYRQTF MGWFRQVPGKEREGVA AISTGGGSTVYADSVKG RFTISQDSSKNTVYLEM NGLKLEDTGMYYCAAS TVITSPSINRNLYQYWG QGTQVTVSS (SEQ ID NO: 46) | FTYRQTFMG (SEQ ID NO: 135) | AISTGGGSTVYA DSVKG (SEQ ID NO: 136) | STVITSPSINR NLYQY (SEQ ID NO: 137) |
| mgp130_VHH22 | QVQLQESGGGLVQPGG SLRLSCAVSGFTFSNYA MKWVRQAPGKGLEWV SSISGGGGATYYADSVK GRFTISRDNTKNTLYLQ MNSLKTEDTAVYYCAA QNLDYRGQGTQVTVSS (SEQ ID NO: 47) | FTFSNYAMK (SEQ ID NO: 138) | SISGGGGATYYA DSVKG (SEQ ID NO: 139) | QNLDY (SEQ ID NO: 140) |

TABLE 3-continued

| Name | VHH Sequence | CDR1 | CDR2 | CDR3 |
|---|---|---|---|---|
| mgp130_VHH23 | QVQLQESGGGLVQPGGSLRLSCTASGFTFNSAHMKWERQPPGKGLEWVSFITPGGASTGYADSVKGRFTISRDNAKNTLYLQMNNLKTEDTAVYYCATGGLRGQGTQVTVSS (SEQ ID NO: 48) | FTFNSAHMK (SEQ ID NO: 141) | FITPGGASTGYADSVKG (SEQ ID NO: 142) | GGL (SEQ ID NO: 143) |
| mgp130_VHH24 | QVQLQESGGGSVQAGGSLRLSCVISGFTYRPTFMGWFRQVLGKEREGVAAITTGGGSTLYADSVKGRFTISQDSSKNTVYLEMNGLKLEDTGMYYCAATTVITSVSINRNLYQYWGQGTQVTVSS (SEQ ID NO: 49) | FTYRPTFMG (SEQ ID NO: 144) | AITTGGGSTLYADSVKG (SEQ ID NO: 145) | TTVITSVSINRNLYQY (SEQ ID NO: 146) |
| mgp130_VHH25 | QVQLQESGGGSVQAGGSLRLSCVISGFTYKQTFMGWFRQVPGKEREGVAAISTGGGSTVYADSVKGRFTISQDSSKNTVYLEMNGLKLEDTGMYYCAASTVITSVTINRGLYQYWGQGTQVTVSS (SEQ ID NO: 50) | FTYKQTFMG (SEQ ID NO: 147) | AISTGGGSTVYADSVKG (SEQ ID NO: 148) | STVITSVTINRGLYQY (SEQ ID NO: 149) |
| mgp130_VHH26 | QVQLQESGGGSVQAGGSLRLSCVISGFVYKQTFMGWFRQVPGKEREGVAAISTGGGSTVYADSVKGRFTISQDSSKNTVYLEMNGLKLEDTGMYYCAASTVITSVSINRGLYQYWGQGTQVTVSS (SEQ ID NO: 51) | FVYKQTFMG (SEQ ID NO: 150) | AISTGGGSTVYADSVKG (SEQ ID NO: 151) | STVITSVSINRGLYQY (SEQ ID NO: 152) |
| mgp130_VHH27 | QVQLQESGGGSVQAGGSLRVSCVISGFTYRQTFMGWFRQVPGKEREGVAAISTGGGSTVYADSVKGRFTISQDSSKNTVYLEMNGLKLEDTGMYYCAASTVITSVSINRGLYQYWGQGTQVTVSS (SEQ ID NO: 52) | FTYRQTFMG (SEQ ID NO: 153) | AISTGGGSTVYADSVKG (SEQ ID NO: 154) | STVITSVSINRGLYQY (SEQ ID NO: 155) |
| mgp130_VHH28 | QVQLQESGGGLVQPGGSLRLSCAASGFTFSSYAMSWVRQAPGKGLEWVSAINSGGGSTYYADSVKGRFTISRDNAKSTLYLQLNSLKTEDTAMYYCTKHVTGDYDPSLRYEYNYWSQGTQVTVSS (SEQ ID NO: 53) | FTFSSYAMS (SEQ ID NO: 156) | AINSGGGSTYYADSVKG (SEQ ID NO: 157) | HVTGDYDPSLRYEYNY (SEQ ID NO: 158) |
| mgp130_VHH29 | QVQLQESGGGLVQPGGSLRLSCAASGFTFSSYAMSWVRQAPGKGLEWVSAINSGGASTYYADSVKGRFTISRDNAKNTLYLQLNSLKTEDTAMYCCAKHVTGDYDPSLRYEYNCWGPGTQVTVSS (SEQ ID NO: 54) | FTFSSYAMS (SEQ ID NO: 159) | AINSGGASTYYADSVKG (SEQ ID NO: 160) | HVTGDYDPSLRYEYNC (SEQ ID NO: 161) |
| mgp130_VHH30 | QVQLQESGGGLVQPGGSLRLSCAASGFTFSSYAMSWVRQAPGKGLEWVSAINSGGGSTYYADSVKGRFTISRDNAKNTLYLQLNSLKTEDTAMYYCAKHVTGDYDPSLRYEYNYWSQGTQVTVSS (SEQ ID NO: 55) | FTFSSYAMS (SEQ ID NO: 162) | AINSGGGSTYYADSVKG (SEQ ID NO: 163) | HVTGDYDPSLRYEYNY (SEQ ID NO: 164) |

TABLE 3-continued

| Name | VHH Sequence | CDR1 | CDR2 | CDR3 |
|---|---|---|---|---|
| mgp130_VHH31 | QVQLQESGGGSVQAGG SLRLSCVISGFTYRQTE MGWFRQVVGKEREGV AAISTGGGSTVYADSVK GRFTISQDSSKDTVYLE MNGLKLEDTGMYYCA ASTVITSESINRNLYQY WGQGTQVTVSS (SEQ ID NO: 56) | FTYRQTFMG (SEQ ID NO: 165) | AISTGGGSTVYA DSVKG (SEQ ID NO: 166) | STVITSESINR NLYQY (SEQ ID NO: 167) |
| mgp130_VHH32 | QVQLQESGGGSVQAGG SLRVSCVVSGFTYRQTF MGWFRQVPGKEREGVA AISTGGGSTVYADSVKG RFTISQDSSKNTVYLEM NGLKLEDTGMYYCAAS TVITSVSINRNLYQYWG QGTQVTVSS (SEQ ID NO: 57) | FTYRQTFMG (SEQ ID NO: 168) | AISTGGGSTVYA DSVKG (SEQ ID NO: 169) | STVITSVSINR NLYQY (SEQ ID NO: 170) |
| mgp130_VHH33 | QVQLQESGGGLVQPGG SLRLSCAASGFTFSSYA MSWVRQAPGKGLEWV SAINSGGGSTYYADSVK GRFTISRDNAKNTMYLQ LNSLKTEDTAMYYCAK HVAGDYDPSLRYEWHV WGQGTQVTVSS (SEQ ID NO: 58) | FTFSSYAMS (SEQ ID NO: 171) | AINSGGGSTYYA DSVKG (SEQ ID NO: 172) | HVAGDYDPS LRYEWHV (SEQ ID NO: 173) |
| mgp130_VHH34 | QVQLQESGGGLVQPGG SLRLSCAASGFTFRSYA MSWVRQAPGKGLEWV SAINSGGGSTYYADSVK ARFTISRDNAKNTLYLQ LNSLKTEDTAMYYCAK HVTGDYDPSLRYEYNY WGQGTQVTVSS (SEQ ID NO: 59) | FTFRSYAMS (SEQ ID NO: 174) | AINSGGGSTYYA DSVKA (SEQ ID NO: 175) | HVTGDYDPS LRYEYNY (SEQ ID NO: 176) |
| mgp130_VHH35 | QVQLQESGGGLVQPGG SLRLSCAASGFTFSSYA MSWVRQAPGKGLEWV SAINSGGGSTYYADSVK GRFTISRDNAKNTLYLQ LNSLKTEDTAMYYCAK HITGDYDPSLRYEYNY WGQGTQVTVSS (SEQ ID NO: 60) | FTFSSYAMS (SEQ ID NO: 177) | AINSGGGSTYYA DSVKG (SEQ ID NO: 178) | HITGDYDPSL RYEYNY (SEQ ID NO: 179) |
| mgp130_VHH36 | QVQLQESGGGSVQAGG SLRLSCVISGFTYRQTF MGWFRQVVGKEREGV AAISTGGGSMVYADSV KGRFTISQDSSKDTVYL EMNGLKLEDTGMYYCA ASTVITSESINRNLYQY WGQGTQVTVSS (SEQ ID NO: 61) | FTYRQTFMG (SEQ ID NO: 180) | AISTGGGSMVYA DSVKG (SEQ ID NO: 181) | STVITSESINR NLYQY (SEQ ID NO: 182) |
| mgp130_VHH37 | QVQLQESGGGPVQAGG SLRLSCVISGFTYRQTF MGWFRQVPGKEREGVA AISTGGGSTVYADSVKG RFTISQDSSKNTVYLEM NGLKLEDTGMYYCAAS TVITSESINRGLYQYWG QGTQVTVSS (SEQ ID NO: 62) | FTYRQTFMG (SEQ ID NO: 183) | AISTGGGSTVYA DSVKG (SEQ ID NO: 184) | STVITSESINR GLYQY (SEQ ID NO: 185) |

TABLE 3-continued

| Name | VHH Sequence | CDR1 | CDR2 | CDR3 |
|---|---|---|---|---|
| mgp130_VHH38 | QVQLQESGGGSVQAGG FLRLSCAFSGYTGCMG WFRQGPGQEREGVASIN DGGSLTYADSVKGRFTI SKDNAKKTLDLQMNTL KPEDTAMYYCAASLSY CLNPTLRVDGYNYWGQ GTQVTVSS (SEQ ID NO: 63) | YTGCMG (SEQ ID NO: 186) | SINDGGSLTYADS VKG (SEQ ID NO: 187) | SLSYCLNPTL RVDGYNY (SEQ ID NO: 188) |
| mgp130_VHH39 | QVQLQESGGGSVQAGG SLRLSCVISGLTYKQTF MGWFRQVPGKEREGVA AISTGGGSTVYADSVKG RFTISQDNSKNTVYLEM NGLKLEDTGMYYCAAS TVITSVSINRYLYQWWG QGTQVTVSS (SEQ ID NO: 64) | LTYKQTFMG (SEQ ID NO: 189) | AISTGGGSTVYA DSVKG (SEQ ID NO: 190) | STVITSVSINR YLYQW (SEQ ID NO: 191) |
| mgp130_VHH40 | QVQLQESGGGLVQPGG SLRLSCAASGFTFSNYA MSWVRQAPGKGVEWV SAINSGGSVFYADSVKG RFTISRDNAKNTLYLQL SSLKTEDTAMYYCAKH VTGDYDPSLRYGYNVW SQGTQVTVSS (SEQ ID NO: 65) | FTFSNYAMS (SEQ ID NO: 192) | AINSGGSVFYAD SVKG (SEQ ID NO: 193) | HVTGDYDPS LRYGYNV (SEQ ID NO: 194) |
| mgp130_VHH41 | QVQLQESGGGSVQAGG SLRLSCGISGFTYRPTFM GWFRQVLGKEREGVAA ISTGGGSTVYADSVKGR FTISQDSSKDTVYLEMN GLKLEDTGMYYCAAST VITSESINRNLYQYWGQ GTQVTVSS (SEQ ID NO: 66) | FTYRPTFMG (SEQ ID NO: 195) | AISTGGGSTVYA DSVKG (SEQ ID NO: 196) | STVITSESINR NLYQY (SEQ ID NO: 197) |
| mgp130_VHH42 | QVQLQESGGGLVQPGG SLRLSCAASGFTFSSYA MSWVRQAPGKGLEWV SAINSGGGSTYYADSVK GRFTISRDNAKNTLYLQ LNSLKTEDTAMYYCAK HVTGDYDPSLRYGYNV WSQGTQVTVSS (SEQ ID NO: 67) | FTFSSYAMS (SEQ ID NO: 198) | AINSGGGSTYYA DSVKG (SEQ ID NO: 199) | HVTGDYDPS LRYGYNV (SEQ ID NO: 200) |
| mgp130_VHH43 | QVQLQESGGGLVQPGG SLRLSCAASGFTFSSYA MSWVRQAPGKGLEWV SAINLGGDTTYYTDSVK GRFTISRDNAKNTLYLQ LNSLKTEDTAMYYCAK HVTGDYDPSLRYEYGY WSQGTQVTVSS (SEQ ID NO: 68) | FTFSSYAMS (SEQ ID NO: 201) | AINLGGDTTYYT DSVKG (SEQ ID NO: 202) | HVTGDYDPS LRYEYGY (SEQ ID NO: 203) |
| mgp130_VHH44 | QVQLQESGGGLVQPGG SLRLSCTASGFTFNSAH LKWERQPPGKGLEWVS FITNGGASTGYADSVKG RFTISRDDAKNTLYLQM NNLKTEDTAVYYCATG GLRGQGTQVTVSS (SEQ ID NO: 69) | FTFNSAHLK (SEQ ID NO: 204) | FITNGGASTGYA DSVKG (SEQ ID NO: 205) | GGL (SEQ ID NO: 206) |
| mgp130_VHH45 | QVQLQESGGGSVQAGG SLRVSCVISGFTYRQTF MGWFRQVPGKEREGVA AISTGGGSTIYANSVKG RFTISQDSSKNTVYLEM NGLKLEDTGMYYCAAS TVITSVSINRGLYQYWG QGTQVTVSS (SEQ ID NO: 70) | FTYRQTFMG (SEQ ID NO: 207) | AISTGGGSTIYAN SVKG (SEQ ID NO: 208) | STVITSVSINR GLYQY (SEQ ID NO: 209) |

TABLE 3-continued

| Name | VHH Sequence | CDR1 | CDR2 | CDR3 |
| --- | --- | --- | --- | --- |
| mgp130_VHH46 | QVQLQESGGGLVQPGG SLRLSCAASGFTFSSYA MSWVRQAPGKGLEWV SAINSGGGSTYYADSVK GRFTISRDNAKNTLYLQ LNSLKTEDTAMYCCAK HITGDYDPSLRYEYNC WGQGTQVTVSS (SEQ ID NO: 71) | FTFSSYAMS (SEQ ID NO: 210) | AINSGGGSTYYA DSVKG (SEQ ID NO: 211) | HITGDYDPSL RYEYNC (SEQ ID NO: 212) |
| mgp130_VHH47 | QVQLQESGGGSVQAGG SLRLSCVISGFTYKQTF MGWFRQVPGKEREGVA AISTGGGNTVYADSVK GRFTISQDSSKNTVYLE MNGLKLEDTGMYYCA ASTVITSVTVNRGLYQY WGQGTQVTVSS (SEQ ID NO: 72) | FTYKQTFMG (SEQ ID NO: 213) | AISTGGGNTVYA DSVKG (SEQ ID NO: 214) | STVITSVTVN RGLYQY (SEQ ID NO: 215) |
| mgp130_VHH48 | QVQLQESGGALVQPGG SLRLSCAASGFTFSYYA MKWVRQAPGKGLEWV SSISGGGGATYYADSVK GRFTISRDNTNDTLYLQ MNSLKTEDTAVYYCAA QNLDYRGQGTQVTVSS (SEQ ID NO: 73) | FTFSYYAMK (SEQ ID NO: 216) | SISGGGGATYYA DSVKG (SEQ ID NO: 217) | QNLDY (SEQ ID NO: 218) |
| mgp130_VHH49 | QVQLQESGGGSVQAGG SLRLSCVISGFTYKQTF MGWFRQVPGKEREGVA AISTGGGSTVYADSVKG RFTISQESSKNTVYLEM NGLKLEDTGMYYCAAS TVITSVTINRGLYQYWG QGTQVTVSS (SEQ ID NO: 74) | FTYKQTFMG (SEQ ID NO: 219) | AISTGGGSTVYA DSVKG (SEQ ID NO: 220) | STVITSVTINR GLYQY (SEQ ID NO: 221) |

In some embodiments, the foregoing sets of CDRs are incorporated in a humanized VHH framework to provide "humanized" sdAb gp130 binding molecules.

The disclosure further provides methods of chemical or recombinant processes for the preparation of the gp130 binding molecules of the present disclosure.

The disclosure further provides nucleic acids encoding the gp130 binding molecules. Table 4 below provide examples of DNA sequences encoding hgp130 binding molecules as described in Table 3 above.

TABLE 4

DNA Sequences Encoding VHHs of Table 3.

| Name | DNA Sequence | SEQ ID NO. |
| --- | --- | --- |
| mgp130_VHH1 | CAGGTGCAGCTGCAGGAGAGCGGCGGCGGCAGCGTGCAGG CCGGCGGCAGCCTGAGGCTGAGCTGCGTGATCAGCGGCTT CACCTACAGGCAGACCTTCATGGGCTGGTTCAGGCAGGTG CTGGGCAAGGAGAGGGAGGGCGTGGCCGCCATCAGCACCG GCGGCGGCAGCACCGTGTACGCCGACAGCGTGAAGGGCAG GTTCACCATCAGCCAGGACAGCAGCAAGAACACCGTGTAC CTGGAGATGAACGGCCTGAAGCTGGAGGACACCGGCATGT ACTACTGCGCCGCCAGCACCGTGATCACCAGCGTGAGCAT CAACAGGGGCCTGTACCAGTACTGGGGCCAGGGCACCCAG GTGACCGTGAGCAGC | 228 |
| mgp130_VHH2 | CAGGTGCAGCTGCAGGAGAGCGGCGGCGGCAGCGTGCAGG CCGGCGGCAGCCTGAGGCTGAGCTGCGCCATCAGCGGCTT CACCTACAGGCAGACCTTCATGGGCTGGTTCAGGCAGGTG GTGGGCAAGGAGAGGGAGGGCGTGGCCGCCATCAGCACCG GCGGCGGCAGCACCGTGTACGCCGACAGCGTGAAGGGCAG GTTCACCATCAGCCAGGACAGCAGCAAGGACACCGTGTAC | 229 |

TABLE 4-continued

DNA Sequences Encoding VHHs of Table 3.

| Name | DNA Sequence | SEQ ID NO. |
|---|---|---|
| | CTGGAGATGAACGGCCTGAAGCTGGAGGACACCGGCATGT<br>ACTACTGCGCCGCCAGCACCGTGATCACCAGCGAGAGCAT<br>CAACAGGAACCTGTACCAGTACTGGGGCCAGGGCACCCAG<br>GTGACCGTGAGCAGC | |
| mgp130_VHH3 | CAGGTGCAGCTGCAGGAGAGCGGCGGCGGCCTGGTGCAGC<br>CCGGCGGCAGCCTGAGGCTGAGCTGCGCCGCCAGCGGCTT<br>CACCCTGAGCACCTACTGGATCTACTGGGTGAGGCAGGCC<br>CCCGGCAAGGGCCCCGAGTGGGTGAGCACCGTGAGCAGGA<br>GCGGCGGCACCACCTACTACGCCGACAGCGTGAACGGCAG<br>GTTCACCATCAGCAGGGACAACGCCAAGAACACCGTGTAC<br>CTGCAGATGAACAACCTGAAGCCCGAGGACGCCGCCGTGT<br>ACTACTGCCTGGCCAGCGTGAGCAACCTGGGCTGGCCCCC<br>CGTGAGGGCCCCCAGCCCCACCGGCCAGGGCACCCAGGTG<br>ACCGTGAGCAGC | 230 |
| mgp130_VHH4 | CAGGTGCAGCTGCAGGAGAGCGGCGGCGGCCTGGTGCAGC<br>CCGGCGGCAGCCTGAGGCTGAGCTGCGCCGCCAGCGGCTT<br>CACCTTCAGCAGCTACGCCATGAGCTGGGTGAGGCAGGCC<br>CCCGGCAAGGGCCTGGAGTGGGTGAGCGCCATCAACAGCG<br>GCGGCGCCGGCACCTACTACACCGACAGCGTGAAGGGCAG<br>GTTCACCATCAGCAGGGACAACGCCAAGAACACCCTGTAC<br>CTGCAGCTGAACAGCCTGAAGACCGAGGACACCGCCATGT<br>ACTACTGCGCCAAGCACGTGACCGGCGACTACGACCCCAG<br>CCTGAGGCACGGCTACAACGTGTGGAGCCAGGGCACCCAG<br>GTGACCGTGAGCAGC | 231 |
| mgp130_VHH5 | CAGGTGCAGCTGCAGGAGAGCGGCGGCGGCAGCGTGCAGG<br>CCGGCGGCAGCCTGAGGCTGAGCTGCGTGATCAGCGGCTT<br>CACCTACAGGCAGACCTTCATGGGCTGGTTCAGGCAGGTG<br>GTGGGCAAGGAGAGGGAGGGCGTGGCCGCCATCAGCACCG<br>GCGGCGGCAGCACCATCTACGCCGACAGCGTGAAGGGCAG<br>GTTCACCATCAGCCAGGACAGCAGCAAGAACACCGTGTAC<br>CTGGAGATGAACGGCCTGAAGCTGGAGGACACCGGCATGT<br>ACTACTGCGCCGCCAGCACCGTGATCACCAGCGAGAGCAT<br>CAACAGGAACCTGTACCAGTACTGGGGCCAGGGCACCCAG<br>GTGACCGTGAGCAGC | 232 |
| mgp130_VHH6 | CAGGTGCAGCTGCAGGAGAGCGGCGGCGGCCTGGTGCAGC<br>CCGGCGGCAGCCTGAGGCTGAGCTGCGCCGCCAGCGGCTT<br>CACCCTGAGCACCTACTGGATGTACTGGGTGAGGCAGGCC<br>CCCGGCAAGGGCCCCGAGTGGGTGAGCGCCGTGAGCAGGG<br>GCGGCTTCAACACCTACTACGCCGACAGCGTGAAGGGCAG<br>GTTCACCATCAGCAGGGACAACGCCAAGAACACCGTGTAC<br>CTGCAGATGAACAGCCTGAAGCCCGAGGACACCGCCGTGT<br>ACTACTGCATGAGCAGCGTGAGCTTCTACGGCTGGCCCCC<br>CGACAGGGTGCCCAGCCCCACCGGCCAGGGCACCCAGGTG<br>ACCGTGAGCAGC | 233 |
| mgp130_VHH7 | CAGGTGCAGCTGCAGGAGAGCGGCGGCGGCCTGGTGCAGC<br>CCGGCGAGAGCCTGAGGCTGAGCTGCGCCGCCAGCGGCTT<br>CACCTTCAGCAGCTACGCCATGAGCTGGGTGAGGCAGGCC<br>CCCGGCAAGGGCCTGGAGTGGGTGAGCGCCATCAACAGCG<br>GCGGCGCCGGCACCTACTACACCGACAGCGTGAAGGGCAG<br>GTTCACCATCAGCAGGGACAACGCCAAGAACACCCTGTAC<br>CTGCAGCTGAACAGCCTGAAGACCGAGGACACCGCCATGT<br>ACTACTGCGCCAAGCACGTGACCGGCGACTACGACCCCAG<br>CCTGAGGTACGGCTACAACGTGTGGAGCCAGGGCACCCAG<br>GTGACCGTGAGCAGC | 234 |
| mgp130_VHH8 | CAGGTGCAGCTGCAGGAGAGCGGCGGCGGCAGCGTGCAGG<br>CCGGCGGCAGCCTGAGGCTGAGCTGCGTGATCAGCGGCTT<br>CACCTACAGGCCCACCTTCATGGGCTGGTTCAGGCAGGTG<br>CTGGGCAAGGAGAGGGAGGGCGTGGCCGCCATCACCACCG<br>GCGGCGGCAGCACCGTGTACGCCGACAGCGTGAAGGGCAG<br>GTTCACCATCAGCCAGGACAGCAGCAAGAACACCGTGTAC<br>CTGGAGATGAACGGCCTGAAGCTGGAGGACACCGGCATGT<br>ACTACTGCGCCGCCACCACCGTGATCACCAGCGTGAGCAT<br>CAACAGGAACCTGTACCAGTACTGGGGCCAGGGCACCCAG<br>GTGACCGTGAGCAGC | 235 |
| mgp130_VHH9 | CAGGTGCAGCTGCAGGAGAGCGGCGGCGGCAGCGTGCAGG<br>CCGGCGGCAGCCTGAGGCTGAGCTGCGCGCATCAGCGGCTT<br>CACCTACAGGCCCACCTTCATGGGCTGGTTCAGGCAGGTG<br>CTGGGCAAGGAGAGGGAGGGCGTGGCCGCCATCAGCACCG<br>GCGGCGGCAGCAGCGTGTACGCCGACAGCGTGAAGGGCAG | 236 |

TABLE 4-continued

DNA Sequences Encoding VHHs of Table 3.

| Name | DNA Sequence | SEQ ID NO. |
|---|---|---|
| | GTTCACCGTGAGCCAGGACAGCAGCAAGAACACCGTGTAC<br>CTGGAGATGAACGGCCTGAAGCTGGAGGACACCGGCATGT<br>ACTACTGCGCCGCCAGCACCGTGATCACCAGCGTGAGCAT<br>CAACAGGGGCCTGTACCAGTACTGGGGCCAGGGCACCCAG<br>GTGACCGTGAGCAGC | |
| mgp130_VHH10 | CAGGTGCAGCTGCAGGAGAGCGGCGGCGGCCTGGTGCAGC<br>CCGGCGGCAGCCTGAGGCTGAGCTGCACCGCCAGCGGCTT<br>CACCTTCAGGAACTACGCCATGAGCTGGGTGAGGCAGGCC<br>CCCGGCAAGGGCCTGGAGTGGGTGAGCGCCATCAACAGCG<br>GCGGCGGCAGCACCTACTACGCCGACAGCGTGAAGGGCAG<br>GTTCACCATCAGCAGGGACAACGCCAAGAACACCCTGTAC<br>CTGAGGCTGCACAGCCTGAAGACCGAGGACACCGCCATGT<br>ACTACTGCGCCAAGCACGTGACCGGCGACTACGACCCCAG<br>CCTGAGGTACGAGTACAACTACTGGAGCCAGGGCACCCAG<br>GTGACCGTGAGCAGC | 238 |
| mgp130_VHH11 | CAGGTGCAGCTGCAGGAGAGCGGCGGCGGCCTGGTGCAGC<br>CCGGCGGCAGCCTGAGGCTGAGCTGCGCCGCCAGCGGCTT<br>CACCTTCAGGAACTACGCCATGAGCTGGGTGAGGCAGGCC<br>CCCGGCAAGGGCCTGGAGTGGGTGAGCGCCATCAACAGCG<br>GCGGCGGCAGCACCTACTACGCCGACAGCGTGAAGGGCAG<br>GTTCACCATCAGCAGGGACAACGCCAAGAACACCCTGTAC<br>CTGCAGCTGAACAGCCTGAAGACCGAGGACACCGCCATGT<br>ACTACTGCACCAAGCACGTGACCGGCGACTACGACCCCAG<br>CCTGAGGTACGAGTACAACTACTGGAGCCAGGGCACCCAG<br>GTGACCGTGAGCAGC | 239 |
| mgp130_VHH12 | CAGGTGCAGCTGCAGGAGAGCGGCGGCGGCCTGGTGCAGC<br>CCGGCGGCAGCCTGAGGCTGAGCTGCGCCGCCAGCGGCTT<br>CACCTTCAGCAGCTACGCCATGAGCTGGGTGAGGCAGGCC<br>CCCGGCAAGGGCCTGGAGTGGGTGAGCGCCATCAACAGCG<br>GCGGCGGCAGCACCTACTACGCCGACAGCGTGAAGGGCAG<br>GTTCACCATCAGCAGGGACAACGCCAAGAACACCCTGTAC<br>CTGCAGCTGAACAGCCTGAAGACCGAGGACACCGCCATGT<br>ACTGCTGCGCCAAGCACGTGACCGGCGACTACGACCCCAG<br>CCTGAGGTACGGCTACAACTGCTGGGGCCCCGGCACCCAG<br>GTGACCGTGAGCAGC | 240 |
| mgp130_VHH13 | CAGGTGCAGCTGCAGGAGAGCGGCGGCGGCAGCGTGCAGC<br>CCGGCGGCAGCCTGAGGCTGAGCTGCGCCGCCAGCGGCTT<br>CACCTTCAGCACCTACGACATGAGCTGGGTGAGGCAGGCC<br>CCCGGCAAGGGCCTGGAGTGGGTGAGCACCATCAACTACA<br>GCGGCAGCAGCACCTACTACGTGGACAGCGTGCTGGGCAG<br>GTTCACCATCGCCAGGGACAACGCCAAGAACACCCTGTAC<br>CTGCAGATGAACAACCTGCAGACCGAGGACACCGCCGTGT<br>ACTACTGCGCCAGCGTGAAGGAGAGGAGGAGCAACGGCCA<br>CCCCATCGTGTTCGGCGACAGGGGCCAGGGCACCCAGGTG<br>ACCGTGAGCAGC | 241 |
| mgp130_VHH14 | CAGGTGCAGCTGCAGGAGAGCGGCGGCGGCAGCGTGCAGG<br>CCGGCGGCAGCCTGAGGCTGAGCTGCGTGATCAGCGGCTT<br>CACCTACAAGCAGACCTTCATGGGCTGGTTCAGGCAGGTG<br>CCCGGCAAGGAGAGGGAGGGCGTGGCCCGCATCAGCACCG<br>GCGGCGGCAGCACCGTGTACGCCGACAGCGTGAAGGGCAG<br>GTTCACCATCAGCCAGGACAGCAGCAAGAACACCGTGTAC<br>CTGGAGATGAACGGCCTGAAGCTGGAGGACACCGGCATGT<br>ACTACTGCGCCGCCAGCACCGTGATCACCAGCGTGAGCAT<br>CAACAGGGGCCTGTACCAGTACTGGGGCCAGGGCACCCAG<br>GTGACCGTGAGCAGC | 242 |
| mgp130_VHH15 | CAGGTGCAGCTGCAGGAGAGCGGCGGCGGCAGCGTGCAGG<br>CCGGCGGCAGCCTGAGGCTGAGCTGCGTGATCAGCGGCTT<br>CACCTACAGGCAGACCTTCATGGGCTGGTTCAGGCAGGTG<br>GTGGGCAAGGAGAGGGAGGGCGTGGCCGCCATCAGCACCG<br>GCGGCGGCAGCACCGTGTACGCCGACAGCGTGAAGGGCAG<br>GTTCACCATCAGCCAGGACAGCAGCAAGAACACCGTGTAC<br>CTGGAGATGAACGGCCTGAAGCTGGAGGACACCGGCATGT<br>ACTACTGCGCCGCCAGCACCGTGATCACCAGCGAGAGCAT<br>CTACAGGAACCTGTACCAGTACTGGGGCCAGGGCACCCAG<br>GTGACCGTGAGCAGC | 243 |
| mgp130_VHH16 | CAGGTGCAGCTGCAGGAGAGCGGCGGCGGCCTGGTGCAGC<br>CCGGCGGCAGCCTGAGGCTGAGCTGCGCCGCCAGCGGCTT<br>CACCTTCAGGAACTACGCCATGAGCTGGGTGAGGCAGGCC<br>CCCGGCAAGGGCCTGGAGTGGGTGAGCGCCATCAACAGCG | 244 |

TABLE 4-continued

DNA Sequences Encoding VHHs of Table 3.

| Name | DNA Sequence | SEQ ID NO. |
|---|---|---|
|  | GCGGCGGCAGCACCTACTACGCCGACAGCGTGAAGGGCAG<br>GTTCACCATCAGCAGGGACAACGCCAAGAACACCCTGTAC<br>CTGCAGATGAACAGCCTGAAGCCCGAGGACACCGCCATGT<br>ACTACTGCGCCAAGCACGTGACCGGCGACTACGACCCCAG<br>CCTGAGGTACGAGTACAACTACTGGAGCCAGGGCACCCAG<br>GTGACCGTGAGCAGC |  |
| mgp130_VHH17 | CAGGTGCAGCTGCAGGAGAGCGGCGGCGGCCTGGTGCAGC<br>CCGGCGGCAGCCTGAGGCTGAGCTGCGCCGCCAGCGGCTT<br>CACCTTCAGGAACTACGCCATGAGCTGGGTGAGGCAGGCC<br>CCCGGCAAGGGCCTGGAGTGGGTGAGCGCCATCAACAGCG<br>GCGGCGGCAGCACCTACTACGCCGACAGCGTGAAGGGCAG<br>GTTCACCATCAGCAGGGACAACGCCAAGAACACCCTGTAC<br>CTGCAGCTGAACAGCCTGAAGACCGAGGACACCGCCATGT<br>ACTACTGCGCCAAGCACGTGACCGGCGACTACGACCCCAG<br>CCTGAGGTACGAGTACGCCTACTGGAGCCAGGGCACCCAG<br>GTGACCGTGAGCAGC | 245 |
| mgp130_VHH18 | CAGGTGCAGCTGCAGGAGAGCGGCGGCGGCAGCGTGCAGG<br>CCGGCGGCAGCCTGAGGCTGAGCTGCGCCGCCAGCGGCTT<br>CACCTTCAGCAGCTACGCCATGAGCTGGGTGAGGCAGGCC<br>CCCGGCAAGGGCCTGGAGTGGGTGAGCGCCATCAACAGCG<br>GCGGCGGCAGCACCTACTACGCCGACAGCGTGAAGGGCAG<br>GTTCACCATCAGCAGGGACAACGCCAAGAACACCCTGTAC<br>CTGCAGCTGAACAGCCTGAAGACCGAGGACACCGCCATGT<br>ACTACTGCGCCAAGCACGTGACCGGCGACTACGACCCCAG<br>CCTGAGGTACGACTACAACTACTGGGGCCAGGGCACCCAG<br>GTGACCGTGAGCAGC | 246 |
| mgp130_VHH19 | CAGGTGCAGCTGCAGGAGAGCGGCGGCGGCAGCGTGCAGG<br>CCGGCGGCAGCCTGAGGCTGAGCTGCGGCATCAGCGGCTT<br>CACCTACAGGCCCACCTTCATGGGCTGGTTCAGGCAGGTG<br>CTGGGCAAGGAGAGGGAGGGCGTGGCCGCCATCAGCACCG<br>GCGGCGGCAGCAGCGTGTACGCCGACAGCGTGAAGGGCAG<br>GTTCACCGTGAGCCAGGACAGCAGCAAGAACACCGTGTAC<br>CTGGAGATGAACCGGCTGAAGCTGGAGGACACCGGCATGT<br>ACTACTGCGCCGCCAGCACCGTGATCACCAGCGTGAGCAT<br>CAACAGGGCCCTGTACCAGTACTGGGGCCAGGGCACCCAG<br>GTGACCGTGAGCAGC | 247 |
| mgp130_VHH20 | CAGGTGCAGCTGCAGGAGAGCGGCGGCGGCCTGGTGCAGC<br>CCGGCGGCAGCCTGAGGCTGAGCTGCGCCGCCAGCGGCTT<br>CACCTTCAGCAGCTACGCCGTGAGCTGGGTGAGGCAGGCC<br>CCCGGCAAGGGCCTGGAGTGGGTGAGCACCATCAACAGCG<br>GCGGCGGCAGCACCTACTACGCCGACAGCGTGAAGGGCAG<br>GTTCACCATCAGCAGGGACAACGCCAAGAACACCCTGTAC<br>CTGCAGCTGAACAGCCTGAAGACCGAGGACACCGCCATGT<br>ACTACTGCACCAAGCACGTGACCGGCGACTACGACCCCAG<br>CCTGAGGTACGAGTACAACGTGTGGAGCCAGGGCACCCAG<br>GTGACCGTGAGCAGC | 248 |
| mgp130_VHH21 | CAGGTGCAGCTGCAGGAGAGCGGCGGCGGCAGCGTGCAGG<br>CCGGCGGCAGCCTGAGGGTGAGCTGCCAGATCAGCGGCTT<br>CACCTACAGGCAGACCTTCATGGGCTGGTTCAGGCAGGTG<br>CCCGGCAAGGAGAGGGAGGGCGTGGCCGCCATCAGCACCG<br>GCGGCGGCAGCACCGTGTACGCCGACAGCGTGAAGGGCAG<br>GTTCACCATCAGCCAGGACAGCAGCAAGAACACCGTGTAC<br>CTGGAGATGAACCGGCTGAAGCTGGAGGACACCGGCATGT<br>ACTACTGCGCCGCCAGCACCGTGATCACCAGCCCCAGCAT<br>CAACAGGAACCTGTACCAGTACTGGGGCCAGGGCACCCAG<br>GTGACCGTGAGCAGC | 249 |
| mgp130_VHH22 | CAGGTGCAGCTGCAGGAGAGCGGCGGCGGCCTGGTGCAGC<br>CCGGCGGCAGCCTGAGGCTGAGCTGCGCCGTGAGCGGCTT<br>CACCTTCAGCAACTACGCCATGAAGTGGGTGAGGCAGGCC<br>CCCGGCAAGGGCCTGGAGTGGGTGAGCAGCATCAGCGGCG<br>GCGGCGGCGCCACCTACTACGCCGACAGCGTGAAGGGCAG<br>GTTCACCATCAGCAGGGACAACACCAAGAACACCCTGTAC<br>CTGCAGATGAACAGCCTGAAGACCGAGGACACCGCCGTGT<br>ACTACTGCGCCGCCCAGAACCTGGACTACAGGGGCCAGGG<br>CACCCAGGTGACCGTGAGCAGC | 250 |
| mgp130_VHH23 | CAGGTGCAGCTGCAGGAGAGCGGCGGCGGCCTGGTGCAGC<br>CCGGCGGCAGCCTGAGGCTGAGCTGCACCGCCAGCGGCTT<br>CACCTTCAACAGCGCCCACATGAAGTGGGAGAGGCAGCCC<br>CCCGGCAAGGGCCTGGAGTGGGTGAGCTTCATCACCCCCG | 251 |

TABLE 4-continued

DNA Sequences Encoding VHHs of Table 3.

| Name | DNA Sequence | SEQ ID NO. |
|---|---|---|
| | GCGGCGCCAGCACCGGCTACGCCGACAGCGTGAAGGGCAG<br>GTTCACCATCAGCAGGGACAACGCCAAGAACACCCTGTAC<br>CTGCAGATGAACAACCTGAAGACCGAGGACACCGCCGTGT<br>ACTACTGCGCCACCGGCGGCCTGAGGGGCCAGGGCACCCA<br>GGTGACCGTGAGCAGC | |
| mgp130_VHH24 | CAGGTGCAGCTGCAGGAGAGCGGCGGCGGCAGCGTGCAGG<br>CCCGGCGGCAGCCTGAGGCTGAGCTGCGTGATCAGCGGCTT<br>CACCTACAGGCCCACCTTCATGGGCTGGTTCAGGCAGGTG<br>CTGGGCAAGGAGAGGGAGGGCGTGGCCGCCATCACCACCG<br>GCGGCGGCAGCACCCTGTACGCCGACAGCGTGAAGGGCAG<br>GTTCACCATCAGCCAGGACAGCAGCAAGAACACCGTGTAC<br>CTGGAGATGAACGGCCTGAAGCTGGAGGACACCGGCATGT<br>ACTACTGCGCCGCCACCACCGTGATCACCAGCGTGAGCAT<br>CAACAGGAACCTGTACCAGTACTGGGGCCAGGGCACCCAG<br>GTGACCGTGAGCAGC | 252 |
| mgp130_VHH25 | CAGGTGCAGCTGCAGGAGAGCGGCGGCGGCAGCGTGCAGG<br>CCCGGCGGCAGCCTGAGGCTGAGCTGCGTGATCAGCGGCTT<br>CACCTACAAGCAGACCTTCATGGGCTGGTTCAGGCAGGTG<br>CCCGGCAAGGAGAGGGAGGGCGTGGCCGCCATCAGCACCG<br>GCGGCGGCAGCACCGTGTACGCCGACAGCGTGAAGGGCAG<br>GTTCACCATCAGCCAGGACAGCAGCAAGAACACCGTGTAC<br>CTGGAGATGAACGGCCTGAAGCTGGAGGACACCGGCATGT<br>ACTACTGCGCCGCCAGCACCGTGATCACCAGCGTGACCAT<br>CAACAGGGGCCTGTACCAGTACTGGGGCCAGGGCACCCAG<br>GTGACCGTGAGCAGC | 253 |
| mgp130_VHH26 | CAGGTGCAGCTGCAGGAGAGCGGCGGCGGCAGCGTGCAGG<br>CCCGGCGGCAGCCTGAGGCTGAGCTGCGTGATCAGCGGCTT<br>CGTGTACAAGCAGACCTTCATGGGCTGGTTCAGGCAGGTG<br>CCCGGCAAGGAGAGGGAGGGCGTGGCCGCCATCAGCACCG<br>GCGGCGGCAGCACCGTGTACGCCGACAGCGTGAAGGGCAG<br>GTTCACCATCAGCCAGGACAGCAGCAAGAACACCGTGTAC<br>CTGGAGATGAACGGCCTGAAGCTGGAGGACACCGGCATGT<br>ACTACTGCGCCGCCAGCACCGTGATCACCAGCGTGAGCAT<br>CAACAGGGGCCTGTACCAGTACTGGGGCCAGGGCACCCAG<br>GTGACCGTGAGCAGC | 254 |
| mgp130_VHH27 | CAGGTGCAGCTGCAGGAGAGCGGCGGCGGCAGCGTGCAGG<br>CCCGGCGGCAGCCTGAGGGTGAGCTGCGTGATCAGCGGCTT<br>CACCTACAGGCAGACCTTCATGGGCTGGTTCAGGCAGGTG<br>CCCGGCAAGGAGAGGGAGGGCGTGGCCGCCATCAGCACCG<br>GCGGCGGCAGCACCGTGTACGCCGACAGCGTGAAGGGCAG<br>GTTCACCATCAGCCAGGACAGCAGCAAGAACACCGTGTAC<br>CTGGAGATGAACGGCCTGAAGCTGGAGGACACCGGCATGT<br>ACTACTGCGCCGCCAGCACCGTGATCACCAGCGTGAGCAT<br>CAACAGGGGCCTGTACCAGTACTGGGGCCAGGGCACCCAG<br>GTGACCGTGAGCAGC | 255 |
| mgp130_VHH28 | CAGGTGCAGCTGCAGGAGAGCGGCGGCGGCCTGGTGCAGC<br>CCGGCGGCAGCCTGAGGCTGAGCTGCGCCGCCAGCGGCTT<br>CACCTTCAGCAGCTACGCCATGAGCTGGGTGAGGCAGGCC<br>CCCGGCAAGGGCCTGGAGTGGGTGAGCGCCATCAACAGCG<br>GCGGCGGCAGCACCTACTACGCCGACAGCGTGAAGGGCAG<br>GTTCACCATCAGCAGGGACAACGCCAAGAGCACCCTGTAC<br>CTGCAGCTGAACAGCCTGAAGACCGAGGACACCGCCATGT<br>ACTACTGCACCAAGCACGTGACCGGCGACTACGACCCCAG<br>CCTGAGGTACGAGTACAACTACTGGAGCCAGGGCACCCAG<br>GTGACCGTGAGCAGC | 256 |
| mgp130_VHH29 | CAGGTGCAGCTGCAGGAGAGCGGCGGCGGCCTGGTGCAGC<br>CCGGCGGCAGCCTGAGGCTGAGCTGCGCCGCCAGCGGCTT<br>CACCTTCAGCAGCTACGCCATGAGCTGGGTGAGGCAGGCC<br>CCCGGCAAGGGCCTGGAGTGGGTGAGCGCCATCAACAGCG<br>GCGGCGCCAGCACCTACTACGCCGACAGCGTGAAGGGCAG<br>GTTCACCATCAGCAGGGACAACGCCAAGAACACCCTGTAC<br>CTGCAGCTGAACAGCCTGAAGACCGAGGACACCGCCATGT<br>ACTGCTCGCCAAGCACGTGACCGGCGACTACGACCCCAG<br>CCTGAGGTACGAGTACAACTGCTGGGGCCCCGGCACCCAG<br>GTGACCGTGAGCAGC | 257 |
| mgp130_VHH30 | CAGGTGCAGCTGCAGGAGAGCGGCGGCGGCCTGGTGCAGC<br>CCGGCGGCAGCCTGAGGCTGAGCTGCGCCGCCAGCGGCTT<br>CACCTTCAGCAGCTACGCCATGAGCTGGGTGAGGCAGGCC<br>CCCGGCAAGGGCCTGGAGTGGGTGAGCGCCATCAACAGCG | 258 |

TABLE 4-continued

DNA Sequences Encoding VHHs of Table 3.

| Name | DNA Sequence | SEQ ID NO. |
|---|---|---|
| | GCGGCGGCAGCACCTACTACGCCGACAGCGTGAAGGGCAG<br>GTTCACCATCAGCAGGGACAACGCCAAGAACACCCTGTAC<br>CTGCAGCTGAACAGCCTGAAGACCGAGGACACCGCCATGT<br>ACTACTGCGCCAAGCACGTGACCGGCGACTACGACCCCAG<br>CCTGAGGTACGAGTACAACTACTGGAGCCAGGGCACCCAG<br>GTGACCGTGAGCAGC | |
| mgp130_VHH31 | CAGGTGCAGCTGCAGGAGAGCGGCGGCGGCAGCGTGCAGG<br>CCGGCGGCAGCCTGAGGCTGAGCTGCGTGATCAGCGGCTT<br>CACCTACAGGCAGACCTTCATGGGCTGGTTCAGGCAGGTG<br>GTGGGCAAGGAGAGGGAGGGCGTGGCCGCCATCAGCACCG<br>GCGGCGGCAGCACCGTGTACGCCGACAGCGTGAAGGGCAG<br>GTTCACCATCAGCCAGGACAGCAGCAAGGACACCGTGTAC<br>CTGGAGATGAACCGGCCTGAAGCTGGAGGACACCGGCATGT<br>ACTACTGCGCCGCCAGCACCGTGATCACCAGCGAGAGCAT<br>CAACAGGAACCTGTACCAGTACTGGGGCCAGGGCACCCAG<br>GTGACCGTGAGCAGC | 259 |
| mgp130_VHH32 | CAGGTGCAGCTGCAGGAGAGCGGCGGCGGCAGCGTGCAGG<br>CCGGCGGCAGCCTGAGGGTGAGCTGCGTGGTGAGCGGCTT<br>CACCTACAGGCAGACCTTCATGGGCTGGTTCAGGCAGGTG<br>CCCGGCAAGGAGAGGGAGGGCGTGGCCGCCATCAGCACCG<br>GCGGCGGCAGCACCGTGTACGCCGACAGCGTGAAGGGCAG<br>GTTCACCATCAGCCAGGACAGCAGCAAGAACACCGTGTAC<br>CTGGAGATGAACCGGCCTGAAGCTGGAGGACACCGGCATGT<br>ACTACTGCGCCGCCAGCACCGTGATCACCAGCGTGAGCAT<br>CAACAGGAACCTGTACCAGTACTGGGGCCAGGGCACCCAG<br>GTGACCGTGAGCAGC | 260 |
| mgp130_VHH33 | CAGGTGCAGCTGCAGGAGAGCGGCGGCGGCCTGGTGCAGC<br>CCGGCGGCAGCCTGAGGCTGAGCTGCGCCGCCAGCGGCTT<br>CACCTTCAGCAGCTACGCCATGAGCTGGGTGAGGCAGGCC<br>CCCGGCAAGGGCCTGGAGTGGGTGAGCGCCATCAACAGCG<br>GCGGCGGCAGCACCTACTACGCCGACAGCGTGAAGGGCAG<br>GTTCACCATCAGCAGGGACAACGCCAAGAACACCATGTAC<br>CTGCAGCTGAACAGCCTGAAGACCGAGGACACCGCCATGT<br>ACTACTGCGCCAAGCACGTGGCCGGCGACTACGACCCCAG<br>CCTGAGGTACGAGTGGCACGTGTGGGGCCAGGGCACCCAG<br>GTGACCGTGAGCAGC | 261 |
| mgp130_VHH34 | CAGGTGCAGCTGCAGGAGAGCGGCGGCGGCCTGGTGCAGC<br>CCGGCGGCAGCCTGAGGCTGAGCTGCGCCGCCAGCGGCTT<br>CACCTTCAGGAGCTACGCCATGAGCTGGGTGAGGCAGGCC<br>CCCGGCAAGGGCCTGGAGTGGGTGAGCGCCATCAACAGCG<br>GCGGCGGCAGCACCTACTACGCCGACAGCGTGAAGGCCAG<br>GTTCACCATCAGCAGGGACAACGCCAAGAACACCCTGTAC<br>CTGCAGCTGAACAGCCTGAAGACCGAGGACACCGCCATGT<br>ACTACTGCGCCAAGCACGTGACCGGCGACTACGACCCCAG<br>CCTGAGGTACGAGTACAACTACTGGGGCCAGGGCACCCAG<br>GTGACCGTGAGCAGC | 262 |
| mgp130_VHH35 | CAGGTGCAGCTGCAGGAGAGCGGCGGCGGCCTGGTGCAGC<br>CCGGCGGCAGCCTGAGGCTGAGCTGCGCCGCCAGCGGCTT<br>CACCTTCAGCAGCTACGCCATGAGCTGGGTGAGGCAGGCC<br>CCCGGCAAGGGCCTGGAGTGGGTGAGCGCCATCAACAGCG<br>GCGGCGGCAGCACCTACTACGCCGACAGCGTGAAGGGCAG<br>GTTCACCATCAGCAGGGACAACGCCAAGAACACCCTGTAC<br>CTGCAGCTGAACAGCCTGAAGACCGAGGACACCGCCATGT<br>ACTACTGCGCCAAGCACATCACCGGCGACTACGACCCCAG<br>CCTGAGGTACGAGTACAACTACTGGGGCCAGGGCACCCAG<br>GTGACCGTGAGCAGC | 263 |
| mgp130_VHH36 | CAGGTGCAGCTGCAGGAGAGCGGCGGCGGCAGCGTGCAGG<br>CCGGCGGCAGCCTGAGGCTGAGCTGCGTGATCAGCGGCTT<br>CACCTACAGGCAGACCTTCATGGGCTGGTTCAGGCAGGTG<br>GTGGGCAAGGAGAGGGAGGGCGTGGCCGCCATCAGCACCG<br>GCGGCGGCAGCATGGTGTACGCCGACAGCGTGAAGGGCAG<br>GTTCACCATCAGCCAGGACAGCAGCAAGGACACCGTGTAC<br>CTGGAGATGAACCGGCCTGAAGCTGGAGGACACCGGCATGT<br>ACTACTGCGCCGCCAGCACCGTGATCACCAGCGAGAGCAT<br>CAACAGGAACCTGTACCAGTACTGGGGCCAGGGCACCCAG<br>GTGACCGTGAGCAGC | 264 |
| mgp130_VHH37 | CAGGTGCAGCTGCAGGAGAGCGGCGGCGGCCCCGTGCAGG<br>CCGGCGGCAGCCTGAGGCTGAGCTGCGTGATCAGCGGCTT<br>CACCTACAGGCAGACCTTCATGGGCTGGTTCAGGCAGGTG | 265 |

TABLE 4-continued

DNA Sequences Encoding VHHs of Table 3.

| Name | DNA Sequence | SEQ ID NO. |
|---|---|---|
| | CCCGGCAAGGAGAGGGAGGGCGTGGCCGCCATCAGCACCG GCGGCGGCAGCACCGTGTACGCCGACAGCGTGAAGGGCAG GTTCACCATCAGCCAGGACAGCAGCAAGAACACCGTGTAC CTGGAGATGAACCGGCTGAAGCTGGAGGACACCGGCATGT ACTACTGCGCCGCCAGCACCGTGATCACCAGCGAGAGCAT CAACAGGGGCCTGTACCAGTACTGGGGCCAGGGCACCCAG GTGACCGTGAGCAGC | |
| mgp130_VHH38 | CAGGTGCAGCTGCAGGAGAGCGGCGGCGGCAGCGTGCAGG CCGGCGGCTTCCTGAGGCTGAGCTGCGCCTTCAGCGGCTA CACCGGCTGCATGGGCTGGTTCAGGCAGGGCCCCGGCCAG GAGAGGGAGGGCGTGGCCAGCATCAACGACGGCGGCAGCC TGACCTACTACGCCGACAGCGTGAAGGGCAGGTTCACCATCAG CAAGGACAACGCCAAGAAGACCCTGGACCTGCAGATGAAC ACCCTGAAGCCCGAGGACACCGCCATGTACTACTGCGCCG CCAGCCTGAGCTACTGCCTGAACCCCACCCTGAGGGTGGA CGGCTACAACTACTGGGGCCAGGGCACCCAGGTGACCGTG AGCAGC | 266 |
| mgp130_VHH39 | CAGGTGCAGCTGCAGGAGAGCGGCGGCGGCAGCGTGCAGG CCGGCGGCAGCCTGAGGCTGAGCTGCGTGATCAGCGGCCT GACCTACAAGCAGACCTTCATGGGCTGGTTCAGGCAGGTG CCCGGCAAGGAGAGGGAGGGCGTGGCCGCCATCAGCACCG GCGGCGGCAGCACCGTGTACGCCGACAGCGTGAAGGGCAG GTTCACCATCAGCCAGGACAACAGCAAGAACACCGTGTAC CTGGAGATGAACCGGCTGAAGCTGGAGGACACCGGCATGT ACTACTGCGCCGCCAGCACCGTGATCACCAGCGTGAGCAT CAACAGGTACCTGTACCAGTGGTGGGGCCAGGGCACCCAG GTGACCGTGAGCAGC | 267 |
| mgp130_VHH40 | CAGGTGCAGCTGCAGGAGAGCGGCGGCGGCCTGGTGCAGC CGGCGGCAGCCTGAGGCTGAGCTGCGCCGCCAGCGGCTT CACCTTCAGCAACTACGCCATGAGCTGGGTGAGGCAGGCC CCCGGCAAGGGCGTGGAGTGGGTGAGCGCCATCAACAGCG GCGGCAGCGTGTTCTACGCCGACAGCGTGAAGGGCAGGTT CACCATCAGCAGGGACAACGCCAAGAACACCCTGTACCTG CAGCTGAGCAGCCTGAAGACCGAGGACACCGCCATGTACT ACTGCGCCAAGCACGTGACCGGCGACTACGACCCCAGCCT GAGGTACGGCTACAACGTGTGGAGCCAGGGCACCCAGGTG ACCGTGAGCAGC | 268 |
| mgp130_VHH41 | CAGGTGCAGCTGCAGGAGAGCGGCGGCGGCAGCGTGCAGG CCGGCGGCAGCCTGAGGCTGAGCTGCGCGGCATCAGCGGCTT CACCTACAGGCCCACCTTCATGGGCTGGTTCAGGCAGGTG CTGGGCAAGGAGAGGGAGGGCGTGGCCGCCATCAGCACCG GCGGCGGCAGCACCGTGTACGCCGACAGCGTGAAGGGCAG GTTCACCATCAGCCAGGACAGCAGCAAGGACACCGTGTAC CTGGAGATGAACCGGCTGAAGCTGGAGGACACCGGCATGT ACTACTGCGCCGCCAGCACCGTGATCACCAGCGAGAGCAT CAACAGGAACCTGTACCAGTACTGGGGCCAGGGCACCCAG GTGACCGTGAGCAGC | 269 |
| mgp130_VHH42 | CAGGTGCAGCTGCAGGAGAGCGGCGGCGGCCTGGTGCAGC CGGCGGCAGCCTGAGGCTGAGCTGCGCCGCCAGCGGCTT CACCTTCAGCAGCTACGCCATGAGCTGGGTGAGGCAGGCC CCCGGCAAGGGCCTGGAGTGGGTGAGCGCCATCAACAGCG GCGGCGGCAGCACCTACTACGCCGACAGCGTGAAGGGCAG GTTCACCATCAGCAGGGACAACGCCAAGAACACCCTGTAC CTGCAGCTGAACAGCCTGAAGACCGAGGACACCGCCATGT ACTGCGCCAAGCACGTGACCGGCGACTACGACCCCAG CCTGAGGTACGGCTACAACGTGTGGAGCCAGGGCACCCAG GTGACCGTGAGCAGC | 270 |
| mgp130_VHH43 | CAGGTGCAGCTGCAGGAGAGCGGCGGCGGCCTGGTGCAGC CCGGCGGCAGCCTGAGGCTGAGCTGCGCCGCCAGCGGCTT CACCTTCAGCAGCTACGCCATGAGCTGGGTGAGGCAGGCC CCCGGCAAGGGCCTGGAGTGGGTGAGCGCCATCAACCTGG GCGGCGACACCACCTACTACACCGACAGCGTGAAGGGCAG GTTCACCATCAGCAGGGACAACGCCAAGAACACCCTGTAC CTGCAGCTGAACAGCCTGAAGACCGAGGACACCGCCATGT ACTACTGCGCCAAGCACGTGACCGGCGACTACGACCCCAG CCTGAGGTACGAGTACGGCTACTGGAGCCAGGGCACCCAG GTGACCGTGAGCAGC | 271 |
| mgp130_VHH44 | CAGGTGCAGCTGCAGGAGAGCGGCGGCGGCCTGGTGCAGC CCGGCGGCAGCCTGAGGCTGAGCTGCACCGCCAGCGGCTT | 272 |

TABLE 4-continued

DNA Sequences Encoding VHHs of Table 3.

| Name | DNA Sequence | SEQ ID NO. |
|---|---|---|
| | CACCTTCAACAGCGCCCACCTGAAGTGGGAGAGGCAGCCC CCCGGCAAGGGCCTGGAGTGGGTGAGCTTCATCACCAACG GCGGCGCCAGCACCGGCTACGCCGACAGCGTGAAGGGCAG GTTCACCATCAGCAGGGACGACGCCAAGAACACCCTGTAC CTGCAGATGAACAACCTGAAGACCGAGGACACCGCCGTGT ACTACTGCGCCACCGGCGGCCTGAGGGGCCAGGGCACCCA GGTGACCGTGAGCAGC | |
| mgp130_VHH45 | CAGGTGCAGCTGCAGGAGAGCGGCGGCGGCAGCGTGCAGG CCGGCGGCAGCCTGAGGGTGAGCTGCGTGATCAGCGGCTT CACCTACAGGCAGACCTTCATGGGCTGGTTCAGGCAGGTG CCCGGCAAGGAGAGGGAGGGCGTGGCCGCCATCAGCACCG GCGGCGGCAGCACCATCTACGCCAACAGCGTGAAGGGCAG GTTCACCATCAGCCAGGACAGCAGCAAGAACACCGTGTAC CTGGAGATGAACCGCCTGAAGCTGGAGGACACCGGCATGT ACTACTGCGCCGCCAGCACCGTGATCACCAGCGTGAGCAT CAACAGGGGCCTGTACCAGTACTGGGGCCAGGGCACCCAG GTGACCGTGAGCAGC | 273 |
| mgp130_VHH46 | CAGGTGCAGCTGCAGGAGAGCGGCGGCGGCCTGGTGCAGC CCGGCGGCAGCCTGAGGCTGAGCTGCGCCGCCAGCGGCTT CACCTTCAGCAGCTACGCCATGAGCTGGGTGAGGCAGGCC CCCGGCAAGGGCCTGGAGTGGGTGAGCGCCATCAACAGCG GCGGCGGCAGCACCTACTACGCCGACAGCGTGAAGGGCAG GTTCACCATCAGCAGGGACAACGCCAAGAACACCCTGTAC CTGCAGCTGAACAGCCTGAAGACCGAGGACACCGCCATGT ACTGCTGCGCCAAGCACATCACCGGCGACTACGACCCAG CCTGAGGTACGAGTACAACTGCTGGGGCCAGGGCACCCAG GTGACCGTGAGCAGC | 274 |
| mgp130_VHH47 | CAGGTGCAGCTGCAGGAGAGCGGCGGCGGCAGCGTGCAGG CCGGCGGCAGCCTGAGGCTGAGCTGCGTGATCAGCGGCTT CACCTACAAGCAGACCTTCATGGGCTGGTTCAGGCAGGTG CCCGGCAAGGAGAGGGAGGGCGTGGCCGCCATCAGCACCG GCGGCGGCAACACCGTGTACGCCGACAGCGTGAAGGGCAG GTTCACCATCAGCCAGGACAGCAGCAAGAACACCGTGTAC CTGGAGATGAACGGCCTGAAGCTGGAGGACACCGGCATGT ACTACTGCGCCGCCAGCACCGTGATCACCAGCGTGACCGT GAACAGGGGCCTGTACCAGTACTGGGGCCAGGGCACCCAG GTGACCGTGAGCAGC | 275 |
| mgp130_VHH48 | CAGGTGCAGCTGCAGGAGAGCGGCGGCGCCCTGGTGCAGC CCGGCGGCAGCCTGAGGCTGAGCTGCGCCGCCAGCGGCTT CACCTTCAGCTACTACGCCATGAAGTGGGTGAGGCAGGCC CCCGGCAAGGGCCTGGAGTGGGTGAGCAGCATCAGCGGCG GCGGCGGCGCCACCTACTACGCCGACAGCGTGAAGGGCAG GTTCACCATCAGCAGGGACAACACCAACGACACCCTGTAC CTGCAGATGAACAGCCTGAAGACCGAGGACACCGCCGTGT ACTACTGCGCCGCCCAGAACCTGGACTACAGGGGCCAGGG CACCCAGGTGACCGTGAGCAGC | 276 |
| mgp130_VHH49 | CAGGTGCAGCTGCAGGAGAGCGGCGGCGGCAGCGTGCAGG CCGGCGGCAGCCTGAGGCTGAGCTGCGTGATCAGCGGCTT CACCTACAAGCAGACCTTCATGGGCTGGTTCAGGCAGGTG CCCGGCAAGGAGAGGGAGGGCGTGGCCGCCATCAGCACCG GCGGCGGCAGCACCGTGTACGCCGACAGCGTGAAGGGCAG GTTCACCATCAGCCAGGAGAGCAGCAAGAACACCGTGTAC CTGGAGATGAACGGCCTGAAGCTGGAGGACACCGGCATGT ACTACTGCGCCGCCAGCACCGTGATCACCAGCGTGACCAT CAACAGGGGCCTGTACCAGTACTGGGGCCAGGGCACCCAG GTGACCGTGAGCAGC | 277 |

The disclosure further provides recombinant viral and non-viral vectors comprising a nucleic acid encoding the gp130 binding molecules of the present disclosure or the CDRs of the gp130 binding molecules of the present disclosure.

The disclosure further provides host cells comprising recombinant viral and non-viral vectors comprising a nucleic acid the gp130 binding molecules of the present disclosure or the CDRs of the gp130 binding molecules of the present disclosure.

The disclosure further provides host cells comprising recombinant viral and non-viral vectors comprising a nucleic acid the gp130 binding molecules of the present disclosure or the CDRs of the gp130 binding molecules of the present disclosure.

The disclosure further provides pharmaceutical formulations comprising the recombinant viral and non-viral vectors comprising a nucleic acid the gp130 binding molecules of the present disclosure and methods of use thereof in the treatment or prevention of diseases, disorders or conditions in a mammalian subject.

The disclosure further kits comprising the gp130 binding molecules of the present disclosure.

In another aspect, the present disclosure provides constructs for the targeted delivery of therapeutic agents to a cell expressing the gp130 receptor, wherein the gp130 binding molecule is conjugated to one or more therapeutic agents, optionally through a chemical or polypeptide linker. The disclosure further provides methods of use of the foregoing in the treatment of disease associated with expression of the gp130 in a subject, the method comprising the administration of a therapeutically effective amount of the gp130 binding molecule conjugated to the therapeutic agent to a subject in need to treatment, alone or in combination with one or more additional therapeutic agents. In some embodiments, the diseases amenable to treatment are diseases, disorders or conditions associated with signaling from receptor comprising the gp130. In some embodiments, the gp130 binding molecules of the present disclosure are useful in the treatment of diseases associated with dysregulated T cell or B cell activity. In some embodiments, the gp130 binding molecules of the present disclosure are useful in the treatment of inflammatory and autoimmune diseases. In some embodiments, the gp130 binding molecules of the present disclosure are useful in the treatment of neoplastic diseases associated with aberrant cell activity arising from dysregulated signaling in cells expressing the gp130.

In another aspect, the present disclosure provides constructs for the identification of cells expressing the gp130 receptor wherein the gp130 binding molecule is conjugated to one or more imaging agents, optionally through a chemical or polypeptide linker. The disclosure further provides methods of use of the foregoing in the identification of cells expressing the gp130 receptor in a subject, the method comprising the administration of an effective amount of the gp130 binding molecule conjugated to the imaging agent to a subject in need to treatment and evaluating the subject for the presence of the imaging agent that is conjugated to the gp130 binding molecule.

In some embodiments, the gp130 binding molecules of the present disclosure are useful to inhibit the activity of interferon gamma in vitro and/or in vivo. In some embodiments, the IFNgR1 binding molecules of the present disclosure are useful in the treatment of autoimmune diseases. The disclosure further provides methods of use of the foregoing in the treatment of an autoimmune disease in a subject, the method comprising administering to the subject a therapeutically effective amount gp130 binding molecule of the present disclosure. In some embodiments, gp130 binding molecule of the present disclosure may be used alone or in combination with one or more supplementary therapeutic agents. In some embodiments, the diseases amenable to treatment are diseases, disorders or conditions associated with signaling from receptor comprising the gp130. In some embodiments, the gp130 binding molecules of the present disclosure are useful in the treatment of diseases associated with dysregulated T cell or B cell activity. In some embodiments, the gp130 binding molecules of the present disclosure are useful in the treatment of autoimmune diseases. In some embodiments, the gp130 binding molecules of the present disclosure are useful in the treatment of neoplastic diseases. In some embodiments, the gp130 binding molecule of the present disclosure is administered to a subject in a pharmaceutically acceptable formulation. In some embodiments, the gp130 binding molecule of the present disclosure is administered by the administration to the subject of a composition comprising a recombinant viral or non-viral vector comprising a nucleic acid sequence encoding the gp130 binding molecule of the present disclosure.

In another aspect, the present disclosure provides gp130 binding molecules which have been modified for extended duration of action in vivo wherein the gp130 binding molecule is conjugated to one or more carrier molecules.

The present disclosure provides gp130 binding molecules comprising a polypeptide sequence that specifically binds to the extracellular domain of the gp130 and methods of use thereof in the isolation, depletion or enrichment of cells expressing the gp130 cells a biological sample.

DETAILED DESCRIPTION OF THE INVENTION

Introduction

In order for the present disclosure to be more readily understood, certain terms and phrases are defined below as well as throughout the specification. The definitions provided herein are non-limiting and should be read in view of the knowledge of one of skill in the art would know.

Before the present methods and compositions are described, it is to be understood that this disclosure is not limited to particular method or composition described, as such may, of course, vary.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited.

It should be noted that as used herein and in the appended claims, the singular forms "a", "an", and "the" include plural referents unless the context clearly dictates otherwise. Thus, for example, reference to "a cell" includes a plurality of such cells and reference to "the peptide" includes reference to one or more peptides and equivalents thereof, e.g., polypeptides, known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

It will be appreciated that throughout this disclosure reference is made to amino acids according to the single letter or three letter codes. For the reader's convenience, the single and three letter amino acid codes are provided in Table 5 below:

TABLE 5

Amino Acid Abbreviations

| Single Letter Abbreviation | Name | 3-letter abbreviation |
|---|---|---|
| G | Glycine | Gly |
| P | Proline | Pro |
| A | Alanine | Ala |
| V | Valine | Val |
| L | Leucine | Leu |
| I | Isoleucine | Ile |
| M | Methionine | Met |
| C | Cysteine | Cys |
| F | Phenylalanine | Phe |
| Y | Tyrosine | Tyr |
| W | Tryptophan | Trp |
| H | Histidine | His |
| K | Lysine | Lys |
| R | Arginine | Arg |
| Q | Glutamine | Gln |
| N | Asparagine | Asn |
| E | Glutamic Acid | Glu |
| D | Aspartic Acid | Asp |
| S | Serine | Ser |
| T | Threonine | Thr |

Standard methods in molecular biology are described in the scientific literature (see, e.g., Sambrook and Russell (2001) Molecular Cloning, 3rd ed., Cold Spring Harbor Laboratory Press, Cold Spring Harbor, N.Y.; and Ausubel, et al. (2001) Current Protocols in Molecular Biology, Vols. 1-4, John Wiley and Sons, Inc. New York, N.Y., which describes cloning in bacterial cells and DNA mutagenesis (Vol. 1), cloning in mammalian cells and yeast (Vol. 2), glycoconjugates and protein expression (Vol. 3), and bioinformatics (Vol. 4)). The scientific literature describes methods for protein purification, including immunoprecipitation, chromatography, electrophoresis, centrifugation, and crystallization, as well as chemical analysis, chemical modification, post-translational modification, production of fusion proteins, and glycosylation of proteins (see, e.g., Coligan, et al. (2000) Current Protocols in Protein Science, Vols. 1-2, John Wiley and Sons, Inc., NY).

Definitions

Unless otherwise indicated, the following terms are intended to have the meaning set forth below. Other terms are defined elsewhere throughout the specification.

Activate: As used herein the term "activate" is used in reference to a receptor or receptor complex to reflect a biological effect, directly and/or by participation in a multicomponent signaling cascade, arising from the binding of an agonist ligand to a receptor responsive to the binding of the ligand.

Activity: As used herein, the term "activity" is used with respect to a molecule to describe a property of the molecule with respect to a test system (e.g., an assay) or biological or chemical property (e.g., the degree of binding of the molecule to another molecule) or of a physical property of a material or cell (e.g., modification of cell membrane potential). Examples of such biological functions include but are not limited to catalytic activity of a biological agent, the ability to stimulate intracellular signaling, gene expression, cell proliferation, the ability to modulate immunological activity such as inflammatory response. "Activity" is typically expressed as a level of a biological activity per unit of agent tested such as [catalytic activity]/[mg protein], [immunological activity]/[mg protein], international units (IU) of activity, [STAT5 phosphorylation]/[mg protein], [proliferation]/[mg protein], plaque forming units (pfu), etc. As used herein, the term proliferative activity refers to an activity that promotes cell proliferation and replication, including dysregulated cell division such as that observed in neoplastic diseases, inflammatory diseases, fibrosis, dysplasia, cell transformation, metastasis, and angiogenesis.

Administer/Administration: The terms "administration" and "administer" are used interchangeably herein to refer the act of contacting a subject, including contacting a cell, tissue, organ, or biological fluid of the subject in vitro, in vivo or ex vivo with an agent (e.g., an a gp130 binding molecule or an engineered cell expressing an gp130 binding molecule, a chemotherapeutic agent, an antibody, or a pharmaceutical formulation comprising one or more of the foregoing). Administration of an agent may be achieved through any of a variety of art recognized methods including but not limited to the topical administration, intravascular injection (including intravenous or intraarterial infusion), intradermal injection, subcutaneous injection, intramuscular injection, intraperitoneal injection, intracranial injection, intratumoral injection, transdermal, transmucosal, iontophoretic delivery, intralymphatic injection, intragastric infusion, intraprostatic injection, intravesical infusion (e.g., bladder), inhalation (e.g respiratory inhalers including dry-powder inhalers), intraocular injection, intraabdominal injection, intralesional injection, intraovarian injection, intracerebral infusion or injection, intracerebroventricular injection (ICVI), and the like. The term "administration" includes contact of an agent to the cell, tissue or organ as well as the contact of an agent to a fluid, where the fluid is in contact with the cell, tissue or organ.

Affinity: As used herein the term "affinity" refers to the degree of specific binding of a first molecule (e.g., a ligand) to a second molecule (e.g., a receptor) and is measured by the equilibrium dissociation constant $K_D$, a ratio of the dissociation rate constant between the molecule and the its target ($k_{off}$) and the association rate constant between the molecule and its target ($k_{on}$).

Agonist: As used herein, the term "agonist" refers a first agent that specifically binds a second agent ("target") and interacts with the target to cause or promote an increase in the activation of the target. In some instances, agonists are activators of receptor proteins that modulate cell activation, enhance activation, sensitize cells to activation by a second agent, or up-regulate the expression of one or more genes, proteins, ligands, receptors, biological pathways, that may result in cell proliferation or pathways that result in cell cycle arrest or cell death such as by apoptosis. In some embodiments, an agonist is an agent that binds to a receptor and alters the receptor state resulting in a biological response that mimics the effect of the endogenous ligand of the receptor. The term "agonist" includes partial agonists, full agonists and superagonists. An agonist may be described as a "full agonist" when such agonist which leads to a substantially full biological response (i.e. the response associated with the naturally occurring ligand/receptor binding interaction) induced by receptor under study, or a partial agonist. A "superagonist" is a type of agonist that can produce a maximal response greater than the endogenous agonist for the target receptor, and thus has an activity of more than 100% of the native ligand. A super agonist is typically a synthetic molecule that exhibits greater than 110%, alternatively greater than 120%, alternatively greater than 130%, alternatively greater than 140%, alternatively greater than 150%, alternatively greater than 160%, or alternatively greater than 170% of the response in an evaluable quantitative or qualitative parameter of the naturally occurring form of the molecule when evaluated at similar concentrations in a comparable assay. It should be noted that the biological effects associated with the full agonist may differ in degree and/or in kind from those biological effects of partial or superagonists. In contrast to agonists, antagonists may specifically bind to a receptor but do not result the signal cascade typically initiated by the receptor and may to modify the actions of an agonist at that receptor. Inverse agonists are agents that produce a pharmacological response that is opposite in direction to that of an agonist.

Antagonist: As used herein, the term "antagonist" or "inhibitor" refers a molecule that opposes the action(s) of an agonist. An antagonist prevents, reduces, inhibits, or neutralizes the activity of an agonist, and an antagonist can also prevent, inhibit, or reduce constitutive activity of a target, e.g., a target receptor, even where there is no identified agonist. Inhibitors are molecules that decrease, block, prevent, delay activation, inactivate, desensitize, or down-regulate, e.g., a gene, protein, ligand, receptor, biological pathway including an immune checkpoint pathway, or cell.

Antibody: As used herein, the term "antibody" refers collectively to: (a) a glycosylated or non-glycosylated immunoglobulin that specifically binds to target molecule, and (b) immunoglobulin derivatives thereof, including but not limited to antibody fragments such as single domain antibodies. In some embodiments the immunoglobulin derivative competes with the immunoglobulin from which it was derived for binding to the target molecule. The term antibody is not restricted to immunoglobulins derived from any particular species and includes murine, human, equine, camelids, antibodies of cartilaginous fishes including, but not limited to, sharks. The term "antibody" encompasses antibodies isolatable from natural sources or from animals following immunization with an antigen and as well as engineered antibodies including monoclonal antibodies, bispecific antibodies, tri-specific, chimeric antibodies, humanized antibodies, human antibodies, CDR-grafted, veneered, or deimmunized (e.g., to remove T-cell epitopes) antibodies, camelized (in the case of VHHs), or molecules comprising binding domains of antibodies (e.g., CDRs) in non-immunoglobulin scaffolds. The term "antibody" should not be construed as limited to any particular means of synthesis and includes naturally occurring antibodies isolatable from natural sources and as well as engineered antibodies molecules that are prepared by "recombinant" means including antibodies isolated from transgenic animals that are transgenic for human immunoglobulin genes or a hybridoma prepared therefrom, antibodies isolated from a host cell transformed with a nucleic acid construct that results in expression of an antibody, antibodies isolated from a combinatorial antibody library including phage display libraries. In one embodiment, an "antibody" is a mammalian immunoglobulin of the IgG1, IgG2, IgG3 or IgG4 class. In some embodiments, the antibody is a "full length antibody" comprising variable and constant domains providing binding and effector functions. The term "single domain antibody" (sdAb) as used herein refers an antibody fragment consisting of a monomeric variable antibody domain that is able to bind specifically to an antigen and compete for binding with the parent antibody from which it is derived. The term "single domain antibody" includes scFv and VHH molecules. As used herein, the term "VHH" refers to a single domain antibody derived from camelid antibody typically obtained from immunization of camelids (including camels, llamas and alpacas (see, e.g., Hamers-Casterman, et al. (1993) Nature 363:446-448). VHHs are also referred to as heavy chain antibodies or Nanobodies® as Single domain antibodies may also be derived from non-mammalian sources such as VHHs obtained from IgNAR antibodies immunization of cartilaginous fishes including, but not limited to, sharks.

Biological Sample: As used herein, the term "biological sample" or "sample" refers to a sample obtained (or derived) from a subject. By way of example, a biological sample comprises a material selected from the group consisting of body fluids, blood, whole blood, plasma, serum, mucus secretions, saliva, cerebrospinal fluid (CSF), bronchoalveolar lavage fluid (BALF), fluids of the eye (e.g., vitreous fluid, aqueous humor), lymph fluid, lymph node tissue, spleen tissue, bone marrow, tumor tissue, including immunoglobulin enriched or cell-type specific enriched fractions derived from one or more of such tissues.

gp130 cell: The terms "gp130 cell", "gp130-expressing cell", "gp130-positive cell" and "gp130+" cell are used interchangeably herein to refer to a cell which expresses and displays the gp130 antigen on the extracellular surface of the cell membrane. Similarly, the terms "gp130-negative cell", "gp130– cells" as are used interchangeably herein to describe cells which do not express or display gp130 antigen on the cell surface.

CDR: As used herein, the term "CDR" or "complementarity determining region" is intended to mean the non-contiguous antigen combining sites found within the variable region of both heavy and light chain immunoglobulin polypeptides. CDRs have been described by Kabat et al., *J. Biol. Chem.* 252:6609-6616 (1977); Kabat, et al., U.S. Dept. of Health and Human Services publication entitled "Sequences of proteins of immunological interest" (1991) (also referred to herein as "Kabat 1991" or "Kabat"); by Chothia, et al. (1987) J. Mol. Biol. 196:901-917 (also referred to herein as "Chothia"); and MacCallum, et al. (1996) J. Mol. Biol. 262:732-745, where the definitions include overlapping or subsets of amino acid residues when compared against each other. Nevertheless, application of either definition to refer to a CDR of an antibody or grafted antibodies or variants thereof is intended to be within the scope of the term as defined and used herein. In the context of the present disclosure, unless otherwise specified, the numbering of the CDR positions is provided according to the Kabat numbering convention or a hybrid of Kabat and Chothia numbering conventions.

Comparable: As used herein, the term "comparable" is used to describe the degree of difference in two measurements of an evaluable quantitative or qualitative parameter. For example, where a first measurement of an evaluable quantitative parameter and a second measurement of the evaluable parameter do not deviate beyond a range that the skilled artisan would recognize as not producing a statistically significant difference in effect between the two results in the circumstances, the two measurements would be considered "comparable." In some instances, measurements may be considered "comparable" if one measurement deviates from another by less than 35%, alternatively by less than 30%, alternatively by less than 25%, alternatively by less than 20%, alternatively by less than 15%, alternatively by less than 10%, alternatively by less than 7%, alternatively by less than 5%, alternatively by less than 4%, alternatively by less than 3%, alternatively by less than 2%, or by less than 1%. In particular embodiments, one measurement is comparable to a reference standard if it deviates by less than 15%, alternatively by less than 10%, or alternatively by less than 5% from the reference standard.

Conservative Amino Acid Substitution: As used herein, the term "conservative amino acid substitution" refers to an amino acid replacement that changes a given amino acid to a different amino acid with similar biochemical properties (e.g., charge, hydrophobicity, and size). For example, the amino acids in each of the following groups can be considered as conservative amino acids of each other: (1) hydrophobic amino acids: alanine, isoleucine, leucine, tryptophan, phenylalanine, valine, proline, and glycine; (2) polar amino acids: glutamine, asparagine, histidine, serine, threonine, tyrosine, methionine, and cysteine; (3) basic amino acids: lysine and arginine; and (4) acidic amino acids: aspartic acid and glutamic acid.

Derived From: As used herein in the term "derived from", in the context of an amino acid sequence is meant to indicate that the polypeptide or nucleic acid has a sequence that is based on that of a reference polypeptide or nucleic acid and is not meant to be limiting as to the source or method in which the protein or nucleic acid is made. By way of example, the term "derived from" includes homologs or variants of reference amino acid or DNA sequences.

Effective Concentration (EC): As used herein, the terms "effective concentration" or its abbreviation "EC" are used interchangeably to refer to the concentration of an agent in an amount sufficient to effect a change in a given parameter in a test system. The abbreviation "E" refers to the magnitude of a given biological effect observed in a test system when that test system is exposed to a test agent. When the magnitude of the response is expressed as a factor of the concentration ("C") of the test agent, the abbreviation "EC" is used. In the context of biological systems, the term Emax refers to the maximal magnitude of a given biological effect observed in response to a saturating concentration of an activating test agent. When the abbreviation EC is provided with a subscript (e.g., $EC_{40}$, $EC_{50}$, etc.) the subscript refers to the percentage of the Emax of the biological response observed at that concentration. For example, the concentration of a test agent sufficient to result in the induction of a measurable biological parameter in a test system that is 30% of the maximal level of such measurable biological parameter in response to such test agent, this is referred to as the "$EC_{30}$" of the test agent with respect to such biological parameter. Similarly, the term "$EC_{100}$" is used to denote the effective concentration of an agent that results the maximal (100%) response of a measurable parameter in response to such agent. Similarly, the term $EC_{50}$ (which is commonly used in the field of pharmacodynamics) refers to the concentration of an agent sufficient to results in the half-maximal (about 50%) change in the measurable parameter. The term "saturating concentration" refers to the maximum possible quantity of a test agent that can dissolve in a standard volume of a specific solvent (e.g., water) under standard conditions of temperature and pressure. In pharmacodynamics, a saturating concentration of a drug is typically used to denote the concentration sufficient of the drug such that all available receptors are occupied by the drug, and $EC_{50}$ is the drug concentration to give the half-maximal effect.

Enriched: As used herein in the term "enriched" refers to a sample that is non-naturally manipulated so that a species (e.g., a molecule or cell) of interest is present in: (a) a greater concentration (e.g., at least 3-fold greater, alternatively at least 5-fold greater, alternatively at least 10-fold greater, alternatively at least 50-fold greater, alternatively at least 100-fold greater, or alternatively at least 1000-fold greater) than the concentration of the species in the starting sample, such as a biological sample (e.g., a sample in which the molecule naturally occurs or in which it is present after administration); or (b) a concentration greater than the environment in which the molecule was made (e.g., a recombinantly modified bacterial or mammalian cell).

Extracellular Domain: As used herein the term "extracellular domain" or its abbreviation "ECD" refers to the portion of a cell surface protein (e.g., a cell surface receptor) which is external to of the plasma membrane of a cell. The cell surface protein may be transmembrane protein, a cell surface or membrane associated protein.

Identity: The term "identity," as used herein in reference to polypeptide or DNA sequences, refers to the subunit sequence identity between two molecules. When a subunit position in both of the molecules is occupied by the same monomeric subunit (i.e., the same amino acid residue or nucleotide), then the molecules are identical at that position. The similarity between two amino acid or two nucleotide sequences is a direct function of the number of identical positions. In general, the sequences are aligned so that the highest order match is obtained. If necessary, identity can be calculated using published techniques and widely available computer programs, such as BLAST 2.0 algorithms, which are described in Altschul et al. (1990) *J. Mol. Biol.* 215: 403-410 and Altschul, et al. (1977) *Nucleic Acids Res.* 25: 3389-3402. Software for performing BLAST analyses is publicly available through the National Center for Biotechnology Information (NCBI) web site. The algorithm involves first identifying high scoring sequence pairs (HSPs) by identifying short words of length W of the query sequence, which either match or satisfy some positive-valued threshold score "T" when aligned with a word of the same length in a database sequence. T is referred to as the neighborhood word score threshold (Altschul, et al., supra). These initial neighborhood word hits act as seeds for initiating searches to find longer HSPs containing them. The word hits are then extended in both directions along each sequence for as far as the cumulative alignment score can be increased. Cumulative scores are calculated using, for nucleotide sequences, the parameters "M" (the reward score for a pair of matching residues; always >0) and "N" (the penalty score for mismatching residues; always <0). For amino acid sequences, a scoring matrix is used to calculate the cumulative score. Extension of the word hits in each direction are halted when: (a) the cumulative alignment score falls off by the quantity X from its maximum achieved value; the cumulative score goes to zero or below, due to the accumulation of one or more negative-scoring residue alignments; or (b) the end of either sequence is reached. The BLAST algorithm parameters "W", "T", and "X" determine the sensitivity and speed of the alignment. The BLASTN program (for nucleotide sequences) functions similarly but uses as defaults a word size ("W") of 28, an expectation ("E") of 10, M=1, N=-2, and a comparison of both strands. For amino acid sequences, the BLASTP program uses as defaults a word size (W) of 3, an expectation (E) of 10, and the BLOSUM62 scoring matrix (see Henikoff & Henikoff, (1989) PNAS(USA) 89:10915-10919).

In An Amount Sufficient Amount to Cause a Response: As used herein the phrase "in an amount sufficient to cause a response" is used in reference to the amount of a test agent sufficient to provide a detectable change in the level of an indicator measured before (e.g., a baseline level) and after the application of a test agent to a test system. In some embodiments, the test system is a cell, tissue or organism. In some embodiments, the test system is an in vitro test system such as a fluorescent assay. In some embodiments, the test system is an in vivo system which involves the measurement of a change in the level a parameter of a cell, tissue, or organism reflective of a biological function before and after the application of the test agent to the cell, tissue, or organism. In some embodiments, the indicator is reflective of biological function or state of development of a cell evaluated in an assay in response to the administration of a quantity of the test agent. In some embodiments, the test system involves the measurement of a change in the level an indicator of a cell, tissue, or organism reflective of a biological condition before and after the application of one or more test agents to the cell, tissue, or organism. The term "in an amount sufficient to effect a response" may be sufficient to be a therapeutically effective amount but may also be more or less than a therapeutically effective amount.

In Combination With: As used herein, the term "in combination with" when used in reference to the administration of multiple agents to a subject refers to the administration of a first agent at least one additional (i.e. second, third, fourth, fifth, etc.) agent to a subject. For purposes of the present invention, one agent (e.g., gp130 binding molecule) is considered to be administered in combination with a second agent (e.g., a modulator of an immune checkpoint pathway) if the biological effect resulting from the administration of the first agent persists in the subject at the time of administration of the second agent such that the therapeutic effects of the first agent and second agent overlap. For example, the PD1 immune checkpoint inhibitors (e.g., nivolumab or pembrolizumab) are typically administered by IV infusion every two weeks or every three weeks while the gp130 binding molecules of the present disclosure are typically administered more frequently, e.g., daily, BID, or weekly. However, the administration of the first agent (e.g., pembrolizumab) provides a therapeutic effect over an extended time and the administration of the second agent (e.g., an gp130 binding molecule) provides its therapeutic effect while the therapeutic effect of the first agent remains ongoing such that the second agent is considered to be administered in combination with the first agent, even though the first agent may have been administered at a point in time significantly distant (e.g., days or weeks) from the time of administration of the second agent. In one embodiment, one agent is considered to be administered in combination with a second agent if the first and second agents are administered simultaneously (within 30 minutes of each other), contemporaneously or sequentially. In some embodiments, a first agent is deemed to be administered "contemporaneously" with a second agent if first and second agents are administered within about 24 hours of each another, preferably within about 12 hours of each other, preferably within about 6 hours of each other, preferably within about 2 hours of each other, or preferably within about 30 minutes of each other. The term "in combination with" shall also understood to apply to the situation where a first agent and a second agent are co-formulated in single pharmaceutically acceptable formulation and the co-formulation is administered to a subject. In certain embodiments, the gp130 binding molecule and the supplementary agent(s) are administered or applied sequentially, e.g., where one agent is administered prior to one or more other agents. In other embodiments, the gp130 binding molecule and the supplementary agent(s) are administered simultaneously, e.g., where two or more agents are administered at or about the same time; the two or more agents may be present in two or more separate formulations or combined into a single formulation (i.e., a co-formulation). Regardless of whether the agents are administered sequentially or simultaneously, they are considered to be administered in combination for purposes of the present disclosure.

In Need of Treatment: The term "in need of treatment" as used herein refers to a judgment made by a physician or other caregiver with respect to a subject that the subject requires or will potentially benefit from treatment. This judgment is made based on a variety of factors that are in the realm of the physician's or caregiver's expertise.

In Need of Prevention: As used herein the term "in need of prevention" refers to a judgment made by a physician or other caregiver with respect to a subject that the subject requires or will potentially benefit from preventative care. This judgment is made based upon a variety of factors that are in the realm of a physician's or caregiver's expertise.

Inhibitor: As used herein the term "inhibitor" refers to a molecule that decreases, blocks, prevents, delays activation of, inactivates, desensitizes, or down-regulates, e.g., a gene, protein, ligand, receptor, or cell. An inhibitor can also be defined as a molecule that reduces, blocks, or inactivates a constitutive activity of a cell or organism.

Intracellular Domain: As used herein the term "intracellular domain" or its abbreviation "ICD" refers to the portion of a cell surface protein (e.g., a cell surface receptor) which is inside of the plasma membrane of a cell. The ICD may include the entire cytoplasmic portion of a transmembrane protein or membrane associated protein, or intracellular protein.

Isolated: As used herein the term "isolated" is used in reference to a polypeptide of interest that, if naturally occurring, is in an environment different from that in which it can naturally occur. "Isolated" is meant to include polypeptides that are within samples that are substantially enriched for the polypeptide of interest and/or in which the polypeptide of interest is partially or substantially purified. Where the polypeptide is not naturally occurring, "isolated" indicates that the polypeptide has been separated from an environment in which it was synthesized, for example isolated from a recombinant cell culture comprising cells engineered to express the polypeptide or by a solution resulting from solid phase synthetic means.

Kabat Numbering: The term "Kabat numbering" as used herein is recognized in the art and refers to a system of numbering amino acid residues which are more variable than other amino acid residues (e.g., hypervariable) in the heavy and light chain regions of immunoglobulins (Kabat, et al., (1971) *Ann. NY Acad. Sci.* 190:382-93; Kabat, et al., (1991) *Sequences of Proteins of Immunological Interest*, Fifth Edition, U.S. Department of Health and Human Services, NIH Publication No. 91-3242). The term "Chothia Numbering" as used herein is recognized in the arts and refers to a system of numbering amino acid residues based on the location of the structural loop regions (Chothia et al. 1986, Science 233:755-758; Chothia & Lesk 1987, JMB 196:901-917; Chothia et al. 1992, JMB 227:799-817). For purposes of the present disclosure, unless otherwise specifically identified, t the positioning of CDRs2 and 3 in the variable region of an antibody follows Kabat numbering or simply, "Kabat." The positioning of CDR1 in the variable region of an antibody follows a hybrid of Kabat and Chothia numbering schemes.

Ligand: As used herein, the term "ligand" refers to a molecule that specifically binds a receptor and causes a change in the receptor so as to effect a change in the activity of the receptor or a response in cell that expresses that receptor. In one embodiment, the term "ligand" refers to a molecule or complex thereof that can act as an agonist or antagonist of a receptor. As used herein, the term "ligand" encompasses natural and synthetic ligands. "Ligand" also encompasses small molecules, peptide mimetics of cytokines and antibodies. The complex of a ligand and receptor is termed a "ligand-receptor complex." A ligand may comprise one domain of a polyprotein or fusion protein (e.g., either domain of an antibody/ligand fusion protein).

Modulate: As used herein, the terms "modulate", "modulation" and the like refer to the ability of a test agent to cause a response, either positive or negative or directly or indirectly, in a system, including a biological system, or biochemical pathway. The term modulator includes both agonists (including partial agonists, full agonists and superagonists) and antagonists.

Nucleic Acid: The terms "nucleic acid", "nucleic acid molecule", "polynucleotide" and the like are used interchangeably herein to refer to a polymeric form of nucleotides of any length, either deoxyribonucleotides or ribonucleotides, or analogs thereof. Non-limiting examples of polynucleotides include linear and circular nucleic acids, messenger RNA (mRNA), complementary DNA (cDNA), recombinant polynucleotides, vectors, probes, primers and the like.

Operably Linked: The term "operably linked" is used herein to refer to the relationship between molecules, typically polypeptides or nucleic acids, which are arranged in a construct such that each of the functions of the component molecules is retained although the operable linkage may result in the modulation of the activity, either positively or negatively, of the individual components of the construct. For example, the operable linkage of a polyethylene glycol (PEG) molecule to a wild-type protein may result in a construct where the biological activity of the protein is diminished relative to the to the wild-type molecule, however the two are nevertheless considered operably linked. When the term "operably linked" is applied to the relationship of multiple nucleic acid sequences encoding differing functions, the multiple nucleic acid sequences when combined into a single nucleic acid molecule that, for example, when introduced into a cell using recombinant technology, provides a nucleic acid which is capable of effecting the transcription and/or translation of a particular nucleic acid sequence in a cell. For example, the nucleic acid sequence encoding a signal sequence may be considered operably linked to DNA encoding a polypeptide if it results in the expression of a preprotein whereby the signal sequence facilitates the secretion of the polypeptide; a promoter or enhancer is considered operably linked to a coding sequence if it affects the transcription of the sequence; or a ribosome binding site is considered operably linked to a coding sequence if it is positioned so as to facilitate translation. Generally, in the context of nucleic acid molecules, the term "operably linked" means that the nucleic acid sequences being linked are contiguous, and, in the case of a secretory leader or associated subdomains of a molecule, contiguous and in reading phase. However, certain genetic elements such as enhancers may function at a distance and need not be contiguous with respect to the sequence to which they provide their effect but nevertheless may be considered operably linked.

Parent Polypeptide: As used herein, the terms "parent polypeptide" or "parent protein" are used interchangeably to designate the source of a second polypeptide (e.g., a derivative, mutein or variant) which is modified with respect to a first "parent" polypeptide. In some instances, the parent polypeptide is a wild-type or naturally occurring form of a protein. In some instance, the parent polypeptide may be a modified form a naturally occurring protein that is further modified. The term "parent polypeptide" may refer to the polypeptide itself or compositions that comprise the parent polypeptide (e.g., glycosylated or PEGylated forms and/or fusion proteins comprising the parent polypeptide).

Partial Agonist: As used herein, the term "partial agonist" refers to a molecule that specifically binds that bind to and activate a given receptor but possess only partial activation the receptor relative to a full agonist. Partial agonists may display both agonistic and antagonistic effects. For example, when both a full agonist and partial agonist are present, the partial agonist acts as a competitive antagonist by competing with the full agonist for the receptor binding resulting in net decrease in receptor activation relative to the contact of the receptor with the full agonist in the absence of the partial agonist. Partial agonists can be used to activate receptors to give a desired submaximal response in a subject when inadequate amounts of the endogenous ligand are present, or they can reduce the overstimulation of receptors when excess amounts of the endogenous ligand are present. The maximum response ($E_{max}$) produced by a partial agonist is called its intrinsic activity and may be expressed on a percentage scale where a full agonist produced a 100% response. An partial agonist may have greater than 10% but less than 100%, alternatively greater than 20% but less than 100%, alternatively greater than 30% but less than 100%, alternatively greater than 40% but less than 100%, alternatively greater than 50% but less than 100%, alternatively greater than 60% but less than 100%, alternatively greater than 70% but less than 100%, alternatively greater than 80% but less than 100%, or alternatively greater than 90% but less than 100%, of the activity of the reference polypeptide when evaluated at similar concentrations in a given assay system.

Polypeptide: As used herein the terms "polypeptide," "peptide," and "protein", used interchangeably herein, refer to a polymeric form of amino acids of any length, which can include genetically coded and non-genetically coded amino acids, chemically or biochemically modified or derivatized amino acids, and polypeptides having modified polypeptide backbones. The term polypeptide include fusion proteins, including, but not limited to, fusion proteins with a heterologous amino acid sequence; fusion proteins with heterologous and homologous leader sequences; fusion proteins with or without N-terminal methionine residues; fusion proteins with amino acid sequences that facilitate purification such as chelating peptides; fusion proteins with immunologically tagged proteins; fusion proteins comprising a peptide with immunologically active polypeptide fragment (e.g., antigenic diphtheria or tetanus toxin or toxoid fragments) and the like.

Prevent: As used herein the terms "prevent", "preventing", "prevention" and the like refer to a course of action initiated with respect to a subject prior to the onset of a disease, disorder, condition or symptom thereof so as to prevent, suppress, inhibit or reduce, either temporarily or permanently, a subject's risk of developing a disease, disorder, condition or the like (as determined by, for example, the absence of clinical symptoms) or delaying the onset thereof. A course of action to prevent a disease, disorder or condition in a subject is typically applied in the context of a subject who is predisposed to developing a disease, disorder or condition due to genetic, experiential or environmental factors of developing a particular disease, disorder or condition. In certain instances, the terms "prevent", "preventing", "prevention" are also used to refer to the slowing of the progression of a disease, disorder or condition from an existing state to a more deleterious state.

Receptor: As used herein, the term "receptor" refers to a polypeptide having a domain that specifically binds a ligand that binding of the ligand results in a change to at least one biological property of the polypeptide. In some embodiments, the receptor is a cell membrane associated protein that comprises and extracellular domain (ECD) and a membrane associated domain which serves to anchor the ECD to the cell surface. In some embodiments of cell surface receptors, the receptor is a membrane spanning polypeptide comprising an intracellular domain (ICD) and extracellular domain (ECD) linked by a membrane spanning domain typically referred to as a transmembrane domain (TM). The binding of a cognate ligand to the receptor results in a conformational change in the receptor resulting in a measurable biological effect. In some instances, where the receptor is a membrane spanning polypeptide comprising an ECD, TM and ICD, the binding of the ligand to the ECD results in a measurable intracellular biological effect mediated by one or more domains of the ICD in response to the binding of the ligand to the ECD. In some embodiments, a receptor is a component of a multi-component complex to facilitate intracellular signaling. For example, the ligand may bind a cell surface receptor that is not associated with any intracellular signaling alone but upon ligand binding facilitates the formation of a heteromultimeric (including heterodimeric, heterotrimeric, etc.) or homomultimeric (including homodimeric, homotrimeric, homotetrameric, etc.) complex that results in a measurable biological effect in the cell such as activation of an intracellular signaling cascade (e.g., the Jak/STAT pathway). In some embodiments, a receptor is a membrane spanning single chain polypeptide comprising ECD, TM and ICD domains wherein the ECD, TM and ICD domains are derived from the same or differing naturally occurring receptor variants or synthetic functional equivalents thereof.

Recombinant: As used herein, the term "recombinant" is used as an adjective to refer to the method by which a polypeptide, nucleic acid, or cell was modified using recombinant DNA technology. A "recombinant protein" is a protein produced using recombinant DNA technology and is frequently abbreviated with a lower case "r" preceding the protein name to denote the method by which the protein was produced (e.g., recombinantly produced human growth hormone is commonly abbreviated "rhGH"). Similarly a cell is referred to as a "recombinant cell" if the cell has been modified by the incorporation (e.g., transfection, transduction, infection) of exogenous nucleic acids (e.g., ssDNA, dsDNA, ssRNA, dsRNA, mRNA, viral or non-viral vectors, plasmids, cosmids and the like) using recombinant DNA technology. The techniques and protocols for recombinant DNA technology are well known in the art such as those can be found in Sambrook, et al. (1989) Molecular Cloning: A Laboratory Manual (2d ed., Cold Spring Harbor Laboratory Press, Plainview, N.Y.) and other standard molecular biology laboratory manuals.

Response: The term "response," for example, of a cell, tissue, organ, or organism, encompasses a quantitative or qualitative change in a evaluable biochemical or physiological parameter, (e.g., concentration, density, adhesion, proliferation, activation, phosphorylation, migration, enzymatic activity, level of gene expression, rate of gene expression, rate of energy consumption, level of or state of differentiation) where the change is correlated with the activation, stimulation, or treatment, with or contact with exogenous agents or internal mechanisms such as genetic programming. In certain contexts, the terms "activation", "stimulation", and the like refer to cell activation as regulated by internal mechanisms, as well as by external or environmental factors; whereas the terms "inhibition", "down-regulation" and the like refer to the opposite effects. A "response" may be evaluated in vitro such as through the use of assay systems, surface plasmon resonance, enzymatic activity, mass spectroscopy, amino acid or protein sequencing technologies. A "response" may be evaluated in vivo quantitatively by evaluation of objective physiological parameters such as body temperature, bodyweight, tumor volume, blood pressure, results of X-ray or other imaging technology or qualitatively through changes in reported subjective feelings of well-being, depression, agitation, or pain. In some embodiments, the level of proliferation of CD3 activated primary human T-cells may be evaluated in a bioluminescent assay that generates a luminescent signal that is proportional to the amount of ATP present which is directly proportional to the number of cells present in culture as described in Crouch, et al. (1993) J. Immunol. Methods 160: 81-8 or using commercially available assays such as the CellTiter-Glo® 2.0 Cell Viability Assay or CellTiter-Glo® 3D Cell Viability kits commercially available from Promega Corporation, Madison WI 53711 as catalog numbers G9241 and G9681 in substantial accordance with the instructions provided by the manufacturer. In some embodiments, the level of activation of T cells in response to the administration of a test agent may be determined by flow cytometric methods as described as determined by the level of STAT (e.g., STAT1, STAT3, STAT5) phosphorylation in accordance with methods well known in the art. For example, STAT5 phosphorylation may be measured using flow cytometric techniques as described in Horta, et al. supra., Garcia, et al., supra, or commercially available kits such as the Phospho-STAT5 (Tyr694) kit (commercially available from Perkin-Elmer, Waltham MA as Part Number 64AT5PEG) in performed in substantial accordance with the instructions provided by the manufacturer.

Significantly Reduced Binding: As used herein, the term "exhibits significantly reduced binding" is used with respect a variant of a first molecule (e.g., a ligand or antibody) which exhibits a significant reduction in the affinity for a second molecule (e.g., receptor or antigen) relative the parent form of the first molecule. With respect to antibody variants, an antibody variant "exhibits significantly reduced binding" if the affinity of the variant antibody for an antigen if the variant binds to the native form of the receptor with and affinity of less than 20%, alternatively less than about 10%, alternatively less than about 8%, alternatively less than about 6%, alternatively less than about 4%, alternatively less than about 2%, alternatively less than about 1%, or alternatively less than about 0.5% of the parent antibody from which the variant was derived. Similarly, with respect to variant ligands, a variant ligand "exhibits significantly reduced binding" if the affinity of the variant ligand binds to a receptor with an affinity of less than 20%, alternatively less than about 10%, alternatively less than about 8%, alternatively less than about 6%, alternatively less than about 4%, alternatively less than about 2%, alternatively less than about 1%, or alternatively less than about 0.5% of the parent ligand from which the variant ligand was derived. Similarly, with respect to variant receptors, a variant ligand "exhibits significantly reduced binding" if the affinity of the variant receptors binds to a with an affinity of less than 20%, alternatively less than about 10%, alternatively less than about 8%, alternatively less than about 6%, alternatively less than about 4%, alternatively less than about 2%, alternatively less than about 1%, or alternatively less than about 0.5% of the parent receptor from which the variant receptor was derived.

Small Molecule(s): The term "small molecules" refers to chemical compounds (typically pharmaceutically active compounds) having a molecular weight that is less than about 10 kDa, less than about 2 kDa, or less than about 1 kDa. Small molecules include, but are not limited to, inorganic molecules, organic molecules, organic molecules containing an inorganic component, molecules comprising a radioactive atom, and synthetic molecules. The term "small molecule" is a term well understood to those of ordinary skill in the pharmaceutical arts and is typically used to distinguish organic chemical compounds from biologics.

Specifically Binds: As used herein the term "specifically binds" refers to the degree of affinity for which a first molecule exhibits with respect to a second molecule. In the context of binding pairs (e.g., ligand/receptor, antibody/antigen) a first molecule of a binding pair is said to specifically bind to a second molecule of a binding pair when the first molecule of the binding pair does not bind in a significant amount to other components present in the sample. A first molecule of a binding pair is said to specifically bind to a second molecule of a binding pair when the first molecule of the binding pair when the affinity of the first molecule for the second molecule is at least two-fold greater, alternatively at least five times greater, alternatively at least ten times greater, alternatively at least 20-times greater, or alternatively at least 100-times greater than the affinity of the first molecule for other components present in the sample. In a particular embodiment, where the first molecule of the binding pair is an antibody, the antibody specifically binds to the antigen (or antigenic determinant (epitope) of a protein, antigen, ligand, or receptor) if the equilibrium dissociation constant between antibody and the antigen is greater than about $10^6$ M, alternatively greater than about $10^8$ M, alternatively greater than about $10^{10}$ M, alternatively greater than about $10^{11}$ M, greater than about $10^{12}$ M as determined by, e.g., Scatchard analysis (Munsen, et al. (1980) Analyt. Biochem. 107:220-239). In one embodiment where the ligand is an gp130 binding sdAb and the receptor comprises an gp130, the gp130 binding sdAb specifically binds if the equilibrium dissociation constant of the gp130 binding sdAb/gp130 ECD is greater than about $10^5$M, alternatively greater than about $10^6$ M, alternatively greater than about $10^7$M, alternatively greater than about $10^8$M, alternatively greater than about 109 M, alternatively greater than about $10^{10}$ M, or alternatively greater than about $10^{11}$ M. Specific binding may be assessed using techniques known in the art including but not limited to competition ELISA assays, radioactive ligand binding assays (e.g., saturation binding, Scatchard plot, nonlinear curve fitting programs and competition binding assays); non-radioactive ligand binding assays (e.g., fluorescence polarization (FP), fluorescence resonance energy transfer (FRET); liquid phase ligand binding assays (e.g., real-time polymerase chain reaction (RT-qPCR), and immunoprecipitation); and solid phase ligand binding assays (e.g., multiwell plate assays, on-bead ligand binding assays, on-column ligand binding assays, and filter assays)) and surface plasmon resonance assays (see, e.g., Drescher et al., (2009) Methods Mol Biol 493:323-343 with commercially available instrumentation such as the Biacore 8K, Biacore 8K+, Biacore S200, Biacore T200 (Cytiva, 100 Results Way, Marlborough MA 01752). In some embodiments, the present disclosure provides molecules (e.g., gp130 binding sdAbs) that specifically bind to the hgp130 isoform. As used herein, the binding affinity of an gp130 binding molecule for the gp130, the binding affinity may be determined and/or quantified by surface plasmon resonance ("SPR"). In evaluating binding affinity of an gp130 binding molecule for the gp130, either member of the binding pair may be immobilized, and the other element of the binding pair be provided in the mobile phase. In some embodiments, the sensor chip on which the protein of interest is to be immobilized is conjugated with a substance to facilitate binding of the protein of interest such as nitrilotriacetic acid (NTA) derivatized surface plasmon resonance sensor chips (e.g., Sensor Chip NTA available from Cytiva Global Life Science Solutions USA LLC, Marlborough MA as catalog number BR100407), as anti-His tag antibodies (e.g. anti-histidine CM5 chips commercially available from Cytiva, Marlborough MA), protein A or biotin. Consequently, to evaluate binding, it is frequently necessary to modify the protein to provide for binding to the substance conjugated to the surface of the chip. For example, the one member of the binding pair to be evaluated by incorporation of a chelating peptide comprising poly-histidine sequence (e.g., 6×His (SEQ ID NO: 281) or 8×His (SEQ ID NO: 282)) for retention on a chip conjugated with NTA. In some embodiments, the gp130 binding molecule may be immobilized on the chip and gp130 (or ECD fragment thereof) be provided in the mobile phase. Alternatively, the gp130 (or ECD fragment thereof) may be immobilized on the chip and the gp130 binding molecule be provided in the mobile phase. In either circumstance, it should be noted that modifications of some proteins for immobilization on a coated SPR chip may interfere with the binding properties of one or both components of the binding pair to be evaluated by SPR. In such cases, it may be necessary to switch the mobile and bound elements of the binding pair or use a chip with a binding agent that facilitates non-interfering conjugation of the protein to be evaluated. Alternatively, when evaluating the binding affinity of gp130 binding molecule for gp130 using SPR, the gp130 binding molecule may be derivatized by the C-terminal addition of a poly-His sequence (e.g., 6×His (SEQ ID NO: 281) or 8×His (SEQ ID NO: 282)) and immobilized on the NTA derivatized sensor chip and the hgp130 receptor subunit for which the gp130 VHH's binding affinity is being evaluated is provided in the mobile phase. The means for incorporation of a poly-His sequence into the C-terminus of the gp130 binding molecule produced by recombinant DNA technology is well known to those of skill in the relevant art of biotechnology. In some embodiments, the binding affinity of gp130 binding molecule for a gp130 using SPR substantial accordance with the teaching of the Examples.

Subject: The terms "recipient", "individual", "subject", and "patient", are used interchangeably herein and refer to any mammalian subject for whom diagnosis, treatment, or therapy is desired, particularly humans. "Mammal" for purposes of treatment refers to any animal classified as a mammal, including humans, domestic and farm animals, and zoo, sports, or pet animals, such as dogs, horses, cats, cows, sheep, goats, pigs, etc. In some embodiments, the mammal is a human being.

Substantially Pure: As used herein, the term "substantially pure" indicates that a component of a composition makes up greater than about 50%, alternatively greater than about 60%, alternatively greater than about 70%, alternatively greater than about 80%, alternatively greater than about 90%, alternatively greater than about 95% of the total content of the composition. A protein that is "substantially pure" comprises greater than about 50%, alternatively greater than about 60%, alternatively greater than about 70%, alternatively greater than about 80%, alternatively greater than about 90%, alternatively greater than about 95% of the total content of the composition.

Suffering From: As used herein, the term "suffering from" refers to a determination made by a physician with respect to a subject based on the available objective or subjective information accepted in the field for the identification of a disease, disorder or condition including but not limited to X-ray, CT-scans, conventional laboratory diagnostic tests (e.g., blood count, etc.), genomic data, protein expression data, immunohistochemistry, that the subject requires or will benefit from treatment. The term suffering from is typically used in conjunction with a particular disease state such as "suffering from a neoplastic disease" refers to a subject which has been diagnosed with the presence of a neoplasm.

T-cell: As used herein the term "T-cell" or "T cell" is used in its conventional sense to refer to a lymphocytes that differentiates in the thymus, possess specific cell-surface antigen receptors, and include some that control the initiation or suppression of cell-mediated and humoral immunity and others that lyse antigen-bearing cells. In some embodiments the T cell includes without limitation naïve CD8$^+$ T cells, cytotoxic CD8$^+$ T cells, naïve CD4$^+$ T cells, helper T cells, e.g., $T_H1$, $T_H2$, $T_H9$, $T_H11$, $T_H22$, $T_{FH}$; regulatory T cells, e.g., $T_R1$, Tregs, inducible Tregs; memory T cells, e.g., central memory T cells, effector memory T cells, NKT cells, tumor infiltrating lymphocytes (TILs) and engineered variants of such T-cells including but not limited to CAR-T cells, recombinantly modified TILs and TCR-engineered cells. In some embodiments the T cell is a T cell expressing the gp130 isoform referred to interchangeably as gp130 cell, gp130+ cell, gp130 T cell, or gp130+ T cell).

Terminus/Terminal: As used herein in the context of the structure of a polypeptide, "N-terminus" (or "amino terminus") and "C-terminus" (or "carboxyl terminus") refer to the extreme amino and carboxyl ends of the polypeptide, respectively, while the terms "N-terminal" and "C-terminal" refer to relative positions in the amino acid sequence of the polypeptide toward the N-terminus and the C-terminus, respectively, and can include the residues at the N-terminus and C-terminus, respectively. "Immediately N-terminal" refers to the position of a first amino acid residue relative to a second amino acid residue in a contiguous polypeptide sequence, the first amino acid being closer to the N-terminus of the polypeptide. "Immediately C-terminal" refers to the position of a first amino acid residue relative to a second amino acid residue in a contiguous polypeptide sequence, the first amino acid being closer to the C-terminus of the polypeptide.

Therapeutically Effective Amount: As used herein to the phrase "therapeutically effective amount" refers to the quantity of an agent when administered to a subject, either alone or as part of a pharmaceutical composition or treatment regimen, in a single dose or as part of a series of doses, provides a positive effect on any quantitative or qualitative symptom, aspect, or characteristic of a disease, disorder or condition. A therapeutically effective amount can be ascertained by measuring relevant physiological effects, and it may be adjusted in connection with a dosing regimen and in response to diagnostic analysis of the subject's condition. The parameters for evaluation to determine a therapeutically effective amount of an agent are determined by the physician using art accepted diagnostic criteria including but not limited to indicia such as age, weight, sex, general health, ECOG score, observable physiological parameters, blood levels, blood pressure, electrocardiogram, computerized tomography, X-ray, and the like. Alternatively, or in addition, other parameters commonly assessed in the clinical setting may be monitored to determine if a therapeutically effective amount of an agent has been administered to the subject such as body temperature, heart rate, normalization of blood chemistry, normalization of blood pressure, normalization of cholesterol levels, or any symptom, aspect, or characteristic of the disease, disorder or condition, biomarkers (such as inflammatory cytokines, IFN-γ, granzyme, and the like), reduction in serum tumor markers, improvement in Response Evaluation Criteria In Solid Tumors (RECIST), improvement in Immune-Related Response Criteria (irRC), increase in duration of survival, extended duration of progression free survival, extension of the time to progression, increased time to treatment failure, extended duration of event free survival, extension of time to next treatment, improvement objective response rate, improvement in the duration of response, reduction of tumor burden, complete response, partial response, stable disease, and the like that that are relied upon by clinicians in the field for the assessment of an improvement in the condition of the subject in response to administration of an agent. In one embodiment, a therapeutically effective amount is an amount of an agent when used alone or in combination with another agent provides an provides a positive effect on any quantitative or qualitative symptom, aspect, or characteristic of a disease, disorder or condition and does not result in non-reversible serious adverse events in the course of administration of the agent to the mammalian subject.

Transmembrane Domain: The term "transmembrane domain" or "TM" refers to a polypeptide domain of a membrane spanning polypeptide (e.g., a transmembrane receptor) which, when the membrane spanning polypeptide is associated with a cell membrane, is which is embedded in the cell membrane and is in peptidyl linkage with the extracellular domain (ECD) and the intracellular domain (ICD) of a membrane spanning polypeptide. A transmembrane domain may be homologous (naturally associated with) or heterologous (not naturally associated with) with either or both of the extracellular and/or intracellular domains. In some embodiments, where the receptor is chimeric receptor comprising the intracellular domain derived from a first parental receptor and a second extracellular domains are derived from a second different parental receptor, the transmembrane domain of the chimeric receptor is the transmembrane domain normally associated with either the ICD or the ECD of the parent receptor from which the chimeric receptor is derived.

Treat: The terms "treat", "treating", treatment" and the like refer to a course of action (such as contacting the subject with pharmaceutical composition comprising a gp130 binding sdAb alone or in combination with a supplementary agent) that is initiated with respect to a subject in response to a diagnosis that the subject is suffering from a disease, disorder or condition, or a symptom thereof, the course of action being initiated so as to eliminate, reduce, suppress, mitigate, or ameliorate, either temporarily or permanently, at least one of: (a) the underlying causes of such disease, disorder, or condition afflicting a subject; and/or (b) at least one of the symptoms associated with such disease, disorder, or condition. In some embodiments, treating includes a course of action taken with respect to a subject suffering from a disease where the course of action results in the inhibition (e.g., arrests the development of the disease, disorder or condition or ameliorates one or more symptoms associated therewith) of the disease in the subject.

Treg Cell or Regulatory T Cell. The terms "regulatory T cell", "Treg cell", or "Treg" are interchangeably herein to refers to a type of CD4+ T cell that can suppress the responses of other T cells including but not limited to effector T cells ($T_{eff}$). Treg cells are typically characterized by expression of CD4 (CD4+), the CD25 subunit of the IL2 receptor (CD25+), and the transcription factor forkhead box P3 (FOXP3+) (Sakaguchi, Annu Rev Immunol 22, 531-62 (2004). In some instances, the term "conventional CD4+ T cells" is used to distinguish non-Treg CD4+ T cells from CD4+ Tregs.

Variant: The terms "variant", "protein variant" or "variant protein" or "variant polypeptide" are used interchangeably herein to refer to a polypeptide that differs from a parent polypeptide by virtue of at least one amino acid modification, substitution, or deletion. The parent polypeptide may be a naturally occurring or wild-type (WT) polypeptide or may be a modified version of a WT polypeptide. The term variant polypeptide may refer to the polypeptide itself, a composition comprising the polypeptide, or the nucleic acid sequence that encodes it. In some embodiments, the variant polypeptide comprises from about one to about ten, alternatively about one to about eight, alternatively about one to about seven, alternatively about one to about five, alternatively about one to about four, alternatively from about one to about three alternatively from one to two amino acid modifications, substitutions, or deletions, or alternatively a single amino acid amino acid modification, substitution, or deletion compared to the parent polypeptide. A variant may be at least about 99% identical, alternatively at least about 98% identical, alternatively at least about 97% identical, alternatively at least about 95% identical, or alternatively at least about 90% identical to the parent polypeptide from which the variant is derived.

Wild Type: By "wild type" or "WT" or "native" herein is meant an amino acid sequence or a nucleotide sequence that is found in nature, including allelic variations. A wild-type protein, polypeptide, antibody, immunoglobulin, IgG, etc. has an amino acid sequence or a nucleotide sequence that has not been modified by the hand of man.

Description

The present disclosure provides gp130 binding molecules comprising single domain antibodies that specifically bind to the extracellular domain of gp130. In some embodiments, the gp130 is human gp130. In some embodiments, the gp130 is murine (or mouse) gp130.

Human gp130

In one embodiment, specifically bind to the extracellular domain of the human gp130 receptor subunit (hgp130). hgp130 is expressed as a 918 amino acid precursor comprising a 22 amino acid N-terminal signal sequence which is post-translationally cleaved to provide an 896 amino acid mature protein. The canonical full-length acid hgp130 precursor (including the signal peptide) is a 918 amino acid polypeptide having the amino acid sequence:

(SEQ ID NO: 1)
MLTLQTWLVQALFIFLTTESTGELLDPCGYISPESPVVQLHSNFTAVCV

LKEKCMDYFHVNANYIVWKTNHFTIPKEQYTIINRTASSVTFTDIASLN

IQLTCNILTFGQLEQNVYGITIISGLPPEKPKNLSCIVNEGKKMRCEWD

GGRETHLETNFTLKSEWATHKFADCKAKRDTPTSCTVDYSTVYFVNIEV

WVEAENALGKVTSDHINFDPVYKVKPNPPHNLSVINSEELSSILKLTWI

-continued
NPSIKSVIILKYNIQYRTKDASTWSQIPPEDTASTRSSFTVQDLKPFTE

YVFRIRCMKEDGKGYWSDWSEEASGITYEDRPSKAPSFWYKIDPSHTQG

YRTVQLVWKTLPPFEANGKILDYEVTLTRWKSHLQNYTVNATKLTVNLT

NDRYLATLTVRNLVGKSDAAVLTIPACDFQATHPVMDLKAFPKDNMLWV

EWTTPRESVKKYILEWCVLSDKAPCITDWQQEDGTVHRTYLRGNLAESK

CYLITVTPVYADGPGSPESIKAYLKQAPPSKGPTVRTKKVGKNEAVLEW

DQLPVDVQNGFIRNYTIFYRTIIGNETAVNVDSSHTEYTLSSLTSDTLY

MVRMAAYTDEGGKDGPEFTFTTPKFAQGEIEAIVVPVCLAFLLTTLLGV

LFCENKRDLIKKHIWPNVPDPSKSHIAQWSPHTPPRHNENSKDQMYSDG

NFTDVSVVEIEANDKKPFPEDLKSLDLFKKEKINTEGHSSGIGGSSCMS

SSRPSISSSDENESSQNTSSTVQYSTVVHSGYRHQVPSVQVFSRSESTQ

PLLDSEERPEDLQLVDHVDGGDGILPRQQYFKQNCSQHESSPDISHFER

SKQVSSVNEEDFVRLKQQISDHISQSCGSGQMKMFQEVSAADAFGPGTE

GQVERFETVGMEAATDEGMPKSYLPQTVRQGGYMPQ

For purposes of the present disclosure, the numbering of amino acid residues of the human gp130 polypeptides as described herein is made in accordance with the numbering of this canonical sequence (UniProt Reference No. P40189, SEQ ID NO:1). Amino acids 1-22 of SEQ ID NO:1 are identified as the signal peptide of hgp130, amino acids 23-619 of SEQ ID NO:1 are identified as the extracellular domain, amino acids 620-641 of SEQ ID NO:1 are identified as the transmembrane domain, and amino acids 642-918 of SEQ ID NO:1 are identified as the intracellular domain.

For the purposes of generating antibodies that bind to the ECD of gp130, immunization may be performed with the extracellular domain of the hgp130. The extracellular domain of hgp130 is a 597 amino acid polypeptide of the sequence:

(SEQ ID NO: 278)
ELLDPCGYISPESPVVQLHSNFTAVCVLKEKCMDYFHVNANYIVWKINH

FTIPKEQYTIINRTASSVTFTDIASLNIQLTCNILTFGQLEQNVYGITI

ISGLPPEKPKNLSCIVNEGKKMRCEWDGGRETHLETNFTLKSEWATHKF

ADCKAKRDTPTSCTVDYSTVYFVNIEVWVEAENALGKVTSDHINFDPVY

KVKPNPPHNLSVINSEELSSILKLTWTNPSIKSVIILKYNIQYRTKDAS

TWSQIPPEDTASTRSSFTVQDLKPFTEYVFRIRCMKEDGKGYWSDWSEE

ASGITYEDRPSKAPSFWYKIDPSHTQGYRTVQLVWKTLPPFEANGKILD

YEVTLTRWKSHLQNYTVNATKLTVNLTNDRYLATLTVRNLVGKSDAAVL

TIPACDEQATHPVMDLKAFPKDNMLWVEWTTPRESVKKYILEWCVLSDK

APCITDWQQEDGTVHRTYLRGNLAESKCYLITVTPVYADGPGSPESIKA

YLKQAPPSKGPTVRTKKVGKNEAVLEWDQLPVDVQNGFIRNYTIFYRTI

IGNETAVNVDSSHTEYTLSSLTSDTLYMVRMAAYTDEGGKDGPEFTFTT

PKFAQGEIE

Mouse gp130

In one embodiment, specifically bind to the extracellular domain of the mouse or murine gp130 receptor subunit (mgp130). mgp130 is expressed as a 917 amino acid precursor comprising a 22 amino acid N-terminal signal sequence which is post-translationally cleaved to provide a 895 amino acid mature protein. The canonical full-length acid mgp130 precursor (including the 22 amino acid signal peptide) is a 917 amino acid polypeptide having the amino acid sequence:

(SEQ ID NO: 279)
MSAPRIWLAQALLFFLTTESIGQLLEPCGYIYPEFPVVQRGSNFTAICV

LKEACLQHYYVNASYIVWKTNHAAVPREQVTVINRTTSSVTFTDVVLPS

VQLTCNILSFGQIEQNVYGVTMLSGFPPDKPTNLTCIVNEGKNMLCQWD

PGRETYLETNYTLKSEWATEKFPDCQSKHGTSCMVSYMPTYYVNIEVWV

EAENALGKVSSESINFDPVDKVKPTPPYNLSVTNSEELSSILKLSWVSS

GLGGLLDLKSDIQYRTKDASTWIQVPLEDTMSPRTSFTVQDLKPFTEYV

FRIRSIKDSGKGYWSDWSEEASGTTYEDRPSRPPSFWYKINPSHGQEYR

SVRLIWKALPLSEANGKILDYEVILTQSKSVSQTYTVTGTELTVNLTND

RYVASLAARNKVGKSAAAVLTIPSPHVTAAYSVVNLKAFPKDNLLWVEW

TPPPKPVSKYILEWCVLSENAPCVEDWQQEDATVNRTHLRGRLLESKCY

QITVTPVFATGPGGSESLKAYLKQAAPARGPTVRTKKVGKNEAVLAWDQ

IPVDDQNGFIRNYSISYRTSVGKEMVVHVDSSHTEYTLSSLSSDTLYMV

RMAAYTDEGGKDGPEFTFTTPKFAQGEIEAIVVPVCLAFLLTTLLGVLF

CFNKRDLIKKHIWPNVPDPSKSHIAQWSPHTPPRHNENSKDQMYSDGNF

TDVSVVEIEANNKKPCPDDLKSVDLFKKEKVSTEGHSSGIGGSSCMSSS

RPSISSNEENESAQSTASTVQYSTVVHSGYRHQVPSVQVFSRSESTQPL

LDSEERPEDLQLVDSVDGGDEILPRQPYFKQNCSQPEACPEISHFERSN

QVLSGNEEDFVRLKQQQVSDHISQPYGSEQRRLFQEGSTADALGTGADG

QMERFESVGMETTIDEEIPKSYLPQTVRQGGYMPQ

For purposes of the present disclosure, the numbering of amino acid residues of the mgp130 polypeptides as described herein is made in accordance with the numbering of this canonical sequence (UniProt Reference No. Q00560, SEQ ID NO:279). Amino acids 1-22 of SEQ ID NO: 279 are identified as the signal peptide of mgp130, amino acids 23-617 of SEQ ID NO: 279 are identified as the extracellular domain, amino acids 618-639 of SEQ ID NO: 279 are identified as the transmembrane domain, and amino acids 640-917 of SEQ ID NO: 279 are identified as the intracellular domain.

For the purposes of generating antibodies that bind to the ECD of gp130, immunization may be performed with the extracellular domain of the mgp130. The extracellular domain of the mgp130 receptor is a 595 amino acid polypeptide of the sequence:

(SEQ ID NO: 280)
QLLEPCGYIYPEFPVVQRGSNFTAICVLKEACLQHYYVNASYIVWKTNH

AAVPREQVTVINRTTSSVTFTDVVLPSVQLTCNILSFGQIEQNVYGVTM

LSGFPPDKPTNLTCIVNEGKNMLCQWDPGRETYLETNYTLKSEWATEKF

PDCQSKHGTSCMVSYMPTYYVNIEVWVEAENALGKVSSESINFDPVDKV

KPTPPYNLSVINSEELSSILKLSWVSSGLGGLLDLKSDIQYRTKDASTW

IQVPLEDTMSPRTSFTVQDLKPFTEYVFRIRSIKDSGKGYWSDWSEEAS

-continued

GTTYEDRPSRPPSFWYKTNPSHGQEYRSVRLIWKALPLSEANGKILDYE

VILTQSKSVSQTYTVTGTELTVNLTNDRYVASLAARNKVGKSAAAVLTI

PSPHVTAAYSVVNLKAFPKDNLLWVEWTPPPKPVSKYILEWCVLSENAP

CVEDWQQEDATVNRTHLRGRLLESKCYQITVTPVFATGPGGSESLKAYL

KQAAPARGPTVRTKKVGKNEAVLAWDQIPVDDQNGFIRNYSISYRTSVG

KEMVVHVDSSHTEYTLSSLSSDTLYMVRMAAYTDEGGKDGPEFTFTTPK

FAQGEIE

Identification of Gp130 Binding Molecules and Single Domain Antibodies

In some embodiments, a gp130 binding molecule of the present disclosure is a single domain antibody (sdAb). The present disclosure relates to gp130 binding molecules comprising single domain antibodies (sdAbs) that specifically bind to the extracellular domain of the human gp130 isoform (hgp130) which are found on all gp130-expressing cells.

A single-domain antibody (sdAb) is an antibody containing a single monomeric variable antibody domain. Like a full-length antibody, sdAbs are able to bind specifically to an antigenic determinant. hgp130 binding VHH single-domain antibodies can be engineered from heavy chain antibodies isolated from Camelidae mammals (e.g., camels, llamas, dromedary, alpaca, and guanaco) immunized with the extracellular domain of hgp130 or an immunologically active fragment thereof. Descriptions of sdAbs and VHHs can be found in, e.g., De Greve et al., (2019) Curr Opin Biotechnol. 61:96-101; Ciccarese, et al., (2019) Front Genet. 10:997: Chanier and Chames (2019) Antibodies (Basel) 8(1); and De Vlieger, et al. (2018) Antibodies (Basel) 8(1). Alternatively, hgp130 single domain antibodies may be engineered from heavy chain antibodies isolated from the IgNAR heavy chain antibodies isolated from cartilaginous fishes immunized with the extracellular domain of hgp130 or an immunologically active fragment thereof hgp130 binding sdAbs may also be obtained by splitting the dimeric variable domains from immunoglobulin G (IgG) isotypes from other mammalian species including humans, rats, rabbits immunized with the extracellular domain of hgp130 or an immunologically active fragment thereof. Although most research into sdAbs is currently based on heavy chain variable domains, sdAbs derived from light chains have also been shown to bind specifically to the target proteins comprising the antigenic immunization sequence. Moller et al., *J Biol Chem.* 285(49):38348-38361, 2010.

In some embodiments, the sdAb is a VHH. A VHH is a type of sdAb that has a single monomeric heavy chain variable antibody domain. Similar to a traditional antibody, a VHH is able to bind specifically to a specific antigen. An exemplary VHH has a molecular weight of approximately 12-15 kDa which is much smaller than traditional mammalian antibodies (150-160 kDa) composed of two heavy chains and two light chains. VHHs can be found in or produced from Camelidae mammals (e.g., camels, llamas, dromedary, alpaca, and guanaco) which are naturally devoid of light chains.

Experimental

The single domain antibodies of the present disclosure were obtained from camels by immunization with an extracellular domain of a gp130 receptor. gp130 VHH molecules of the present disclosure of the present disclosure were generated in substantial accordance with the teaching of the Examples. Briefly, a camel was sequentially immunized with the ECD of the human gp130 and mouse gp130 over a period several weeks of by the subcutaneous an adjuvanted composition containing a recombinantly produced fusion proteins comprising the extracellular domain of the gp130, the human IgG1 hinge domain domain and the human IgG1 heavy chain Fc. Following immunization, RNAs extracted from a blood sample of appropriate size VHH-hinge-CH2-CH3 species were transcribed to generate DNA sequences, digested to identify the approximately 400 bp fragment comprising the nucleic acid sequence encoding the VHH domain was isolated. The isolated sequence was digested with restriction endonucleases to facilitate insertion into a phagemid vector for in frame with a sequence encoding a his-tag and transformed into E. coli to generate a phage library. Multiple rounds of biopanning of the phage library were conducted to identify VHHs that bound to the ECD of gp130 (human or mouse as appropriate). Individual phage clones were isolated for periplasmic extract ELISA (PE-ELISA) in a 96-well plate format and selective binding confirmed by colorimetric determination. The gp130 binding molecules that demonstrated specific binding to the gp130 antigen were isolated and sequenced and sequences analyzed to identify VHH sequences, CDRs and identify unique VHH clonotypes. As used herein, the term "clonotypes" refers a collection of binding molecules that originate from the same B-cell progenitor cell, in particular collection of antigen binding molecules that belong to the same germline family, have the same CDR3 lengths, and have 70% or greater homology in CDR3 sequence. The VHH molecules demonstrating specific binding to the hgp130 ECD antigen (anti-human gp130 VHHs) and the CDRs isolated from such VHHs are provided in Table 1. The VHH molecules demonstrating specific binding to the ngp130 ECD antigen (anti-mouse gp130 VHHs) and the CDRs isolated from such VHHs are provided in Table 3. Nucleic acid sequences encoding the VHHs of Table 1 and 3 are provide in Tables 2 and 4 respectively.

To more fully characterize the binding properties and evaluate binding affinity of the VHH molecules generated in accordance with the foregoing, representative examples of each of the human and mouse VHH clonotypes were subjected to analysis of by surface plasmon resonance in substantial accordance with the teaching of Example 5 herein. The results of these SPR experiments are provided in Tables 6 and 7 below.

TABLE 6 anti-hGP130 Mono-Fc VHHs (ligand) binding to hGP130-his
(Antigen: Sino Biological, Catalog# 10974)

| Ligand | SEQ ID NO: | $k_{ON}$ (1/Ms) | $k_{OFF}$ (1/s) | Affinity (nM) | Rmax (RU) | Load (RU) | Calc. Rmax (RU) | Surface Activity |
|---|---|---|---|---|---|---|---|---|
| DR591 | 2 | 5.9E+04 | 1.9E−03 | 33 | 52 | 84.6 | 252 | 21% |
| DR592 | 3 | 1.6E+05 | 5.9E−03 | 38 | 142.3 | 147 | 437 | 33% |
| DR593 | 4 | 2.5E+05 | 2.1E−02 | 82 | 64.2 | 110 | 326 | 20% |
| DR594 | 5 | 1.6E+05 | 9.5E−03 | 58 | 96.9 | 153 | 455 | 21% |
| DR595 | 6 | 1.8E+05 | 7.3E−03 | 41 | 127 | 128 | 379 | 33% |
| DR596 | 7 | 1.9E+05 | 8.2E−03 | 44 | 68.8 | 83.6 | 249 | 28% |

TABLE 7 anti-mGP130 Mono-Fc VHHs (ligand) binding to hGP130-his
(Antigen: Sino Biological, Catalog# 10974)

| Ligand | SEQ ID NO: | $k_{ON}$ (1/Ms) | $k_{OFF}$ (1/s) | Affinity (nM) | Rmax (RU) | Load (RU) | Calc. Rmax (RU) | Surface Activity |
|---|---|---|---|---|---|---|---|---|
| mgp130_VHH48 | 74 | 4.3E+04 | 1.8E−03 | 42 | 120 | 194 | 80 | 150% |
| mgp130_VHH44 | 70 | 2.0E+05 | 1.2E−03 | 6 | 116.3 | 95.7 | 39 | 296% |
| mgp130_VHH6 | 32 | 1.3E+05 | 3.0E−02 | 229 | 60.5 | 181 | 75 | 81% |
| mgp130_VHH13 | 39 | 1.1E+05 | 3.7E−03 | 35.6 | 19.1 | 247 | 102 | 19% |
| mgp130_VHH16 | 42 | 2.1E+04 | 3.6E−04 | 17.4 | 73.3 | 240 | 99 | 74% |
| mgp130_VHH5 | 31 | 9.0E+04 | 8.1E−03 | 90 | 145.9 | 189 | 78 | 188% |

As illustrated by the data presented in Tables 6 and 7 above, the gp130 binding molecules generated in accordance with the teaching of present disclosure exhibit specific binding and provided a range of affinities to the the extracellular domain of gp130.

In some instances, due to sequence or structural similarities between the extracellular domains of gp130 receptors from various mammalian species, immunization with an antigen derived from a gp130 of a first mammalian species (e.g., the hgp130-ECD) may provide antibodies which specifically bind to gp130 receptors of one or more additional mammalian species. Such antibodies are termed "cross reactive." For example, immunization of a camelid with a human derived antigen (e.g., the hgp130-ECD) may generate antibodies that are cross-reactive the murine and human receptors. Evaluation of cross-reactivity of antibody with respect to the receptors derived from other mammalian species may be readily determined by the skilled artisan, for example using the methods relating to evaluation of binding affinity and/or specific binding described elsewhere herein such as flow cytometry or SPR. Consequently, the use of the term "human gp130 VHH" or "hgp130 VHH" merely denotes that the species of the gp130 antigen used for immunization of the camelid from which the VHH was derived was the human gp130 (e.g., the hgp130 ECD, SEQ ID NO:278 but should not be understood as limiting with respect to the specific binding affinity of the VHH for gp130 molecules of other mammalian species. Similarly, the use of the term "mouse gp130 VHH" or "mgp130 VHH" merely denotes that the species of the gp130 antigen used for immunization of the camelid from which the VHH was derived was the murine gp130 (e.g., the mgp130 ECD, SEQ ID NO:280) but should not be understood as limiting with respect to the specific binding affinity of the VHH for gp130 molecules of other mammalian species.

The present disclosure provides gp130 binding molecules comprising a polypeptide having at least 75%, alternatively 80%, alternatively 90%, alternatively 95%, alternatively 98%, or alternatively 99% or 100% identity to a polypeptide of any one of SEQ ID NOS:2-7.

The present disclosure provides gp130 binding molecules comprising a polypeptide having at least 75%, alternatively 80%, alternatively 90%, alternatively 95%, alternatively 98%, or alternatively 99% or 100% identity to a polypeptide of any one of SEQ ID NOS: 26-74.

The present disclosure provides gp130 binding molecules comprising a CDR1, a CDR2, and a CDR3 as described in a row of Table 1 provided herein. In some embodiments, the CDR1, CDR2, and CDR3 can each, independently, comprise at least 90% (e.g., 91%, 92%, 93%, 94%, 95%, 96%, 97%, 98%, 99%, or 100%) sequence identity, or have 0, 1, 2, or 3 amino acid changes, optionally conservative amino acid changes, relative to the sequence described in a row of Table 1 provided herein.

The present disclosure provides gp130 binding molecules comprising a CDR1, a CDR2, and a CDR3 as described in a row of Table 3 provided herein. In some embodiments, the CDR1, CDR2, and CDR3 can each, independently, comprise at least 90% (e.g., 91%, 92%, 93%, 94%, 95%, 96%, 97%, 98%, 99%, or 100%) sequence identity, or have 0, 1, 2, or 3 amino acid changes, optionally conservative amino acid changes, relative to the sequence described in a row of Table 3 provided herein.

Modified Forms of Single Domain Antibodies
CDR Grafted sdAbs

In some embodiments, the gp130 binding sdAb of the present disclosure is a CDR grafted gp130 binding sdAb. CDRs obtained from antibodies, heavy chain antibodies, and sdAbs derived therefrom may be grafted onto alternative frameworks as described in Saerens, et al. (2005) J. Mol Biol 352:597-607 to generate CDR-grafted sdAbs. In some embodiments, the present disclosure provides a gp130 binding molecule comprising a CDR grafted gp130 binding sdAb, said CDR-grafted gp130 binding sdAb comprising a set of CDRs1, 2, and 3 as shown in a row of the Table 1A above. In some embodiments, the present disclosure provides a gp130 binding molecule comprising a CDR grafted gp130 binding sdAb, said CDR-grafted gp130 binding sdAb comprising a set of CDRs1, 2, and 3 as shown in a row of the Table 2 above.

Chimeric and Humanized sdAbs

Any framework region can be used with the CDRs as described herein. In some embodiments, the gp130 binding sdAb is a chimeric sdAb, in which the CDRs are derived from one species (e.g., camel) and the framework and/or constant regions are derived from another species (e.g., human or mouse). In specific embodiments, the framework regions are human or humanized sequences. Thus, humanized gp130 binding sdAbs derived from hgp130 binding VHHs are considered within the scope of the present disclosure. The techniques for humanization of camelid single domain antibodies are well known in the art. See, e.g., Vincke, et al. (2009) *General Strategy to Humanize a Camelid Single-domain Antibody and Identification of a Universal Humanized Nanobody Scaffold* J. Biol. Chem. 284(5)3273-3284.

In some embodiments, a $V_HH$ described herein can be humanized to contain human framework regions. Examples of human germlines that could be used to create humanized VHHs include, but are not limited to, VH3-23 (e.g., UniProt ID: P01764), VH3-74 (e.g., UniProtID: A0A0B4J1X5), VH3-66 (e.g., UniProtID: A0A0C4DH42), VH3-30 (e.g., UniProt ID: P01768), VH3-11 (e.g., UniProt ID: P01762), and VH3-9 (e.g., UniProt ID: P01782).

Elimination of N-Linked Glycosylation Sites

In some embodiments, it is possible that an amino acid sequence (particularly a CDR sequence) of the gp130 binding sdAb may contain a glycosylation motif, particularly an N-linked glycosylation motif of the sequence Asn-X-Ser (N-X-S) or Asn-X-Thr (N-X-T), wherein X is any amino acid except for proline. In such instances, it is desirable to eliminate such N-linked glycosylation motifs by modifying the sequence of the N-linked glycosylation motif to prevent glycosylation. In some embodiments, the elimination of the Asn-X-Ser (N-X-S)N-linked glycosylation motif may be achieved by the incorporation of conservative amino acid substitution of the Asn (N) residue and/or Ser (S) residue of the Asn-X-Ser (N-X-S)N-linked glycosylation motif In some embodiments, the elimination of the Asn-X-Thr (N-X-T) N-linked glycosylation motif may be achieved by incorporation of conservative amino acid substitution of the Asn (N) residue and/or Thr (T) residue of the Asn-X-Thr (N-X-T)N-linked glycosylation motif In some embodiments, elimination of the As procaryotic host cells do not provide the mechanism for glycosylation of recombinant proteins, when employing a procaryotic expression system to produce a recombinant gp130 binding sdAb the modification of the sequence to eliminate the N-linked glycosylation sites may be obviated.

gp130 Binding Molecules Comprising Additional Agents

In some embodiments, a gp130 binding molecule of the present disclosure comprises a gp130 single domain antibody (sdAb) conjugated to one or more additional biologically active agents including but not limited to, therapeutic agents, chemically, optically or radioactively active agents, including combinations thereof. The conjugation of at least one such biologically, chemically, optically or radioactively active agent confer additional biological or chemical properties to gp130 binding sdAb, the combination providing a gp130 binding molecule possessing additional or alternative utilities.

For example, the additional agent may be a molecule selected from one or more of: immunomodulatory agents (e.g., immunogens); molecules that improve aqueous solubility (e.g., water soluble polymers and hydrophilic molecules such as sugars); carrier molecules that extend in vivo half-life (e.g., PEGylation, Fc fusions or acylation); generation of antibodies for use in detection assays (e.g., epitope tags), enhance ease of purification (e.g., chelating peptides such as poly-His tags); targeting domains that provide selective targeting gp130 binding molecule to a particular cell or tissue type; therapeutic agents (e.g., therapeutic agents including small molecule or polypeptide agents); agents that visibility to optical or electromagnetic sensors (e.g., radionucleotides or fluorescent agents). In some embodiments, the linker is a cleavable linker or a non-cleavable linker. The use of a cleavable linker in a gp130 binding molecule as contemplated herein facilitates the release of a therapeutic agent into the intracellular cytoplasm upon internalization of the gp130 binding molecule. A non-cleavable linker would allow release upon digestion of the gp130 binding molecule of or it could be used with an agent that does not require release from the antibody (e.g., an imaging agent).

In some embodiments, where the gp130 binding molecule comprises a gp130 binding sdAb in stable association with an additional agent joined via a linker. A linker is a covalent linkage between two elements of a gp130 binding molecule (e.g., a hgp130 binding VHH and PEG polymer). A linker can be a covalent bond, chemical linker or a peptide linker. Suitable linkers include "flexible linkers" which are generally of sufficient length to permit some movement between the gp130 binding sdAb and the linked agent(s). Examples of chemical linkers include aryl acetylene, ethylene glycol oligomers containing 2-10 monomer units, diamines, diacids, amino acids, or combinations thereof. In some embodiments, the linker is a peptide linker. Suitable peptide linkers can be readily selected and can be of any suitable length, such as 1 amino acid (e.g., Gly), 2, 3, 4, 5, 6, 7, 8, 9, 10, 10-20, 20-30, 30-50 or more than 50 amino acids. Suitable peptide linkers are known in the art, and include, for example, peptide linkers containing flexible amino acid residues such as glycine and serine. Examples of flexible linkers include glycine polymers (G)n, glycine-serine polymers, glycine-alanine polymers, alanine-serine polymers, and other flexible linkers. Glycine and glycine-serine polymers are relatively unstructured, and therefore can serve as a neutral tether between components. Further examples of flexible linkers include glycine polymers (G)n, glycine-alanine polymers, alanine-serine polymers, glycine-serine polymers. Glycine and glycine-serine polymers are relatively unstructured, and therefore may serve as a neutral tether between components. A multimer (e.g., 1, 2, 3, 4, 5, 6, 7, 8, 9, 10, 10-20, 20-30, or 30-50) of such linker sequences may be linked together to provide flexible linkers that may be used to conjugate a heterologous amino acid sequence to gp130 binding sdAbs disclosed herein. In some embodiments the linkers have the formula (GGGS)n (SEQ ID NO: 283), (GGGSG)n (SEQ ID NO: 284), (GGGGS)n (SEQ ID NO: 285), (GGS)nG (SEQ ID NO: 286), or (GGSG)n (SEQ ID NO: 287), wherein n is an integer selected from 1, 2, 3, 4, 5, 6, 7, 8, 9 and 10.

Immunomodulatory Agents

In some embodiments, a gp130 binding molecule of the present disclosure comprises an immunomodulatory agent (immunoconjugates). Immunomodulatory agents that may conjugated to the hgp130 binding sdAb of the present disclosure include, but are not limited to, inactivated virus particles, inactivated bacterial toxins such as toxoid from diphtheria, tetanus, cholera, or leukotoxin molecules, inactivated bacteria and dendritic cells. Such immunoconjugates are useful in facilitating an immune response against the gp130 or cells expressing the gp130.

Flag Tags

In one embodiment, the present disclosure provides a gp130 binding molecule comprising an antigenic tag, such as a FLAG sequence. FLAG sequences are recognized by biotinylated, highly specific, anti-FLAG antibodies, as described herein (see e.g., Blanar et al. (1992) Science 256:1014 and LeClair, et al. (1992) PNAS-USA 89:8145). In some embodiments, the gp130 binding sdAb polypeptide further comprises a C-terminal c-myc epitope tag.

Chelating Peptides

In one embodiment, the present disclosure provides a gp130 binding molecule comprising one or more transition metal chelating polypeptide sequences. The incorporation of such a transition metal chelating domain facilitates purification immobilized metal affinity chromatography (IMAC) as described in Smith, et al. U.S. Pat. No. 4,569,794 issued Feb. 11, 1986. Examples of transition metal chelating polypeptides useful in the practice of the present gp130 binding molecule are described in Smith, et al. supra and Dobeli, et al. U.S. Pat. No. 5,320,663 issued May 10, 1995, the entire teachings of which are hereby incorporated by reference. Particular transition metal chelating polypeptides useful in the practice of the present gp130 binding molecule are polypeptides comprising 3-6 contiguous histidine residues (SEQ ID NO: 288) such as a six-histidine $(His)_6$ peptide (SEQ ID NO: 281) and are frequently referred to in the art as "His-tags." In addition to providing a purification "handle" for the recombinant proteins or to facilitate immobilization on SPR sensor chips, such the conjugation of the hgp130 binding molecule to a chelating peptide facilitates the targeted delivery to gp130 expressing cells of transition metal ions as kinetically inert or kinetically labile complexes in substantial accordance with the teaching of Anderson, et al., (U.S. Pat. No. 5,439,829 issued Aug. 8, 1995 and Hale, J. E (1996) Analytical Biochemistry 231(1):46-49. The transition metal ion is a reporter molecule such as a fluorescent compound or radioactive agent, including as radiological imaging or therapeutic agents.

Carrier Molecules

In some embodiments the gp130 binding sdAbs of the present disclosure may be conjugated to one or more carrier molecules. Carrier molecules are typically large, slowly metabolized macromolecules which provide for stabilization and/or extended duration of action in vivo to distinguish such molecules from conventional carrier molecules used in the preparation of pharmaceutical formulations as described below. Examples of in vivo carriers that may be incorporated into gp130 binding molecules, but are not limited to: proteins (including but not limited to human serum albumin); fatty acids (acylation); polysaccharides (including but not limited to (N- and O-linked) sugars, sepharose, agarose, cellulose, or cellulose); polypeptides amino acid copolymers; acylation, or polysialylation, an polyethylene glycol (PEG) polymers.

Water Soluble Polymers

In some embodiments, the gp130 binding sdAb is conjugated to one or more water-soluble polymers. Examples of water soluble polymers useful in the practice of the present gp130 binding molecule include polyethylene glycol (PEG), poly-propylene glycol (PPG), polysaccharides (polyvinylpyrrolidone, copolymers of ethylene glycol and propylene glycol, poly(oxyethylated polyol), polyolefinic alcohol, polysaccharides, poly-alpha-hydroxy acid, polyvinyl alcohol (PVA), polyphosphazene, polyoxazolines (POZ), poly (N-acryloylmorpholine), or a combination thereof.

Polyethylene Glycol

In one embodiment, the carrier molecule is a polyethylene glycol ("PEG") polymer. Conjugation of PEG polymers to proteins (PEGylation) is a well-established method for the extension of serum half-life of biological agents. The PEGylated polypeptide may be further referred to as monopegylated, dipegylated, tripegylated (and so forth) to denote a polypeptide comprising one, two, three (or more) PEG moieties attached to the polypeptide, respectively. In some embodiments, the PEG may be covalently attached directly to the sdAb (e.g., through a lysine side chain, sulfhydryl group of a cysteine or N-terminal amine) or optionally employ a linker between the PEG and the sdAb. In some embodiments, a gp130 binding molecule comprises more than one PEG molecules each of which is attached to a different amino acid residue. In some embodiments, the sdAb may be modified by the incorporation of non-natural amino acids with non-naturally occurring amino acid side chains to facilitate site specific PEGylation. In other embodiments, cysteine residues may be substituted at one or more positions within the sdAb to facilitate site-specific PEGylation via the cysteine sulfhydryl side chain.

In some instances, the gp130 binding molecules of the present disclosure possess an N-terminal glutamine ("1Q") residue. N-terminal glutamine residues have been observed to spontaneously cyclyize to form pyroglutamate (pE) at or near physiological conditions. (See e.g., Liu, et al (2011) J. Biol. Chem. 286(13): 11211-11217). In some embodiments, the formation of pyroglutamate complicates N-terminal PEG conjugation particularly when aldehyde chemistry is used for N-terminal PEGylation. Consequently, when PEGylating the gp130 binding molecules of the present disclosure, particularly when aldehyde chemistry is to be employed, the gp130 binding molecules possessing an amino acid at position 1 (e.g., 1Q) are substituted at position 1 with an alternative amino acid or are deleted at position 1 (e.g., des-1Q). In some embodiments, the gp130 binding molecules of the present disclosure comprise an amino acid substitution selected from the group Q1E and Q1D.

PEGs suitable for conjugation to a polypeptide sequence are generally soluble in water at room temperature, and have the general formula

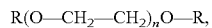

R(O—CH$_2$—CH$_2$)$_n$O—R, where R is hydrogen or a protective group such as an alkyl or an alkanol group, and where n is an integer from 1 to 1000. When R is a protective group, it generally has from 1 to 8 carbons. The PEG can be linear or branched. Branched PEG derivatives, "star-PEGs" and multi-armed PEGs are contemplated by the present disclosure.

A molecular weight of the PEG used in a gp130 binding molecule is not restricted to any particular range. The PEG component of a gp130 binding molecule can have a molecular mass greater than about 5 kDa, greater than about 10 kDa, greater than about 15 kDa, greater than about 20 kDa, greater than about 30 kDa, greater than about 40 kDa, or greater than about 50 kDa. In some embodiments, the molecular mass is from about 5 kDa to about 10 kDa, from about 5 kDa to about 15 kDa, from about 5 kDa to about 20 kDa, from about 10 kDa to about 15 kDa, from about 10 kDa to about 20 kDa, from about 10 kDa to about 25 kDa or from about 10 kDa to about 30 kDa. Linear or branched PEG molecules having molecular weights from about 2,000 to about 80,000 daltons, alternatively about 2,000 to about 70,000 daltons, alternatively about 5,000 to about 50,000 daltons, alternatively about 10,000 to about 50,000 daltons, alternatively about 20,000 to about 50,000 daltons, alternatively about 30,000 to about 50,000 daltons, alternatively about 20,000 to about 40,000 daltons, alternatively about 30,000 to about 40,000 daltons. In one embodiment of the gp130 binding molecule, the PEG is a 40 kD branched PEG comprising two 20 kD arms.

The present disclosure also contemplates a gp130 binding molecule comprising more than one PEG moiety wherein the PEGs have different sizes values, and thus the various different PEGs are present in specific ratios. For example, in the preparation of a PEGylated gp130 binding molecule, some compositions comprise a mixture of mono-, di-, tri-, and quadra-PEGylated sdAb conjugates. In some compositions, the percentage of mono-PEGylated species is 18-25%, the percentage of di-PEGylated species is 50-66%, the percentage of tri-pegylated species is 12-16%, and the percentage of quadra-pegylated species up to 5%. Such complex compositions can be produced by reaction conditions and purification methods known in the art. Chromatography may be used to resolve conjugate fractions, and a fraction is then identified which contains the conjugate having, for example, the desired number of PEGs attached, purified free from unmodified protein sequences and from conjugates having other numbers of PEGs attached.

PEGylation most frequently occurs at the α-amino group at the N-terminus of the polypeptide, the epsilon amino group on the side chain of lysine residues, and the imidazole group on the side chain of histidine residues. Since most recombinant polypeptides possess a single alpha and a number of epsilon amino and imidazole groups, numerous positional isomers can be generated depending on the linker chemistry.

Two widely used first generation activated monomethoxy PEGs (mPEGs) are succinimdyl carbonate PEG (SC-PEG; see, e.g., Zalipsky, et al. (1992) Biotehnol. Appl. Biochem 15:100-114) and benzotriazole carbonate PEG (BTC-PEG; see, e.g., Dolence, et al. U.S. Pat. No. 5,650,234), which react preferentially with lysine residues to form a carbamate linkage but are also known to react with histidine and tyrosine residues. Use of a PEG-aldehyde linker targets a single site on the N-terminus of a polypeptide through reductive amination.

The PEG can be bound to a gp130 binding molecule of the present disclosure via a terminal reactive group (a "spacer") which mediates a bond between the free amino or carboxyl groups of one or more of the polypeptide sequences and polyethylene glycol. The PEG having the spacer which can be bound to the free amino group includes N-hydroxysuccinylimide polyethylene glycol, which can be prepared by activating succinic acid ester of polyethylene glycol with N-hydroxysuccinylimide.

In some embodiments, the PEGylation of the sdAb is facilitated by the incorporation of non-natural amino acids bearing unique side chains to facilitate site specific PEGylation. The incorporation of non-natural amino acids into polypeptides to provide functional moieties to achieve site specific PEGylation of such polypeptides is known in the art. See e.g., Ptacin, et al., PCT International Application No. PCT/US2018/045257 filed Aug. 3, 2018 and published Feb. 7, 2019 as International Publication Number WO 2019/028419A1.

The PEG moiety of the of a PEGylated gp130 binding molecule may be be linear or branched. Branched PEG derivatives, "star-PEGs" and multi-armed PEGs are contemplated by the present disclosure. Specific embodiments PEGs useful in the practice of the present disclosure include a 10 kDa linear PEG-aldehyde (e.g., Sunbright® ME-100AL, NOF America Corporation, One North Broadway, White Plains, NY 10601 USA), 10 kDa linear PEG-NHS ester (e.g., Sunbright® ME-100CS, Sunbright® ME-100AS, Sunbright® ME-100GS, Sunbright® ME-100HS, NOF), a 20 kDa linear PEG-aldehyde (e.g., Sunbright® ME-200AL, NOF, a 20 kDa linear PEG-NHS ester (e.g., Sunbright® ME-200C5, Sunbright® ME-200AS, Sunbright® ME-200GS, Sunbright® ME-200HS, NOF), a 20 kDa 2-arm branched PEG-aldehyde the 20 kDA PEG-aldehyde comprising two 10kDA linear PEG molecules (e.g., Sunbright® GL2-200AL3, NOF), a 20 kDa 2-arm branched PEG-NHS ester the 20 kDA PEG-NHS ester comprising two 10kDA linear PEG molecules (e.g., Sunbright® GL2-200TS, Sunbright® GL200GS2, NOF), a 40 kDa 2-arm branched PEG-aldehyde the 40 kDA PEG-aldehyde comprising two 20kDA linear PEG molecules (e.g., Sunbright® GL2-400AL3), a 40 kDa 2-arm branched PEG-NHS ester the 40 kDa PEG-NHS ester comprising two 20kDA linear PEG molecules (e.g., Sunbright® GL2-400AL3, Sunbright® GL2-400GS2, NOF), a linear 30 kDa PEG-aldehyde (e.g., Sunbright® ME-300AL) and a linear 30 kDa PEG-NHS ester.

Fc Fusions

In some embodiments, the carrier molecule is a Fc molecule or a monomeric subunit thereof. In some embodiments, the dimeric Fc molecule may be engineered to possess a "knob-into-hole modification." The knob-into-hole modification is more fully described in Ridgway, et al. (1996) Protein Engineering 9(7):617-621 and U.S. Pat. No. 5,731,168, issued Mar. 24, 1998, U.S. Pat. No. 7,642,228, issued Jan. 5, 2010, U.S. Pat. No. 7,695,936, issued Apr. 13, 2010, and U.S. Pat. No. 8,216,805, issued Jul. 10, 2012. The knob-into-hole modification refers to a modification at the interface between two immunoglobulin heavy chains in the CH3 domain, wherein: i) in a CH3 domain of a first heavy chain, an amino acid residue is replaced with an amino acid residue having a larger side chain (e.g., tyrosine or tryptophan) creating a projection from the surface ("knob") and ii) in the CH3 domain of a second heavy chain, an amino acid residue is replaced with an amino acid residue having a smaller side chain (e.g., alanine or threonine), thereby generating a cavity ("hole") within at interface in the second CH3 domain within which the protruding side chain of the first CH3 domain ("knob") is received by the cavity in the second CH3 domain. In one embodiment, the "knob-into-hole modification" comprises the amino acid substitution T366W and optionally the amino acid substitution S354C in one of the antibody heavy chains, and the amino acid substitutions T366S, L368A, Y407V and optionally Y349C in the other one of the antibody heavy chains. Furthermore, the Fc domains may be modified by the introduction of cysteine residues at positions S354 in one chain and Y349 in the other chain which results in a stabilizing disulfide bridge between the two antibody heavy chains in the Fc region (Carter, et al. (2001) Immunol Methods 248, 7-15). The knob-into-hole format is used to facilitate the expression of a first polypeptide (e.g., an gp130 binding sdAb) on a first Fc monomer with a "knob" modification and a second polypeptide on the second Fc monomer possessing a "hole" modification to facilitate the expression of heterodimeric polypeptide conjugates.

Targeting Domains

In some embodiments, the gp130 binding molecule is provided as a component of a multivalent (e.g., bivalent) fusion protein with a polypeptide sequence ("targeting domain") to facilitate selective binding to particular cell type or tissue expressing a cell surface molecule that specifically binds to such targeting domain, optionally incorporating a linker between the gp130 binding sdAb sequence and the sequence of the targeting domain of the fusion protein.

In some embodiments, the gp130 binding molecule may be targeted to a particular cell type cell by being operably linked to a targeting domain to the gp130 binding molecule. As used herein, the term targeting domain refers to a moiety that specifically binds to a molecule expressed on the surface of a target cell. The targeting domain may be any moiety that specifically binds to one or more cell surface molecules (e.g., T cell receptor) expressed on the surface of a target cell. In some embodiments, the target cell is a T cell. In some embodiments, the target cell is a gp130+ T cell.

In some embodiments, the targeting domain is a ligand for a receptor. In some embodiments, the targeting domain is a ligand for a receptor expressed on the surface of a T cell. In some embodiments, the ligand is a cytokine. In some embodiments, the cytokine includes but is not limited to the group consisting interleukins, interferons, and functional derivatives thereof. In some embodiments, the cytokine includes but is not limited to the group consisting IL2, IL3, IL4, IL7, IL9, IL12, IL15, IL18, IL21, IL22, IL23, IL27, IL28, IL34, and modified versions or fragments thereof that bind to their cognate ligand expressed on the surface of a T-cell. In some embodiments, the cytokine includes but is not limited to the group consisting of interferon alpha, interferon a2b, interferon gamma, or interferon lambda and modified versions or fragments thereof that bind to their cognate ligand expressed on the surface of a T-cell.

In another aspect, the present disclosure provides a multivalent binding molecule, the multivalent binding molecule comprising: (a) a gp130 binding molecule and (b) a second binding molecule that specifically binds to the extracellular domain of a second cell surface molecule, wherein the gp130 binding molecule and second binding molecule are operably linked, optionally through a chemical or polypeptide linker. In some embodiments, the gp130 binding molecules of the present disclosure are useful in the preparation of the multivalent binding molecules described in Gonzalez, et al. PCT/US2018/021301 published as WO 2018/182935 A1 on Oct. 4, 2018. In accordance with the teaching of Gonzalez, et al, the second binding molecule specifically binds to the extracellular domain of: (i) a component of cytokine receptor other than a receptor of which gp130 forms a signaling complex in response to a natural ligand that activates the JAK/STAT pathway in the cell; (ii) a receptor tyrosine kinase; or (iii) a TNFR superfamily member. In some embodiments, the second surface molecule is a tyrosine kinase selected from EGFR, ErbB2, ErbB3, ErbB4, InsR, IGF1R, InsRR, PDGFRα, PDGFRβ, CSF1R/Fms, cKit, Flt-3/Flk2, VEGFR1, VEGFR2, VEGFR3, FGFR1, FGFR2, FGFR3, FGFR4, PTK7/CCK4, TrkA, TrkB, TrkC, Ror1, Ror2, MuSK, Met, Ron, Axl, Mer, Tyro3, Tie1, Tie2, EphA1-8, EphA10, EphB1-4, EphB6, Ret, Ryk, DDR1, DDR2, Ros, LMR1, LMR2, LMR3, ALK, LTK, SuRTK106/STYK1. In some embodiments, the second surface molecule is a TNFR superfamily member is selected from TNFR1 (TNFRSF1A), TNFR2 (TNFRSF1B; TNFRSF2), 41-BB (TNFRSF9); AITR (TNFRSF18); BCMA (TNFRSF17), CD27 (TNFRSF7), CD30 (TNFRSF8), CD40 (TNFRSF5), Death Receptor 1 (TNFRSF10C), Death Receptor-3 (TNFRSF25), Death Receptor 4 (TNFRSF10A), Death Receptor 5 (TNFRSF10B), Death Receptor-6 (TNFRSF21), Decoy Receptor-3 (TNFRSF6B), Decoy Receptor 2 (TNFRSF10D), EDAR, Fas (TNFRSF6), HVEM (TNFRSF14), LTBR (TNFRSF3), OX40 (TNFRSF4), RANK (TNFRSF11A), TACI (TNFRSF13B), Troy (TNFRSF19), XEDAR (TNFRSF27), Osteoprotegerin (TNFRSF11B), TWEAK receptor (TNFRSF12A), BAFF Receptor (TNFRSF13C), NGF receptor (TNFRSF16).

In some embodiments, the targeting domain is a polypeptide that specifically binds to a cell surface molecule associated with a tumor cell (e.g., a cognate ligand for a tumor cell receptor) selected from the group consisting of GD2, BCMA, CD19, CD33, CD38, CD70, GD2, IL3Ra2, CD19, mesothelin, Her2, EpCam, Mucd, ROR1, CD133, CEA, EGRFRVIII, PSCA, GPC3, Pan-ErbB and FAP.

In some embodiments, the targeting domain of the gp130 binding molecule is an antibody (as defined hereinabove to include molecules such as VHHs, scFvs, etc.) Examples of antibodies that may incorporated as a targeting domain of a gp130 binding molecule include but are not limited to the group consisting of: anti-GD2 antibodies, anti-BCMA antibodies, anti-CD19 antibodies, anti-CD33 antibodies, anti-CD38 antibodies, anti-CD70 antibodies, anti-GD2 antibodies and IL3Ra2 antibodies, anti-CD19 antibodies, anti-mesothelin antibodies, anti-Her2 antibodies, anti-EpCam antibodies, anti-Muc antibodies, anti-ROR1 antibodies, anti-CD133 antibodies, anti-CEA antibodies, anti-PSMA antibodies, anti-EGRFRVIII antibodies, anti-PSCA antibodies, anti-GPC3 antibodies, anti-Pan-ErbB antibodies, and anti-FAP antibodies.

The antibody or antigen-binding fragment thereof can also be linked to another antibody to form, e.g., a bispecific or a multispecific antibody Labels In some embodiments, gp130 binding molecules of the present disclosure are operably linked to one or more labels. In some embodiments, the label is incorporated to facilitate use as imaging agent, diagnostic agent, or for use in cell sorting procedures. The term labels includes but is not limited to fluorescent labels, a biologically active enzyme labels, a radioisotopes (e.g., a radioactive ions), a nuclear magnetic resonance active labels, a luminescent labels, or a magnetic compound. In one embodiment a gp130 binding sdAb (e.g., a gp130 binding VHH) molecule in stable association (e.g., covalent, coordinate covalent) with an imaging labels. The term imaging labels is used to describe any of a variety of compounds a signature that facilitates identification, tracing and/or localization of the gp130 binding sdAb (or its metabolites) using diagnostic procedures. Examples of imaging labels include, but are not limited to, fluorescent compounds, radioactive compounds, and compounds opaque to imaging methods (e.g., X-ray, ultrasound). Examples of radioactive compounds useful as imaging label include but are not limited to Technetium-99m ($^{99m}$Tc), Indium-111($^{111}$In), Iodine-131 ($^{131}$I), Iodine-123($^{123}$I), Iodine-125 ($^{125}$I), Gallium-67 ($^{67}$Ga), and Lutetium-177 ($^{177}$Lu), phosphorus ($^{32}$P), carbon ($^{14}$C), tritium ($^{3}$H), yttrium ($^{90}$Y), actinium ($^{225}$Ac), astatine ($^{211}$At), rhenium ($^{186}$Re), bismuth ($^{212}$Bi or $^{213}$Bi), and rhodium ($^{188}$Rh).

Therapeutic Agents

In some embodiments, gp130 binding molecules of the present disclosure are operably linked to a therapeutic agent. Examples of therapeutic agents include therapeutic small molecule (e.g., chemotherapeutic agents) or biologic therapeutic agents including antibodies, cytoxic or cytostatic compounds, a radioisotope, molecules of plant, fungal, or bacterial origin, or biological proteins (e.g., protein toxins) or particles (e.g., nano-particles or recombinant viral particles, e.g., via a viral coat protein), therapeutic antibodies antibodies, chemotherapeutic agents, as described more fully herein.

In some embodiments, the therapeutic agent which is operably linked to the gp130 binding molecule of the present disclosure is short-range radiation emitters, including, for example, short-range, high-energy a-emitters. Examples of such radioisotope include an alpha-emitter, a beta-emitter, a gamma-emitter or a beta/gamma emitter. Radioisotopes useful as therapeutic agents include yttrium 90 ($^{90}$Y), lutetium-177 ($^{177}$Lu), actinium-225 ($^{225}$Ac), astatine-211 ($^{211}$At), rhenium-186 ($^{186}$Re), bismuth-212 ($^{212}$Bi), bismuth-213 ($^{213}$Bi), and rhodium-188 ($^{188}$Rh).

In some embodiments, the gp130 binding molecule is operably linked to a cytotoxic agent (or derivative thereof), such maytansinol or the DM1 maytansinoid), a taxane, or a calicheamicin, pseudomonas exotoxin A, deBouganin, ricin toxin, diphtheria toxin, an amatoxin, such as a-amanitin, saporin, maytansine, a maytansinoid, an auristatin, an anthracycline, a calicheamicin, irinotecan, SN-38, a duocarmycin, a pyrrolobenzodiazepine, a pyrrolobenzodiazepine dimer, an indolinobenzodiazepine, and an indolinobenzodiazepine dimer, or a variant thereof).

Synthesis of Gp130 Binding Molecules:

In some embodiments, the gp130 binding molecules of the present disclosure are polypeptides. However, in some embodiments, only a portion of the gp130 binding molecule is a polypeptide, for example where the gp130 binding molecule comprises a non-peptidyl domain (e.g., a PEG gp130 binding sdAb conjugate, a radionucleotide gp130 binding sdAb conjugate, or a small molecule gp130 binding sdAb conjugate). The following provides guidance to enable the solid phase and recombinant synthesis of the polypeptide portions (domains) of gp130 binding molecules of the present disclosure. In those embodiments where only a portion of the gp130 binding molecule is a polypeptide, it will be understood that the peptidyl domain(s) of the gp130 binding molecule are an intermediate in the process which may undergo further processing to complete the synthesis of the desired gp130 binding molecules. The polypeptide domains of gp130 binding molecules may be produced by conventional methodology for the construction of polypeptides including recombinant or solid phase syntheses as described in more detail below.

Chemical Synthesis

In addition to generating mutant polypeptides via expression of nucleic acid molecules that have been altered by recombinant molecular biological techniques, polypeptide domains of gp130 binding molecules can be chemically synthesized. Chemically synthesized polypeptides are routinely generated by those of skill in the art. Chemical synthesis includes direct synthesis of a peptide by chemical means of the polypeptide domains of gp130 binding molecules exhibiting the properties described. This method can incorporate both natural and unnatural amino acids at desired positions that facilitate linkage of particular molecules (e.g., PEG).

In some embodiments, the polypeptide domains of gp130 binding molecules of the present disclosure may be prepared by chemical synthesis. The chemical synthesis of the polypeptide domains of gp130 binding molecules may proceed via liquid-phase or solid-phase. Solid-phase peptide synthesis (SPPS) allows the incorporation of unnatural amino acids and/or peptide/protein backbone modification. Various forms of SPPS are available for synthesizing the polypeptide domains of gp130 binding molecules of the present disclosure are known in the art (e.g., Ganesan A. (2006) Mini Rev. Med. Chem. 6:3-10; and Camarero J.A. et al., (2005) Protein Pept Lett. 12:723-8). In the course of chemical synthesis, the alpha functions and any reactive side chains may protected with acid-labile or base-labile groups that are stable under the conditions for linking amide bonds but can readily be cleaved without impairing the peptide chain that has formed.

In the solid phase synthesis, either the N-terminal or C-terminal amino acid may be coupled to a suitable support material. Suitable support materials are those which are inert towards the reagents and reaction conditions for the stepwise condensation and cleavage reactions of the synthesis process and which do not dissolve in the reaction media being used. Examples of commercially available support materials include styrene/divinylbenzene copolymers which have been modified with reactive groups and/or polyethylene glycol; chloromethylated styrene/divinylbenzene copolymers; hydroxymethylated or aminomethylated styrene/divinylbenzene copolymers; and the like. The successive coupling of the protected amino acids can be carried out according to conventional methods in peptide synthesis, typically in an automated peptide synthesizer.

At the end of the solid phase synthesis, the peptide is cleaved from the support material while simultaneously cleaving the side chain protecting groups. The peptide obtained can be purified by various chromatographic methods including but not limited to hydrophobic adsorption chromatography, ion exchange chromatography, distribution chromatography, high pressure liquid chromatography (HPLC) and reversed-phase HPLC.

Recombinant Production

Alternatively, polypeptide domains of gp130 binding molecules of the present disclosure may be produced by recombinant DNA technology. In the typical practice of recombinant production of polypeptides, a nucleic acid sequence encoding the desired polypeptide is incorporated into an expression vector suitable for the host cell in which expression will be accomplish, the nucleic acid sequence being operably linked to one or more expression control sequences encoding by the vector and functional in the target host cell. The recombinant protein may be recovered through disruption of the host cell or from the cell medium if a secretion leader sequence (signal peptide) is incorporated into the polypeptide. The recombinant protein may be purified and concentrated for further use including incorporation.

Synthesis of Nucleic Acid Sequences Encoding the Gp130 Binding Molecule

In some embodiments, the the polypeptide domains of gp130 binding molecule is produced by recombinant methods using a nucleic acid sequence encoding the the polypeptide domains of gp130 binding molecule(or fusion protein comprising the polypeptide domains of gp130 binding molecule). The nucleic acid sequence encoding the desired polypeptide domains of gp130 binding molecule can be synthesized by chemical means using an oligonucleotide synthesizer.

The nucleic acid molecules are not limited to sequences that encode polypeptides; some or all of the non-coding sequences that lie upstream or downstream from a coding sequence (e.g., the coding sequence of the polypeptide domains of gp130 binding molecule) can also be included. Those of ordinary skill in the art of molecular biology are familiar with routine procedures for isolating nucleic acid molecules. They can, for example, be generated by treatment of genomic DNA with restriction endonucleases, or by performance of the polymerase chain reaction (PCR). In the event the nucleic acid molecule is a ribonucleic acid (RNA), molecules can be produced, for example, by in vitro transcription.

The nucleic acid molecules encoding the polypeptide domains of gp130 binding molecule (and fusions thereof) may contain naturally occurring sequences or sequences that differ from those that occur naturally, but, due to the degeneracy of the genetic code, encode the same polypeptide. These nucleic acid molecules can consist of RNA or DNA (for example, genomic DNA, cDNA, or synthetic DNA, such as that produced by phosphoramidite-based synthesis), or combinations or modifications of the nucleotides within these types of nucleic acids. In addition, the nucleic acid molecules can be double-stranded or single-stranded (i.e., either a sense or an antisense strand).

Nucleic acid sequences encoding the polypeptide domains of the gp130 binding molecule may be obtained from various commercial sources that provide custom synthesis of nucleic acid sequences. Amino acid sequence variants of the HUMAN gp130 binding molecules of the present disclosure are prepared by introducing appropriate nucleotide changes into the coding sequence based on the genetic code which is well known in the art. Such variants represent insertions, substitutions, and/or specified deletions of, residues as noted. Any combination of insertion, substitution, and/or specified deletion can be made to arrive at the final construct, provided that the final construct possesses the desired biological activity as defined herein.

Methods for constructing a DNA sequence encoding the polypeptide domains of gp130 binding molecule and expressing those sequences in a suitably transformed host include, but are not limited to, using a PCR-assisted mutagenesis technique. Mutations that consist of deletions or additions of amino acid residues to polypeptide domains of gp130 binding molecule can also be made with standard recombinant techniques. In the event of a deletion or addition, the nucleic acid molecule encoding polypeptide domains of gp130 binding molecule is optionally digested with an appropriate restriction endonuclease. The resulting fragment can either be expressed directly or manipulated further by, for example, ligating it to a second fragment. The ligation may be facilitated if the two ends of the nucleic acid molecules contain complementary nucleotides that overlap one another, but blunt-ended fragments can also be ligated. PCR-generated nucleic acids can also be used to generate various mutant sequences.

A polypeptide domain of gp130 binding molecules of the present disclosure may be produced recombinantly not only directly, but also as a fusion polypeptide with a heterologous polypeptide, e.g., a signal sequence or other polypeptide having a specific cleavage site at the N-terminus or C-terminus of the mature gp130 binding molecule. In general, the signal sequence may be a component of the vector, or it may be a part of the coding sequence that is inserted into the vector. The heterologous signal sequence selected preferably is one that is recognized and processed (i.e., cleaved by a signal peptidase) by the host cell. In some embodiments, the signal sequence is the signal sequence that is natively associated with the gp130 binding molecule (i.e. the human gp130 signal sequence). The inclusion of a signal sequence depends on whether it is desired to secrete the gp130 binding molecule from the recombinant cells in which it is made. If the chosen cells are prokaryotic, it generally is preferred that the DNA sequence not encode a signal sequence. If the chosen cells are eukaryotic, it generally is preferred that a signal sequence be encoded and most preferably that the wild type IL-2 signal sequence be used. Alternatively, heterologous mammalian signal sequences may be suitable, such as signal sequences from secreted polypeptides of the same or related species, as well as viral secretory leaders, for example, the herpes simplex gD signal. When the recombinant host cell is a yeast cell such as *Saccharomyces cerevisiae*, the alpha mating factor secretion signal sequence may be employed to achieve extracellular secretion of the gp130 binding molecule into the culture medium as described in Singh, U.S. Pat. No. 7,198,919 B1.

In the event the polypeptide domain of gp130 binding molecules to be expressed is to be expressed as a chimera (e.g., a fusion protein comprising a gp130 binding molecule and a heterologous polypeptide sequence), the chimeric protein can be encoded by a hybrid nucleic acid molecule comprising a first sequence that encodes all or part of the polypeptide domains of gp130 binding molecule and a second sequence that encodes all or part of the heterologous polypeptide. For example, polypeptide domains of gp130 binding molecules described herein may be fused to a hexa-histidine tag (SEQ ID NO: 281) to facilitate purification of bacterially expressed protein, or to a hemagglutinin tag to facilitate purification of protein expressed in eukaryotic cells. By first and second, it should not be understood as limiting to the orientation of the elements of the fusion protein and a heterologous polypeptide can be linked at either the N-terminus and/or C-terminus of the polypeptide domains of gp130 binding molecule. For example, the N-terminus may be linked to a targeting domain and the C-terminus linked to a hexa-histidine tag (SEQ ID NO: 281) purification handle.

The complete amino acid sequence of the polypeptide domain of gp130 binding molecule (or fusion/chimera) to be expressed can be used to construct a back-translated gene. A DNA oligomer containing a nucleotide sequence coding for the polypeptide domain of gp130 binding molecules can be synthesized. For example, several small oligonucleotides coding for portions of the desired polypeptide can be synthesized and then ligated. The individual oligonucleotides typically contain 5' or 3' overhangs for complementary assembly.

In some embodiments, the nucleic acid sequence encoding the polypeptide domain of the gp130 binding molecule may be "codon optimized" to facilitate expression in a particular host cell type. Techniques for codon optimization in a wide variety of expression systems, including mammalian, yeast and bacterial host cells, are well known in the and there are online tools to provide for a codon optimized sequences for expression in a variety of host cell types. See e.g., Hawash, et al., (2017) 9:46-53 and Mauro and Chappell in *Recombinant Protein Expression in Mammalian Cells: Methods and Protocols*, edited by David Hacker (Human Press New York). Additionally, there are a variety of web based on-line software packages that are freely available to assist in the preparation of codon optimized nucleic acid sequences.

Expression Vectors

Once assembled (by synthesis, site-directed mutagenesis or another method), the nucleic acid sequence encoding polypeptide domains of gp130 binding molecule will be inserted into an expression vector. A variety of expression vectors for uses in various host cells are available and are typically selected based on the host cell for expression. An expression vector typically includes, but is not limited to, one or more of the following: an origin of replication, one or more marker genes, an enhancer element, a promoter, and a transcription termination sequence. Vectors include viral vectors, plasmid vectors, integrating vectors, and the like. Plasmids are examples of non-viral vectors. To facilitate efficient expression of the recombinant polypeptide, the nucleic acid sequence encoding the polypeptide sequence to be expressed is operably linked to transcriptional and translational regulatory control sequences that are functional in the chosen expression host.

Expression vectors typically contain a selection gene, also termed a selectable marker. This gene encodes a protein necessary for the survival or growth of transformed host cells grown in a selective culture medium. Host cells not transformed with the vector containing the selection gene will not survive in the culture medium. Typical selection genes encode proteins that (a) confer resistance to antibiotics or other toxins, e.g., ampicillin, neomycin, methotrexate, or tetracycline, (b) complement auxotrophic deficiencies, or (c) supply critical nutrients not available from complex media.

Expression vectors for polypeptide domain of gp130 binding molecules of the present disclosure contain a regulatory sequence that is recognized by the host organism and is operably linked to nucleic acid sequence encoding the polypeptide domains of gp130 binding molecule. The terms "regulatory control sequence," "regulatory sequence" or "expression control sequence" are used interchangeably herein to refer to promoters, enhancers, and other expression control elements (e.g., polyadenylation signals). See, for example, Goeddel (1990) in Gene Expression Technology: Methods in Enzymology 185 (Academic Press, San Diego CA USA Regulatory sequences include those that direct constitute expression of a nucleotide sequence in many types of host cells and those that direct expression of the nucleotide sequence only in certain host cells (e.g., tissue-specific regulatory sequences). It will be appreciated by those skilled in the art that the design of the expression vector can depend on such factors as the choice of the host cell to be transformed, the level of expression of protein desired, and the like. In selecting an expression control sequence, a variety of factors understood by one of skill in the art are to be considered. These include, for example, the relative strength of the sequence, its controllability, and its compatibility with the actual DNA sequence encoding the subject gp130 binding molecule, particularly as regards potential secondary structures.

In some embodiments, the regulatory sequence is a promoter, which is selected based on, for example, the cell type in which expression is sought. Promoters are untranslated sequences located upstream (5') to the start codon of a structural gene (generally within about 100 to 1000 bp) that control the transcription and translation of particular nucleic acid sequence to which they are operably linked. Such promoters typically fall into two classes, inducible and constitutive. Inducible promoters are promoters that initiate increased levels of transcription from DNA under their control in response to some change in culture conditions, e.g., the presence or absence of a nutrient or a change in temperature. A large number of promoters recognized by a variety of potential host cells are well known.

A T7 promoter can be used in bacteria, a polyhedrin promoter can be used in insect cells, and a cytomegalovirus or metallothionein promoter can be used in mammalian cells. Also, in the case of higher eukaryotes, tissue-specific and cell type-specific promoters are widely available. These promoters are so named for their ability to direct expression of a nucleic acid molecule in a given tissue or cell type within the body. Skilled artisans are well aware of numerous promoters and other regulatory elements which can be used to direct expression of nucleic acids.

Transcription from vectors in mammalian host cells may be controlled, for example, by promoters obtained from the genomes of viruses such as polyoma virus, fowlpox virus, adenovirus (such as human adenovirus serotype 5), bovine papilloma virus, avian sarcoma virus, cytomegalovirus, a retrovirus (such as murine stem cell virus), hepatitis-B virus and most preferably Simian Virus 40 (SV40), from heterologous mammalian promoters, e.g., the actin promoter, PGK (phosphoglycerate kinase), or an immunoglobulin promoter, from heat-shock promoters, provided such promoters are compatible with the host cell systems. The early and late promoters of the SV40 virus are conveniently obtained as an SV40 restriction fragment that also contains the SV40 viral origin of replication.

Transcription by higher eukaryotes is often increased by inserting an enhancer sequence into the vector. Enhancers are cis-acting elements of DNA, usually about from 10 to 300 bp, which act on a promoter to increase its transcription. Enhancers are relatively orientation and position independent, having been found 5' and 3' to the transcription unit, within an intron, as well as within the coding sequence itself.

Many enhancer sequences are now known from mammalian genes (globin, elastase, albumin, alpha-fetoprotein, and insulin). Typically, however, one will use an enhancer from a eukaryotic cell virus. Examples include the SV40 enhancer on the late side of the replication origin, the cytomegalovirus early promoter enhancer, the polyoma enhancer on the late side of the replication origin, and adenovirus enhancers. The enhancer may be spliced into the expression vector at a position 5' or 3' to the coding sequence but is preferably located at a site 5' from the promoter. Expression vectors used in eukaryotic host cells will also contain sequences necessary for the termination of transcription and for stabilizing the mRNA. Such sequences are commonly available from the 5' and, occasionally 3', untranslated regions of eukaryotic or viral DNAs or cDNAs. Construction of suitable vectors containing one or more of the above-listed components employs standard techniques.

In addition to sequences that facilitate transcription of the inserted nucleic acid molecule, vectors can contain origins of replication, and other genes that encode a selectable marker. For example, the neomycin-resistance (neoR) gene imparts G418 resistance to cells in which it is expressed, and thus permits phenotypic selection of the transfected cells. Additional examples of marker or reporter genes include beta-lactamase, chloramphenicol acetyltransferase (CAT), adenosine deaminase (ADA), dihydrofolate reductase (DHFR), hygromycin-B-phosphotransferase (HPH), thymidine kinase (TK), lacZ (encoding beta-galactosidase), and xanthine guanine phosphoribosyltransferase (XGPRT). Those of skill in the art can readily determine whether a given regulatory element or selectable marker is suitable for use in a particular experimental context. Proper assembly of the expression vector can be confirmed by nucleotide sequencing, restriction mapping, and expression of a biologically active polypeptide in a suitable host.

Host Cells

The present disclosure further provides prokaryotic or eukaryotic cells that contain and express a nucleic acid molecule that encodes a polypeptide domains of gp130 binding molecule. A cell of the present disclosure is a transfected cell, i.e., a cell into which a nucleic acid molecule, for example a nucleic acid molecule encoding a polypeptide domains of gp130 binding molecule, has been introduced by means of recombinant DNA techniques. The progeny of such a cell are also considered within the scope of the present disclosure.

Host cells are typically selected in accordance with their compatibility with the chosen expression vector, the toxicity of the product coded for by the DNA sequences of this gp130 binding molecule, their secretion characteristics, their ability to fold the polypeptides correctly, their fermentation or culture requirements, and the ease of purification of the products coded for by the DNA sequences. Suitable host cells for cloning or expressing the DNA in the vectors herein are the prokaryote, yeast, or higher eukaryote cells.

In some embodiments the recombinant polypeptide domains of gp130 binding molecule or biologically active variants thereof can also be made in eukaryotes, such as yeast or human cells. Suitable eukaryotic host cells include insect cells (examples of Baculovirus vectors available for expression of proteins in cultured insect cells (e.g., Sf9 cells) include the pAc series (Smith et al. (1983) Mol. Cell Biol. 3:2156-2165) and the pVL series (Lucklow and Summers (1989) Virology 170:31-39)); yeast cells (examples of vectors for expression in yeast *S. cerevisiae* include pYepSecl (Baldari et al. (1987) EMBO J. 6:229-234), pMFa (Kurjan and Herskowitz (1982) Cell 30:933-943), pJRY88 (Schultz et al. (1987) Gene 54:113-123), pYES2 (Invitrogen Corporation, San Diego, Calif.), and pPicZ (Invitrogen Corporation, San Diego, Calif)); or mammalian cells (mammalian expression vectors include pCDM8 (Seed (1987) Nature 329:840) and pMT2PC (Kaufman et al. (1987) EMBO J. 6:187:195)).

Examples of useful mammalian host cell lines are mouse L cells (L-M[TK-], ATCC #CRL-2648), monkey kidney CV1 line transformed by SV40 (COS-7, ATCC CRL 1651); human embryonic kidney line (HEK293 or HEK293 cells subcloned for growth in suspension culture; baby hamster kidney cells (BHK, ATCC CCL 10); Chinese hamster ovary cells/-DHFR (CHO); mouse sertoli cells (TM4); monkey kidney cells (CV1 ATCC CCL 70); African green monkey kidney cells (VERO-76, ATCC CRL-1 587); human cervical carcinoma cells (HELA, ATCC CCL 2); canine kidney cells (MDCK, ATCC CCL 34); buffalo rat liver cells (BRL 3A, ATCC CRL 1442); human lung cells (W138, ATCC CCL 75); human liver cells (Hep G2, HB 8065); mouse mammary tumor (MMT 060562, ATCC CCL51); TRI cells; MRC 5 cells; FS4 cells; and a human hepatoma line (Hep G2). In mammalian cells, the expression vector's control functions are often provided by viral regulatory elements. For example, commonly used promoters are derived from polyoma, Adenovirus 2, cytomegalovirus, and Simian Virus 40.

The polypeptide domains of gp130 binding molecule can be produced in a prokaryotic host, such as the bacterium *E. coli*, or in a eukaryotic host, such as an insect cell (e.g., an Sf21 cell), or mammalian cells (e.g., COS cells, NIH 3T3 cells, or HeLa cells). These cells are available from many sources, including the American Type Culture Collection (Manassas, Va.). Artisans or ordinary skill are able to make such a determination. Furthermore, if guidance is required in selecting an expression system, skilled artisans may consult Ausubel et al. (Current Protocols in Molecular Biology, John Wiley and Sons, New York, N.Y., 1993) and Pouwels et al. (Cloning Vectors: A Laboratory Manual, 1985 Suppl. 1987).

In some embodiments, the recombinant polypeptide domains of gp130 binding molecule may be glycosylated or unglycosylated depending on the host organism used to produce the gp130 binding molecule. If bacteria are chosen as the host then the polypeptide domains of gp130 binding molecule produced will be aglycosylated. Eukaryotic cells, on the other hand, will glycosylate the recombinant polypeptide domains of gp130 binding molecule. For other additional expression systems for both prokaryotic and eukaryotic cells, see Chapters 16 and 17 of Sambrook et al. (1989) Molecular Cloning: A Laboratory Manual (2nd ed., Cold Spring Harbor Laboratory Press, Plainview, N.Y.). See, Goeddel (1990) in Gene Expression Technology: Methods in Enzymology 185 (Academic Press, San Diego, Calif.).

Transfection

The expression constructs of the can be introduced into host cells to thereby produce the recombinant polypeptide domains of gp130 binding molecule disclosed herein or to produce biologically active muteins thereof. Vector DNA can be introduced into prokaryotic or eukaryotic cells via conventional transformation or transfection techniques. Suitable methods for transforming or transfecting host cells can be found in Sambrook et al. (1989) Molecular Cloning: A Laboratory Manual (2d ed., Cold Spring Harbor Laboratory Press, Plainview, N.Y.) and other standard molecular biology laboratory manuals.

In order to facilitate transfection of the target cells, the target cell may be exposed directly with the non-viral vector may under conditions that facilitate uptake of the non-viral vector. Examples of conditions which facilitate uptake of foreign nucleic acid by mammalian cells are well known in the art and include but are not limited to chemical means (such as Lipofectamine®, Thermo-Fisher Scientific), high salt, and magnetic fields (electroporation).

Cell Culture

Cells may be cultured in conventional nutrient media modified as appropriate for inducing promoters, selecting transformants, or amplifying the genes encoding the desired sequences. Mammalian host cells may be cultured in a variety of media. Commercially available media such as Ham's F10 (Sigma), Minimal Essential Medium ((MEM), Sigma), RPMI 1640 (Sigma), and Dulbecco's Modified Eagle's Medium ((DMEM), Sigma) are suitable for culturing the host cells. Any of these media may be supplemented as necessary with hormones and/or other growth factors (such as insulin, transferrin, or epidermal growth factor), salts (such as sodium chloride, calcium, magnesium, and phosphate), buffers (such as HEPES), nucleosides (such as adenosine and thymidine), antibiotics, trace elements, and glucose or an equivalent energy source. Any other necessary supplements may also be included at appropriate concentrations that would be known to those skilled in the art. The culture conditions, such as temperature, pH and the like, are those previously used with the host cell selected for expression and will be apparent to the ordinarily skilled artisan.

Recovery of Recombinant Proteins

Recombinantly-produced gp130 binding polypeptides can be recovered from the culture medium as a secreted polypeptide if a secretion leader sequence is employed. Alternatively, the gp130 binding polypeptides can also be recovered from host cell lysates. A protease inhibitor, such as phenyl methyl sulfonyl fluoride (PMSF) may be employed during the recovery phase from cell lysates to inhibit proteolytic degradation during purification, and antibiotics may be included to prevent the growth of adventitious contaminants.

Purification

Various purification steps are known in the art and find use, e.g., affinity chromatography. Affinity chromatography makes use of the highly specific binding sites usually present in biological macromolecules, separating molecules on their ability to bind a particular ligand. Covalent bonds attach the ligand to an insoluble, porous support medium in a manner that overtly presents the ligand to the protein sample, thereby using natural specific binding of one molecular species to separate and purify a second species from a mixture. Antibodies are commonly used in affinity chromatography. Size selection steps may also be used, e.g., gel filtration chromatography (also known as size-exclusion chromatography or molecular sieve chromatography) is used to separate proteins according to their size. In gel filtration, a protein solution is passed through a column that is packed with semipermeable porous resin. The semipermeable resin has a range of pore sizes that determines the size of proteins that can be separated with the column.

The recombinant polypeptide domains of gp130 binding molecule produced by the transformed host can be purified according to any suitable method. gp130 binding molecules can be isolated from inclusion bodies generated in *E. coli*, or from conditioned medium from either mammalian or yeast cultures producing a given gp130 binding molecule sing cation exchange, gel filtration, and or reverse phase liquid chromatography.

The substantially purified forms of the recombinant polypeptides can be used, e.g., as therapeutic agents, as described herein.

The biological activity of the recombinant polypeptide domains of gp130 binding molecule produced in accordance with the foregoing can be confirmed by a gp130 binding using procedures well known in the art including but not limited to competition ELISA, radioactive ligand binding assays (e.g., saturation binding, Scatchard plot, nonlinear curve fitting programs and competition binding assays); non-radioactive ligand binding assays (e.g., fluorescence polarization (FP), fluorescence resonance energy transfer (FRET) and surface plasmon resonance assays (see, e.g., Drescher et al., Methods Mol Biol 493:323-343 (2009) with instrumentation commercially available from GE Healthcare Bio-Sciences such as the Biacore 8+, Biacore S200, Biacore T200 (GE Healthcare Bio-Sciences, 100 Results Way, Marlborough MA 01752)); liquid phase ligand binding assays (e.g., real-time polymerase chain reaction (RT-qPCR), and immunoprecipitation); and solid phase ligand binding assays (e.g., multiwell plate assays, on-bead ligand binding assays, on-column ligand binding assays, and filter assays).

Methods of Use

In some embodiments, compositions comprising gp130 binding molecules are useful in the treatment of a human diseases including autoimmune and inflammatory diseases, infectious diseases and neoplastic diseases. In one embodiment, the present disclosure provides a method of modulating the activity of cells expressing the gp130 by the administration of a gp130 binding molecule to a subject in an amount sufficient to interfere with the activity of receptors comprising the of gp130. The present disclosure further provides a method of modulating the activity of cells expressing the gp130 in a mixed population of cells comprising contacting said population of cells, in vivo and/or ex vivo, with a gp130 binding molecule or complex of the present disclosure to in an amount sufficient to interfere with the activity of receptors comprising the gp130. In some embodiments, the gp130 binding molecules of the present disclosure are inhibitors of the activity of receptors of which gp130 forms a subunit (e.g. IL6) Gp130 forms a subunit of the IL6 receptor and as previously discussed, IL6 inhibitors have established utility in the treatment of autoimmune and inflammatory disease, infectious disease and neoplastic disease.

Autoimmune and Inflammatory Diseases

Disorders amenable to treatment with an gp130 binding molecule (including pharmaceutically acceptable formulations comprising an gp130 binding molecules and/or the nucleic acid molecules that encode them including recombinant viruses encoding such an gp130 binding molecules) of the present disclosure include inflammatory or autoimmune diseases including but not limited to, organ rejection, graft versus host disease, autoimmune thyroid disease, multiple sclerosis, allergy, asthma, neurodegenerative diseases including Alzheimer's disease, systemic lupus erythramatosis (SLE), autoinflammatory diseases, inflammatory bowel disease (IBD), Crohn's disease, diabetes including Type 1 or type 2 diabetes, inflammation, autoimmune disease, atopic diseases, paraneoplastic autoimmune diseases, cartilage inflammation, arthritis, rheumatoid arthritis, juvenile arthritis, juvenile rheumatoid arthritis, juvenile rheumatoid arthritis, polyarticular juvenile rheumatoid arthritis, systemic onset juvenile rheumatoid arthritis, juvenile ankylosing spondylitis, juvenile enteropathic arthritis, juvenile reactive arthritis, juvenile Reiter's Syndrome, SEA Syndrome (Seronegativity Enthesopathy Arthropathy Syndrome), juvenile dermatomyositis, juvenile psoriatic arthritis, juvenile scleroderma, juvenile systemic lupus erythematosus, juvenile vasculitis, pauciarticular rheumatoidarthritis, polyarticular rheumatoidarthritis, systemic onset rheumatoidarthritis, ankylosing spondylitis, enteropathic arthritis, reactive arthritis, Reiter's syndrome,SEA Syndrome(Seronegativity, Enthesopathy, Arthropathy Syndrome).

Other examples of proliferative and/or differentiative disorders amenable to treatment with gp130 binding molecules (including pharmaceutically acceptable formulations comprising gp130 binding molecules and/or the nucleic acid molecules that encode them including recombinant viruses encoding such gp130 binding molecules) of the present disclosure include, but are not limited to, skin disorders. The skin disorder may involve the aberrant activity of a cell or a group of cells or layers in the dermal, epidermal, or hypodermal layer, or an abnormality in the dermal-epidermal junction. For example, the skin disorder may involve aberrant activity of keratinocytes (e.g., hyperproliferative basal and immediately suprabasal keratinocytes), melanocytes, Langerhans cells, Merkel cells, immune cell, and other cells found in one or more of the epidermal layers, e.g., the stratum basale (stratum germinativum), stratum spinosum, stratum granulosum, stratum lucidum or stratum corneum. In other embodiments, the disorder may involve aberrant activity of a dermal cell, for example, a dermal endothelial, fibroblast, immune cell (e.g., mast cell or macrophage) found in a dermal layer, for example, the papillary layer or the reticular layer.

Examples of inflammatory or autoimmune skin disorders include psoriasis, psoriatic arthritis, dermatitis (eczema), for example, exfoliative dermatitis or atopic dermatitis, pityriasis rubra pilaris, pityriasis rosacea, parapsoriasis, pityriasis lichenoiders, lichen planus, lichen nitidus, ichthyosiform dermatosis, keratodermas, dermatosis, alopecia areata, pyoderma gangrenosum, vitiligo, pemphigoid (e.g., ocular cicatricial pemphigoid or bullous pemphigoid), urticaria, prokeratosis, rheumatoid arthritis that involves hyperproliferation and inflammation of epithelial-related cells lining the joint capsule; dermatitises such as seborrheic dermatitis and solar dermatitis; keratoses such as seborrheic keratosis, senile keratosis, actinic keratosis, photo-induced keratosis, and keratosis follicularis; acne vulgaris; keloids and prophylaxis against keloid formation; nevi; warts including verruca, condyloma or condyloma acuminatum, and human papilloma viral (HPV) infections such as venereal warts; leukoplakia; lichen planus; and keratitis. The skin disorder can be dermatitis, e.g., atopic dermatitis or allergic dermatitis, or psoriasis.

The compositions of the present disclosure (including pharmaceutically acceptable formulations comprising gp130 binding molecules and/or the nucleic acid molecules that encode them including recombinant viruses encoding such gp130 binding molecules) can also be administered to a patient who is suffering from (or may suffer from) psoriasis or psoriatic disorders. The term "psoriasis" is intended to have its medical meaning, namely, a disease which afflicts primarily the skin and produces raised, thickened, scaling, nonscarring lesions. The lesions are usually sharply demarcated erythematous papules covered with overlapping shiny scales. The scales are typically silvery or slightly opalescent. Involvement of the nails frequently occurs resulting in pitting, separation of the nail, thickening and discoloration. Psoriasis is sometimes associated with arthritis, and it may be crippling. Hyperproliferation of keratinocytes is a key feature of psoriatic epidermal hyperplasia along with epidermal inflammation and reduced differentiation of keratinocytes. Multiple mechanisms have been invoked to explain the keratinocyte hyperproliferation that characterizes psoriasis. Disordered cellular immunity has also been implicated in the pathogenesis of psoriasis. Examples of psoriatic disorders include chronic stationary psoriasis, plaque psoriasis, moderate to severe plaque psoriasis, psoriasis vulgaris, eruptive psoriasis, psoriatic erythroderma, generalized pustular psoriasis, annular pustular psoriasis, or localized pustular psoriasis.

Combination with Supplementary Therapeutic Agents

The present disclosure provides for the use of the gp130 binding molecules of the present disclosure in combination with one or more additional active agents ("supplementary agents"). Such further combinations are referred to interchangeably as "supplementary combinations" or "supplementary combination therapy" and those therapeutic agents that are used in combination with gp130 binding molecules of the present disclosure are referred to as "supplementary agents." As used herein, the term "supplementary agents" includes agents that can be administered or introduced separately, for example, formulated separately for separate administration (e.g., as may be provided in a kit) and/or therapies that can be administered or introduced in combination with the gp130 binding molecules.

As used herein, the term "in combination with" when used in reference to the administration of multiple agents to a subject refers to the administration of a first agent at least one additional (i.e. second, third, fourth, fifth, etc.) agent to a subject. For purposes of the present invention, one agent (e.g., gp130 binding molecule) is considered to be administered in combination with a second agent (e.g., a modulator of an immune checkpoint pathway) if the biological effect resulting from the administration of the first agent persists in the subject at the time of administration of the second agent such that the therapeutic effects of the first agent and second agent overlap. For example, the PD1 immune checkpoint inhibitors (e.g., nivolumab or pembrolizumab) are typically administered by IV infusion every two weeks or every three weeks while the gp130 binding molecules of the present disclosure are typically administered more frequently, e.g., daily, BID, or weekly. However, the administration of the first agent (e.g., pembrolizumab) provides a therapeutic effect over an extended time and the administration of the second agent (e.g., an gp130 binding molecule) provides its therapeutic effect while the therapeutic effect of the first agent remains ongoing such that the second agent is considered to be administered in combination with the first agent, even though the first agent may have been administered at a point in time significantly distant (e.g., days or weeks) from the time of administration of the second agent. In one embodiment, one agent is considered to be administered in combination with a second agent if the first and second agents are administered simultaneously (within 30 minutes of each other), contemporaneously or sequentially. In some embodiments, a first agent is deemed to be administered "contemporaneously" with a second agent if first and second agents are administered within about 24 hours of each another, preferably within about 12 hours of each other, preferably within about 6 hours of each other, preferably within about 2 hours of each other, or preferably within about 30 minutes of each other. The term "in combination with" shall also understood to apply to the situation where a first agent and a second agent are co-formulated in single pharmaceutically acceptable formulation and the co-formulation is administered to a subject. In certain embodiments, the gp130 binding molecule and the supplementary agent(s) are administered or applied sequentially, e.g., where one agent is administered prior to one or more other agents. In other embodiments, the gp130 binding molecule and the supplementary agent(s) are administered simultaneously, e.g., where two or more agents are administered at or about the same time; the two or more agents may be present in two or more separate formulations or combined into a single formulation (i.e., a co-formulation). Regardless of whether the agents are administered sequentially or simultaneously, they are considered to be administered in combination for purposes of the present disclosure.

Supplemental Agents Useful in the Treatment of Inflammatory or Autoimmune Disorders In some embodiments, the method further comprises administering of the gp130 binding molecule of the present disclosure in combination with one or more supplementary agents selected from the group consisting of a corticosteroid, a Janus kinase inhibitor, a calcineurin inhibitor, a mTor inhibitor, an IMDH inhibitor, a biologic, a vaccine, and a therapeutic antibody. In certain embodiments, the therapeutic antibody is an antibody that binds a protein selected from the group consisting of BLyS, CDT 1a, CD20, CD25, CD3, CD52, IgE, IL12/IL23, IL17α, IL1β, IL4Rα, IL5, IL6R, integrin-α4β7, RANKL, TNFα, VEGF-A, and VLA-4.

In some embodiments, the supplementary agent is one or more agents selected from the group consisting of corticosteroids (including but not limited to prednisone, budesonide, prednilisone), Janus kinase inhibitors (including but not limited to tofacitinib (Xeljanz®)), calcineurin inhibitors (including but not limited to cyclosporine and tacrolimus), mTor inhibitors (including but not limited to sirolimus and everolimus), IMDH inhibitors (including but not limited to azathioprine, leflunomide and mycophenolate), biologics such as abatcept (Orencia®) or etanercept (Enbrel®), and therapeutic antibodies.

Examples of therapeutic antibodies that may be administered as supplementary agents in combination with the gp130 binding molecules of the present disclosure in the treatment of autoimmune disease include but are not limited to anti-CD25 antibodies (e.g. daclizumab and basiliximab), anti-VLA-4 antibodies (e.g. natalizumab), anti-CD52 antibodies (e.g. alemtuzumab), anti-CD20 antibodies (e.g. rituximab, ocrelizumab), anti-TNF antibodies (e.g. infliximab, and adalimumab), anti-IL6R antibodies (e.g. tocilizumab), anti-TNFα antibodies (e.g. adalimumab (Humira®), golimumab, and infliximab), anti-integrin-α4β7 antibodies (e.g. vedolizumab), anti-IL17a antibodies (e.g. brodalumab or secukinumab), anti-IL4Rα antibodies (e.g. dupilumab), anti-RANKL antibodies, IL6R antibodies, anti-IL1β antibodies (e.g. canakinumab), anti-CD11a antibodies (e.g. efalizumab), anti-CD3 antibodies (e.g. muramonab), anti-IL5 antibodies (e.g. mepolizumab, reslizumab), anti-BLyS antibodies (e.g. belimumab); and anti-IL12/IL23 antibodies (e.g ustekinumab).

Many therapeutic antibodies have been approved for clinical use against autoimmune disease. Examples of antibodies approved by the United States Food and Drug Administration (FDA) for use in the treatment of autoimmune diseases in a subject suffering therefrom that may be administered as supplementary agents in combination with the gp130 binding molecules of the present disclosure (and optionally additional supplementary agents) for the treatment of the indicated autoimmune disease are provided in Table 8 below:

TABLE 8

Antibodies Useful as Supplmentary Agents In the Treatment of Autoimmune and Inflammatory Disease

| Name | Target | Therapeutic Indication |
|---|---|---|
| efalizumab | CD11a | Psoriasis |
| belimumab | BLyS | Systemic lupus erythematosus |
| ocrelizumab | CD20 | Multiple sclerosis |
| rituximab | CD20 | Multiple sclerosis |
| basiliximab | CD25 | Transplantation rejection |
| daclizumab | CD25 | Transplantation rejection |
| muromonab | CD3 | Transplantation rejection |
| alemtuzumab | CD52 | Multiple sclerosis |
| omalizumab | IgE | Asthma |
| ustekinumab | IL12/IL23 | Plaque psoriasis |
| brodalumab | IL17a | Psoriasis, psoriatic arthritis, ankylosing spondylitis |
| secukinumab | IL17a | Psoriasis, psoriatic arthritis, ankylosing spondylitis |
| ixekizumab | IL17a | Psoriasis, psoriatic arthritis, ankylosing spondylitis |
| canakinumab | IL1β | Cryopyrin-associated periodic syndrome, tumor necrosis factor receptor associated periodic syndrome, hyperimmunoglobulin D syndrome, mevalonate kinase deficiency, familial Mediterranean fever, rheumatoid arthritis |
| dupilumab | IL4Rα | Asthma, dermatitis |
| mepolizumab | IL5 | Asthma |
| reslizumab | IL5 | Asthma |
| tocilizumab | IL6R | Rheumatoid arthritis |
| vedolizumab | Integrin-α4β7 | Ulcerative colitis, Crohn's disease |
| denosumab | RANKL | Osteoporosis |
| certolizumab | TNFa | Chron's disease, rheumatoid arthritis |
| golimumab | TNFa | Rheumatoid arthritis, psoriatic arthritis, ankylosing spondylitis |
| adalimumab | TNFα | Rheumatoid arthritis, juvenile idiopathic arthritis, psoriatic arthrit ankylosing spondylitis, Crohn's disease, plaque psoriasis |
| infliximab | TNFα | Crohn's disease, ulcerative colitis, rheumatoid arthritis, ankylosin spondylitis, psoriatic arthritis, plaque psoriasis |
| ranibizumab | VEGF-A | Neovascular age-related macular degeneration, macular edema |
| natalizumab | VLA-4 | Multiple sclerosis, relapsing multiple sclerosis, Crohn's disease |

The foregoing antibodies of Table 8 useful as supplementary agents in the practice of the methods of the present disclosure may be administered alone or in the form of any antibody drug conjugate (ADC) comprising the antibody, linker, and one or more drugs (e.g. 1, 2, 3, 4, 5, 6, 7, or 8 drugs) or in modified form (e.g. PEGylated).

Treatment of Neoplastic Disease

The present disclosure provides methods of use of gp130 binding molecules in the treatment of subjects suffering from a neoplastic disease disorder or condition by the administration of a therapeutically effective amount of a gp130 binding molecule (or nucleic acid encoding a gp130 binding molecule including recombinant vectors encoding gp130 binding molecules, and eucaryotic and procaryotic cells modified to express a gp130 binding molecule) as described herein.

Neoplasms Amenable to Treatment:

The compositions and methods of the present disclosure are useful in the treatment of subject suffering from a neoplastic disease characterized by the presence neoplasms, including benign and malignant neoplasms, and neoplastic disease.

Examples of benign neoplasms amenable to treatment using the compositions and methods of the present disclosure include but are not limited to adenomas, fibromas, hemangiomas, and lipomas. Examples of pre-malignant neoplasms amenable to treatment using the compositions and methods of the present disclosure include but are not limited to hyperplasia, atypia, metaplasia, and dysplasia. Examples of malignant neoplasms amenable to treatment using the compositions and methods of the present disclosure include but are not limited to carcinomas (cancers arising from epithelial tissues such as the skin or tissues that line internal organs), leukemias, lymphomas, and sarcomas typically derived from bone fat, muscle, blood vessels or connective tissues). Also included in the term neoplasms are viral induced neoplasms such as warts and EBV induced disease (i.e., infectious mononucleosis), scar formation, hyperproliferative vascular disease including intimal smooth muscle cell hyperplasia, restenosis, and vascular occlusion and the like.

The term "neoplastic disease" includes cancers characterized by solid tumors and non-solid tumors including but not limited to breast cancers; sarcomas (including but not limited to osteosarcomas and angiosarcomas and fibrosarcomas), leukemias, lymphomas, genitourinary cancers (including but not limited to ovarian, urethral, bladder, and prostate cancers); gastrointestinal cancers (including but not limited to colon esophageal and stomach cancers); lung cancers; myelomas; pancreatic cancers; liver cancers; kidney cancers; endocrine cancers; skin cancers; and brain or central and peripheral nervous (CNS) system tumors, malignant or benign, including gliomas and neuroblastomas, astrocytomas, myelodysplastic disorders; cervical carcinoma-in-situ; intestinal polyposes; oral leukoplakias; histiocytoses, hyperprofroliferative scars including keloid scars, hemangiomas; hyperproliferative arterial stenosis, psoriasis, inflammatory arthritis; hyperkeratoses and papulosquamous eruptions including arthritis.

The term neoplastic disease includes carcinomas. The term "carcinoma" refers to malignancies of epithelial or endocrine tissues including respiratory system carcinomas, gastrointestinal system carcinomas, genitourinary system carcinomas, testicular carcinomas, breast carcinomas, prostatic carcinomas, endocrine system carcinomas, and melanomas. The term neoplastic disease includes adenocarcinomas. An "adenocarcinoma" refers to a carcinoma derived from glandular tissue or in which the tumor cells form recognizable glandular structures.

As used herein, the term "hematopoietic neoplastic disorders" refers to neoplastic diseases involving hyperplastic/neoplastic cells of hematopoietic origin, e.g., arising from myeloid, lymphoid or erythroid lineages, or precursor cells thereof.

Myeloid neoplasms include, but are not limited to, myeloproliferative neoplasms, myeloid and lymphoid disorders with eosinophilia, myeloproliferative/myelodysplastic neoplasms, myelodysplastic syndromes, acute myeloid leukemia and related precursor neoplasms, and acute leukemia of ambiguous lineage. Exemplary myeloid disorders amenable to treatment in accordance with the present disclosure include, but are not limited to, acute promyeloid leukemia (APML), acute myelogenous leukemia (AML) and chronic myelogenous leukemia (CML).

Lymphoid neoplasms include, but are not limited to, precursor lymphoid neoplasms, mature B-cell neoplasms, mature T-cell neoplasms, Hodgkin's Lymphoma, and immunodeficiency-associated lymphoproliferative disorders. Exemplary lymphic disorders amenable to treatment in accordance with the present disclosure include, but are not limited to, acute lymphoblastic leukemia (ALL) which includes B-lineage ALL and T-lineage ALL, chronic lymphocytic leukemia (CLL), prolymphocytic leukemia (PLL), hairy cell leukemia (HLL) and Waldenstrom's macroglobulinemia (WM).

In some instances, the hematopoietic neoplastic disorder arises from poorly differentiated acute leukemias (e.g., erythroblastic leukemia and acute megakaryoblastic leukemia). As used herein, the term "hematopoietic neoplastic disorders" refers malignant lymphomas including, but are not limited to, non-Hodgkins lymphoma and variants thereof, peripheral T cell lymphomas, adult T-cell leukemia/lymphoma (ATL), cutaneous T cell lymphoma (CTCL), large granular lymphocytic leukemia (LGF), Hodgkin's disease and Reed-Steinberg disease.

The determination of whether a subject is "suffering from a neoplastic disease" refers to a determination made by a physician with respect to a subject based on the available information accepted in the field for the identification of a disease, disorder or condition including but not limited to X-ray, CT-scans, conventional laboratory diagnostic tests (e.g. blood count, etc.), genomic data, protein expression data, immunohistochemistry, that the subject requires or will benefit from treatment.

Combination of Gp130 Binding Molecules with Supplementary Anti-Neoplastic Agents:

The present disclosure provides for the use of the gp130 binding molecules of the present disclosure in combination with one or more additional active anti-neoplastic agents ("supplementary agents") for the treatment of neoplastic disease. Such further combinations are referred to interchangeably as "supplementary anti-neoplastic combinations" or "supplementary anti-neoplastic combination therapy" and those therapeutic agents that are used in combination with gp130 binding molecules of the present disclosure are referred to as "supplementary anti-neoplastic agents." As used herein, the term "supplementary anti-neoplastic agents" includes anti-neoplastic agents that can be administered or introduced separately, for example, formulated separately for separate administration (e.g., as may be provided in a kit) and/or therapies that can be administered or introduced in combination with the gp130 binding molecules.

Chemotherapeutic Agents:

In some embodiments, the supplementary anti-neoplastic agent is a chemotherapeutic agent. In some embodiments the supplementary agent is a "cocktail" of multiple chemotherapeutic agents. In some embodiments the chemotherapeutic agent or cocktail is administered in combination with one or more physical methods (e.g. radiation therapy). The term "chemotherapeutic agents" includes but is not limited to alkylating agents such as thiotepa and cyclosphosphamide; alkyl sulfonates such as busulfan, improsulfan and piposulfan; aziridines such as benzodopa, carboquone, meturedopa, and uredopa; ethylenimines and methylamelamines including altretamine, triethylenemelamine, trietylenephosphoramide, triethylenethiophosphaoramide and trimethylolomelamime; nitrogen mustards such as chlorambucil, chlomaphazine, cholophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, ranimustine; antibiotics such as aclacinomysins, actinomycin, authramycin, azaserine, bleomycins such as bleomycin $A_2$, cactinomycin, calicheamicin, carabicin, caminomycin, carzinophilin, chromomycins, dactinomycin, daunorubicin and derivatives such as demethoxy-daunomycin, 11-deoxydaunorubicin, 13-deoxydaunorubicin, detorubicin, 6-diazo-5-oxo-L-norleucine, doxorubicin, epirubicin, esorubicin, idarubicin, marcellomycin, mitomycins such as mitomycin C, N-methyl mitomycin C; mycophenolic acid, nogalamycin, olivomycins, peplomycin, potfiromycin, puromycin, quelamycin, rodorubicin, streptonigrin, streptozocin, tubercidin, ubenimex, zinostatin, zorubicin; anti-metabolites such as methotrexate and 5-fluorouracil (5-FU); folic acid analogues such as denopterin, methotrexate, pteropterin, trimetrexate, dideazatetrahydrofolic acid, and folinic acid; purine analogs such as fludarabine, 6-mercaptopurine, thiamiprine, thioguanine; pyrimidine analogs such as ancitabine, azacitidine, 6-azauridine, carmofur, cytarabine, dideoxyuridine, doxifluridine, enocitabine, floxuridine, 5-FU; androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldophosphamide glycoside; aminolevulinic acid; amsacrine; bestrabucil; bisantrene; edatraxate; defofamine; demecolcine; diaziquone; elformithine; elliptinium acetate; etoglucid; gallium nitrate; hydroxyurea; lentinan; lonidamine; mitoguazone; mitoxantrone; mopidamol; nitracrine; pentostatin; phenamet; pirarubicin; podophyllinic acid; 2-ethylhydrazide; procarbazine; razoxane; sizofiran; spirogermanium; tenuazonic acid; triaziquone; 2,2',2"-trichlorotriethylamine; urethan; vindesine; dacarbazine; mannomustine; mitobronitol; mitolactol; pipobroman; gacytosine; arabinoside (Ara-C); cyclophosphamide; thiotepa; taxoids, e.g., paclitaxel, nab-paclitaxel and doxetaxel; chlorambucil; gemcitabine; 6-thioguanine; mercaptopurine; methotrexate; platinum and platinum coordination complexes such as cisplatin, oxaplatin and carboplatin; vinblastine; etoposide (VP-16); ifosfamide; mitomycin C; mitoxantrone; vincristine; vinorelbine; navelbine; novantrone; teniposide; daunomycin; aminopterin; xeloda; ibandronate; CPT11; topoisomerase inhibitors; difluoromethylomithine (DMFO); retinoic acid; esperamicins; capecitabine; taxanes such as paclitaxel, docetaxel, cabazitaxel; carminomycin, adriamycins such as 4'-epiadriamycin, 4-adriamycin-14-benzoate, adriamycin-14-octanoate, adriamycin-14-naphthaleneacetate; cholchicine and pharmaceutically acceptable salts, acids or derivatives of any of the above.

The term "chemotherapeutic agents" also includes anti-hormonal agents that act to regulate or inhibit hormone action on tumors such as anti-estrogens, including for example tamoxifen, raloxifene, aromatase inhibiting 4(5)-imidazoles, 4-hydroxytamoxifen, trioxifene, keoxifene, onapristone, and toremifene; and antiandrogens such as flutamide, nilutamide, bicalutamide, leuprolide, and goserelin; and pharmaceutically acceptable salts, acids or derivatives of any of the above.

In some embodiments, a supplementary anti-neoplastic agent is one or more chemical or biological agents identified in the art as useful in the treatment of neoplastic disease, including, but not limited to, a cytokines or cytokine antagonists such as IL-12, INFα, or anti-epidermal growth factor receptor, irinotecan; tetrahydrofolate antimetabolites such as pemetrexed; antibodies against tumor antigens, a complex of a monoclonal antibody and toxin, a T-cell adjuvant, bone marrow transplant, or antigen presenting cells (e.g., dendritic cell therapy), anti-tumor vaccines, replication competent viruses, signal transduction inhibitors (e.g., Gleevec® or Herceptin®) or an immunomodulator to achieve additive or synergistic suppression of tumor growth, non-steroidal anti-inflammatory drugs (NSAIDs), cyclooxygenase-2 (COX-2) inhibitors, steroids, TNF antagonists (e.g., Remicade® and Enbrel®), interferon-β1a (Avonex®), and interferon-β1b (Betaseron®) as well as combinations of one or more of the foregoing as practiced in known chemotherapeutic treatment regimens including but not limited to TAC, FOLFOX, TPC, FEC, ADE, FOLFOX-6, EPOCH, CHOP, CMF, CVP, BEP, OFF, FLOX, CVD, TC, FOLFIRI, PCV, FOLFOXIRI, ICE-V, XELOX, and others that are readily appreciated by the skilled clinician in the art.

In some embodiments, the gp130 binding molecule is administered in combination with BRAF/MEK inhibitors, kinase inhibitors such as sunitinib, PARP inhibitors such as olaparib, EGFR inhibitors such as osimertinib (Ahn, et al. (2016) J Thorac Oncol 11:S115), IDO inhibitors such as epacadostat, and oncolytic viruses such as talimogene laherparepvec (T-VEC).

Anti-Tumor Antigen Antibody Therapeutics as Supplementary Agents

In some embodiments, a "supplementary anti-neoplastic agent" is a therapeutic antibody (including bi-specific and tri-specific antibodies which bind to one or more tumor associated antigens including but not limited to bispecific T cell engagers (BITEs), dual affinity retargeting (DART) constructs, and trispecific killer engager (TriKE) constructs).

In some embodiments, the therapeutic antibody is an antibody that binds to at least one tumor antigen selected from the group consisting of HER2 (e.g. trastuzumab, pertuzumab, ado-trastuzumab emtansine), nectin-4 (e.g. enfortumab), CD79 (e.g. polatuzumab vedotin), CTLA4 (e.g. ipilumumab), CD22 (e.g. moxetumomab pasudotox), CCR4 (e.g. magamuizumab), IL23p19 (e.g. tildrakizumab), PDL1 (e.g. durvalumab, avelumab, atezolizumab), IL17a (e.g. ixekizumab), CD38 (e.g. daratumumab), SLAMF7 (e.g. elotuzumab), CD20 (e.g. rituximab, tositumomab, ibritumomab and ofatumumab), CD30 (e.g. brentuximab vedotin), CD33 (e.g. gemtuzumab ozogamicin), CD52 (e.g. alemtuzumab), EpCam, CEA, fpA33, TAG-72, CAIX, PSMA, PSA, folate binding protein, GD2 (e.g. dinuntuximab), GD3, IL6 (e.g. silutxumab) GM2, Le$^y$, VEGF (e.g. bevacizumab), VEGFR, VEGFR2 (e.g. ramucirumab), PDGFRa (e.g. olartumumab), EGFR (e.g. cetuximab, panitumumab and necitumumab), ERBB2 (e.g. trastuzumab), ERBB3, MET, IGF1R, EPHA3, TRAIL R1, TRAIL R2, RANKL RAP, tenascin, integrin αVβ, and integrin α4β1.

In some embodiments, a therapeutic antibody is an immune checkpoint modulator for the treatment and/or prevention neoplastic disease in a subject as well as diseases, disorders or conditions associated with neoplastic disease. The term "immune checkpoint pathway" refers to biological response that is triggered by the binding of a first molecule (e.g. a protein such as PD1) that is expressed on an antigen presenting cell (APC) to a second molecule (e.g. a protein such as PDL1) that is expressed on an immune cell (e.g. a T-cell) which modulates the immune response, either through stimulation (e.g. upregulation of T-cell activity) or inhibition (e.g. downregulation of T-cell activity) of the immune response. The molecules that are involved in the formation of the binding pair that modulate the immune response are commonly referred to as "immune checkpoints." In one embodiment, the immune checkpoint pathway modulator is an antagonist of a negative immune checkpoint pathway that inhibits the binding of PD1 to PDL1 and/or PDL2 ("PD1 pathway inhibitor). The term PD1 pathway inhibitors includes monoclonal antibodies that interfere with the binding of PD1 to PDL1 and/or PDL2. Examples of commercially available PD1 pathway inhibitors useful as supplementary agents in the treatment of neoplastic disease include antibodies that interfere with the binding of PD1 to PDL1 and/or PDL2 including but not limited to nivolumab (Opdivo®, BMS-936558, MDX1106, commercially available from BristolMyers Squibb, Princeton NJ), pembrolizumab (Keytruda®MK-3475, lambrolizumab, commercially available from Merck and Company, Kenilworth NJ), and atezolizumab (Tecentriq®, Genentech/Roche, South San Francisco CA). Additional PD1 pathway inhibitors antibodies are in clinical development including but not limited to durvalumab (MEDI4736, Medimmune/AstraZeneca), pidilizumab (CT-011, CureTech), PDR001 (Novartis), BMS-936559 (MDX1105, BristolMyers Squibb), and avelumab (MSB0010718C, Merck Serono/Pfizer) and SHR-1210 (Incyte). Additional antibody PD1 pathway inhibitors are described in U.S. Pat. No. 8,217,149 (Genentech, Inc) issued Jul. 10, 2012; U.S. Pat. No. 8,168,757 (Merck Sharp and Dohme Corp.) issued May 1, 2012, U.S. Pat. No. 8,008,449 (Medarex) issued Aug. 30, 2011, U.S. Pat. No. 7,943,743 (Medarex, Inc) issued May 17, 2011.

Examples of antibody therapeutics which are FDA approved and may be used as supplementary agents for use in the treatment of neoplastic disease include atezolizumab, olaratumab, ixekizumab, trastuzumab, infliximab, rituximab, edrecolomab, daratumumab, elotuzumab, necitumumab, dinutuximab, nivolumab, blinatumomab, pembrolizumab, pertuzumab, brentuximab vedotin, ipilimumab, ofatumumab, certolizumab pegol, catumaxomab, panitumumab, bevacizumab, ramucirumab, siltuximab, enfortumab vedotin, polatuzumab vedotin, [fam]-trastuzumab deruxtecan, cemiplimab, moxetumomab pasudotox, mogamuizumab, tildrakizumab, ibalizumab, durvalumab, inotuzumab, ozogamicin, avelumab, obinutuzumab, ado-trastuzumab emtansine, cetuximab, tositumomab-I131, ibritumomab tiuxetan, gemtuzumab, and ozogamicin.

Physical Methods

In some embodiments, a supplementary anti-neoplastic agent is one or more non-pharmacological modalities (e.g., localized radiation therapy or total body radiation therapy or surgery). By way of example, the present disclosure contemplates treatment regimens wherein a radiation phase is preceded or followed by treatment with a treatment regimen comprising a gp130 binding molecule and one or more supplementary anti-neoplastic agents. In some embodiments, the present disclosure further contemplates the use of a gp130 binding molecule in combination with surgery (e.g. tumor resection). In some embodiments, the present disclosure further contemplates the use of a gp130 binding molecule in combination with bone marrow transplantation, peripheral blood stem cell transplantation or other types of transplantation therapy.

In some embodiments, the methods of the disclosure may include the combination of the administration of a gp130 binding molecules with supplementary agents in the form of cell therapies for the treatment of neoplastic, autoimmune or inflammatory diseases. Examples of cell therapies that are amenable to use in combination with the methods of the present disclosure include but are not limited to engineered T cell products comprising one or more activated CAR-T cells, engineered TCR cells, tumor infiltrating lymphocytes (TILs), engineered Treg cells.

CARs useful in the practice of the present invention are prepared in accordance with principles well known in the art. See e.g., Eshhaar et al. U.S. Pat. No. 7,741,465 Bi issued Jun. 22, 2010; Sadelain, et al (2013) Cancer Discovery 3(4):388-398; Jensen and Riddell (2015) Current Opinions in Immunology 33:9-15; Gross, et al. (1989) PNAS(USA) 86(24):10024-10028; Curran, et al. (2012) J Gene Med 14(6):405-15. Examples of commercially available CAR-T cell products include axicabtagene ciloleucel (marketed as Yescarta® commercially available from Gilead Pharmaceuticals) and tisagenlecleucel (marketed as Kymriah® commercially available from Novartis). In some embodiments, the CAR-T possesses a CAR specifically binds to a cell surface molecule associated with a tumor cell is selected from the group consisting of GD2, BCMA, CD19, CD33, CD38, CD70, GD2, IL3Rα2, CD19, mesothelin, Her2, EpCam, Mucd, ROR1, CD133, CEA, EGRFRVIII, PSCA, GPC3, Pan-ErbB and FAP Formulations The present disclosure further provides pharmaceutically acceptable formulations of the gp130 binding molecules of the present disclosure. The preferred formulation depends on the intended mode of administration and therapeutic application. Pharmaceutical dosage forms of the gp130 binding molecules described herein comprise physiologically acceptable carriers that are inherently non-toxic and non-therapeutic. Examples of such carriers include ion exchangers, alumina, aluminum stearate, lecithin, serum proteins, such as human serum albumin, buffer substances such as phosphates, glycine, sorbic acid, potassium sorbate, partial glyceride mixtures of saturated vegetable fatty acids, water, salts, or electrolytes such as protamine sulfate, disodium hydrogen phosphate, potassium hydrogen phosphate, sodium chloride, zinc salts, colloidal silica, magnesium trisilicate, polyvinyl pyrrolidone, cellulose-based substances, and PEG. Carriers for topical or gel-based forms of polypeptides include polysaccharides such as sodium carboxymethylcellulose or methylcellulose, polyvinylpyrrolidone, polyacrylates, polyoxyethylene-polyoxypropylene-block polymers, PEG, polymeric amino acids, amino acid copolymers, and lipid aggregates (such as oil droplets or liposomes).

The pharmaceutical compositions may also comprise pharmaceutically-acceptable, non-toxic carriers, excipients, stabilizers, or diluents, which are defined as vehicles commonly used to formulate pharmaceutical compositions for animal or human administration. The diluent is selected so as not to affect the biological activity of the combination. Acceptable carriers, excipients, or stabilizers are non-toxic to recipients at the dosages and concentrations employed, and include buffers such as phosphate, citrate, and other organic acids; antioxidants including ascorbic acid and methionine; preservatives (such as octadecyidimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g., Zn-protein complexes); and/or non-ionic surfactants such as TWEEN™, PLURONICS™ or polyethylene glycol (PEG).

Formulations to be used for in vivo administration are typically sterile. Sterilization of the compositions of the present disclosure may readily accomplished by filtration through sterile filtration membranes.

Typically, compositions are prepared as injectables, either as liquid solutions or suspensions; solid forms suitable for solution in, or suspension in, liquid vehicles prior to injection can also be prepared. The preparation also can be emulsified or encapsulated in liposomes or micro particles such as polylactide, polyglycolide, or copolymer for enhanced adjuvant effect, as discussed above (Langer, Science 249: 1527, 1990 and Hanes, *Advanced Drug Delivery Reviews* 28: 97-119, 1997). The agents of this disclosure can be administered in the form of a depot injection or implant preparation which can be formulated in such a manner as to permit a sustained or pulsatile release of the active ingredient. The pharmaceutical compositions are generally formulated as sterile, substantially isotonic and in full compliance with all Good Manufacturing Practice (GMP) regulations of the U.S. Food and Drug Administration.

Vector Delivery of Polypeptide Gp130 Binding Molecules

In those embodiments where the gp130 binding molecule is a polypeptide, such gp130 binding molecules may also be delivered to a subject through the administration of a recombinant vectors comprising a nucleic acid sequence encoding the peptidyl gp130 binding molecule operably linked to an expression control sequence in the cells of the tissues of the subject.

Expression vectors may be viral vectors or non-viral vectors. The term "nonviral vector" refers to an autonomously replicating, extrachromosomal circular DNA molecule, distinct from the normal genome and nonessential for cell survival under nonselective conditions capable of effecting the expression of an coding sequence in the target cell. Plasmids are examples of non-viral vectors. In order to facilitate transfection of the target cells, the target cell may be exposed directly with the non-viral vector may under conditions that facilitate uptake of the non-viral vector. Examples of conditions which facilitate uptake of foreign nucleic acid by mammalian cells are well known in the art and include but are not limited to chemical means (such as Lipofectamine®,Thermo-Fisher Scientific), high salt, magnetic fields (electroporation)

In one embodiment, a non-viral vector may be provided in a non-viral delivery system. Non-viral delivery systems are typically complexes to facilitate transduction of the target cell with a nucleic acid cargo wherein the nucleic acid is complexed with agents such as cationic lipids (DOTAP, DOTMA), surfactants, biologicals (gelatin, chitosan), metals (gold, magnetic iron) and synthetic polymers (PLG, PEI, PAMAM). Numerous embodiments of non-viral delivery systems are well known in the art including lipidic vector systems (Lee et al. (1997) Crit Rev Ther Drug Carrier Syst. 14:173-206); polymer coated liposomes (Marin et al., U.S. Pat. No. 5,213,804, issued May 25, 1993; Woodle, et al., U.S. Pat. No. 5,013,556, issued May 7, 1991); cationic liposomes (Epand et al., U.S. Pat. No. 5,283,185, issued Feb. 1, 1994; Jessee, J. A., U.S. Pat. No. 5,578,475, issued Nov. 26, 1996; Rose et al, U.S. Pat. No. 5,279,833, issued Jan. 18, 1994; Gebeyehu et al., U.S. Pat. No. 5,334,761, issued Aug. 2, 1994).

In another embodiment, the expression vector may be a viral vector. As used herein, the term viral vector is used in its conventional sense to refer to any of the obligate intracellular parasites having no protein-synthesizing or energy-generating mechanism and generally refers to any of the enveloped or non-enveloped animal viruses commonly employed to deliver exogenous transgenes to mammalian cells. A viral vector may be replication competent (e.g., substantially wild-type), conditionally replicating (recombinantly engineered to replicate under certain conditions) or replication deficient (substantially incapable of replication in the absence of a cell line capable of complementing the deleted functions of the virus). The viral vector can possess certain modifications to make it "specifically replicating," i.e. that it replicates preferentially in certain cell types or phenotypic cell states, e.g., cancerous. Viral vector systems useful in the practice of the instant gp130 binding molecule include, for example, naturally occurring or recombinant viral vector systems. Examples of viruses useful in the practice of the present gp130 binding molecule include recombinantly modified enveloped or non-enveloped DNA and RNA viruses. For example, viral vectors can be derived from the genome of human or bovine adenoviruses, vaccinia virus, lentivirus, herpes virus, adeno-associated virus, human immunodeficiency virus, sindbis virus, and retroviruses (including but not limited to Rous sarcoma virus), and hepatitis B virus. Typically, genes of interest are inserted into such vectors to allow packaging of the gene construct, typically with accompanying viral genomic sequences, followed by infection of a sensitive host cell resulting in expression of the gene of interest (e.g., a targeting antigen).

The expression vector may encode one or more polypeptides in addition to the targeting antigen. When expressing multiple polypeptides as in the practice of the present gp130 binding molecule, each polypeptide may be operably linked to an expression control sequence (monocistronic) or multiple polypeptides may be encoded by a polycistronic construct where multiple polypeptides are expressed under the control of a single expression control sequence. In one embodiment, the expression vector encoding the targeting antigen may optionally further encode one or more immunological modulators. Examples of immunological modulators useful in the practice of the present gp130 binding molecule include but are not limited to cytokines. Examples of such cytokines are interleukins including but not limited to one more or of IL-1, IL-2, IL-3, IL-4, IL-12, TNF-alpha, interferon alpha, interferon alpha-2b, interferon-beta, interferon-gamma, GM-CSF, MIP1-alpha, MIP1-beta, MIP3-alpha, TGF-beta and other suitable cytokines capable of modulating immune response. The expressed cytokines can be directed for intracellular expression or expressed with a signal sequence for extracellular presentation or secretion.

The expression vector may optionally provide an additional expression cassette comprising a nucleic acid sequence encoding a "rescue" gene. A "rescue gene" is a nucleic acid sequence, the expression of which renders the cell susceptible to killing by external factors or causes a toxic condition in the cell such that the cell is killed. Providing a rescue gene enables selective cell killing of transduced cells. Thus, the rescue gene provides an additional safety precaution when said constructs are incorporated into the cells of a mammalian subject to prevent undesirable spreading of transduced cells or the effects of replication competent vector systems. In one embodiment, the rescue gene is the thymidine kinase (TK) gene (see e.g., Woo, et al. U.S. Pat. No. 5,631,236 issued May 20, 1997 and Freeman, et al. U.S. Pat. No. 5,601,818 issued Feb. 11, 1997) in which the cells expressing the TK gene product are susceptible to selective killing by the administration of gancyclovir.

Dosage

The present disclosure further provides the administration of therapeutically or prophylactically effective dose of gp130 binding molecule or a recombinant vector or cell comprising a nucleic acid sequence encoding a polypeptide gp130 binding molecule to a subject suffering from or at risk of developing, respectively, a disease, disorder or condition. The dosage of the pharmaceutical composition comprising the gp130 binding molecules, vector or cell depends on factors including the route of administration, the disease to be treated, and physical characteristics, e.g., age, weight, general health, of the subject. Typically, the amount of a gp130 binding molecule contained within a single dose may be an amount that effectively prevents, delays, or treats the disease without inducing significant toxicity. A pharmaceutical composition of the disclosure may include a dosage of a gp130 binding molecule described herein ranging from 0.01 to 500 mg/kg (e.g., from 0.01 to 450 mg, from 0.01 to 400 mg, from 0.01 to 350 mg, from 0.01 to 300 mg, from 0.01 to 250 mg, from 0.01 to 200 mg, from 0.01 to 150 mg, from 0.01 to 100 mg, from 0.01 to 50 mg, from 0.01 to 10 mg, from 0.01 to 1 mg, from 0.1 to 500 mg/kg, from 1 to 500 mg/kg, from 5 to 500 mg/kg, from 10 to 500 mg/kg, from 50 to 500 mg/kg, from 100 to 500 mg/kg, from 150 to 500 mg/kg, from 200 to 500 mg/kg, from 250 to 500 mg/kg, from 300 to 500 mg/kg, from 350 to 500 mg/kg, from 400 to 500 mg/kg, or from 450 to 500 mg/kg) and, in a more specific embodiment, about 1 to about 100 mg/kg (e.g., about 1 to about 90 mg/kg, about 1 to about 80 mg/kg, about 1 to about 70 mg/kg, about 1 to about 60 mg/kg, about 1 to about 50 mg/kg, about 1 to about 40 mg/kg, about 1 to about 30 mg/kg, about 1 to about 20 mg/kg, about 1 to about 10 mg/kg, about 10 to about 100 mg/kg, about 20 to about 100 mg/kg, about 30 to about 100 mg/kg, about 40 to about 100 mg/kg, about 50 to about 100 mg/kg, about 60 to about 100 mg/kg, about 70 to about 100 mg/kg, about 80 to about 100 mg/kg, or about 90 to about 100 mg/kg). In some embodiments, a pharmaceutical composition of the disclosure may include a dosage of a binding protein described herein ranging from 0.01 to 20 mg/kg (e.g., from 0.01 to 15 mg/kg, from 0.01 to 10 mg/kg, from 0.01 to 8 mg/kg, from 0.01 to 6 mg/kg, from 0.01 to 4 mg/kg, from 0.01 to 2 mg/kg, from 0.01 to 1 mg/kg, from 0.01 to 0.1 mg/kg, from 0.01 to 0.05 mg/kg, from 0.05 to 20 mg/kg, from 0.1 to 20 mg/kg, from 1 to 20 mg/kg, from 2 to 20 mg/kg, from 4 to 20 mg/kg, from 6 to 20 mg/kg, from 8 to 20 mg/kg, from 10 to 20 mg/kg, from 15 to 20 mg/kg). The dosage may be adapted by the physician in accordance with conventional factors such as the extent of the disease and different parameters of the subject.

A pharmaceutical composition containing a gp130 binding molecule described herein can be administered to a subject in need thereof, for example, one or more times (e.g., 1-10 times or more) daily, weekly, monthly, biannually, annually, or as medically necessary. Dosages may be provided in either a single or multiple dosage regimens. The timing between administrations may decrease as the medical condition improves or increase as the health of the patient declines. A course of therapy may be a single dose or in multiple doses over a period of time. In some embodiments, a single dose is used. In some embodiments, two or more split doses administered over a period of 1, 2, 3, 4, 5, 6, 7, 8, 9, 10, 11, 12, 13, 14, 21, 28, 30, 60, 90, 120 or 180 days are used. Each dose administered in such split dosing protocols may be the same in each administration or may be different. Multi-day dosing protocols over time periods may be provided by the skilled artisan (e.g., physician) monitoring the administration, taking into account the response of the subject to the treatment including adverse effects of the treatment and their modulation as discussed above.

For prophylactic applications, pharmaceutical compositions or medicaments are administered to a patient susceptible to, or otherwise at risk of disease in an amount sufficient to eliminate or reduce the risk, lessen the severity, or delay the outset of the disease, including biochemical, histologic and/or behavioral symptoms of the disease, its complications and intermediate pathological phenotypes presenting during development of the disease.

In some embodiments the condition to be treated is a chronic condition (e.g., a chronic infection, i.e., an infection that is not cleared by the host immune system within a period of up to 1 week, 2 weeks, etc.). In some cases, chronic condition involve integration of pathogen genetic elements into the host genome, e.g., retroviruses, lentiviruses, Hepatitis B virus, etc. In other cases, chronic infections, for example certain intracellular bacteria or protozoan pathogens, result from a pathogen cell residing within a host cell. Additionally, in some embodiments, the infection is in a latent stage, as with herpes viruses or human papilloma viruses. In such instances, the course of therapy may involve the administration of the gp130 binding molecule over an extended period of time including continued administration in the substantial absence of the symptoms of the chronic condition to prevent recurrence of the chronic conditions or symptoms thereof.

In prophylactic applications, a relatively low dosage may be administered at relatively infrequent intervals over a long period of time. Some patients continue to receive treatment for the rest of their lives. In other therapeutic applications, a relatively high dosage at relatively short intervals is sometimes required until progression of the disease is reduced or terminated, and preferably until the patient shows partial or complete amelioration of symptoms of disease. Thereafter, the patent can be administered a prophylactic regime.

Routes of Administration

Administration of a gp130 binding molecules described herein may be achieved through any of a variety of art recognized methods including but not limited to the topical, intravascular injection (including intravenous or intraarterial infusion), intradermal injection, subcutaneous injection, intramuscular injection, intraperitoneal injection, intracranial injection, intratumoral injection, intranodal injection, transdermal, transmucosal, iontophoretic delivery, intralymphatic injection (Senti and Kundig (2009) *Current Opinions in Allergy and Clinical Immunology* 9(6):537-543), intragastric infusion, intraprostatic injection, intravesical infusion (e.g., bladder), respiratory inhalers including nebulizers, intraocular injection, intraabdominal injection, intralesional injection, intraovarian injection, intracerebral infusion or injection, intracerebroventricular injection (ICVI), and the like. Administration to the subject may be achieved by intravenous, as a bolus or by continuous infusion over a period of time. Examples of parenteral routes of administration include, for example, intravenous, intradermal, subcutaneous, transdermal (topical), transmucosal, and rectal administration. The gp130 binding molecule can be administered once, continuously, such as by continuous pump, or at periodic (e.g., daily, bi-weekly, monthly) intervals over a period of time can occur over the period of one week, two weeks, one month, two months, three months or more. Desired time intervals of multiple doses of the gp130 binding molecule may be determined by one of skill in the art.

As described hereinabove, the compositions of the present disclosure may be used in combination with one or more additional therapeutically effective agents. As used herein, the term "in combination with" when used in reference to the administration of multiple agents to a subject refers to the administration of a first agent at least one additional (i.e. second, third, fourth, fifth, etc.) supplementary agent to a subject. For purposes of the present disclosure, one agent (e.g., a gp130 binding molecule) is considered to be administered in combination with a supplementary agent if the biological effect resulting from the administration of the first agent persists in the subject at the time of administration of the supplementary agent such that the therapeutic effects of the first agent and second agent overlap. The administration of the first agent may provide a therapeutic effect over an extended time and the administration of the supplementary agent provides its therapeutic effect while the therapeutic effect of the first agent remains ongoing such that the supplementary agent is considered to be administered in combination with the first agent, even though the first agent may have been administered at a point in time significantly distant (e.g., days or weeks) from the time of administration of the supplementary agent. In one embodiment, one agent is considered to be administered in combination with a supplementary agent if the first and second agents are administered simultaneously (within 30 minutes of each other), contemporaneously or sequentially. In some embodiments, a first agent is deemed to be administered "contemporaneously" with a supplementary agent if first and supplementary agents are administered within about 24 hours of each another, preferably within about 12 hours of each other, preferably within about 6 hours of each other, preferably within about 2 hours of each other, or preferably within about 30 minutes of each other. The term "in combination with" shall also understood to apply to the situation where a first agent and a supplementary agent are co-formulated in single pharmaceutically acceptable formulation and the co-formulation is administered to a subject. In certain embodiments, first agent and the supplementary agent(s) are administered or applied sequentially, e.g., where one agent is administered prior to one or more other agents. In other embodiments, the first agent and the supplementary agent(s) are administered simultaneously, for example where two or more agents are administered at or about the same time; the two or more agents may be present in two or more separate formulations or combined into a single formulation (i.e., a co-formulation). Regardless of whether the agents are administered sequentially or simultaneously, they are considered to be administered in combination for purposes of the present disclosure.

Kits

The present disclosure also contemplates kits comprising pharmaceutical compositions of gp130 binding molecules. In some embodiments, the kit further comprises supplementary pharmaceutical compositions comprising supplementary agents as discussed above for use in combination therapy with gp130 binding molecules. The kits are generally in the form of a physical structure housing various components, as described below, and can be utilized, for example, in practicing the methods described above. A kit may comprise a gp130 binding molecule in the form of a pharmaceutical composition suitable for administration to a subject that is ready for use or in a form or requiring preparation for example, thawing, reconstitution or dilution prior to administration. When the gp130 binding molecule is in a form that requires reconstitution by a user, the kit may also comprise a sterile container providing a reconstitution medium comprising buffers, pharmaceutically acceptable excipients, and the like. A kit of the present disclosure can be designed for conditions necessary to properly maintain the components housed therein (e.g., refrigeration or freezing). A kit may further contain a label or packaging insert including identifying information for the components therein and instructions for their use. Each component of the kit can be enclosed within an individual container, and all of the various containers can be within a single package. Labels or inserts can include manufacturer information such as lot numbers and expiration dates. The label or packaging insert can be, e.g., integrated into the physical structure housing the components, contained separately within the physical structure, or affixed to a component of the kit (e.g., an ampule, syringe or vial). Labels or inserts may be provided in a physical form or a computer readable medium. In some embodiments, the actual instructions are not present in the kit, but rather the kit provides a means for obtaining the instructions from a remote source, e.g., via an internet site, including by secure access by providing a password (or scannable code such as a barcode or QR code on the container of the gp130 binding molecule or kit comprising) in compliance with governmental regulations (e.g., HIPAA) are provided.

EXAMPLES

The following examples are put forth so as to provide those of ordinary skill in the art with a complete disclosure and description of how to make and use the present gp130 binding molecule, and are not intended to limit the scope of what the inventors regard as their gp130 binding molecule nor are they intended to represent that the experiments below were performed and are all of the experiments that can be performed. It is to be understood that exemplary descriptions written in the present tense were not necessarily performed, but rather that the descriptions can be performed to generate the data and the like described therein. Efforts have been made to ensure accuracy with respect to numbers used (e.g., amounts, temperature, etc.), but some experimental errors and deviations should be accounted for. Variations of the particularly described procedures employed may become apparent to individuals or skill in the art and it is expected that those skilled artisans may employ such variations as appropriate. Accordingly, it is intended that the gp130 binding molecule be practiced otherwise than as specifically described herein, and that the invention includes all modifications and equivalents of the subject matter recited in the claims appended hereto as permitted by applicable law.

Unless indicated otherwise, parts are parts by weight, molecular weight is weight average molecular weight, temperature is in degrees Celsius (° C.), and pressure is at or near atmospheric. Standard abbreviations are used, including the following: bp=base pair(s); kb=kilobase(s); pl=picoliter(s); s or sec=second(s); min=minute(s); h or hr=hour(s); aa=amino acid(s); kb=kilobase(s); nt=nucleotide(s); pg=picogram; ng=nanogram; µg=microgram; mg=milligram; g=gram; kg=kilogram; dl or dL=deciliter; µl or µL=microliter; ml or mL=milliliter; 1 or L=liter; µM=micromolar; mM=millimolar; M=molar; kDa=kilodalton; i.m.=intramuscular(ly); i.p.=intraperitoneal (ly); SC or SQ=subcutaneous(ly); QD=daily; BID=twice daily; QW=weekly; QM=monthly; HPLC=high performance liquid chromatography; BW=body weight; U=unit; ns=not statistically significant; PBS=phosphate-buffered saline; PCR=polymerase chain reaction; NHS=N-hydroxysuccinimide; HSA=human serum albumin; MSA=mouse serum albumin; DMEM=Dulbeco's Modification of Eagle's Medium; GC=genome copy; EDTA=ethylenediaminetetraacetic acid; PBMCs=primary peripheral blood mononuclear cells; FBS=fetal bovine serum; FCS=fetal calf serum; HEPES=4-(2-hydroxyethyl)-1piperazineethanesulfonic acid; LPS=lipopolysaccharide; ATCC=American Type Culture Collection Example 1. Immunization Protocol The process for isolation of the anti-hgp130 VHHs was initiated by immunization of a camel with a polypeptide corresponding to amino acids 23-619 of hgp130, (UNIPROT Reference No. P40189). The process for isolation of the anti-mgp130 VHHs was the initiated by immunization of a camel with the with the 201 amino acid extracellular domain of the mgp130, amino acids 23-617 of the mgp130 precursor (UNIPROT Reference No. Q00560). With respect to each antigen, the following methodology was used to identify and isolate the VHHs.

The synthetic DNA sequence encoding the antigen was inserted into the pFUSE_hIgG1_Fc2 vector (Generay Biotechnology) and transfected into the HEK293F mammalian cell host cell for expression. The antigen is expressed as an Fc fusion protein which is purified using Protein A chromatography. The antigen was diluted with 1×PBS (antigen total about 1 mg). The quality was estimated by SDS-PAGE to ensure the purity was sufficient (>80%) for immunization. The camel was acclimated at the facility for at least 7 days before immunization. The immunization with the antigen was conducted using once weekly administration of the antigen over a period of 7 weeks. For the initial immunization, the immunogen was prepared as follows: 10 mL of complete Freund's Adjuvant (CFA) was added into mortar, then 10 mL antigen in 1×PBS was slowly added into the mortar with the pestle grinding and sample ground until the antigen was emulsified until milky white and hard to disperse. For the subsequent six immunizations (weeks 2-7) in the immunization protocol, immunogen was prepared as above except that Incomplete Freund's Adjuvant (IFA) was used in place of CFA. At least six sites on the camel were injected subcutaneously with approximately 2 ml of the emulsified antigen for a total of approximately 10 mL per camel. When injecting the antigen, the needle is maintained in the in the subcutaneous space for approximately 10 to 15 seconds after each injection to avoid leakage of the emulsion.

Example 2. Phage Library Construction

A blood sample was collected from the camel three days following the last injection in the immunization protocol. RNA was extracted from blood and transcribed to cDNA. The approximately 900 bp reverse transcribed sequences encoding the VHH-CH1-hinge-CH2-CH3 constructs were isolated from the approximately desired 700 bp fragments encoding the VHH-hinge-CH2-CH3 species. The purified approximately 700 bp fragments were amplified by nested PCR. The amplified sequences were digested using Pst1 and Not1. The approximately 400 bp PST1/Not1 digested fragments were inserted into a Pst1/Not1 digested pMECS phagemid vector such that the sequence encoding the VHH was in frame with a DNA sequence encoding a HA/His sequence. The PCR generated sequences and the vector of pMECS phagemid were digested with Pst I and Not I, subsequently, ligated to pMECS/Nb recombinant. After ligation, the products were transformed into *Escherichia coli* (*E. coli*) TG1 cells by electroporation. The transformants were enriched in growth medium, followed by transfer to 2YT+2% glucose agar plates.

Example 3: Isolation of Antigen Specific VHHs

Bio-panning of the phage library was conducted to identify VHHs that bind IFNgR1. A 96-well plate was coated with IFNgR1 and the phage library was incubated in each well to allow phage-expressing IFNgR1 reactive VHH to bind to the IFNgR1 on the plate. Non-specifically bound phage were washed off and the specifically bound phage isolated. After the selection, the enriched phage library expressing IFNgR1 reactive VHH were amplified in TG1 cells. The aforementioned bio-panning process was repeated for 2-3 rounds to enrich the library for VHH selective for IFNgR1.

Example 4: Identification of Antibodies Exhibiting Specific Binding to IFNgR1

A Upon completion of the biopanning of Example 3, three 96-well plates of individual phage clones were isolated in order to perform periplasmic extract ELISA (PE-ELISA) on IFNgR1 coated plates to identify positive VHH binders that selectively bound IFNgR1. A 96-well plate was coated with IFNgR1 and PBS under the same conditions. Next, wells were blocked at 37° C. for 1 h. Then, 100 μl of extracted antibodies was added to each well and incubated for 1 h. Subsequently, 100 μl of anti-tag polyclonal antibody conjugated to HRP was added to each well and incubated at 37° C. for 1 h. Plates were developed with TMB substrate. The reaction was stopped by the addition of H2SO4. Absorbance at 450 nm was read on a microtiter plate reader. Antibodies with absorbance of the antigen-coated well at least threefold greater than PBS-coated control were considered to provide specific binding to IFNgR1. Positive clones were sequenced, and sequences analyzed to identify unique clonotypes Example 5. Evaluation of Binding Affinity Via Surface Plasmon Resonance A representative example from each hgp130 VHH and mgp130 VHH clonotype generated in accordance with Examples 1-3 was selected for evaluation of binding via SPR as follows. Evaluation of binding affinity of the hgp130 binding molecules corresponding to SEQ ID NOS 2, 3, 4, 5, 6 and 7 was conducted using surface plasmon resonance (SPR) in substantial accordance with the following procedure. All experiments were conducted in 10 mM Hepes, 150 mM NaCl, 0.05% (v/v) Polysorbate 20 (PS20) and 3 mM EDTA (HBS-EP+ buffer) on a Biacore T200 instrument equipped with a Protein A derivatized sensor chip (Cytiva). Mono-Fc VHH ligands were flowed at 5 µl/min for variable time ranging from 18 to 300 seconds, reaching the capture loads listed in the tables below. Following ligand capture, injections of a 2-fold dilution series of the extracellular domain of the IL2Rb-receptor modified to incorporate a C-terminal poly-His sequence, typically comprising at least five concentrations between 1 µM and 1 nM, were performed in either high performance or single cycle kinetics mode. Surface regeneration was achieved by flowing 10 mM glycine-HCl, pH 1.5 (60 seconds, 50 µL/min). Buffer-subtracted sensograms were processed with Biacore T200 Evaluation Software and globally fit with a 1:1 Langmuir binding model (bulk shift set to zero) to extract kinetics and affinity constants ($k_a$, $k_d$, $K_D$). $R_{MAX}<100$ RU indicates surface density compatible with kinetics analysis. Calculated $R_{max}$ values were generated using the equation: Rmax=Load (RU)×valency of ligand ×(Molecular weight of analyte/Molecular weight of ligand). Surface activity was defined as the ratio of experimental/calculated Rmax.

It is understood that the examples and embodiments described herein are for illustrative purposes only and that various modifications or changes in light thereof will be suggested to persons skilled in the art and are to be included within the spirit and purview of this application and scope of the appended claims. All publications, sequence accession numbers, patents, and patent applications cited herein are hereby incorporated by reference in their entirety for all purposes.

The invention claimed is:

1. A gp130 binding molecule that specifically binds to the extracellular domain of gp130, wherein the gp130 binding molecule comprises a single domain antibody comprising
   a complementarity determining region (CDR) 1 comprising the amino acid sequence of SEQ ID NO:8, a CDR2 comprising the amino acid sequence of SEQ ID NO:9, and a CDR3 comprising the amino acid sequence of SEQ ID NO:10; or
   a CDR1 comprising the amino acid sequence of SEQ ID NO:11, a CDR2 comprising the amino acid sequence of SEQ ID NO: 12, and a CDR3 comprising the amino acid sequence of SEQ ID NO:13; or
   a CDR1 comprising the amino acid sequence of SEQ ID NO:14, a CDR2 comprising the amino acid sequence of SEQ ID NO:15, and a CDR3 comprising the amino acid sequence of SEQ ID NO:16; or
   a CDR1 comprising the amino acid sequence of SEQ ID NO:17, a CDR2 comprising the amino acid sequence of SEQ ID NO:18, and a CDR3 comprising the amino acid sequence of SEQ ID NO:19; or
   a CDR1 comprising the amino acid sequence of SEQ ID NO:20, a CDR2 comprising the amino acid sequence of SEQ ID NO:21, and a CDR3 comprising the amino acid sequence of SEQ ID NO:22; or
   a CDR1 comprising the amino acid sequence of SEQ ID NO:23, a CDR2 comprising the amino acid sequence of SEQ ID NO:24, and a CDR3 comprising the amino acid sequence of SEQ ID NO:25.

2. The gp130 binding molecule of claim 1, wherein the CDR1 comprises an amino acid sequence of SEQ ID NO: 17, the CDR2 comprises an amino acid sequence of SEQ ID NO: 18, and the CDR3 comprises an amino acid sequence of SEQ ID NO: 19.

3. The gp130 binding molecule of claim 1, wherein the CDR1 comprises SEQ ID NO: 8, the CDR2 comprises SEQ ID NO:9, and the CDR3 comprises SEQ ID NO:10.

4. The gp130 binding molecule of claim 1, wherein the CDR1 comprises SEQ ID NO: 11, the CDR2 comprises SEQ ID NO:12, and the CDR3 comprises SEQ ID NO:13.

5. The gp130 binding molecule of claim 1, wherein the CDR1 comprises SEQ ID NO: 14, the CDR2 comprises SEQ ID NO: 15, and the CDR3 comprises SEQ ID NO:16.

6. The gp130 binding molecule of claim 1, wherein the CDR1 comprises SEQ ID NO: 20, the CDR2 comprises SEQ ID NO:21, and the CDR3 comprises SEQ ID NO:22.

7. The gp130 binding molecule of claim 1, wherein the CDR1 comprises SEQ ID NO: 23, the CDR2 comprises SEQ ID NO:24, and the CDR3 comprises SEQ ID NO:25.

8. The gp130 binding molecule of claim 1, wherein the gp130 binding molecule is a $V_H H$.

9. The gp130 binding molecule of claim 8, wherein the VHH comprises an amino acid sequence of SEQ ID NO: 5.

10. The gp130 binding molecule of claim 8, wherein the VHH is humanized or otherwise comprises CDRs grafted onto a heterologous framework.

11. The gp130 binding molecule claim 1, further comprising a labeling agent, an imaging agent, and/or a therapeutic agent.

12. A nucleic acid sequence encoding the gp130 binding molecule of claim 1.

13. A recombinant viral or non-viral vector comprising a nucleic acid of claim 12.

14. A host cell comprising a nucleic acid of claim 12.

15. A pharmaceutical formulation comprising the viral or non-viral vector of claim 13.

16. A kit comprising the gp130 binding molecule of claim 1.

17. A method for treating a neoplastic, inflammatory or autoimmune disease in a mammalian subject by administering to said subject a therapeutically effective amount of a gp130 binding molecule of claim 1 or a pharmaceutically acceptable formulation thereof.

18. The method of claim 17 wherein the disease is a neoplastic disease.

19. The method of claim 9 wherein the disease is an inflammatory or autoimmune disease.

20. The method of claim 19 wherein the inflammatory or autoimmune disease is selected from the group consisting of rheumatoid arthritis, systemic lupus erythramatosis (SLE), and inflammatory bowel disease (IBD).

* * * * *